(12) United States Patent
Yasui

(10) Patent No.: US 8,064,315 B2
(45) Date of Patent: Nov. 22, 2011

(54) CONDENSING OPTICAL DEVICE, OPTICAL PICKUP, AND OPTICAL DISC APPARATUS

(75) Inventor: Toshifumi Yasui, Saitama (JP)

(73) Assignee: Sony Corporation, Tokyo (JP)

( * ) Notice: Subject to any disclaimer, the term of this patent is extended or adjusted under 35 U.S.C. 154(b) by 258 days.

(21) Appl. No.: 12/544,410

(22) Filed: Aug. 20, 2009

(65) Prior Publication Data

US 2010/0054109 A1    Mar. 4, 2010

(30) Foreign Application Priority Data

Aug. 28, 2008 (JP) ................. 2008-220488

(51) Int. Cl.
*G11B 7/00* (2006.01)

(52) U.S. Cl. ......... 369/112.08; 369/112.03; 369/112.05; 369/112.06; 369/112.07; 369/112.11; 369/112.12; 369/112.13; 369/112.23; 369/112.25; 369/112.26

(58) Field of Classification Search ............. 369/112.03, 369/112.05, 112.06, 112.07, 112.08, 112.11, 369/112.12, 112.13, 112.23, 112.25, 112.26

See application file for complete search history.

(56) References Cited

U.S. PATENT DOCUMENTS

| | | | |
|---|---|---|---|
| 2002/0122374 A1 | 9/2002 | Yamamoto et al. | |
| 2003/0058776 A1* | 3/2003 | Sakamoto | 369/112.07 |
| 2005/0105446 A1 | 5/2005 | Sakamoto et al. | |
| 2009/0316543 A1 | 12/2009 | Hayashibe et al. | |
| 2010/0002562 A1 | 1/2010 | Kaneda | |
| 2010/0008200 A1 | 1/2010 | Ogihara | |
| 2010/0284262 A1* | 11/2010 | Nakamura et al. | 369/112.23 |

FOREIGN PATENT DOCUMENTS

| | | |
|---|---|---|
| JP | 9-312057 A | 12/1997 |
| JP | 11-219542 A | 8/1999 |
| JP | 11-353785 A | 12/1999 |
| JP | 2001-143301 A | 5/2001 |
| JP | 2001-357557 A | 12/2001 |
| JP | 2002-329316 A | 11/2002 |
| JP | 2003-157545 A | 5/2003 |
| JP | 2004-265573 | 9/2004 |
| JP | 2005-018967 A | 1/2005 |
| JP | 2005-037658 A | 2/2005 |
| JP | 2005-209325 A | 8/2005 |
| JP | 2005-259332 A | 9/2005 |
| JP | 2005-327328 A | 11/2005 |
| JP | 2005-353142 A | 12/2005 |
| JP | 2006-107734 A | 4/2006 |

(Continued)

*Primary Examiner* — Latanya Bibbins
(74) *Attorney, Agent, or Firm* — Wolf, Greenfield & Sacks, P.C.

(57) ABSTRACT

An optical pickup includes: a first emission unit emitting an optical beam with a first wavelength corresponding to a first optical disc; a second emission unit emitting an optical beam with a second wavelength, which is longer than the first wavelength, corresponding to a second optical disc different from the first optical disc; a third emission unit emitting an optical beam with a third wavelength, which is longer than the second wavelength, corresponding to a third optical disc different from the first and second optical discs; a condensing optical device condensing, on a signal recording surface of a corresponding optical disc, the optical beams emitted from the first to third emission units; and a diffraction unit provided in the condensing optical device, which is disposed on the optical path of the optical beams with the first to third wavelengths.

14 Claims, 36 Drawing Sheets

FOREIGN PATENT DOCUMENTS

| | | |
|---|---|---|
| JP | 2006-185498 A | 7/2006 |
| JP | 2006-309809 A | 11/2006 |
| JP | 2007-004962 A | 1/2007 |
| JP | 2007-122851 A | 5/2007 |
| JP | 2007-294029 A | 11/2007 |
| JP | 2007-328886 A | 12/2007 |
| JP | 2008-004169 A | 1/2008 |
| JP | 2008-071433 A | 3/2008 |
| WO | WO 2008/010506 A1 | 1/2008 |

* cited by examiner

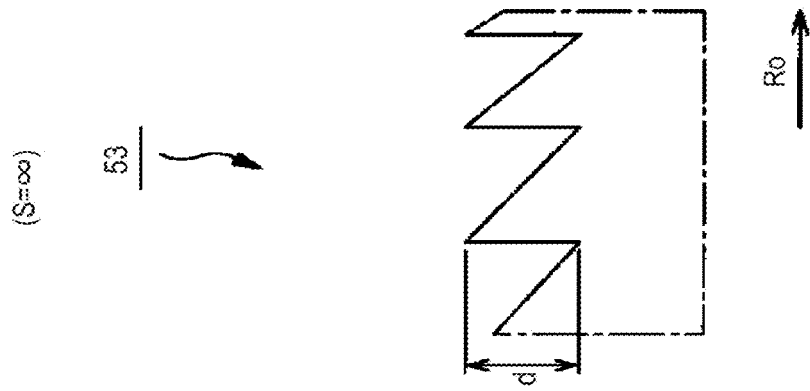
FIG.5C (S=∞)
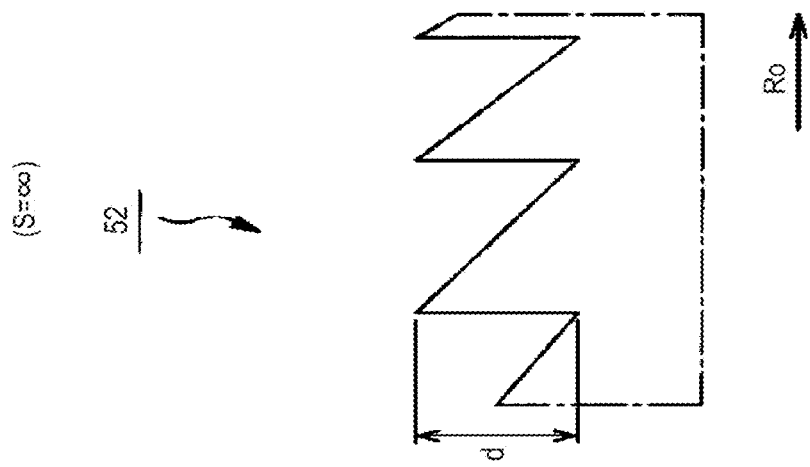
FIG.5B (S=∞)
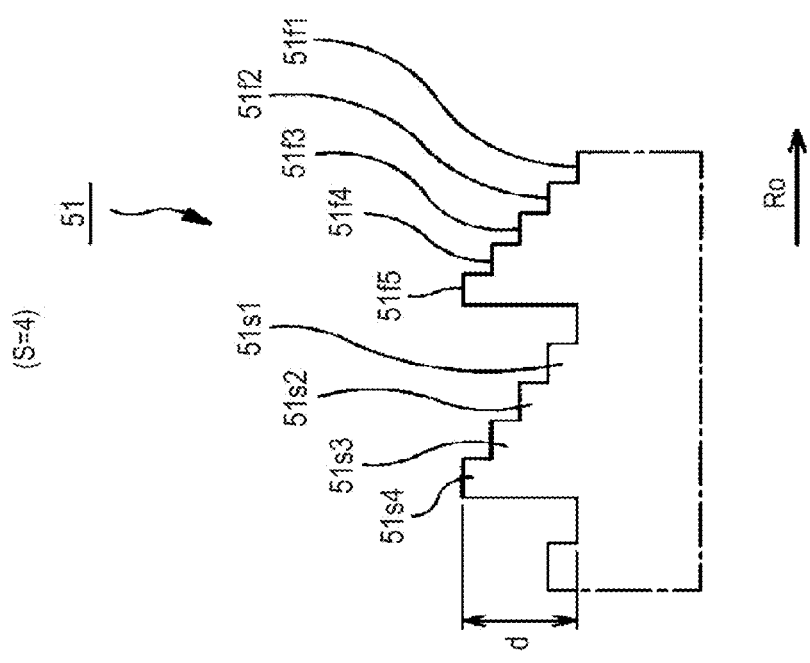
FIG.5A (S=4)

SPHERICAL CORRECTION POSSIBILITY OF INNER RING ZONE OF EXAMPLE 1
$(k_{1i}, k_{2i}, k_{3i})=(+1,-1,-2)$

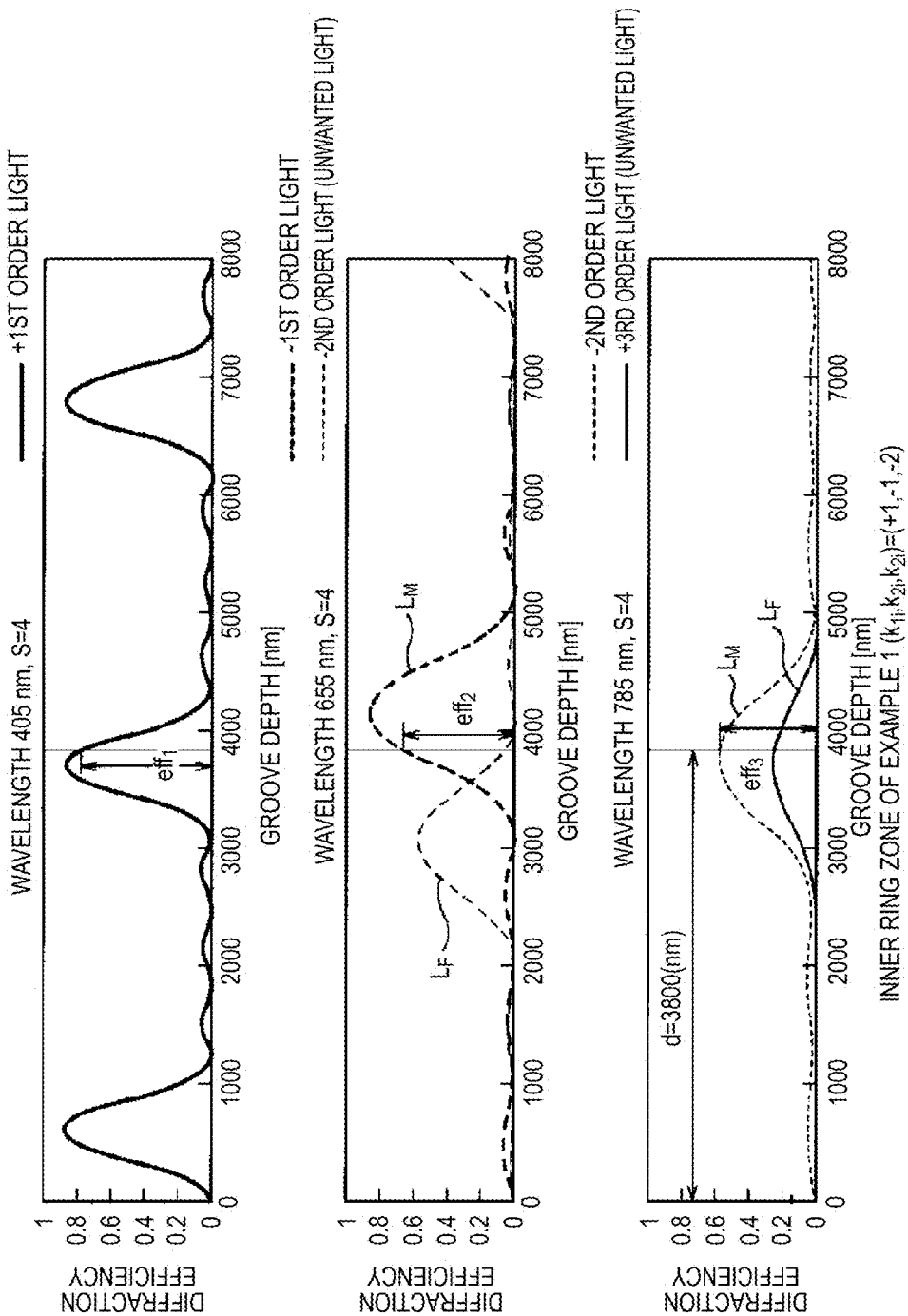

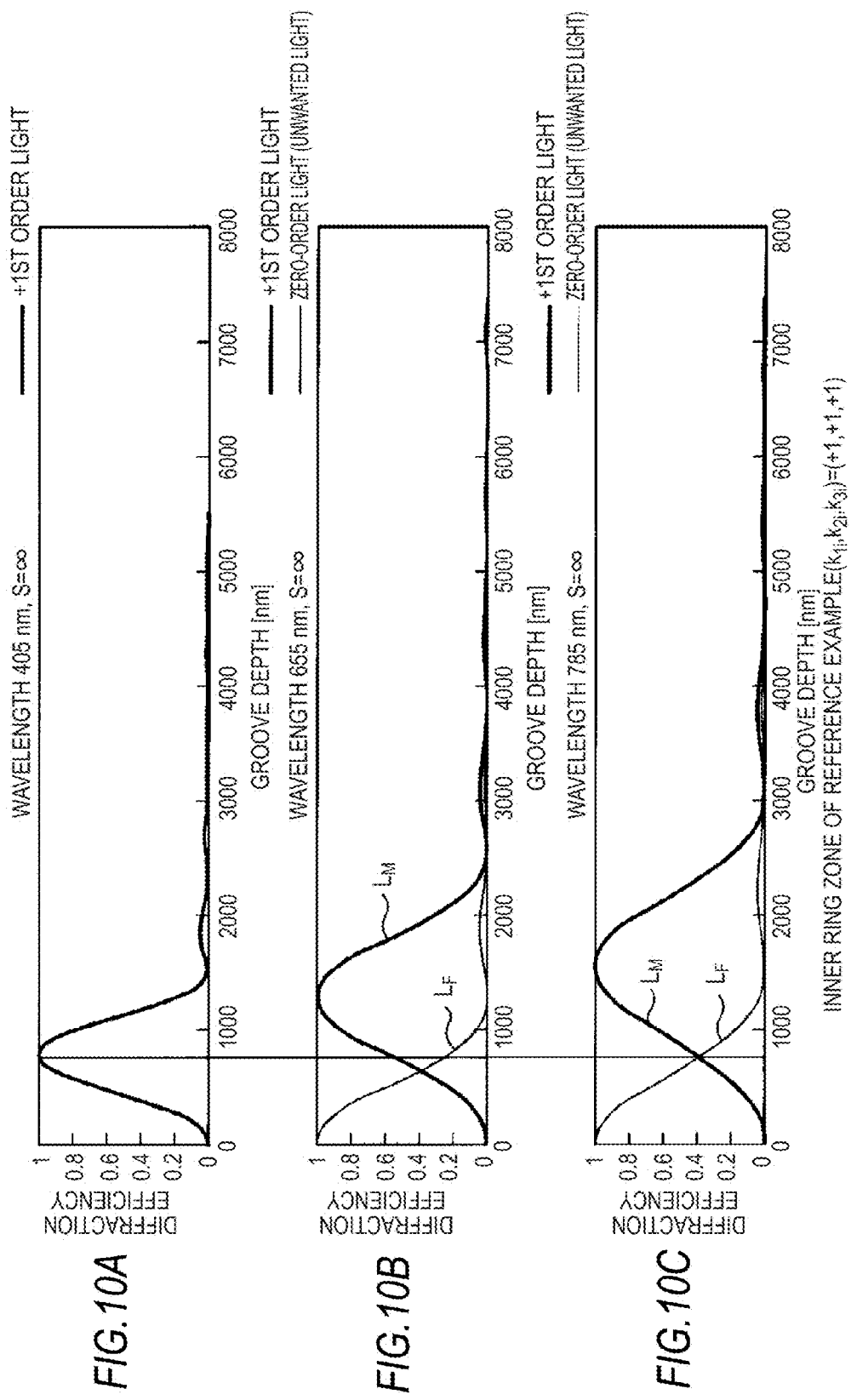

OBJECTIVE LENS: RELATION BETWEEN $C_2$ AND $\triangle SA3$

FLARING IN MIDDLE RING ZONE OF EXAMPLE 1
$(k_{1m}, k_{2m}, k_{3m}) = (+3, +2, +2)$

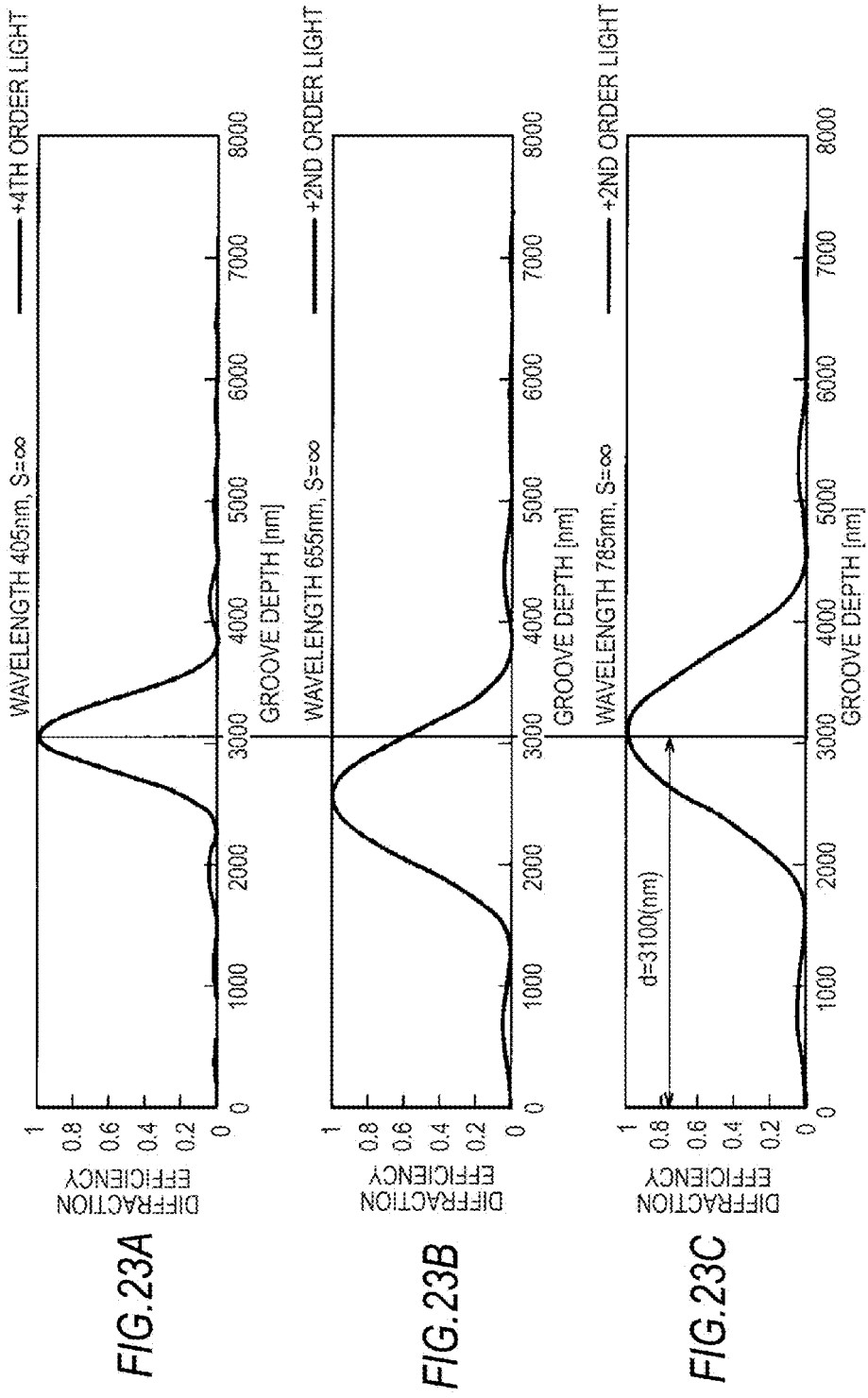

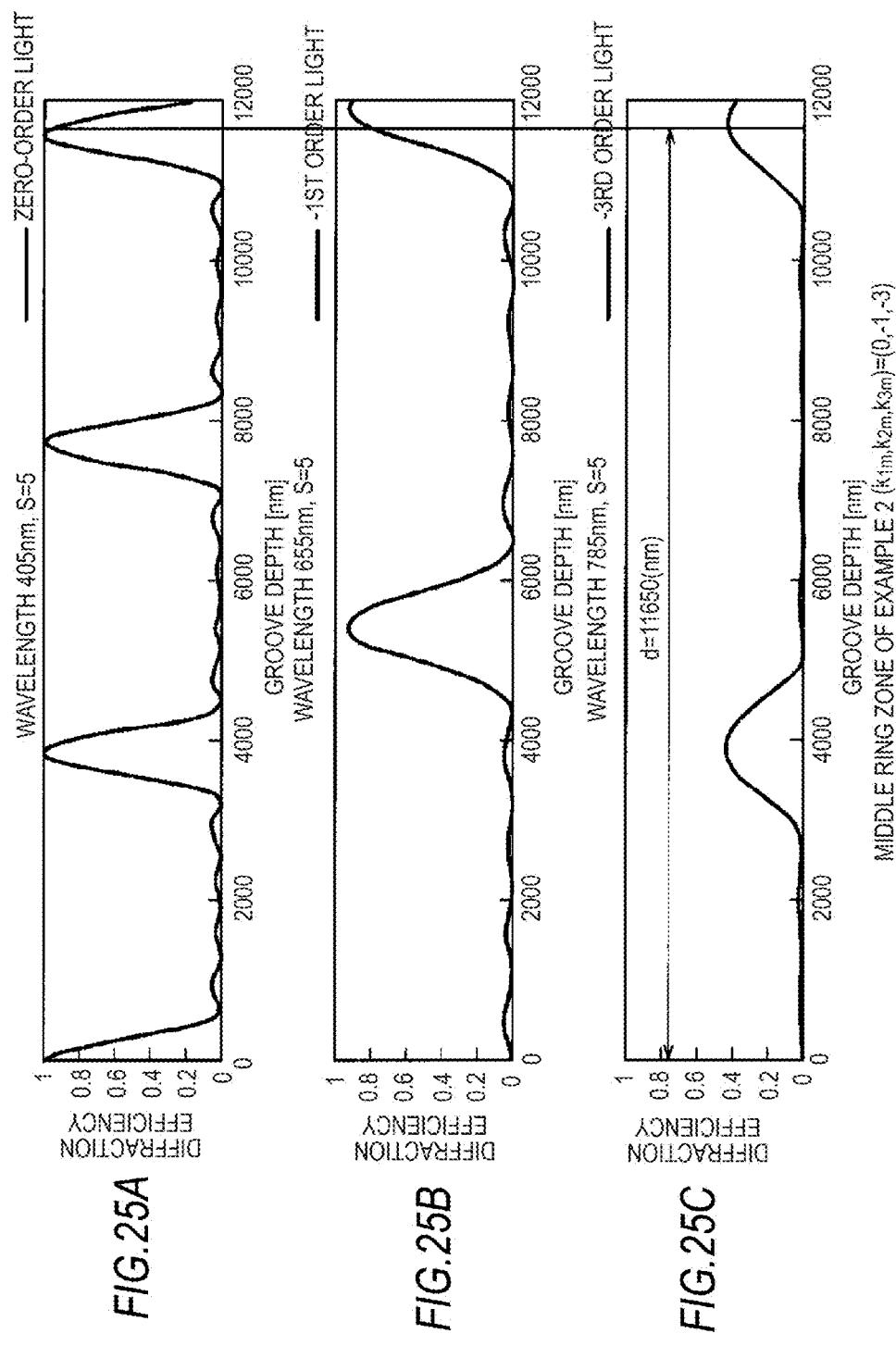

SPHERICAL CORRECTION POSSIBILITY OF INNER RING ZONE OF EXAMPLE 2
$(k_{1i}, k_{2i}, k_{3i}) = (0, -1, -2)$

FLARING IN MIDDLE RING ZONE OF EXAMPLE 2
$(k_{1m}, k_{2m}, k_{3m}) = (0, -1, -3)$

FLARING IN OUTER RING ZONE OF EXAMPLE 2
$(k_{1o}, k_{2o}, k_{3o}) = (+1, +1, +1)$

LONGITUDINAL ABERRATION DIAGRAM OF EXAMPLE 13
(FIRST OPTICAL DISC)

LONGITUDINAL ABERRATION DIAGRAM OF EXAMPLE 13
(SECOND OPTICAL DISC)

LONGITUDINAL ABERRATION DIAGRAM OF EXAMPLE 13
(THIRD OPTICAL DISC)

LONGITUDINAL ABERRATION DIAGRAM OF EXAMPLE 14
(FIRST OPTICAL DISC)

LONGITUDINAL ABERRATION DIAGRAM OF EXAMPLE 14
(SECOND OPTICAL DISC)

LONGITUDINAL ABERRATION DIAGRAM OF EXAMPLE 14
(THIRD OPTICAL DISC)

LONGITUDINAL ABERRATION DIAGRAM OF EXAMPLE 15
(FIRST OPTICAL DISC)

LONGITUDINAL ABERRATION DIAGRAM OF EXAMPLE 15
(SECOND OPTICAL DISC)

LONGITUDINAL ABERRATION DIAGRAM OF EXAMPLE 15
(THIRD OPTICAL DISC)

CONDENSING OPTICAL DEVICE, OPTICAL PICKUP, AND OPTICAL DISC APPARATUS

BACKGROUND OF THE INVENTION

1. Field of the Invention

The present invention relates to a condensing optical device for use in an optical pickup for performing recording and/or playback of an information signal with respect to a different three types of optical discs, an optical pickup, and an optical disc apparatus using the optical pickup.

2. Description of the Related Art

In recent years, an optical disc capable of high-density recording (hereinafter, referred to as "high-density recording optical disc" in which recording/playback of a signal is performed by using an optical beam with a wavelength of about 405 nm by a blue-violet semiconductor laser has been proposed as a next-generation optical disc format. An example of the high-density recording optical disc has been proposed in which the thickness of a cover layer for protecting a signal recording layer is made thin, for example, to 0.1 mm.

When providing an optical pickup compatible with the high-density recording optical discs, an optical pickup having compatibility with optical discs having different formats, such as a CD (Compact Disc) with a use wavelength of about 785 nm, a DVD (Digital Versatile Disc) with a wavelength of about 655 nm, and the like, according to the related art has been desired. Thus, there has been demand for an optical pickup and an optical disc apparatus having compatibility between optical discs having formats in which the disc structure and consequently laser specifications thereof differ.

A method is known which realizes recording or playback of an information signal with respect to three types of optical discs having different formats. In this case, two types of objective lenses and two types of optical systems for DVD/CD and high-density recording optical disc such as shown in FIG. 43 are provided, and the objective lenses are switched for each use wavelength.

An optical pickup 130 shown in FIG. 43 realizes recording and/or playback of different types of optical discs by providing two types of objective lenses 134 and 135. The optical pickup 130 includes a light source unit 132, such as a laser diode or the like, which has an emission unit for emitting an optical beam with a wavelength of about 785 nm with respect to an optical disc, such as a CD or the like, and an emission unit for emitting an optical beam with a wavelength of about 655 nm with respect to an optical disc, such as a DVD or the like, a light source unit 131, such as a laser diode or the like, which has an emission unit for emitting an optical beam with a wavelength of about 405 nm with respect to a high-density recording optical disc, an objective lens 134 for an optical disc, such as a DVD, a CD, or the like, and an objective lens 135 for a high-density recording optical disc. The optical pickup also includes collimator lenses 142A and 142B, quarter-wave plates 143A and 143B, redirecting mirrors 144A and 144B, beam splitters 136 and 137, gratings 139 and 140, a photosensor 145, a multi lens 146, and the like.

An optical beam with a wavelength of about 785 nm emitted from the light source unit 132 transmits the beam splitter 136 and the beam splitter 137, and is input to the objective lens 134. The optical beam is condensed on a signal recording surface of an optical disc having a protection layer (cover layer) with a thickness of 1.1 mm by the objective lens 134.

Similarly, an optical beam with a wavelength of about 655 nm emitted from the light source unit 132 is input to the objective lens 134 through the same optical path, and is condensed on a signal recording surface of an optical disc having a protection layer with a thickness of 0.6 mm. Return light with a wavelength of 785 nm and return light with a wavelength of 655 nm reflected at the signal recording surfaces of the optical discs are detected by the photosensor 145 including a photodetector or the like through the beam splitter 137.

An optical beam with a wavelength of about 405 nm emitted from the light source unit 131 is reflected at the beam splitter 136, and is input to the objective lens 135 through the beam splitter 137. The optical beam is condensed on a signal recording surface of an optical disc having a protection layer with a thickness of about 0.1 mm by the objective lens 135. Return light with a wavelength of 405 nm reflected at the signal recording surface of the optical disc is detected by the photosensor 145 through the beam splitter 137.

With the optical pickup shown in FIG. 43, two types of objective lenses of the objective lens 134 for DVD/CD and the objective lens 135 for high-density recording optical disc are provided, thereby realizing recording and/or playback of different three types of optical discs, that is, realizing compatibility between multiple types of optical discs.

However, the optical pickup such as described above has the following problems. First, each optical disc has a different optimum inclination of objective lens, and in the above-described optical pickup, the use of the two objective lenses 135 and 134 causes a situation where the attachment angle of the actuator of the objective lenses 135 and 134 to lens holders may be unsuitable. Accordingly, the optimum inclination of objective lens cannot be realized with respect to an optical disc. As a result, the quality of a playback signal may be degraded. In the above-described optical pickup, since the two types of objective lenses 135 and 134 are used, it is necessary to provide two types of optical systems, such as redirecting mirrors, collimator lenses, quarter-wave plates, and the like, resulting in an increase in the number of parts. For this reason, costs may be increased, and the optical pickup may be increased in size. Further, in the above-described optical pickup, the two objective lenses 135 and 134 need to be mounted on an objective lens driving actuator, resulting in an increase in the weight of the actuator and degradation of sensitivity.

Meanwhile, an optical pickup is studied in which the above-described problems are solved, and optical parts are further simplified by using a single objective lens in common with respect to multiple types of optical discs and three types of use wavelengths. A basic principle for providing an objective lens corresponding to optical beams with three types of wavelengths is to provide a diffraction unit, such as a diffraction optical element or the like, in the optical path upstream of the objective lens, thereby inputting the optical beam to the objective lens in the state of diffusive/convergent light and correcting spherical aberration due to the combination of use wavelength and media.

However, in the known optical pickup being studied, the configuration has involved diffraction units, which are provided on multiple surfaces, a diffractive surface needs to have a spherical surface shape different from the spherical surface of the objective lens, or a liquid crystal element having a complex configuration needs to be provided in the optical path upstream of the objective lens. In each of these configurations, the lens units, the diffraction units, the liquid crystal elements, or the like are individually formed and then assembled. For this reason, a rather high level of precision is necessary for positioning the units and attaching multiple diffraction surfaces, leading to more and increasingly troublesome and complicated steps in manufacturing, and problems of failure to meet the necessary precision.

For example, as described in JP-A-2004-265573, an optical pickup is proposed in which a diffraction unit is provided on one surface, but this has only realized compatibility of two wavelengths. In order to realize compatibility of three wavelengths, there is a need to separately provide an objective lens corresponding to another wavelength, resulting in an increase in the number of optical parts and complication of the configuration (see JP-A-2004-265573). Further, when an optical pickup having compatibility of three wavelengths is provided, there is also a need to increase light use efficiency or to reduce unwanted light incidence.

SUMMARY OF THE INVENTION

It is desirable to provide a condensing optical device for use in an optical pickup, which realizes recording and/or playback of information signals by condensing optical beams on signal recording surfaces of optical discs by using a single objective lens in common with respect to three types of optical discs with different use wavelengths, without a complicated configuration, an optical pickup, and an optical disc apparatus using the optical pickup.

According to an embodiment of the invention, there is provided a condensing optical device for use in an optical pickup configured to irradiate optical beams on at least a first optical disc, a second optical disc of a different type from the first optical disc, and a third optical disc of a different type from the first and second optical discs, thereby performing recording and/or playback of information signals. The condensing optical device condenses, on a signal recording surface of a corresponding optical disc, an optical beam with a first wavelength corresponding to the first optical disc, an optical beam with a second wavelength, which is longer than the first wavelength, corresponding to the second optical disc, and an optical beam with a third wavelength, which is longer than the second wavelength, corresponding to the third optical disc. The condensing optical device includes a diffraction unit provided on an input side surface or an output side surface. The diffraction unit has a substantially circular first diffraction region provided on an innermost portion, a ring zone-shaped second diffraction region provided outside the first diffraction region, and a ring zone-shaped third diffraction region provided outside the second diffraction region. The first diffraction region has a first diffraction structure formed in a ring zone shape to have a predetermined depth, and is configured to emit diffracted light of an order of the optical beam with the first wavelength, which passes therethrough and is condensed on the signal recording surface of the first optical disc through the condensing optical device, to emit diffracted light of an order of the optical beam with the second wavelength, which passes therethrough and is condensed on the signal recording surface of the second optical disc through the condensing optical device, and to emit diffracted light of an order of the optical beam with the third wavelength, which passes therethrough and is condensed on the signal recording surface of the third optical disc through the condensing optical device. The second diffraction region has a second diffraction structure different from the first diffraction structure formed in a ring zone shape to have a predetermined depth, and is configured to emit diffracted light of an order of the optical beam with the first wavelength, which passes therethrough and is condensed on the signal recording surface of the first optical disc through the condensing optical device, to emit diffracted light of an order of the optical beam with the second wavelength, which passes therethrough and is condensed on the signal recording surface of the second optical disc through the condensing optical device, and to emit diffracted light such that diffracted light of an order other than the order of the optical beam with the third wavelength which passes therethrough and is condensed on the signal recording surface of the third optical disc through the condensing optical device is dominant. The third diffraction region has a third diffraction structure different from the first and second diffraction structures formed in a ring zone shape to have a predetermined depth, and is configured to emit diffracted light of an order of the optical beam with the first wavelength, which passes therethrough and is condensed on the signal recording surface of the first optical disc through the condensing optical device, to emit diffracted light such that diffracted light of an order other than the order of the optical beam with the second wavelength which passes therethrough and is condensed on the signal recording surface of the second optical disc through the condensing optical device is dominant, and to emit diffracted light such that diffracted light of an order other than the order of the optical beam with the third wavelength which passes therethrough and is condensed on the signal recording surface of the third optical disc through the condensing optical device is dominant. The first and second diffraction structures are cyclical structures in which unit cyclical structures having a concavo-convex shape are successively formed in a radial direction of each ring zone, and satisfy Expressions (1) and (2).

$$4 \leq N_i \leq 39 \tag{1}$$

$$3 \leq N_m \leq 25 \tag{2}$$

In Expressions (1) and (2), $N_i$ represents the cyclical number of the cyclical structure in the first diffraction structure of the first diffraction region, and $N_m$ represents the cyclical number of the cyclical structure in the second diffraction structure of the second diffraction region.

According to another embodiment of the invention, an optical pickup includes a first emission unit emitting an optical beam with a first wavelength corresponding to a first optical disc, a second emission unit emitting an optical beam with a second wavelength, which is longer than the first wavelength, corresponding to a second optical disc different from the first optical disc, a third emission unit emitting an optical beam with a third wavelength, which is longer than the second wavelength, corresponding to a third optical disc different from the first and second optical discs, a condensing optical device condensing, on a signal recording surface of a corresponding optical disc, the optical beams emitted from the first to third emission units, and a diffraction unit provided in the condensing optical device, which is disposed on the optical path of the optical beams with the first to third wavelengths. The diffraction unit has a substantially circular first diffraction region provided on an innermost portion, a ring zone-shaped second diffraction region provided outside the first diffraction region, and a ring zone-shaped third diffraction region provided outside the second diffraction region. The first diffraction region has a first diffraction structure formed in a ring zone shape to have a predetermined depth, and is configured to emit diffracted light of an order of the optical beam with the first wavelength, which passes therethrough and is condensed on the signal recording surface of the first optical disc through the condensing optical device, to emit diffracted light of an order of the optical beam with the second wavelength, which passes therethrough and is condensed on the signal recording surface of the second optical disc through the condensing optical device, and to emit diffracted light of an order of the optical beam with the third wavelength, which passes therethrough and is condensed on the signal recording surface of the third optical disc through the condensing optical device. The second diffraction region has a second diffraction structure different from the first diffraction structure formed in a ring zone shape to have a predetermined depth, and is configured to emit diffracted light of an order of the optical beam with the first wavelength, which passes therethrough and is condensed on the signal recording surface of the first optical disc through the objective lens, to emit diffracted light of an order of the optical beam with the second wavelength, which passes therethrough and is condensed on the signal recording surface of the second optical disc through the condensing optical device, and to emit diffracted light such that diffracted light of an order other than the order of the optical beam with the third wavelength which passes therethrough and is condensed on the signal recording surface of the third optical disc through the condensing optical device is dominant. The third diffraction region has a third diffraction structure different from the first and second diffraction structures formed in a ring zone shape to have a predetermined depth, and is configured to emit diffracted light of an order of the optical beam with the first wavelength, which passes therethrough and is condensed on the signal recording surface of the first optical disc through the condensing optical device, to emit diffracted light such that diffracted light of an order other than the order of the optical beam with the second wavelength which passes therethrough and is condensed on the signal recording surface of the second optical disc through the condensing optical device is dominant, and to emit diffracted light such that diffracted light of an order other than the order of the optical beam with the third wavelength which passes therethrough and is condensed on the signal recording surface of the third optical disc through the condensing optical device is dominant. The first and second diffraction structures are cyclical structures in which unit cyclical structures having a concavo-convex shape are successively formed in a radial direction of each ring zone, and satisfy Expressions (1) and (2).

$$4 \leq N_i \leq 39 \quad (1)$$

$$3 \leq N_m \leq 25 \quad (2)$$

In Expressions (1) and (2), $N_i$ represents the cyclical number of the cyclical structure in the first diffraction structure of the first diffraction region, and $N_m$ represents the cyclical number of the cyclical structure in the second diffraction structure of the second diffraction region.

According to yet another embodiment of the invention, an optical disc apparatus includes an optical pickup performing recording and/or playback of an information signal by selectively irradiating a plurality of optical beams with different wavelengths onto an optical disc, which is arbitrarily selected from at least a first optical disc, a second optical disc different from the first optical disc, and a third optical disc different from the first and second optical discs, and is driven to rotate. The above-described optical pickup is used as the optical pickup for the optical disc apparatus.

According to yet another embodiment of the invention, there is provided a condensing optical device for use in an optical pickup configured to irradiate optical beams on at least a first optical disc, a second optical disc of a different type from the first optical disc, and a third optical disc of a different type from the first and second optical discs, thereby performing recording and/or playback of information signals. The condensing optical device condenses, on a signal recording surface of a corresponding optical disc, an optical beam with a first wavelength corresponding to the first optical disc, an optical beam with a second wavelength, which is longer than the first wavelength, corresponding to the second optical disc, and an optical beam with a third wavelength, which is longer than the second wavelength, corresponding to the third optical disc. The condensing optical device includes a diffraction unit provided on an input side surface or an output side surface. The diffraction unit has a substantially circular first region provided on an innermost portion, a ring-zone shaped second region provided outside the first region, and a ring-zone shaped third region provided outside the second region. The first region has a first diffraction structure formed in a ring zone shape to have a predetermined depth, and is configured to emit diffracted light of an order of the optical beam with the first wavelength, which passes therethrough and is condensed on the signal recording surface of the first optical disc through the condensing optical device, to emit diffracted light of an order of the optical beam with the second wavelength, which passes therethrough and is condensed on the signal recording surface of the second optical disc through the condensing optical device, and to emit diffracted light of an order of the optical beam with the third wavelength, which passes therethrough and is condensed on the signal recording surface of the third optical disc through the condensing optical device. The second region has a second diffraction structure different from the first diffraction structure formed in a ring zone shape to have a predetermined depth, and is configured to emit diffracted light of an order of the optical beam with the first wavelength, which passes therethrough and is condensed on the signal recording surface of the first optical disc through the condensing optical device, to emit diffracted light of an order of the optical beam with the second wavelength, which passes therethrough and is condensed on the signal recording surface of the second optical disc through the condensing optical device, and to emit diffracted light such that diffracted light of an order other than the order of the optical beam with the third wavelength which passes therethrough and is condensed on the signal recording surface of the third optical disc through the condensing optical device is dominant. The third region is configured to condense the optical beam with the first wavelength, which passes therethrough, on the signal recording surface of the first optical disc through the condensing optical device, to cause the optical beam with the second wavelength, which passes therethrough, so as not to be condensed on the signal recording surface of the second optical disc through the condensing optical device, and to cause the optical beam with the third wavelength, which passes therethrough, so as not to be condensed on the signal recording surface of the third optical disc through the condensing optical device. The first and second diffraction structures are cyclical structures in which unit cyclical structures having a concavo-convex shape are successively formed in a radial direction of each ring zone, and satisfy Expressions (1) and (2).

$$4 \leq N_i \leq 39 \quad (1)$$

$$3 \leq N_m \leq 25 \quad (2)$$

In Expressions (1) and (2), $N_i$ represents the cyclical number of the cyclical structure in the first diffraction structure of the first region, and $N_m$ represents the cyclical number of the cyclical structure in the second diffraction structure of the second region.

According to yet another embodiment of the invention, an optical pickup includes a first emission unit emitting an optical beam with a first wavelength corresponding to a first optical disc, a second emission unit emitting an optical beam with a second wavelength, which is longer than the first wavelength, corresponding to a second optical disc different from the first optical disc, a third emission unit emitting an optical beam with a third wavelength, which is longer than the second wavelength, corresponding to a third optical disc different from the first and second optical discs, a condensing optical device condensing, on a signal recording surface of a corresponding optical disc, the optical beams emitted from the first to third emission units, and a diffraction unit provided in the condensing optical device, which is disposed on the optical path of the optical beams with the first to third wavelengths. The diffraction unit has a substantially circular first region provided on an innermost portion, a ring zone-shaped second region provided outside the first region, and a ring-zone shaped third region provided outside the second region. The first region has a first diffraction structure formed in a ring zone shape to have a predetermined depth, and is configured to emit diffracted light of an order of the optical beam with the first wavelength, which passes therethrough and is condensed on the signal recording surface of the first optical disc through the condensing optical device, to emit diffracted light of an order of the optical beam with the second wavelength, which passes therethrough and is condensed on the signal recording surface of the second optical disc through the condensing optical device, and to emit diffracted light of an order of the optical beam with the third wavelength, which passes therethrough and is condensed on the signal recording surface of the third optical disc through the condensing optical device. The second region has a second diffraction structure different from the first diffraction structure formed in a ring zone shape to have a predetermined depth, and is configured to emit diffracted light of an order of the optical beam with the first wavelength, which passes therethrough and is condensed on the signal recording surface of the first optical disc through the condensing optical device, to emit diffracted light of an order of the optical beam with the second wavelength, which passes therethrough and is condensed on the signal recording surface of the second optical disc through the condensing optical device, and to emit diffracted light such that diffracted light of an order other than the order of the optical beam with the third wavelength which passes therethrough and is condensed on the signal recording surface of the third optical disc through the condensing optical device is dominant. The third region is configured to condense the optical beam with the first wavelength, which passes therethrough, on the signal recording surface of the first optical disc through the condensing optical device, to cause the optical beam with the second wavelength, which passes therethrough, so as not to be condensed on the signal recording surface of the second optical disc through the condensing optical device, and to cause the optical beam with the third wavelength, which passes therethrough, so as not to be condensed on the signal recording surface of the third optical disc through the condensing optical device. The first and second diffraction structures are cyclical structures in which unit cyclical structures having a concavo-convex shape are successively formed in a radial direction of each ring zone, and satisfy Expressions (1) and (2).

$$4 \leq N_i \leq 39 \qquad (1)$$

$$3 \leq N_m \leq 25 \qquad (2)$$

In Expressions (1) and (2), $N_i$ represents the cyclical number of the cyclical structure in the first diffraction structure of the first region, and $N_m$ represents the cyclical number of the cyclical structure in the second diffraction structure of the second region.

According to yet another embodiment of the invention, an optical disc apparatus includes an optical pickup performing recording and/or playback of an information signal by selectively irradiating a plurality of optical beams with different wavelengths onto an optical disc, which is arbitrarily selected from at least a first optical disc, a second optical disc different from the first optical disc, and a third optical disc different from the first and second optical discs, and is driven to rotate. The above-described optical pickup is used as the optical pickup for the optical disc apparatus.

According to yet another embodiment of the invention, there is provided a condensing optical device for use in an optical pickup configured to irradiate optical beams on at least a first optical disc, a second optical disc of a different type from the first optical disc, and a third optical disc of a different type from the first and second optical discs, thereby performing recording and/or playback of information signals. The condensing optical device condenses, on a signal recording surface of a corresponding optical disc, an optical beam with a first wavelength corresponding to the first optical disc, an optical beam with a second wavelength, which is longer than the first wavelength, corresponding to the second optical disc, and an optical beam with a third wavelength, which is longer than the second wavelength, corresponding to the third optical disc. The condensing optical device includes a diffraction unit provided on an input side surface or an output side surface. The diffraction unit has a substantially circular first region provided on an innermost portion, a ring-zone shaped second region provided outside the first region, and a ring-zone shaped third region provided outside the second region. The first region has a first diffraction structure formed in a ring zone shape to have a predetermined depth, and is configured to emit diffracted light of an order of the optical beam with the first wavelength, which passes therethrough and is condensed on the signal recording surface of the first optical disc through the condensing optical device, to emit diffracted light of an order of the optical beam with the second wavelength, which passes therethrough and is condensed on the signal recording surface of the second optical disc through the condensing optical device, and to emit diffracted light of an order of the optical beam with the third wavelength, which passes therethrough and is condensed on the signal recording surface of the third optical disc through the condensing optical device. The second region has a second diffraction structure different from the first diffraction structure formed in a ring zone shape to have a predetermined depth, and is configured to emit diffracted light of an order of the optical beam with the first wavelength, which passes therethrough and is condensed on the signal recording surface of the first optical disc through the condensing optical device, to emit diffracted light of an order of the optical beam with the second wavelength, which passes therethrough and is condensed on the signal recording surface of the second optical disc through the condensing optical device, and to emit diffracted light such that diffracted light of an order other than the order of the optical beam with the third wavelength which passes therethrough and is condensed on the signal recording surface of the third optical disc through the condensing optical device is dominant. The third region is configured to condense the optical beam with the first wavelength, which passes therethrough, on the signal recording surface of the first optical disc through the condensing optical device, to cause the optical beam with the second wavelength, which passes therethrough, so as not to be condensed on the signal recording surface of the second optical disc through the condensing optical device, and to cause the optical beam with the third wavelength, which passes therethrough, so as not to be condensed on the signal recording surface of the third optical disc through the condensing optical device. The first diffraction structure is an optical path difference providing structure in which at least a first basic structure and a second basic structure are formed so as to overlap each other. The first basic structure is a cyclical structure, in which unit cyclical structures having a concavo-convex shape are successively formed in a radial direction of each ring zone, as an optical path difference providing structure, which provides an optical path difference between the first and second wavelengths so as to emit diffracted light of the order to be condensed. The second basic structure is an optical path difference providing structure that provides an optical path difference so as to emit diffracted light such that diffracted light of zero order of the optical beam with the first wavelength which passes through the second basic structure is dominant, to emit diffracted light such that diffracted light of zero order of the optical beam with the second wavelength which passes through the second basic structure is dominant, and to emit diffracted light such that diffracted light of an order other than zero order of the optical beam with the third wavelength which passes through the second basic structure is dominant. The second diffraction structure is a cyclical structure in which unit cyclical structures having a concavo-convex shape are successively formed in a radial direction of each ring zone. The first basic structure of the first diffraction structure is a cyclical structure in which unit cyclical structures having a concavo-convex shape are successively formed in a radial direction of each ring zone, and satisfies Expression (1). The second diffraction structure is a cyclical structure in which unit cyclical structures having a concavo-convex shape are successively formed in a radial direction of each ring zone, and satisfies Expression (2).

$$4 \leq N_i \leq 39 \quad (1)$$

$$3 \leq N_m \leq 25 \quad (2)$$

In Expressions (1) and (2), $N_i$ represents the cyclical number of the cyclical structure in the first basic structure of the first diffraction structure of the first region, and $N_m$ represents the cyclical number of the cyclical structure in the second diffraction structure of the second region.

According to yet another embodiment of the invention, an optical pickup includes a first emission unit emitting an optical beam with a first wavelength corresponding to a first optical disc, a second emission unit emitting an optical beam with a second wavelength, which is longer than the first wavelength, corresponding to a second optical disc different from the first optical disc, a third emission unit emitting an optical beam with a third wavelength, which is longer than the second wavelength, corresponding to a third optical disc different from the first and second optical discs, a condensing optical device condensing, on a signal recording surface of a corresponding optical disc, the optical beams emitted from the first to third emission units, and a diffraction unit provided in the condensing optical device, which is disposed on the optical path of the optical beams with the first to third wavelengths. The diffraction unit has a substantially circular first region provided on an innermost portion, a second ring-zone shaped region provided outside the first region, and a ring-zone shaped third region provided outside the second region. The first region has a first diffraction structure formed in a ring zone shape to have a predetermined depth, and is configured to emit diffracted light of an order of the optical beam with the first wavelength, which passes therethrough and is condensed on the signal recording surface of the first optical disc through the condensing optical device, to emit diffracted light of an order of the optical beam with the second wavelength, which passes therethrough and is condensed on the signal recording surface of the second optical disc through the condensing optical device, and to emit diffracted light of an order of the optical beam with the third wavelength, which passes therethrough and is condensed on the signal recording surface of the third optical disc through the condensing optical device. The second region has a second diffraction structure different from the first diffraction structure formed in a ring zone shape to have a predetermined depth, and is configured to emit diffracted light of an order of the optical beam with the first wavelength, which passes therethrough and is condensed on the signal recording surface of the first optical disc through the condensing optical device, to emit diffracted light of an order of the optical beam with the second wavelength, which passes therethrough and is condensed on the signal recording surface of the second optical disc through the condensing optical device, and to emit diffracted light such that diffracted light of an order other than the order of the optical beam with the third wavelength which passes therethrough and is condensed on the signal recording surface of the third optical disc through the condensing optical device is dominant. The third region is configured to condense the optical beam with the first wavelength, which passes therethrough, on the signal recording surface of the first optical disc through the condensing optical device, to cause the optical beam with the second wavelength, which passes therethrough, so as not to be condensed on the signal recording surface of the second optical disc through the condensing optical device, and to cause the optical beam with the third wavelength, which passes therethrough, so as not to be condensed on the signal recording surface of the third optical disc through the condensing optical device. The first diffraction structure is an optical path difference providing structure in which at least a first basic structure and a second basic structure are formed so as to overlap each other. The first basic structure is a cyclical structure, in which unit cyclical structures having a concavo-convex shape are successively formed in a radial direction of each ring zone, as an optical path difference providing structure, which provides an optical path difference between the first and second wavelengths so as to emit diffracted light of the order to be condensed. The second basic structure is an optical path difference providing structure that provides an optical path difference so as to emit diffracted light such that diffracted light of zero order of the optical beam with the first wavelength which passes through the second basic structure is dominant, to emit diffracted light such that diffracted light of zero order of the optical beam with the second wavelength which passes through the second basic structure is dominant, and to emit diffracted light such that diffracted light of an order other than zero order of the optical beam with the third wavelength which passes through the second basic structure is dominant. The second diffraction structure is a cyclical structure in which unit cyclical structures having a concavo-convex shape are successively formed in a radial direction of each ring zone. The first basic structure of the first diffraction structure is a cyclical structure in which unit cyclical structures having a concavo-convex shape are successively formed in a radial direction of each ring zone, and satisfies Expression (1). The second diffraction structure is a cyclical structure in which unit cyclical structures having a concavo-convex shape are successively formed in a radial direction of each ring zone, and satisfies Expression (2).

$$4 \leq N_i \leq 39 \quad (1)$$

$$3 \leq N_m \leq 25 \quad (2)$$

In Expressions (1) and (2), $N_i$ represents the cyclical number of the cyclical structure in the first basic structure of the first diffraction structure of the first region, and $N_m$ represents the cyclical number of the cyclical structure in the second diffraction structure of the second region.

According to yet another embodiment of the invention, an optical disc apparatus includes an optical pickup performing recording and/or playback of an information signal by selectively irradiating a plurality of optical beams with different wavelengths onto an optical disc, which is arbitrarily selected from at least a first optical disc, a second optical disc different from the first optical disc, and a third optical disc different from the first and second optical discs, and is driven to rotate. The above-described optical pickup is used as the optical pickup for the optical disc apparatus.

According to the embodiments of the invention, the diffraction unit enables the corresponding optical beam to be condensed on the signal recording surface of each of three kinds of optical discs with different use wavelengths by using the single common objective lens. Therefore, three-wavelength compatibility is realized with the common objective lens, and thus good recording and/or playback of signals with respect to the respective optical discs is realized.

According to the embodiments of the invention, the first and second diffraction structures of the diffraction unit are cyclical structures which have the cyclical number $N_i$ and $N_m$, which satisfy Expressions (1) and (2), and in which the unit cyclical structures having a concavo-convex shape are successively formed in the radial direction of each ring zone. Therefore, it is possible to increase the light use efficiency and to reduce unwanted light incidence.

$$4 \leq N_i \leq 39 \quad (1)$$

$$3 \leq N_m \leq 25 \quad (2)$$

BRIEF DESCRIPTION OF THE DRAWINGS

FIG. 3A is a diagram showing an optical beam when diffracted light of +1 order of an optical beam with a first wavelength is generated with respect to a first optical disc, FIG. 3B is a diagram showing an optical beam when diffracted light of −1 order of an optical beam with a second wavelength is generated with respect to a second optical disc, and FIG. 3C is a diagram showing an optical beam when diffracted light of −2 order of an optical beam with a third wavelength is generated with respect to a third optical disc;

FIG. 4A is a plan view of an objective lens, and FIG. 4B is a sectional view of an objective lens;

FIGS. 5A to 5B are diagrams illustrating the configuration of a diffraction unit which is provided on one surface of the objective lens shown in FIGS. 4A and 4B, specifically, FIG. 5A is a sectional view showing a shape as to the reference surface which is an example of a first diffraction region which is provided as an inner ring zone of a diffraction unit, FIG. 5B is a sectional view showing a shape as to the reference surface as an example of a second diffraction region which is provided as a middle ring zone of a diffraction unit, FIG. 5C is a sectional view showing a shape as to the reference surface as an example of a third diffraction region which is provided as an outer ring zone of a diffraction unit;

FIGS. 9A to 9C are diagrams for calculation of the diffraction efficiency of an inner ring zone of Example 1, and is a diagram showing a change in the diffraction efficiency of an optical beam of each wavelength with respect a change in the groove depth d in a case of S=4 and $(k_{1i}, k_{2i}, k_{3i})=(+1, -1, -2)$;

FIGS. 10A to 10C are diagrams showing a change in the diffraction efficiency of an inner ring zone of a reference example for comparison with the inner ring zone of Example 1 shown in FIGS. 9A to 9C, and showing a change in the diffraction efficiency of an optical beam of each wavelength with respect to a change in the groove depth d in a case of a blazed form (S=∞) and $(k_{1i}, k_{2i}, k_{3i})=(+1, +1, +1)$;

FIG. 11A is a diagram showing the design phase amount $\phi$ that is to be provided to a manufacturing wavelength $\lambda_0$ at each position in the radial direction, FIG. 11B is a diagram showing the phase amount $\phi'$ that is actually provided at each position in the radial direction on the basis of $\phi$ shown in FIG. 11A, and FIG. 11C is a diagram conceptually showing the form of a diffraction structure which provides the phase amount $\phi'$ shown in FIG. 11B;

FIG. 20A is a sectional view showing a first basic structure, FIG. 20B is a sectional view showing the form of a second basic structure, and FIG. 20C is a sectional view showing the form of a composite diffraction structure in which a first basic structure and a second basic structure overlap each other;

FIGS. 23A to 23C are diagrams for calculation of the diffraction efficiency of the outer ring zone of Example 1, and is a diagram showing a change in the diffraction efficiency of an optical beam of each wavelength with respect to a change in the groove depth d in a case of S=∞ and $(k_{1o}, k_{2o}, k_{3o})=(+4, +2, +2)$;

FIGS. 25A to 25C are diagrams for calculation of the diffraction efficiency of a middle ring zone of Example 2, and is a diagram showing a change in the diffraction efficiency of an optical beam of each wavelength with respect to a change in the groove depth d in a case of S=∞ and $(k_{1m}, k_{2m}, k_{3m})=(0, -1, -3)$;

FIG. 30A is a plan view of an objective lens, and FIG. 30B is a sectional view of an objective lens;

FIG. 41A is a side view showing an example of a condensing optical device formed by an objective lens integrally having a diffraction unit on the incident side thereof, and FIG. 41B is a side view showing an example of a condensing optical device formed by a diffraction optical element having a diffraction unit on the incident side thereof and an objective lens;

DESCRIPTION OF THE PREFERRED EMBODIMENTS

An optical disc apparatus using an optical pickup to which the invention is applied will be described with reference to the drawings.

Figure 1:
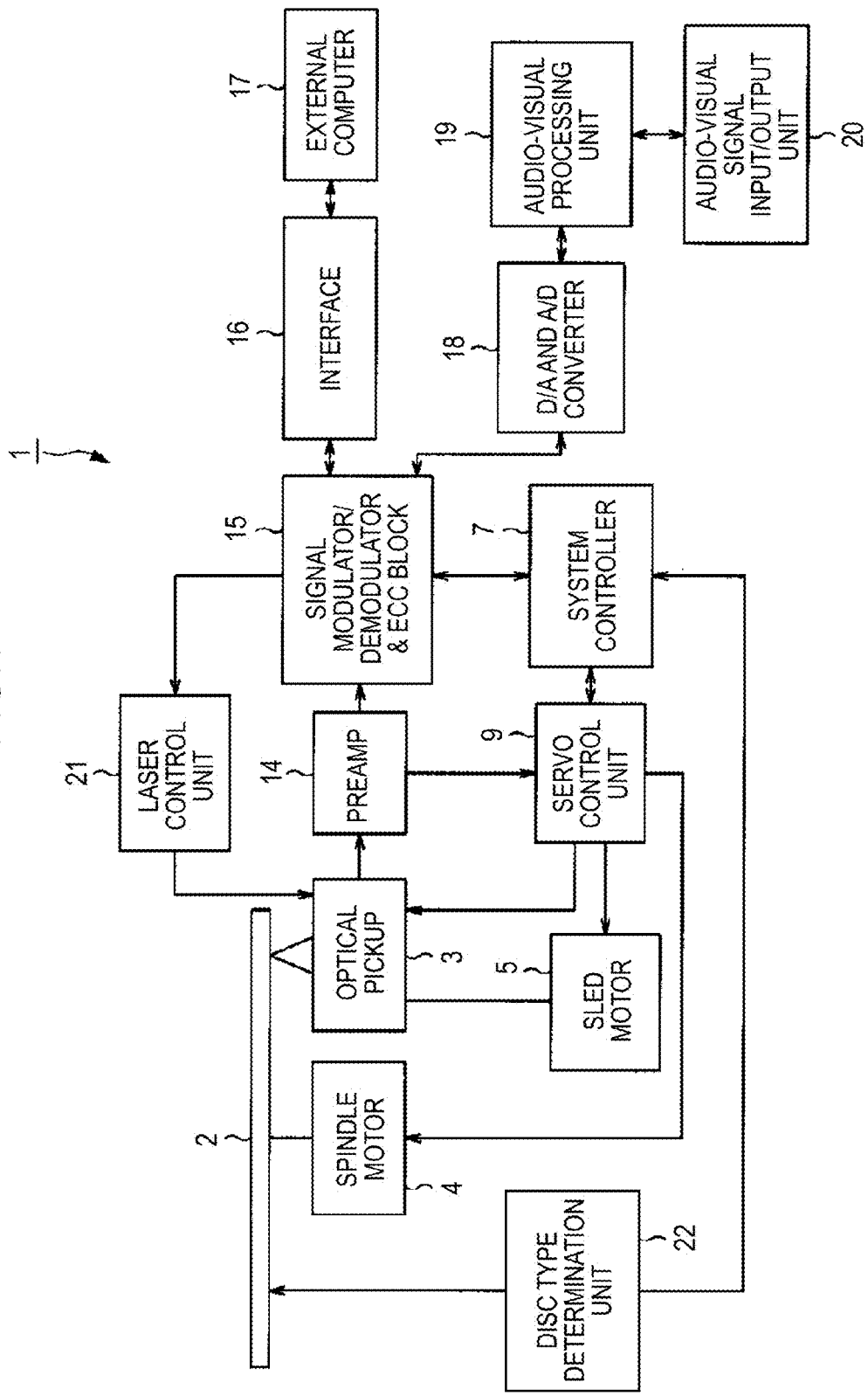
FIG. 1 is a block circuit diagram showing an optical disc apparatus to which the invention is applied.

As shown in FIG. 1, an optical disc apparatus 1 to which the invention is applied includes an optical pickup 3 performing information recording/playback with respect to an optical disc 2, a spindle motor 4 serving as a driving unit for rotating the optical disc 2, and a sled motor 5 moving the optical pickup 3 in the radial direction of the optical disc 2. The optical disc apparatus 1 is an optical disc apparatus that realizes compatibility between three standards such that information recording and/or playback can be performed with respect to three types of optical discs with different formats and optical disc with layered recording layers.

Optical discs to be used here include, for example, optical discs using a semiconductor laser of an emission wavelength around 785 nm, such as CD (Compact Disc), CD-R (Recordable), CD-RW (ReWritable), and the like, optical discs using a semiconductor laser of an emission wavelength around 655 nm, such as DVD (Digital Versatile Disc), DVD-R (Recordable), DVD-RW (ReWritable), DVD+RW (ReWritable), and the like, and high-density recording optical discs using a semiconductor laser of a shorter emission wavelength around 405 nm (blue-violet), capable of high-density recording, such as BD (Blu-ray Disc (Registered Trademark)) and the like.

Hereinafter, the three types of optical discs 2 which the optical disc apparatus 1 records information to or plays information from will be described as a first optical disc 11, such as BD or the like, described above as being capable of high-density recording, which has a protective layer formed to have a first thickness of around 0.1 mm and uses an optical beam with a wavelength around 405 nm as recording/playback light, a second optical disc 12, such as DVD or the like, which has a protective layer formed to have a second thickness of around 0.6 mm and uses an optical beam with a wavelength around 655 nm as recording/playback light, and a third optical disc 13, such as CD or the like, which has a protective layer formed to have a third thickness of around 1.1 mm and uses an optical beam with a wavelength around 785 nm as recording/playback light.

Driving of the spindle motor 4 and the sled motor 5 of the optical disc apparatus 1 is controlled by a servo control unit 9, which is controlled on the basis of instructions from a system controller 7 also serving as a disc type determination unit, depending on the type of disc. For example, the spindle motor 4 and the sled motor 5 are driven at a predetermined revolution according to the first optical disc 11, the second optical disc 12, and the third optical disc 13.

The optical pickup 3 is an optical pickup having a three-wavelength compatible optical system. The optical pickup 3 irradiates optical beams with different wavelengths onto the recording layers of the optical discs of different standards from the protective layer side, and detects reflected light of the optical beams from the recording layer. The optical pickup 3 outputs signals corresponding to each of the optical beams from detected reflected light.

The optical disc apparatus 1 includes a preamp 14 generating focus error signals, tracking error signals, RF signals, and the like on the basis of signals output from the optical pickup 3, a signal modulator/demodulator and error correction code block (hereinafter, referred to as signal modulator/demodulator & ECC block) 15 demodulating signals from the preamp 14 or modulating signals from an external computer 17 or the like, an interface 16, a D/A and A/D converter 18, an audio-visual processing unit 19, and an audio-visual signal input/output unit 20.

On the basis of the output from the photosensor, the preamp 14 generates focus error signals by the astigmatic method or the like, generates tracking error signals by the three-beam method, the DPD method, the DPP method, or the like, generates RF signals, and outputs the RF signals to the signal modulator/demodulator & ECC block 15. The preamp 14 also outputs the focus error signals and the tracking error signals to the servo control unit 9.

At the time of recording data to the first optical disc, the signal modulator/demodulator & ECC block 15 performs error correction processing on the digital signals input from the interface 16 or the D/A and A/D converter 18 according to an error correction method, such as LDC-ECC, BIS, or the like, and then performs modulation, such as 1-7PP or the like. At the time of recording data to the second optical disc, the signal modulator/demodulator & ECC block 15 performs error correction processing according to an error correction method, such as PC (Product Code) or the like, and then performs modulation, such as 8-16 modulation or the like. At the time of recording data to the third optical disc, the signal modulator/demodulator & ECC block 15 performs error correction processing according to an error correction method, such as CIRC or the like, and then performs modulation, such as 8-14 modulation or the like. The signal modulator/demodulator & ECC block 15 then outputs modulated data to a laser control unit 21. When playing each optical disc, the signal modulator/demodulator & ECC block 15 performs demodulation on the basis of RF signals input from the preamp 14, further performs error correction processing, and outputs data to the interface 16 or the D/A and A/D converter 18.

For compressive data recording, a compression/decompression unit may be provided between the signal modulator/demodulator & ECC block 15 and the interface 16 or the D/A and A/D converter 18. In this case, data is compressed with a format, such as MPEG2, MPEG4, or the like.

The servo control unit 9 receives the focus error signals or the tracking error signals from the preamp 14. The servo control unit 9 generates focus servo signals or tracking servo signals such that the focus error signals or the tracking error signal become zero, and drives and controls an objective lens driving unit, such as a biaxial actuator or the like, driving the objective lens on the basis of the servo signals. The servo control unit 9 detects synchronization signals or the like from the output of the preamp 14, and performs servo control of the spindle motor by CLV (Constant Linear Velocity), CAV (Constant Angular Velocity), a combination thereof, or the like.

The laser control unit 21 controls the laser source of the optical pickup 3. With this specific example, the laser control unit 21 performs controls such that the output power of the laser source differs between the recording mode and the playback mode. The laser control unit 21 also performs control such that the output power of the laser source differs depending on the type of the optical disc 2. The laser control unit 21 switches over the laser source of the optical pickup 3 depending on the type of the optical disc 2 detected by a disc type determination unit 22.

The disc type determination unit 22 can detect the different formats of the optical discs 2 by detecting a change in the amount of reflected light from the first to third optical discs 11, 12, and 13 from a difference in surface reflectance, shape and other external differences, and the like.

Each block constituting the optical disc apparatus 1 is configured so as to perform signal processing in accordance with the specification of the optical disc 2 to be loaded on the basis of the detection result of the disc type determination unit 22.

The system controller 7 controls the entire apparatus in accordance with the type of the optical disc 2 determined by the disc type determination unit 22. The system controller 7 specifies the recording position or the playback position of the optical disc, at which recording/playback is to be performed, on the basis of address information or TOC (Table of Contents) information recorded in premastered pits or grooves on the innermost portion of the optical disc, and controls the units on the basis of the specified position, in accordance with operation input from the user.

With the optical disc apparatus 1 configured as above, the optical disc 2 is rotated by the spindle motor 4, the sled motor 5 is driven and controlled in accordance with control signals from the servo control unit 9, and the optical pickup 3 is moved to a position corresponding to a desired recording track of the optical disc 2. Then, information recording/playback is performed with respect to the optical disc 2.

Specifically, at the time of recording/playback by the optical disc apparatus 1, the servo control unit 9 rotates the optical disc 2 by CAV, CLV, or a combination thereof. The optical pickup 3 irradiates an optical beam from the light source onto the optical disc 2 and detects return optical beams from the optical disc 2 by the photosensor, generates focus error signals or tracking error signals, and drives the objective lens by an objective lens driving mechanism on the basis of the focus error signals or the tracking error signals, thereby performing focus servo and tracking servo.

At the time of recording by the optical disc apparatus 1, signals from the external computer 17 are input to the signal modulator/demodulator & ECC block 15 through the interface 16. The signal modulator/demodulator & ECC block 15 adds the above-described predetermined error correction code to digital data input from the interface 16 or the D/A and A/D converter 18, and further performs predetermined modulation to generate recording signals. The laser control unit 21 controls the laser source of the optical pickup 3 on the basis of the recording signals generated by the signal modulator/demodulator & ECC block 15, and performs recording with respect to a predetermined optical disc.

At the time of playback of information recorded on the optical disc 2 by the optical disc apparatus 1, the signal modulator/demodulator & ECC block 15 performs demodulation on signals detected by the photosensor. If the recording signals demodulated by the signal modulator/demodulator & ECC block 15 are for data storage of the computer, the signals are output to the external computer 17 through the interface 16. Accordingly, the external computer 17 can operate on the basis of the signals recorded on the optical disc 2. If the recording signals demodulated by the signal modulator/demodulator & ECC block 15 are for audio-visual, the signals are subjected to digital-analog conversion by the D/A and A/D converter 18 and supplied to the audio-visual processing unit 19. Audio-visual processing is performed by the audio-visual processing unit 19, and signals are output to an external speaker or a monitor (not shown) through the audio-visual signal input/output unit 20.

Now, the optical pickup 3 for recording/playback and the like used in the above-described optical disc apparatus 1 will be described in detail.

The optical pickup 3 for use in the above-described optical disc apparatus 1 to which the invention is applied will be described in detail with reference to FIGS. 2 to 42. As described above, the optical pickup 3 is an optical pickup that selectively irradiates a plurality of optical beams with different wavelengths onto an optical disc arbitrarily selected from three types of the first to third optical discs 11, 12, and 13 with different formats, such as the thickness of the protective layer or the like, thereby performing recording and/or playback of information signals.

Figure 2:
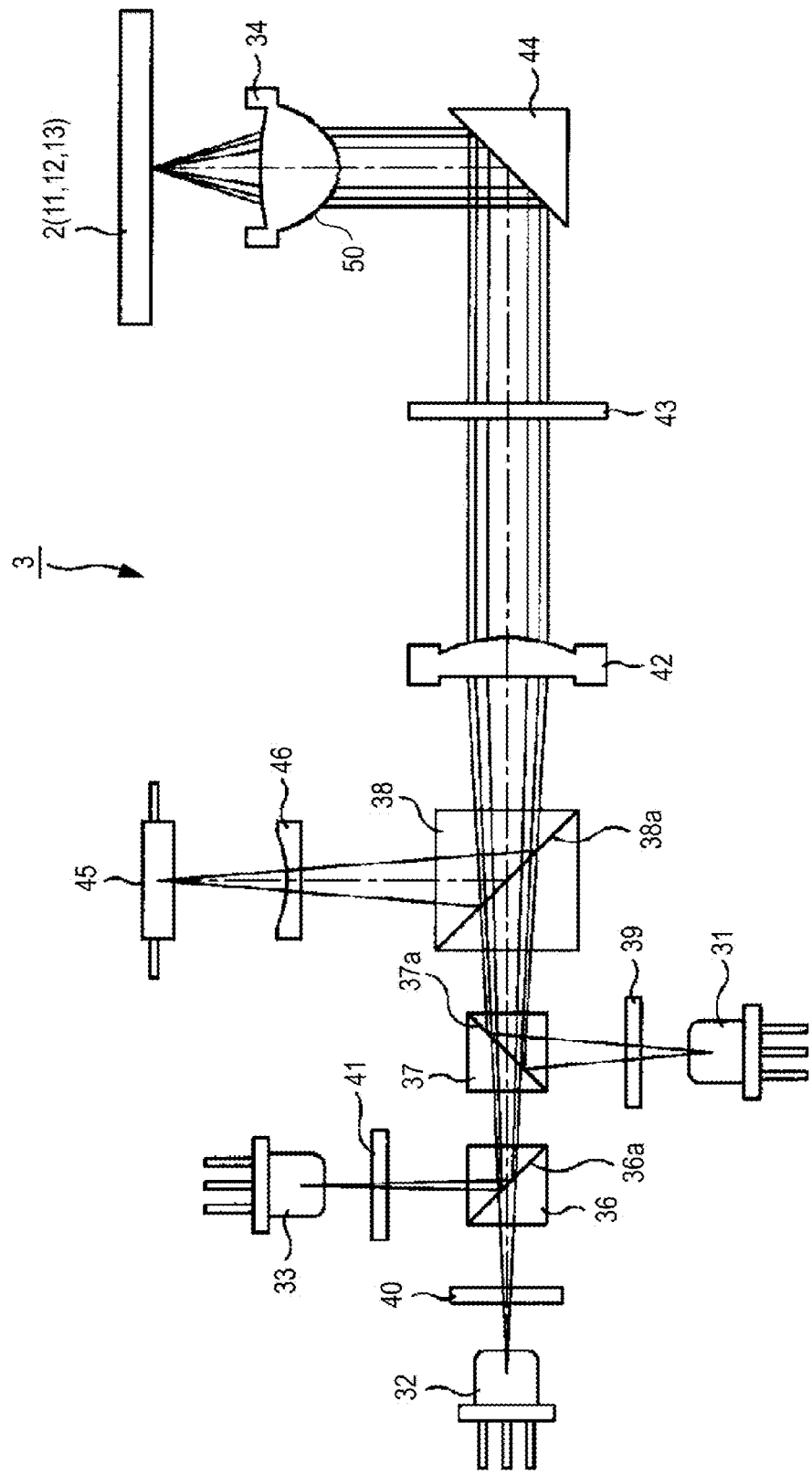
FIG. 2 is an optical path diagram showing the optical system of an optical pickup to which the invention is applied.

As shown in FIG. 2, the optical pickup 3 to which the invention is applied includes a first light source unit 31 having a first emission unit configured to emit an optical beam with a first wavelength, a second light source unit 32 having a second emission unit configured to emit an optical beam with a second wavelength longer than the first wavelength, a third light source unit 33 having a third emission unit configured to emit an optical beam with a third wavelength longer than the second wavelength, and an objective lens 34, serving as a condensing optical device, configured to condense the optical beam emitted from each of the first to third emission units on the signal recording surface of the corresponding optical disc 2.

The optical pickup 3 further includes a first beam splitter 36, serving as an optical path synthesizing unit, provided between the second and third emission units and the objective lens 34 to synthesize the optical path of the optical beam with the second wavelength emitted from the second emission unit and the optical path of the optical beam with the third wavelength emitted from the third emission unit, a second beam splitter 37, serving as an optical beam synthesizing unit, provided between the first beam splitter 36 and the objective lens 34 to synthesize the optical path of the optical beams with the second and third wavelengths synthesized by the first beam splitter 36, and the optical path of the optical beam with the first wavelength emitted from the first emission unit, and a third beam splitter 38, serving as an optical beam splitting unit, provided between the second beam splitter 37 and the objective lens 34 to split the outgoing optical path of the optical beams with the first to third wavelengths synthesized by the second beam splitter 37 from the return optical path (hereinafter, referred to as "return path") of the optical paths with the first to third wavelengths reflected from the optical disc.

The optical pickup 3 also includes a first grating 39 provided between the first emission unit of the first light source unit 31 and the second beam splitter 37 to diffract the optical beam with the first wavelength emitted from the first emission unit into three beams for detection of tracking error signals or the like, a second grating 40 provided between the second emission unit of the second light source unit 32 and the first beam splitter 36 to diffract the optical beam with the second wavelength emitted from the second emission unit into three beams for detection of tracking error signals or the like, and a third grating 41 provided between the third emission unit of the third light source unit 33 and the first beam splitter 36 to diffract the optical beam with the third wavelength emitted from the third emission unit into three beams for detection of tracking error signals or the like.

The optical pickup 3 also includes a collimator lens 42, serving as a divergent angle conversion unit, provided between the third beam splitter 38 and the objective lens 34 to convert the divergent angle of the optical beams with the first to third wavelengths, the optical paths of which have been synthesized by the third beam splitter 38, so as to be adjusted into a state of substantially parallel light or a state diffused or converged with respect to substantially parallel light, and output light, a quarter-wave plate 43 provided between the collimator lens 42 and the objective lens 34 to provide a quarter-wave phase difference to the optical beams with the first to third wavelengths, the divergent angle of which has been adjusted by the collimator lens 42, and a redirecting mirror 44 provided between the objective lens 34 and the quarter-wave plate 43 to reflect and redirect the optical beams having passed through the above-described optical parts within a plane substantially orthogonal to the optical axis of the objective lens 34, and to emit the optical beam in the direction toward the optical axis of the objective lens 34.

The optical pickup 3 also includes a photosensor 45 configured to receive and detect the optical beams with the first to third wavelength split on the return path from the outgoing optical path of the optical beams with the first to third wavelengths by the third beam splitter 38, and a multi lens 46 provided between the third beam splitter 38 and the photosensor 45 to condense the optical beams with the first to third wavelengths on the return path split by the third beam splitter 38 onto the photoreception surface of the photodetector or the like of the photosensor 45 and to provide astigmatism for detection of focus error signals or the like.

The first light source unit 31 has a first emission unit configured to emit an optical beam with a first wavelength around 405 nm onto the first optical disc 11. The second light source unit 32 has a second emission unit configured to emit an optical beam with a second wavelength around 655 nm onto the second optical disc 12. The third light source unit 33 has a third emission unit configured to emit an optical beam with a third wavelength around 785 nm onto the third optical disc. Note that while the first to third emission units are configured so as to be individually disposed at the light source units 31, 32, and 33, the invention is not limited to this configuration. For example, a light source unit having two emission units from among the first to third emission units and a light source unit having the remaining emission unit may be disposed at different positions, or a light source unit may have the first to third emission units at substantially the same position.

The objective lens 34 condenses the input optical beams with the first to third wavelength onto the signal recording surface of the optical disc 2. The objective lens 34 is movably held by an objective lens driving mechanism, such as a biaxial actuator or the like (not shown). The objective lens 34 is moved by a biaxial actuator or the like on the basis of the tracking error signal and the focus error signals generated from the RF signals of return light from the optical disc 2 detected by the photosensor 45 to be moved along two axes, one in the direction toward/away from the optical disc 2 and the other in the radial direction of the optical disc 2. The objective lens 34 condenses optical beams emitted from the first to third emission units such that the optical beams are always focused on the signal recording surface of the optical disc 2, and causes the condensed optical beams to track a recording track formed on the signal recording surface of the optical disc 2. As described below, when a diffraction unit 50 is provided on an optical element (a diffraction optical element 35B) separate from the objective lens (see FIGS. 41A and 41B), the below-described diffraction optical element 35B is held by a lens holder of the objective lens driving mechanism where an objective lens 34B is held so as to be integral with the objective lens 34B. With this configuration, the below-described advantages of the diffraction unit 50 provided to the diffraction optical element 35B can be appropriately manifested at the time of field shift of the objective lens 34B, such as movement in the tracking direction or the like.

The objective lens 34 has, as one surface thereof, for example, a diffraction unit 50 having a plurality of diffraction regions on the incident side surface thereof. With this diffraction unit 50, each of the optical beams with the first to third wavelengths passing through each of a plurality of diffraction regions is diffracted so as to become a predetermined diffraction order, thereby entering the objective lens 34 as an optical beam in a diffused state or a converged state having a predetermined divergent angle. Accordingly, the single objective lens 34 can be used to appropriately condense the optical beams with the first to third wavelengths on the signal recording surfaces of the three types of optical discs corresponding to the optical beams such that no spherical aberration occurs. The objective lens 34 having the diffraction unit 50 has a diffraction structure which generates diffraction power serving as a reference with a lens surface shape as reference, and thus the objective lens 34 functions as a condensing optical device to appropriately condense the optical beams with the three different wavelengths onto the signal recording surfaces of the optical discs corresponding to the optical beams such that no spherical aberration occurs. Therefore, the objective lens 34 has a refraction element function and a diffraction element function, that is, has a refraction function according to a lens curved surface and a diffraction function according to the diffraction unit 50 provided on one surface.

Figure 3A:
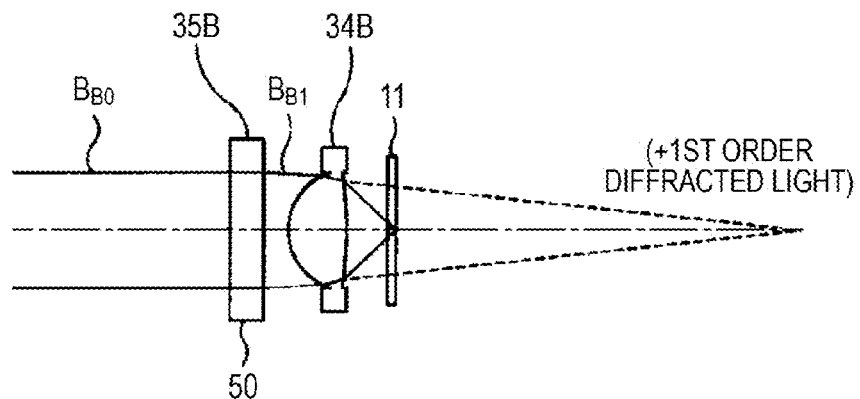
FIGS. 3A to 3C are diagrams illustrating the functions of a diffraction unit constituting the optical pickup shown in FIG. 2, and illustrating the functions of a diffraction optical element having a diffraction function where a diffraction unit is provided, and the functions of an objective lens having a refraction function when a diffraction unit is provided on an optical element separate from an objective lens, specifically.
Figure 3B:
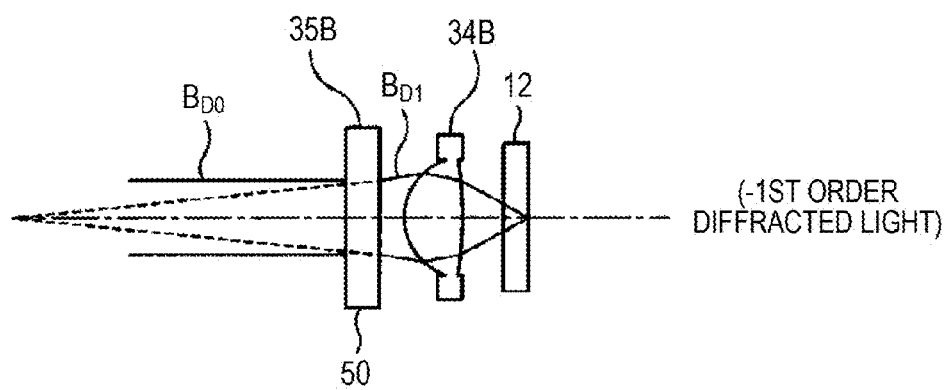
Figure 3C:
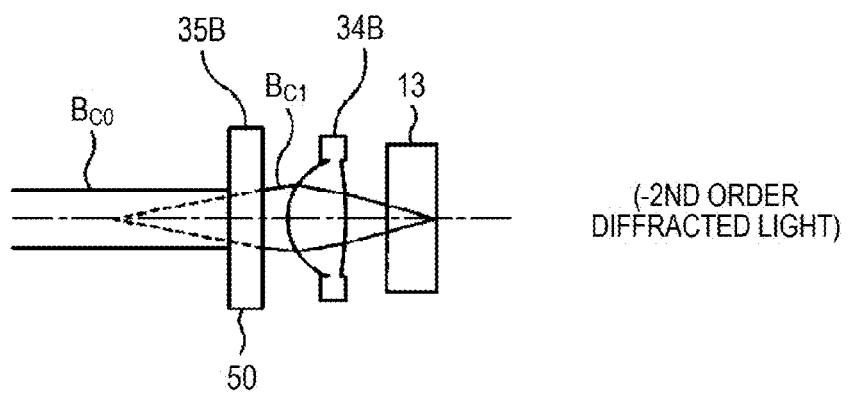

In order to conceptually describe the diffraction function of the diffraction unit 50, as described below, a description will be provided regarding a case where the diffraction unit 50 is provided on the diffraction optical element 35B separate from the objective lens 34B having refractive power (see FIGS. 41A and 41B). As shown in FIG. 3A, the diffraction optical element 35B that is used along with the objective lens 34B having a refraction function alone as described below and has the diffraction unit 50 diffracts the optical beam $B_{B0}$ with the first wavelength having passed through the diffraction unit 50 so as to become diffracted light $B_{B1}$ of +1 order and inputs to the objective lens 34B, that is, inputs to the objective lens 34B as an optical beam in a diffused state at a predetermined divergent angle, thereby appropriately condensing on the signal recording surface of the first optical disc 11. As shown in FIG. 3B, the diffraction optical element 35B diffracts the optical beam $B_{D0}$ with the second wavelength having passed through the diffraction unit 50 so as to become diffracted light $B_{D1}$ of −1 order and inputs to the objective lens 34B, that is, inputs to the objective lens 34B as an optical beam in a converged state at a predetermined divergent angle, thereby appropriately condensing on the signal recording surface of the second optical disc 12. As shown in FIG. 3C, the diffraction optical element 35B diffracts the optical beam $B_{C0}$ with the third wavelength having passed through the diffraction unit 50 so as to become diffracted light $B_{C1}$ of −2 order and inputs to the objective lens 34B, that is, inputs to the objective lens 34B as an optical beam in a converged state at a predetermined divergent angle, thereby appropriately condensing on the signal recording surface of the third optical disc 13. In this way, condensation can be appropriately performed on the signal recording surfaces of the three types of optical discs with the single objective lens 34B such that no spherical aberration occurs. While an example where the optical beams with the same wavelength are made to be diffracted light of the same diffraction order at a plurality of diffraction regions of the diffraction unit 50 has been described with reference to FIGS. 3A to 3C, the diffraction unit 50 constituting the optical pickup 3 to which the invention is applied enables a diffraction order for each wavelength to be set for each region, as described below, suitable aperture restriction, and a reduction in spherical aberration. For the sake of description, the above description has been made regarding a case where the diffraction unit 50 is provided on an optical element separate from the objective lens, but the diffraction unit 50 provided integral with one surface of the objective lens 34 described here has the same function by providing diffraction power according to the diffraction structure thereof. Diffraction power of the diffraction unit 50 and refractive power according to the lens curved surface serving as the reference of the objective lens 34 enable the optical beam of each wavelength to be condensed on the signal recording surface of the corresponding optical disc such that no spherical aberration occurs.

In the above and following descriptions of diffraction orders, a diffraction order that diffracts closer to the optical axis side in the travel direction with respect to an input optical beam is a positive diffraction order, and a diffraction order that diffracts away from the optical axis in the travel direction is a negative diffraction order. In other words, a diffraction order that diffracts toward the optical axis of the input optical beam is a positive diffraction order.

Figure 4A:
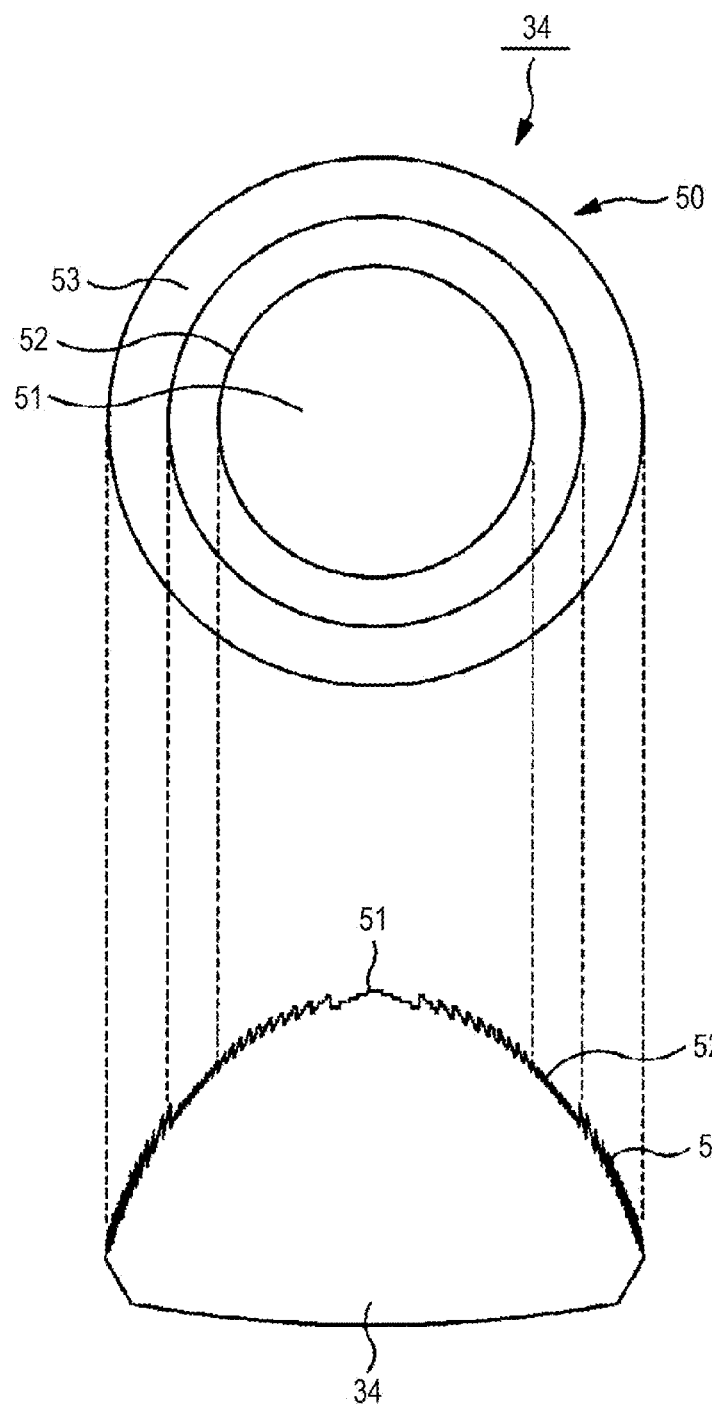
FIGS. 4A and 4B are diagrams illustrating an objective lens constituting the optical pickup shown in FIG. 2, specifically.
Figure 4B:
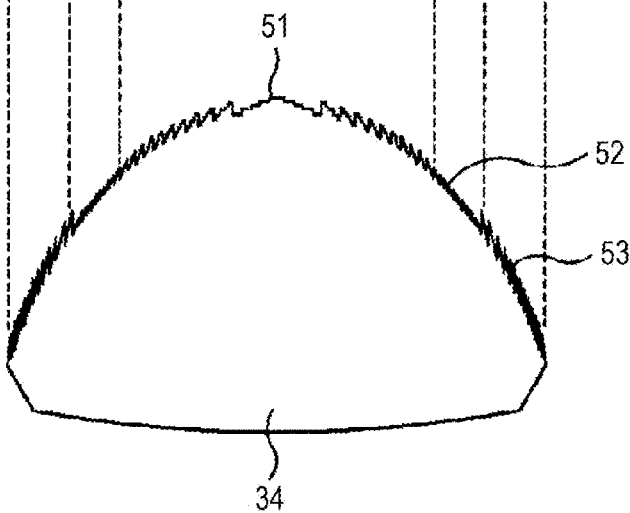

Specifically, as shown in FIGS. 4A and 4B, the diffraction unit 50 provided at the incident side surface of the objective lens 34 has a substantially circular first diffraction region (hereinafter, also referred to as "inner ring zone") 51 provided on an innermost portion, a ring zone-shaped second diffraction region (hereinafter, also referred to as "middle ring zone") 52 provided outside the first diffraction region 51, and a ring zone-shaped third diffraction region (hereinafter, also referred to as "outer ring zone") 53 provided outside the second diffraction region 52.

The first diffraction region 51 that is an inner ring zone has a first diffraction structure formed in a ring zone shape to have a predetermined depth, and is configured to emit diffracted light of the optical beam with the first wavelength which passes therethrough such that diffracted light of a diffraction order being condensed so as to form an appropriate spot on the signal recording surface of the first optical disc through the objective lens 34 is dominant, that is, the maximum diffraction efficiency is manifested with respect to diffracted light of other diffraction orders.

With the first diffraction structure, the first diffraction region 51 also emits diffracted light of the optical beam with the second wavelength which passes therethrough such that diffracted light of a diffraction order being condensed so as to form an appropriate spot on the signal recording surface of the second optical disc through the objective lens 34 is dominant, that is, the maximum diffraction efficiency is manifested with respect to diffracted light of other diffraction orders.

With the first diffraction structure, the first diffraction region 51 also emits diffracted light of the optical beam with the third wavelength which passes therethrough such that diffracted light of a diffraction order being condensed so as to form an appropriate spot on the signal recording surface of the third optical disc through the objective lens 34 is dominant, that is, the maximum diffraction efficiency is manifested with respect to diffracted light of other diffraction orders.

Thus, the first diffraction region 51 has such a diffraction structure that diffracted light of a predetermined diffraction order is dominant with respect to the optical beam of each wavelength. For this reason, when the optical beam of each wavelength having passed through the first diffraction region 51 and become diffracted light of a predetermined diffraction order is condensed on the signal recording surface of the corresponding optical disc by the objective lens 34, spherical aberration can be corrected and reduced. Note that regarding the first diffraction region 51, and the second and third diffraction regions 52 and 53 described in detail later, descriptions are made above and below with the understanding that diffracted light of a predetermined diffraction order which is selected so as to be dominant with respect to the optical beam of each wavelength includes transmitted light, that is, light of zero order.

The first diffraction structure is a ring zone-shaped cyclical structure in which unit cyclical structures being formed in a concavo-convex shape having a plurality of steps or the like with respect to the reference surface are successively formed in the radial direction of the ring zone. In the first diffraction structure, the pitch of the unit cyclical structures is constant or successively changes, and the ratio of the width of each step to the width of one cycle and the height of each step in the optical axis direction as to the reference surface becomes cyclic.

Specifically, as shown in FIGS. 4A, 4B, and 5A, the first diffraction region 51 is formed in a ring zone shape centered on the optical axis with the sectional shapes of the ring zones with respect to the reference surface being formed successively in the radial direction with a predetermined cyclical number $N_i$ with a staircase form (hereinafter, also referred to as "multi-step staircase form") of a predetermined number of steps S (where S is a positive integer) of a predetermined depth (hereinafter, also referred to as "groove depth") d as one cycle. Note that the sectional shape of the ring zone in the diffraction structure means the sectional shape taken along a plane including the radial direction of the ring zone, that is, a plane orthogonal to the tangential direction of the ring zone.

The reference surface means the surface shape of the incident side surface which is required as a refraction element function of the objective lens 34. In the first diffraction region 51, actually, as shown in FIG. 4A, with the surface shape of the incident side surface required as a refraction element function of the objective lens 34 as the reference surface, a surface shape, such as a combination of a ring zone-shaped surface shape and staircase-like surface shape making up a diffraction structure having a diffraction function such as shown in FIG. 5A, is formed with respect to the reference surface, but in FIGS. 4A and 4B, and FIG. 12 described below, for description, only the form of the diffraction structure as to the reference surface is shown, and in the following description, the shape as to the reference surface will be described. Note that when the diffraction unit 50 is provided on an optical element (a diffraction optical element 35B described below) separate from the objective lens, the shape shown in FIGS. 4A and 4B become the sectional shape of the diffraction optical element 35B. The diffraction structure shown in FIGS. 4A and 4B and the like is actually formed with minute dimensions such as described below, and FIGS. 4A and 4B and the like show enlarged sections.

Figure 12:
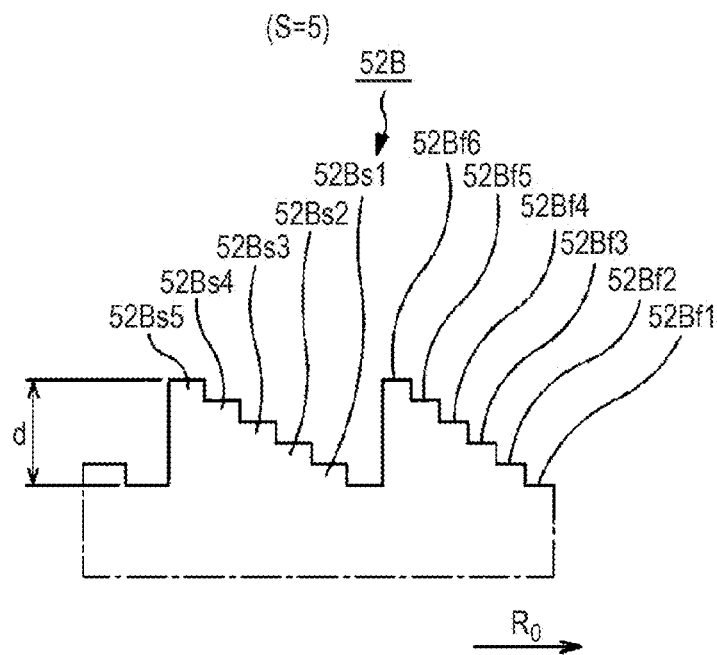
FIG. 12 shows another example of a middle ring zone constituting the diffraction unit, and is a sectional view showing a shape as to the reference surface as an example of a second diffraction region where a staircase-like diffraction structure is formed.

The diffraction structure having a staircase form with a predetermined number of steps S is a structure in which staircase portions each having first to S-th steps of substantially the same depth are successively formed in the radial direction, in other words, in which first to (S+1)th diffraction surfaces are formed with substantially the same interval in the optical axis direction. The predetermined depth d in the diffraction structure means the length along the optical axis between the (S+1)th diffraction surface which is formed on the side of the staircase form closest to the surface (the highest step, which is the shallowest position) and the first diffraction surface which is formed on the side of the staircase form closest to the element (the lowest step, which is the deepest position). A structure has been shown in FIG. 5A in which the steps of each staircase portion of the staircase form are formed so as to be closer to the inner side of the radial direction, that is, such that the closer to the inner side of the radial direction, the closer to the surface side the steps are formed. This is because a diffraction order such as described below is selected as a maximum diffraction efficiency order in an inner ring zone. In FIGS. 5B and 5C, and FIG. 12 described below, similarly to the inner ring zone, the saw-tooth slopes of concavo-convexes or the steps of the staircase form are formed such that the closer to the inner side of the radial direction, the closer to the surface side the saw-tooth slopes of concavo-convexes or the steps of the staircase form are formed, but the invention is not limited to this configuration. For example, the formation direction of the blazed form or staircase form is set depending on the selected diffraction order. In FIGS. 5A to 5C, $R_o$ indicates the direction toward the outside of the radial direction of the ring zone, that is, the direction away from the optical axis.

In the first diffraction structure formed at the first diffraction region 51, and second and third diffraction structures described below, the groove depth d and the number of steps S are determined taking into consideration the dominant diffraction order and diffraction efficiency. As shown in FIG.

5A, the groove width of each step (the dimension in the radial direction of each step of the staircase form) is such that the steps are formed with the same width within one staircase portion, while looking at different staircase portions formed successively in the radial direction, the value of the groove width is smaller as the step is further away from the optical axis. Note that the description has been made here assuming that such a configuration is used as described above, but the groove width may be such that while looking at different staircase portions formed successively in the radial direction, the value of the groove width is larger as the step is further away from the optical axis. The same is applied to FIGS. 5B and 5C. The groove width is determined on the basis of a phase difference obtained at the diffraction region such that the spot which is condensed on the signal recording surface of the optical disc is optimized.

For example, as shown in FIG. 5A, the first diffraction structure of the first diffraction region 51 is a diffraction structure where the number of steps is 4 (S=4). In this diffraction structure, staircase portions are formed successively in the radial direction with a predetermined cyclical number $N_i$ with a staircase portion having first to fourth steps 51s1, 51s2, 51s3, and 51s4 of substantially the same depth (d/4) as one cycle, and first to fifth diffraction surfaces 51f1, 51f2, 51f3, 51f4, and 51f5 are formed at the same intervals of (d/4) in the optical axis direction.

When the first diffraction region 51 emits diffracted light of the optical beam with the first wavelength which passes therethrough such that diffracted light of a diffraction order $k_{1i}$ is dominant, that is, diffraction efficiency is maximum, emits diffracted light of the optical beam with the second wavelength which passes therethrough such that diffracted light of a diffraction order $k_{2i}$ is dominant, that is, diffraction efficiency is maximum, and emits diffracted light of the optical beam with the third wavelength which passes therethrough such that diffracted light of a diffraction order $k_{3i}$ is dominant, a configuration is made so as to have the relation $k_{1i} \geq k_{2i} > k_{3i}$.

With the configuration where diffracted light is generates so as to have the relation $k_{1i} \geq k_{2i} > k_{3i}$, the first diffraction region 51 not only makes diffracted light of a diffraction order whereby spherical aberration can be appropriately reduced dominant, but also optimizes the relation of the working distance and the focal distance, and ensures the working distance, thereby ensuring the working distance when the third wavelength $\lambda_3$ is used. Accordingly, the focal distance as to the first wavelength $\lambda_1$ is made long. Therefore, problems can be prevented, such as an increase in the size of the lens diameter of the objective lens or the entire optical pickup, and aberration can be reduced while diffraction efficiency can be ensured.

Now, a description will be made based on the following first to fourth perspectives regarding a method of selecting the optimal diffraction order, including the reason why with the first diffraction region 51, a configuration is made so as to have the relation $k_{1i} \geq k_{2i} > k_{3i}$. In other words, with the first diffraction region 51, as the first perspective, there is a need to reduce spherical aberration at each wavelength, as the second perspective, there is a need to optimize the working distance and the focal distance at each wavelength, and as the third and fourth perspectives, there is a need to use a configuration which is advantageous in manufacturing and can be readily manufactured. From these perspectives, the diffraction orders $k_{1i}$, $k_{2i}$, and $k_{3i}$ are selected as diffraction orders with maximum diffraction efficiency. A description will be made below regarding this point.

First, the first perspective will be described. As the first perspective, as the diffraction order with the first diffraction region 51 that is an inner ring zone, there is a need to use an order whereby spherical aberration of the corresponding optical disc can be corrected at the time of condensation with the objective lens 34. In general, when material dispersion is ignored at a region having a function such as the first diffraction region 51, let the first wavelength be $\lambda_1$ (nm), the second wavelength be $\lambda_2$ (nm), the third wavelength be $\lambda_3$ (nm), the selected diffraction order of the optical beam with the first wavelength be $k_{1i}$, the selected diffraction order of the optical beam with the second wavelength be $k_{2i}$, the selected diffraction order of the optical beam with the third wavelength be $k_{3i}$, the thickness of a first protective layer of the first optical disc be $t_1$ (mm), the thickness of a second protective layer of the second optical disc be $t_2$ (mm), and the thickness of a third protective layer of the third optical disc be $t_3$ (mm), then, it is known that satisfying Expression (8) described below (let us say that x of $k_{1x}$, $k_{2x}$, and $k_{3x}$ in the conditional expression with the inner ring zone is x=i) is a condition on which spherical aberration on the signal recording surface of each optical disc at each wavelength can be corrected and reduced.

$$(\lambda_1 \times k_{1x} - \lambda_2 \times k_{2x})/(t_1 - t_2) \cong (\lambda_1 \times k_{1x} - \lambda_3 \times k_{3x})/(t_1 - t_3) \quad (8)$$

Figure 6:
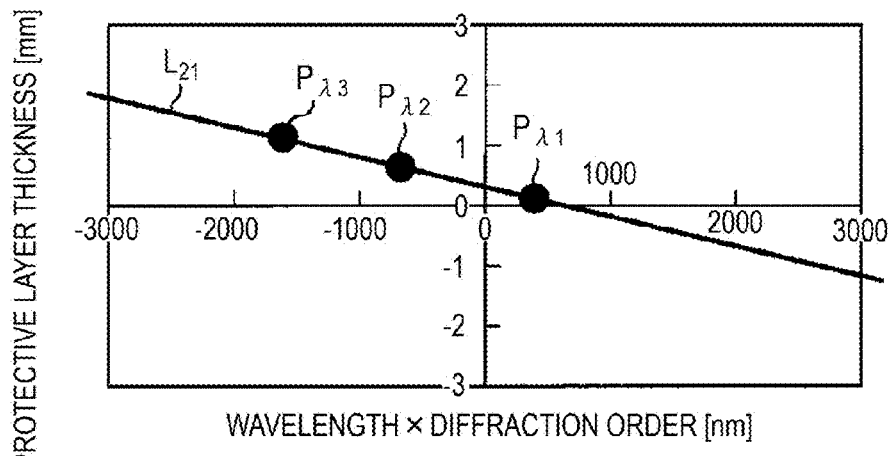
FIG. 6 is a diagram illustrating spherical aberration correction possibility at a diffraction region (inner ring zone) of a diffraction unit constituting an optical pickup which is used to diffract three wavelengths with reference to an inner ring zone of Example 1, and showing the relation of points that are plotted according to the relation between wavelength×diffraction order and the thickness of a protective layer, and the design line of the objective lens in a case of $(k_{1i}, k_{2i}, k_{3i})=(+1, -1, -2)$.

In the first diffraction region 51 that is an inner ring zone, when $\lambda_1$=405 (nm), $\lambda_2$=655 (nm), $\lambda_3$=785 (nm), $t_1$=0.1 (mm), $t_2$=0.6 (mm), and $t_3$=1.1 (mm), for example, when $k_{1i}$=+1, $k_{2i}$=−1, and $k_{3i}$=−2 as an example of an optimal combination, as described below, the conditional expression is satisfied, and it has been confirmed that spherical aberration can be reduced. This can be restated in order words that points $P_{\lambda 1}$, $P_{\lambda 2}$, and $P_{\lambda 3}$ are plotted, as shown in FIG. 6, in which the horizontal axis represents a value calculated by wavelength× diffraction order (nm) and the vertical axis represents the thickness (mm) of the protective layer, the points are positioned on a line, meaning that spherical aberration on the signal recording surface of each optical disc at each wavelength can be corrected and reduced. Actually, when the points $P_{\lambda 1}$, $P_{\lambda 2}$, and $P_{\lambda 3}$ are plotted under the following conditions, the points are positioned on a design line, meaning that spherical aberration can be corrected and reduced. Specifically, the material or the surface shapes at the input and output sides of the objective lens 34 are determined with the line $L_{21}$ shown in FIG. 6 as the design line. The inclination of the design line $L_{21}$ substantially approximates the inclination of a line connecting $P_{\lambda 1}$ and $P_{\lambda 2}$ calculated by $(t_1-t_2)/(\lambda_1 \times k_{1i} - \lambda_2 \times k_{2i})$ or the inclination of a line connecting $P_{\lambda 1}$ and $P_{\lambda 3}$ calculated by $(t_1-t_3)/(\lambda_1 \times k_{1i} - \lambda_3 \times k_{3i})$, or determined taking into consideration the inclinations of these lines or other design conditions.

Note that while in FIG. 6, $P_{\lambda 3}$ deviates slightly upward from the line $L_{21}$, spherical aberration can be reliably corrected by inputting, as divergent light, incident light onto the objective lens 34 where the diffraction unit 50 is provided. That is, divergent light is input to the objective lens 34, such that the same result as that when the apparent thickness of the protective layer is thickened can be obtained. As described, when the diffraction unit 50 is provided on an optical element (diffraction optical element 35B, see FIGS. 41A and 41B) separated from the objective lens, spherical aberration can be reliably corrected by inputting, as divergent light, incident light on an optical element of the objective lens 34B and the diffraction optical element 35B which is closer to the emission units, for example, in FIGS. 41A and 41B, the diffraction optical element 35B.

Figure 7:
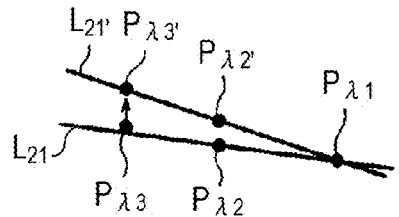
FIG. 7 is a diagram conceptually showing that spherical aberration can be corrected using divergent light, and showing that plot positions are shifted due to the second and third wavelengths having been input in a state of diffusion light, and then plots $P_{\lambda 1}$, $P_{\lambda 2}'$, and $P_{\lambda 3}'$ are positioned on a line, as compared with the state of FIG. 6.

A description will be made regarding this point with reference to FIG. 7 which illustrates the concept of correction. Specifically, the optical beams with the second and third wavelengths $\lambda_2$ and $\lambda_3$ are input to the objective lens 34 as minimal divergent light, such that plots $P_{\lambda 2}'$ and $P_{\lambda 3}'$ indicating the second and third wavelengths are shifted upward as to plots $P_{\lambda 2}$ and $P_{\lambda 3}$ according to the apparent thickness of the protective layer, as shown in FIG. 7. As shown in FIG. 7, the magnification of divergent light is appropriately adjusted, such that the three points $P_{\lambda 1}$, $P_{\lambda 2}'$, and $P_{\lambda 3}'$ are positioned on the line $L_{21}'$ completely. Therefore, spherical aberration due to a difference in the thickness of the protective layer or the like can be sufficiently corrected. In this case, the line $L_{21}'$ on which the plots $P_{\lambda 1}$, $P_{\lambda 2}'$, and $P_{\lambda 3}'$ are positioned is taken as a design line.

An arrangement may be made in which only the optical beam with the third wavelength $\lambda_3$ is input as convergent light and is shifted downward to position the plots on one line, thereby correcting spherical aberration. When convergent light is used, however, the working distance is shortened, which is undesirable in some cases. Accordingly, when three-wavelength compatibility is taken into consideration, it is advantageous to input divergent light to the objective lens with the second and third wavelengths from the perspective that appropriate return magnification can be ensured.

When the plots $P_{\lambda 1}$, $P_{\lambda 2}$, and $P_{\lambda 3}$ that has close connection with the above-described relational expression and are described with reference to FIG. 6 are taken into consideration, if the absolute values of the respective diffraction orders are within a range of third order, the diffraction orders $k_{1i}$, $k_{2i}$, and $k_{3i}$ need to satisfy the relational expression of Expression (9a) or (9b) described below.

$$k_{1i} \leq k_{2i} \leq k_{3i} \tag{9a}$$

$$k_{1i} \geq k_{2i} \geq k_{3i} \tag{9b}$$

Next, the second perspective will be described. As the second perspective, there is a need to use a diffraction order whereby the focal distance $f_1$ as to the first wavelength $\lambda_1$ can be reduced while maintaining the working distance WD3 large when the third wavelength $\lambda_3$ is used. In general, the extension of the focal distance f extends the working distance. The focal distance $f_1$ as to the first wavelength $\lambda_1$ needs to be reduced, and the focal distance $f_3$ as to the third wavelength $\lambda_3$ needs to be increased. It is desirable to suppress the focal distance $f_1$ as to the first wavelength $\lambda_1$ to 2.2 mm or shorter. There is a need to ensure the working distance of around 0.4 mm when the third wavelength $\lambda_3$ is used. To this end, if we say that $f_1 = 2.2$ mm, and incidence on the objective lens 34 is infinite incidence, that is, parallel light incidence, $f_3$ needs to be around 2.5 mm or longer. With the material of the objective lens made of plastic corresponding to the above-described three wavelengths $\lambda_1$, $\lambda_2$, and $\lambda_3$, dispersion is large, but let us say that this is ignored here, and an approximate value is calculated.

The objective lens 34 has refractive power according to a lens curved surface, and diffraction power according to the diffraction unit 50 provided on one surface. It has been known that the focal distance $f_{dif}$ according to diffraction of the diffraction unit 50 of the objective lens 34 can be calculated by Expression (10) described below. For Expression (10), $\lambda_0$ is the manufacturing wavelength, and now, let us say that $\lambda_0 = \lambda_1$. Also, $C_1$ is a value called a phase difference function coefficient, which is a coefficient for defining a phase difference shape provided by a diffraction structure (diffraction grating), and varies depending on the value of $\lambda_0$. Also, for Expression (10), k represents a diffraction order selected at each of the wavelengths $\lambda_1$, $\lambda_2$, and $\lambda_3$, and specifically is $k_1$, $k_2$, and $k_3$.

$$f_{dif} = \frac{0.5}{kC_1} \cdot \frac{\lambda_0}{\lambda} \tag{10}$$

In Expression (10), when $\lambda_0 = \lambda_1$, if the absolute value of the coefficient $C_1$ is not smaller than $1 \times 10^{-2}$, the pitch amount increases, and consequently, formation becomes impossible. Let the focal distance according to refractive power of a lens curved surface be $f_r$, then, the focal distance $f_{all}$ of refraction and diffraction of the entire objective lens is calculated according to the relation of Expression (11) described below using the above-described focal distance $f_{dif}$ according to diffraction and $f_r$.

$$\frac{1}{f_{all}} = \frac{1}{f_{dif}} + \frac{1}{f_r} \tag{11}$$

Figure 8:
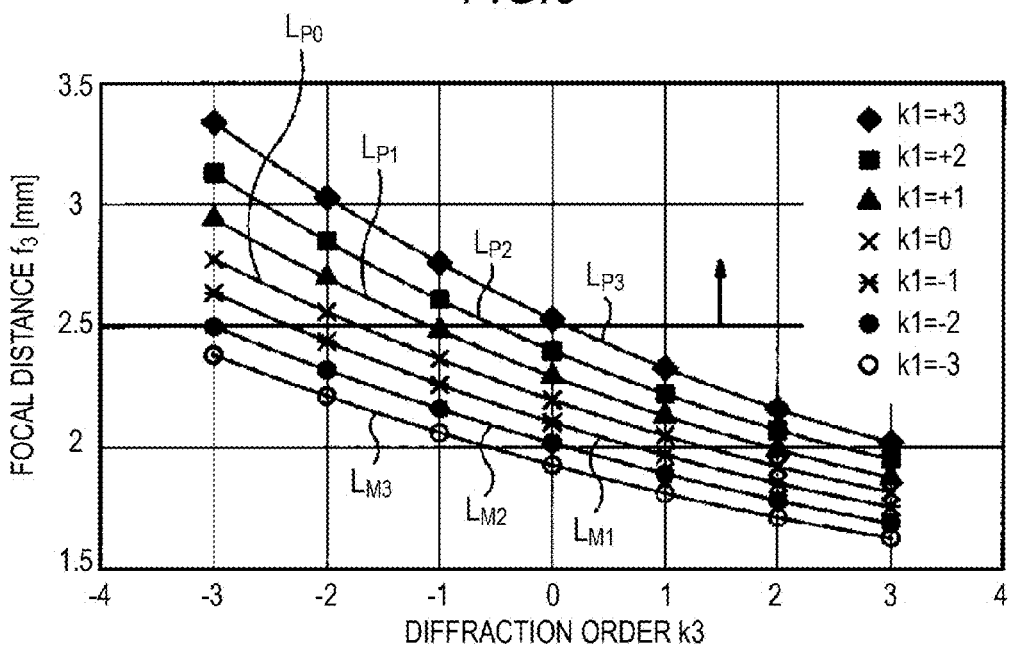
FIG. 8 is a diagram illustrating the relation between diffraction orders $k_1$ and $k_3$, which are selected at the diffraction unit regarding the first and third wavelengths, and the focal distance of the objective lens as to the third wavelength, and showing a change in the focal distance as to the third wavelength depending on a change in the diffraction order $k_3$ of the third wavelength for each diffraction order $k_1$ of the first wavelength.

FIG. 8 shows a change in the value of the focal distance $f_3$ when $k_1$ and $k_3$ are changed based on Expressions (10) and (11). In FIG. 8, the horizontal axis represents the diffraction order $k_3$, and the vertical axis represents the focal distance $f_3$ as to the third wavelength $\lambda_3$. Curves $L_{M3}$, $L_{M2}$, $L_{M1}$, $L_{P0}$, $L_{P1}$, $L_{P2}$, and $L_{P3}$ represent curves connecting plotted changes in the focal distance $f_3$ along with a change in $k_{3i}$ when the diffraction order $k_{1i}$ is −3rd order, −2nd order, −1st order, zero order, 1st order, 2nd order, and 3rd order. FIG. 8 shows calculation results assuming that the coefficient $C_1$ is $1 \times 10^{-2}$ which is the maximum, and $f_{all1}$ representing the overall focal distance $f_{all}$ calculated by Expression (11) of the first wavelength $\lambda_1$ $f_{all1} = 2.2$ (mm). The diffraction order has thus been described above, but actually, geometrical optics can be applied to the inner ring zone alone, and the properties, such as the focal distance and the like, are determined with the inner ring zone. Accordingly, the above-described $k_1$ to $k_3$ correspond to $k_{1i}$ to $k_{3i}$, and in other words, the above-described relation of $k_1$ to $k_3$ has the relation where $k_1$ to $k_3$ are substituted with $k_{1i}$ to $k_{3i}$. Referring to FIG. 8, in order to set $f_3$ to 2.5 mm or longer, the relation of Expression (12a) described below is established. Accordingly, in order to ensure the appropriate focal distance and working distance, it is necessary to have the relation of Expression (12b) described below from Expression (9b).

$$k_{1i} > k_{3i} \tag{12a}$$

$$k_{1i} \geq k_{2i} > k_{3i} \tag{12b}$$

From the perspective that Expression (12b) and a restriction that a diffraction order to be used is around 3 or smaller, each of combinations $(k_{1i}, k_{3i}) = (-2, -3), (-1, -2), (-1, -3), (0, -2), (0, -3), (1, -2), (1, -3), (2, -1), (2, -2) (2, -3), (3, 0), (3, -1), (3, -2),$ and $(3, -3)$ is a suitable combination from the above-described perspective. In this case, $k_{2i}$ that is determines so as to satisfy Expression (12b) is used. Strictly, the relation of FIG. 8 is changed with the value of $f_1$ and material dispersion, and the target value of $f_3$ decreases by decreasing $f_1$ or changing incident magnification to the objective lens to divergent light, but the above-described choices of the diffraction orders are suitable.

Next, the third perspective will be described. As the third perspective, the configuration needs to be advantageous in manufacturing. When a diffraction order to be selected is too great, the steps of the diffraction structure to be formed, and the depth of blaze become deep. When the depth of the diffraction structure becomes deep, formation precision may be deteriorated. In addition, an optical path length enhancement effect due to a change in temperature increases, and temperature diffraction efficiency properties are deteriorated. Deterioration in formation precision leads to deterioration in diffraction efficiency. It is desirable and common from such reasons to select a diffraction order up to around 3 to 4. Accordingly, with the above-described second perspective, study has been made using a diffraction order up to 3.

Next, the fourth perspective will be described. As the fourth perspective, though similar to the third perspective, the configuration needs to be able to be manufacture. When diffraction efficiency calculation that will be described in a below-described section of "Calculation of depth and shape of diffraction structure and diffraction efficiency" is performed, the depth d needs to be equal to or smaller than a suitable size, and the diffraction structure needs to be able to be formed with this depth. Further, the depth d needs to be equal to or smaller than at least 15 μm.

From the first to fourth perspectives such as above, the first diffraction region 51 which is an inner ring zone is configured so as to generate diffracted light having the relation of $k_{1i} \geq k_{2i} \geq k_{3i}$.

The first diffraction region 51 is configured such that, of the diffraction orders $k_{1i}$, $k_{2i}$, and $k_{3i}$ of each wavelength with maximum diffraction efficiency, $k_{1i}$ and $k_{3i}$ have any one of the following relations.

$(k_{1i}, k_{3i})$=(−2, −3), (−1, −2), (−1, −3), (0, −2), (0, −3), (1, −2), (1, −3), (2, −1), (2, −2), (2, −3), (3, 0), (3, −1), (3, −2), and (3, −3)

Figure 19:
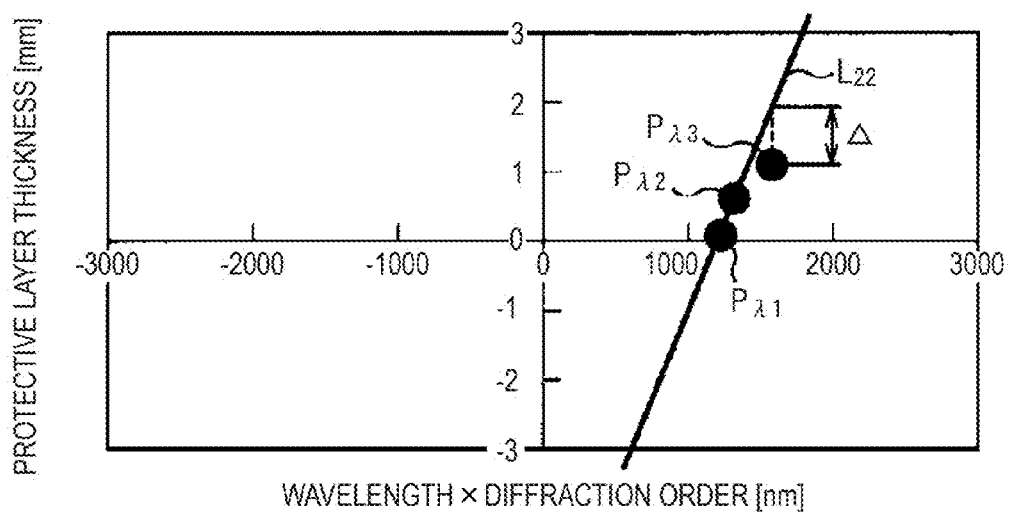
FIG. 19 is a diagram illustrating flaring in the middle ring zone of Example 1, and showing the relation of points that are plotted according to the relation between wavelength×diffraction order and the thickness of a protective layer, and the design line of the objective lens in a case of $(k_{1m}, k_{2m}, k_{3m})= (+3, +2, +2)$.
Figure 20A:
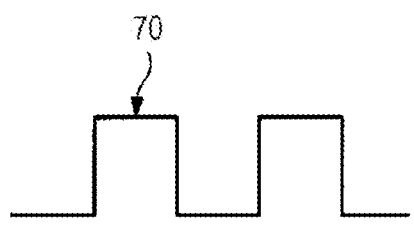
FIGS. 20A to 20C are diagrams illustrating the configuration of a diffraction unit having a composite diffraction structure in which a first basic structure where a predetermined diffraction order is dominant for each wavelength and a second basic structure where a predetermined diffraction order is dominant for each wavelength overlap each other, specifically.
Figure 20B:
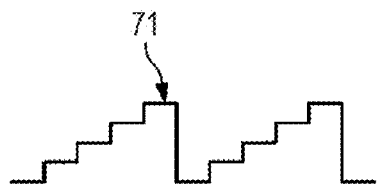
Figure 20C:
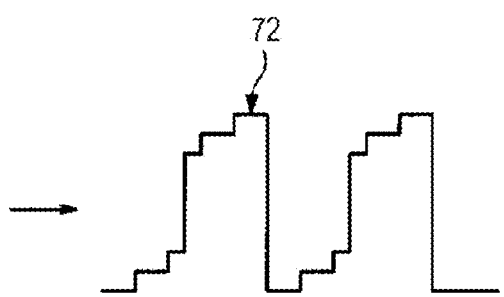

From the first to fourth perspectives, specifically, as described below, the optimal configuration example is a case where $(k_{1i}, k_{2i}, k_{3i})$=(1, −1, −2), (0, −1, −2), (1, −2, −3), or (0, −2, −3). Now, when the diffraction orders $k_{1i}$, $k_{2i}$, and $k_{3i}$ are selected as described above, the number of steps S and the depth d to be selected when diffraction efficiency and the like are taken into consideration are shown in I1 to I4 in Table 1. Also, in Table 1, additionally, with the relations of the plots $P_{\lambda 1}$, $P_{\lambda 2}$, and $P_{\lambda 3}$ and the design line L described with reference to FIG. 6, a below-described deviation amount Δ from the design line L of the plot $P_{\lambda 3}$ indicating the third wavelength is shown. That is, as shown in FIG. 19 described below, when a line (hereinafter, also referred to "spherical aberration correction line") connecting the above-described plots $P_{\lambda 1}$ and $P_{\lambda 2}$ is set, the deviation amount Δ indicates the distance deviated in the vertical axis direction (a direction indicating the protective layer thickness) from the plot $P_{\lambda 3}$ toward the spherical aberration correction line. In the case of the deviation amount Δ=0, this indicates that the respective points $P_{\lambda 1}$, $P_{\lambda 2}$, and $P_{\lambda 3}$ are on one line completely. When the deviation amount Δ is positive, this indicates that the plot $P_{\lambda 3}$ is positioned below the spherical aberration correction line, and when the deviation amount Δ is negative, this indicates that the plot $P_{\lambda 3}$ is positioned above the spherical aberration correction line. In FIG. 6 illustrating Example 1 of the inner ring zone, it is difficult to illustrate the deviation amount Δ from the features of the inner ring zone, so the description has been made regarding the deviation amount Δ using FIG. 19 used for Example 1 of the middle ring zone, but let us say that the definition regarding the deviation amount Δ is the same for both the inner ring zone and the middle ring zone. As shown in Table 1, in any example, diffraction efficiency is sufficiently ensured, and the deviation amount Δ is also sufficiently small. Accordingly, a suitable diffraction order can be confirmed even if spherical aberration correction is taken into consideration.

TABLE 1

Order, diffraction efficiency, diffraction order, depth, the number of steps, and Δ of inner ring zones

| No. | $K_{1i}$ | $K_{2i}$ | $K_{3i}$ | $eff_1$ | $eff_2$ | $eff_3$ | d[μm] | s | Δ[mm] |
|---|---|---|---|---|---|---|---|---|---|
| I1 | 1 | −1 | −2 | 0.81 | 0.62 | 0.57 | 3.8 | 4 | −0.06 |
| I2 | 0 | −1 | −2 | 0.98 | 0.78 | 0.39 | 6.9 | 3 | 0.21 |
| I3 | 1 | −2 | −3 | 0.86 | 0.70 | 0.52 | 5.4 | 6 | −0.19 |
| I4 | 0 | −2 | −3 | 0.86 | 0.50 | 0.39 | 4.0 | 5 | −0.10 |

Next, a description will be made regarding "Calculation of depth and shape of diffraction structure and diffraction efficiency" with the first diffraction region 51 and the like with reference to a specific example. Now, a diffraction surface design example such that diffracted light of each diffraction order described above is taken as maximum diffracted light will be shown as the inner ring zone of Example 1 with reference to FIGS. 9A to 9C. Note that the diffraction amount (diffraction efficiency) of the selected diffraction order fluctuates depending on the groove depth such as shown in FIGS. 9A to 9C, so setting of a suitable groove depth enables the diffraction of the selected diffraction order at each wavelength to be increased up to a desired level.

Specifically, FIGS. 9A to 9C illustrate a change in diffraction efficiency as to the groove depth d when assuming that the diffraction structure is a staircase form of the number of steps S=4, and $(k_{1i}, k_{2i}, k_{3i})$=(+1, −1, −2). FIG. 9A is a diagram showing a change in diffraction efficiency of +1st order diffracted light of the optical beam with the first wavelength. FIG. 9B is a diagram showing a change in diffraction efficiency of −1st order diffracted light of the optical beam with the second wavelength and a change in diffraction efficiency of −2nd order diffracted light serving as unwanted light as described below. FIG. 9C is a diagram showing a change in diffraction efficiency of −2nd order diffracted light of the optical beam with the third wavelength and a change in diffraction efficiency of +3rd order diffracted serving as unwanted light as described below. In FIGS. 9A to 9C, the horizontal axis represents the groove depth (nm), and the vertical axis represents diffraction efficiency (light intensity). When the diffraction efficiency of $k_{1i}$ is $eff_1$, the diffraction efficiency of $k_{2i}$ is $eff_2$, and the diffraction efficiency of $k_{3i}$ is $eff_3$, the position of the groove depth d=3800 (nm) shown in the horizontal axis has sufficient diffraction efficiency. Specifically, as shown in FIG. 9A $eff_1$=0.81, as shown in FIG. 9B $eff_2$=0.62, and as shown in FIG. 9C $eff_3$=0.57, which have sufficient diffraction efficiency. As shown in FIGS. 9A to 9C, the relation between diffraction efficiency and the groove depth fluctuates depending on the number of steps, so there is a need to select a suitable number of steps. Here, the number of steps S=4 is used, as described above.

With the first diffraction region 51, the inner ring zone region has a step structure (staircase-like diffraction structure), which is a configuration suitable for separating the diffraction efficiency of unwanted light generated at this diffraction region from the diffraction efficiency $eff_1$, $eff_2$, and $eff_3$ of regular light. The term "regular light" means diffracted light of diffraction orders $k_{1i}$, $k_{2i}$, and $k_{3i}$ selected as described above, that is, diffracted light of a diffraction order with maximum diffraction efficiency. The term "unwanted light" means diffracted light of a diffraction order with the second largest diffraction efficiency. In FIGS. 9A to 9C, and FIGS. 10A to 10C and FIGS. 25A to 25C described below, $L_M$ indicates a change in diffraction efficiency of diffracted light of a diffraction order with maximum diffraction efficiency, and $L_F$ indicates a change in diffraction efficiency of diffracted light of a diffraction order serving as unwanted light described here.

A description will be made regarding a case where with the first diffraction region 51, the diffraction structure of a staircase form is formed, thereby reducing the influence of unwanted light. For comparison with FIGS. 9A to 9C, diffraction efficiency when the inner ring zone is formed to have a blazed form is shown in FIGS. 10A to 10C as a reference example. FIGS. 10A to 10C show a change in diffraction efficiency as to the groove depth d when the diffraction structure has a blazed form of the number of steps S=∞, and $(k_{1i}, k_{2i}, k_{3i})$=(+1, +1, +1). FIG. 10A is a diagram showing a change in diffraction efficiency of +1st order diffracted light of the optical beam with the first wavelength. FIG. 10B is a diagram showing a change in diffraction efficiency of +1st order diffracted light of the optical beam with the second wavelength, and a change in diffraction efficiency of zero-order light serving as unwanted light. FIG. 10C is a diagram showing a change in diffraction efficiency of +1st order diffracted light of the optical beam with the third wavelength, and a change in diffraction efficiency of zero-order light serving as unwanted light. In FIGS. 10A to 10C, the horizontal axis represents the groove depth (nm), and the vertical axis represents diffraction efficiency (light intensity). As shown in FIGS. 10A to 10C, in the case of the second and third wavelengths, zero-order light has efficiency as unwanted light. With each optical beam of adjacent diffraction orders, such as zero-order light and 1st order light, there is few difference in the diffraction angle. For this reason, if regular light which is the optical beam of one of the selected diffraction orders $k_{2i}$ and $k_{3i}$ is condensed on the corresponding optical disc so as to be in a focused state, unwanted light is also condensed in a blurring state. Subsequently, unwanted light is reflected at the optical disc, and reflected light of unwanted light is irradiated onto the photoreceptor portion, which adversely affects a signal obtained at the photoreceptor portion. Accordingly, jitter or the like may be deteriorated. Further, the influence of unwanted light grows when defocus occurs. As shown in FIGS. 9A to 9C described above, the diffraction structure having the staircase form is formed, such that the diffraction efficiency of unwanted light can be reduced, as compared with the case shown in FIGS. 10A to 10C.

That is, an inner ring zone portion such as the first diffraction region 51 is formed in a staircase form, a configuration can be realized in which the amount of diffracted light of unwanted light is suppressed. With the diffraction structure having the staircase form, a groove depth which decreases the efficiency of unwanted light can be selected. Accordingly, even if the efficiency of unwanted light becomes high, the diffraction order serving as regular light and the diffraction order serving as unwanted light differ greatly, such that unwanted light can be prevented from being condensed at the time of focus. Specifically, as shown in FIG. 9B, the efficiency of unwanted light at the second wavelength can be suppressed to around 5% which does not contribute. Also, as shown in FIG. 9C, regular light at the third wavelength is −2nd order light, but unwanted light is +3rd order light. With −2nd order light and +3rd order light, diffraction angles differ greatly. Accordingly, when regular light is focused, unwanted light is defocused greatly, and thus there is no bad influence due to incidence of unwanted light on the photoreceptor portion. In other words, a so-called step structure such as a staircase form is a structure suitable for separating the diffraction efficiency of regular light from the diffraction efficiency of diffracted light of adjacent diffraction orders, as compared with a blazed form or the like.

The second diffraction region 52 which is a middle ring zone has a second diffraction structure different from the first diffraction structure formed in a ring zone shape to have a predetermined depth, and is configured to emit diffracted light of the optical beam with the first wavelength which passes therethrough such that diffracted light of a diffraction order being condensed so as to form an appropriate spot on the signal recording surface of the first optical disc through the objective lens 34 is dominant, that is, the maximum diffraction efficiency is manifested with respect to diffracted light of other diffraction orders.

With the second diffraction structure, the second diffraction region 52 also emits diffracted light of the optical beam with the second wavelength which passes therethrough such that diffracted light of a diffraction order being condensed so as to form an appropriate spot on the signal recording surface of the second optical disc through the objective lens 34 is dominant, that is, the maximum diffraction efficiency is manifested with respect to diffracted light of other diffraction orders.

With the second diffraction structure, the second diffraction region 52 also emits diffracted light of the optical beam with the third wavelength which passes therethrough such that diffracted light of a diffraction order other than the diffraction order being condensed so as to form an appropriate spot on the signal recording surface of the third optical disc through the objective lens 34 is dominant, that is, the maximum diffraction efficiency is manifested with respect to diffracted light of other diffraction orders. To put this point in another way, in the light of a below-described flaring operation and the like, with the second diffraction structure, the second diffraction region 52 emits diffracted light of the optical beam with the third wavelength which passes therethrough such that diffracted light of a diffraction order which forms no appropriate spot on the signal recording surface of the third optical disc through the objective lens 34 is dominant. Note that with the second diffraction structure, the second diffraction region 52 can sufficiently reduce the diffraction efficiency of diffracted light of a diffraction order of the optical beam with the third wavelength being condensed so as to form an appropriate spot on the signal recording surface of the third optical disc through the objective lens 34.

Thus, the second diffraction region 52 has such a diffraction structure that diffracted light of a predetermined diffraction order is dominant with respect to the optical beam of each wavelength. For this reason, when the optical beam of each of the first and second wavelengths having passed through the second diffraction region 52 and become diffracted light of a predetermined diffraction order is condensed on the signal recording surface of the corresponding optical disc by the objective lens 34, spherical aberration can be corrected and reduced.

The second diffraction region 52 is configured so as to function as described above with respect to the optical beams with the first and second wavelengths, and is configured such that with respect to the optical beam with the third wavelength, diffracted light of a diffraction order which passes therethrough and is not condensed on the signal recording surface of the third optical disc through the objective lens 34 is dominant by taking into consideration the influence of flaring and the like. Accordingly, even if the optical beam with the third wavelength having passed the second diffraction region 52 is input to the objective lens 34, this seldom affects the signal recording surface of the third optical disc. In other words, the second diffraction region 52 can serve so as to significantly reduce the light quantity of the optical beam with the third wavelength having passed therethrough and been condensed on the signal recording surface by the objective lens 34 to around zero, and subject the optical beam with the third wavelength to aperture restriction.

Incidentally, the above-described first diffraction region 51 is formed with such a size that the optical beam with the third wavelength having passed therethrough is input to the objective lens 34 in the same state as that of the optical beam subjected to aperture restriction at around NA=0.45. The second diffraction region 52 formed outside the first diffraction region 51 does not condense the optical beam with the third wavelength having passed therethrough on the third optical disc through the objective lens 34. Consequently, the diffraction unit 50 including the first and second diffraction regions 51 and 52 configured as above serves so as to perform aperture restriction at around NA=0.45 with respect to the optical beam with the third wavelength. A configuration has been made in which the diffraction unit 50 performs aperture restriction of numerical aperture NA of around 0.45 with respect to the optical beam with the third wavelength, but the numerical aperture restricted by the above-described configuration is not limited to this.

The second diffraction structure is a ring zone-shaped cyclical structure in which unit cyclical structures being formed in a concavo-convex shape having a plurality of steps or the like with respect to the reference surface are successively formed in the radial direction of the ring zone. In the second diffraction structure, the pitch of the unit cyclical structures is constant or successively changes, and the ratio of the width of each step to the width of one cycle and the height of each step in the optical axis direction as to the reference surface becomes cyclic. A description will be made assuming that the above-described concavo-convex shape includes a blazed form. That is, the second diffraction structure has a plurality of steps or unit cyclical structures having a predetermined shape, such as a blazed form.

Specifically, as shown in FIGS. 4A, 4B, and 5B, the second diffraction region 52 is formed in a ring zone shape centered on the optical axis with the sectional shapes of the ring zones with respect to the reference surface being formed successively in the radial direction with a predetermined cyclical number $N_m$ with a blazed form of a predetermined depth (hereinafter, also referred to as "groove depth") d as one cycle.

While a description has been made here assuming that the second diffraction region having a diffraction structure is formed such that the sectional shape of the ring zone is a blazed form, any diffraction structure may be used insofar as it is a cyclical structure in which unit cyclical structures having a concavo-convex shape are formed successively in the radial direction of each ring zone, such that an optical beam of a predetermined diffraction order is dominant with respect to the optical beam of each wavelength as described above. For example, as shown in FIG. 12, a diffraction region 52B may be formed which has a ring zone shape centered on the optical axis and the sectional shape of the ring zone is configured as to the reference surface such that staircase forms are formed successively in the radial direction with a predetermined cyclical number $N_m$ with a staircase form having a predetermined depth d and a predetermined number of steps S as one cycle.

As shown in FIG. 12, the diffraction region 52B when the staircase form is formed as a middle ring zone has a ring zone shape centered on the optical axis, and the sectional shape of the ring zone is configured such that the staircase forms are formed successively in the radial direction with a predetermined cyclical number $N_m$ with a staircase form having a predetermined depth d and a predetermined cyclical number S as one cycle. Note that the second diffraction region 52B has different numerical values of d and/or S as compared with those in the first diffraction region 51, that is, the second diffraction structure different from the first diffraction structure provided in the first diffraction region 51 is formed. For example, the diffraction structure of the second diffraction region 52B shown in FIG. 12 is a diffraction structure in which the number of steps is set to 5 (S=5), staircase portions are formed successively in the radial direction with a predetermined cyclical number $N_m$ with a staircase portion having first to fifth steps 52Bs1, 52Bs2, 52Bs3, 52Bs4, and 52Bs5 each having substantially the same depth (d/3) as one cycle, and first to sixth diffraction surfaces 52Bf1, 52Bf2, 52Bf3, 52Bf4, 52Bf5, and 52Bf6 are formed with the same interval (d/5) in the optical axis direction.

When the second diffraction region 52 emits diffracted light of the optical beam with the first wavelength which passes therethrough such that diffracted light of a diffraction order $k_{1m}$ is dominant, that is, such that diffraction efficiency is maximum, emits diffracted light of the optical beam with the second wavelength which passes therethrough such that diffracted light of a diffraction order $k_{2m}$ is dominant, that is, such that diffraction efficiency is maximum, and emits diffracted light of the optical beam with the third wavelength which passes therethrough such that diffracted light of a diffraction order $k_{3m}$ is dominant, that is, such that diffraction efficiency is maximum, the diffraction orders $k_{1m}$, $k_{2m}$, and $k_{3m}$ are set so as to satisfy the relations determined from the following first to third perspectives.

First, the first perspective will be described. As the first perspective, the diffraction orders $k_{1m}$, $k_{2m}$, and $k_{3m}$ which become the maximum diffraction efficiency do not satisfy the relational expression of Expression (8) described above (let us say that x of $k_{1x}$, $k_{2x}$, and $k_{3x}$ in the conditional expression with the middle ring zone is x=m). This is because with a middle ring zone region, when $k_{1m}$, $k_{2m}$, and $k_{3m}$ satisfy Expression (8), diffracted light of a diffraction order $k_{3m}$ of the third wavelength is formed on the signal recording surface of the third optical disc. In such a case, aperture restriction as to the third wavelength cannot be realized.

In other words, a configuration may be made in which the second diffraction region 52 generates the diffraction efficiency of diffracted light of the diffraction orders $k_{1m}$ and $k_{2m}$ of the optical beams with the first and second wavelengths in a high state so as to condense light through the objective lens 34 and form an appropriate spot on the signal recording surfaces of the first and second optical discs, and suppresses the diffraction efficiency of the diffraction order of the optical beam with the third wavelength being condensed on the signal recording surface of the third optical disc as much as possible so as to have an aperture restriction function, but the relation of Expression (8) is not satisfied here. Accordingly, the optical beam of the diffraction order according to the optical beam with the third wavelength is shifted from a state where a focal point is imaged on the signal recording surface of the third optical disc, thereby further reducing the light quantity of the optical beam to be condensed on the signal recording surface of the third optical disc substantially. Hereinafter, a position where an optical beam with a predetermined wavelength is formed through the objective lens 34 is shifted from the signal recording surface of the corresponding optical disc, thereby reducing the light quantity of the optical beam with this wavelength to be condensed on the signal recording surface substantially. This will be called "flaring", and the details thereof will be described below.

Note that with regard to the third wavelength, a configuration needs to be made such that with not only the diffraction order $k_{3m}$ having maximum diffraction efficiency but also all of the diffraction orders having predetermined diffraction efficiency, the diffraction orders thereof will be substituted with $k_{3m}$, and the above-described relational expression is set so as not to be satisfied along with $k_{1m}$ and $k_{2m}$ described above. This is because if diffracted light of a diffraction order having predetermined efficiency satisfies the relation of Expression (8), diffracted light is condensed by the objective lens, and accordingly aperture restriction cannot be performed appropriately. Now, let us say that the term "predetermined diffraction efficiency" means such an efficiency level that when the optical beam having passed through this region is irradiated on the optical disc, the optical beam reflected at the optical disc is input to the photoreceptor portion, the optical beam becomes noise when return light of the optical beam having passed within a regular aperture range is detected by the photoreceptor unit, and in other words, means such an efficiency level that aperture restriction cannot be performed appropriately.

Meanwhile, like the first perspective, the diffraction orders $k_{1m}$, $k_{2m}$, and $k_{3m}$ that do not satisfy the relational expression of Expression (8) are selected, such that aperture restriction as to the third wavelength can be performed appropriated.

Next, the second perspective will be described. As the second perspective, when similarly to the description regarding the inner ring zone, the selected diffraction order is too great, the steps, groove depth, and blazed depth of the diffraction structure become deeper. If the depth of the diffraction structure becomes deep, formation precision may be deteriorated. In addition, an optical path length enhancement effect due to a change in temperature increases, and temperature diffraction efficiency properties are deteriorated. It is desirable and common from such reasons to select a diffraction order up to around 3 to 4.

Next, the third perspective will be described. As the third perspective, similarly to the description regarding the inner ring zone, when diffraction efficiency calculation described below is performed, the depth d needs to be equal to or smaller than a suitable size, and formation can be made with this depth. The depth d needs to be equal to or smaller than at least 15 μm.

With the second diffraction region 52, predetermined diffraction orders $k_{1m}$ and $k_{2m}$ need to be selected so as to satisfy the first to third perspectives described above. For example, a combination $(k_{1m}, k_{2m})=(+1,+1), (-1,-1), (0,+2), (0,-2), (0,+1), (0,-1), (+1,0)$, and $(-1,0)$ (hereinafter, this combination is referred to as "combination A of diffraction orders of middle ring zones"), and a combination $(k_{1m}, k_{2m})=(+3,+2), (-3,-2), (+2,+1)$, and $(-2,-1)$ (hereinafter, this combination is referred to as "combination B of diffraction orders of middle ring zones") are optimal configuration examples. Now, Table 2 shows the above-described functions of middle ring zones when the combinations A and B of the diffraction orders of the middle ring zones are selected, staircase forms when diffraction efficiency and the like are taken into consideration, the form of a diffraction structure selected from the blazed forms, the number of steps S (in the case of a blazed form, "∞"), and the groove depth d. As shown in Table 2, with the combination A of the diffraction orders of the middle ring zones, there is a groove depth whereby optimal diffraction efficiency can be obtained with the diffraction structure having the staircase form which is a so-called step form, that is, it can be said that this combination is a combination suitable for the diffraction structure having the staircase form. In Table 2, MA1 to MA4 indicate respective combinations of the combination A, and MB1 and MB2 indicate respective combinations of the combination B. Note that in the case of the combination A, the optimal solution can be obtained even with a non-cyclical structure. With the combination B of the diffraction orders of the middle ring zones, there is a groove depth whereby optimal diffraction efficiency can be obtained with the diffraction structure having the blazed form, that is, it can be said that this combination is a combination suitable for the diffraction structure having the blazed form. Note that in Table 2, with the diffraction structure suitable for the above-described combination of the diffraction orders $k_{1m}$ and $k_{2m}$, along with a diffraction order $k_{3m}$, the diffraction efficiency of which of the optical beam with the third wavelength reaches the maximum, a diffraction order having the second largest diffraction efficiency as so-called unwanted light is shown as "$k_{3m}$'". Also, in Table 2, diffraction efficiency $eff_1$, $eff_2$, and $eff_3$ of the diffraction orders $k_{1m}$, $k_{2m}$, and $k_{3m}$ of each wavelength, and diffraction efficiency $eff_3$' of the diffraction order $k_{3m}$' of the third wavelength are shown. With each example, along with the deviation amount Δ from the spherical aberration correction line of the plot $P_{\lambda 3}$ of the third wavelength, when the diffraction order $k_{3m}$' of the third wavelength is plotted similarly, the deviation amount of this plot point from the spherical aberration correction line is shown as "Δ'". Note that the combinations of Table 2 and the diffraction orders $k_{1m}$, $k_{2m}$, $k_{3m}$, and $k_{3m}$' in Table 3 described below are combinations of decoding in the same order. In Table 2, "*" indicates that with $eff_3$', diffraction efficiency is low, which effects no problem.

TABLE 2

Order, diffraction efficiency, diffraction order, depth, the number of steps, and Δ of middle ring zones

| No. | $K_{1m}$ | $K_{2m}$ | $K_{3m}$ | $K_{2m'}$ | $eff_1$ | $eff_2$ | $eff_3$ | $eff_{2'}$ | d[μm] | s | Δ[mm] | Δ'[mm] |
|---|---|---|---|---|---|---|---|---|---|---|---|---|
| MA1 | $\mu_1$ | $\mu_1$ | 0 | * | 0.80 | 0.48 | 0.52 | * | 6.4 | 3 | −1.83 | * |
| MA2 | 0 | $\mu_2$ | 0 | $\mu_2$ | 1.00 | 0.57 | 0.25 | 0.23 | 3.1 | 4 | −1.01 | −0.40 |
| MA3 | 0 | $\mu_1$ | ±1 | $\mu_1$ | 0.99 | 0.63 | 0.28 | 0.28 | 1.6 | 2 | −1.62 | −0.40 |
| MA4 | $\mu_1$ | 0 | 0 | $\mu_1$ | 0.79 | 0.85 | 0.43 | 0.34 | 4.1 | 3 | −0.50 | −1.49 |
| MB1 | ±3 | ±2 | ±2 | $\mu_1$ | 0.96 | 0.93 | 0.47 | 0.34 | 2.4 | ∞ | 0.75 | −3.15 |
| MB2 | ±2 | ±1 | ±1 | * | 1.00 | 0.86 | 1.00 | * | 1.6 | ∞ | −0.93 | * |

As shown in Table 2, with the above-described combinations A and B, in any case, diffraction efficiency is sufficiently ensured, and when diffraction efficiency of the third wavelength exists, the deviation amount Δ is sufficiently great, that is, a large spherical aberration is provided to the optical beam of the third wavelength, which does not contribute to image formation. Accordingly, it can be confirmed that the aperture restriction function is manifested. This means that flaring effects are obtained. Note that in Table 2, with the combinations A and B, it goes without saying that there is a combination including multiple solutions as to the groove depth d and the number of steps S, but an example of the groove depth d and the number of steps S is shown as a representative example.

The diffraction orders $k_{1m}$ and $k_{2m}$ to be selected at the second diffraction region 52 that satisfy the first to third perspectives are not limited to the above combinations. For example, it can be said that a combination $(k_{1m}, k_{2m})=(+1, -1)$ and $(-1, +1)$ (hereinafter, this combination is referred to as "combination C of diffraction orders of middle ring zones") and a combination $(k_{1m}, k_{2m})=(+1, +1)$ and $(-1, -1)$ (hereinafter, this combination is referred to as "combination D of diffraction orders of middle ring zones") are optimal configuration examples. Now, the above-described functions of the middle ring zones when the combinations C and D of the diffraction orders of the middle ring zones are selected, staircase form selected when diffraction efficiency and the like are taken into consideration, the form of a diffraction structure selected from the blazed form, the number of steps S, and the groove depth d are shown in MC1 and MD1 of Table 3. Now, as shown in Table 3, with the combination C of the diffraction orders of the middle ring zones, there is a groove depth whereby optimal diffraction efficiency can be obtained with the diffraction structure having the staircase form which is a so-called step form, that is, it can be said that this combination is a combination suitable for the diffraction structure having the staircase form. With the combination D of the diffraction orders of the middle ring zones, there is a groove depth whereby optimal diffraction efficiency can be obtained with the diffraction structure having the blazed form, that is, it can be said that this combination is a combination suitable for the diffraction structure having the blazed form. Note that "$k_{1m}$", "$k_{2m}$", "$k_{3m}$", "$k_{3m'}$", "$eff_1$", "$eff_2$", "$eff_3$", "$eff_3'$", "d", "S", "$\Delta$", and "$\Delta'$" shown in Table 3 are the same as those described above with reference to Table 2.

on the signal recording surface of the third optical disc, thereby enabling aperture restriction to be performed.

As described above, with the middle ring zone, the second diffraction region 52B having the staircase form may be used instead of the second diffraction region 52 having the blazed form. This is because, as described in the above description of the inner ring zone, while the staircase form (step structure) is advantageous to reduce the influence of unwanted light, the middle ring zone is provided outside the inner ring zone, and the lens curved surface is steep, so the blazed form (blazed structure) is advantageous in terms of manufacturing. That is, with the middle ring zone, an advantageous configuration needs to be selected while taking into consideration the relation with other configurations with subtle balance of the influence of unwanted light and the advantages in terms of manufacturing.

Now, a description will be made regarding flaring with the second diffraction region 52, and the configuration thereof. With the above description of the first diffraction region 51, a description has been made regarding a case where it is required to satisfy the above-described conditional expression $(\lambda_1 \times k_{1x} - \lambda_2 \times k_{2x})/(t_1-t_2) \cong (\lambda_1 \times k_{1x} - \lambda_3 \times k_{3x})/(t_1-t_3)$, but this conditional expression (let us say that x of $k_{1x}$, $k_{2x}$, and $k_{3x}$ in the conditional expression with the middle ring zone is x=m) is also taken into consideration with the second diffraction region 52. With the second diffraction region 52 serving as a middle ring zone, when taking into consideration a function for generating diffracted light of the diffraction orders $k_{1m}$ and $k_{2m}$ of the optical beams with the first and second wavelengths being condensed through the objective lens 34 in a state of high diffraction efficiency so as to form an appropriate spot on the signal recording surfaces of the first and second optical discs such as described above, $P_{\lambda 1}$ and $P_{\lambda 2}$ to be plotted need to be positioned on a design line. Further, in

TABLE 3

Order, diffraction efficiency, diffraction order, depth, the number of steps, and $\Delta$ of middle ring zones

| No. | $K_{1m}$ | $K_{2m}$ | $K_{3m}$ | $K_{2m'}$ | $eff_1$ | $eff_2$ | $eff_3$ | $eff_{2'}$ | d[μm] | s | Δ[mm] | Δ'[mm] |
|---|---|---|---|---|---|---|---|---|---|---|---|---|
| MC1 | ±1 | $\mu_1$ | $\mu_1$ | $\mu_2$ | 0.81 | 0.81 | 0.32 | 0.19 | 2.9 | 3 | −0.44 | −0.06 |
| MD1 | ±1 | ±1 | ±1 | 0 | 1.00 | 0.60 | 0.42 | 0.39 | 0.8 | ∞ | −0.25 | −1.83 |

As shown in Table 3, with the above-described combinations C and D, in any case, diffraction efficiency is sufficiently ensured. Note that with the example shown in Table 3, the deviation amount Δ or the deviation amount Δ' is not sufficiently great as compared with the example shown in Table 2, but comparatively low diffraction efficiency $eff_3$ and $eff_3'$ and certain levels of deviation amount Δ and Δ' are obtained. Therefore, the influence of unwanted light can be sufficiently reduced while realizing aperture restriction, for example, using a method of setting the return magnification of an optical system to be great, or the like.

With the second diffraction region 52 such as above, from the first to fourth perspectives such as described above, the combinations A, B, C, and D of the diffraction orders of the middle ring zones such as described above can be selected. The selection of such a diffraction order enables the optical beams with the first and second wavelengths to be condensed on the signal recording surfaces of the corresponding optical discs with high diffraction efficiency in a state where spherical aberration is reduced. With regard to the optical beam with the third wavelength, diffracted light of a diffraction order of high diffraction efficiency is prevented from being condensed order to perform flaring regarding the third wavelength, there is a need to select a design line so as to separate $P_{\lambda 3}$ from the design line intentionally. That is, the objective lens 34 is configured based on the design line whereby $P\lambda_3$ is deviated, such that diffracted light of the relevant diffraction order of the optical beam with the third wavelength can be shifted from a state where a focal point is imaged on the signal recording surface of the third optical disc, and the light quantity of the optical beam with the third wavelength to be condensed on the signal recording surface of the third optical disc can be reduced substantially. Therefore, aperture restriction as to the optical beam with the third wavelength such as described above can be performed reliably and favorably. Specifically, in the case of $(k_{1m}, k_{2m}, k_{3m})=(+3, +2, +2)$ such as shown in FIG. 19, $P_{\lambda 3}$ is deviated from the design line $L_{22}$, so in addition to the effects initially expected that the diffraction efficiency of diffracted light of the relevant diffraction order of the third wavelength can be reduced according to the diffraction structure formed in the second diffraction region 52, flaring effects are further obtained. According to such a configuration, the light quantity of the optical beam with the third wavelength which is input to the third optical disc can be further suppressed.

Next, a description will be made regarding, with the first diffraction region 51 and the second diffraction region 52, the pitch of unit cyclical structures each having a staircase form or a blazed form and a cyclical number of a cyclical structure, in which units cyclical structures are formed successively in the radial direction with a unit cyclical structure as one cycle. Note that, hereinafter, the cyclical number of the cyclical structure in which the staircase forms or blazed forms are formed successively formed in the radial direction with a staircase form or blazed form as one cycle is also called a cyclical number.

With the objective lens 34 such as described above, a configuration needs to be made in which there is deviation between unwanted light and regular light, that is, there is a certain level of distance between a position where unwanted light is condensed and a position where regular light is condensed. When taking this into consideration, with the inner ring zone and the middle ring zone, the cyclical number needs to be selected such that the influence of unwanted light can be reduced sufficiently. As described above, it has been known that the focal distance $f_{dif}$ according to diffraction of the diffraction unit 50 of the objective lens 34 can be calculated by the relation of Expression (13) described below. For Expression (14) described below, $\lambda_0$ is a manufacturing wavelength, and now, let us say that $\lambda_0$=710 nm. Also, $C_1$ is a value called a phase difference function coefficient, which is a coefficient for defining a phase difference shape provided by a diffraction structure (diffraction grating) and varies depending on the value of $\lambda_0$. Also, k indicates a diffraction order selected at each of the wavelengths $\lambda_1$, $\lambda_2$, and $\lambda_3$, and specifically is $k_1$, $k_2$, and $k_3$.

$$f_{dif} = \frac{0.5}{kC_1} \cdot \frac{\lambda_0}{\lambda} \qquad (13)$$

The focal distance $f_{R1}$ that is formed by synthesis of the diffraction grating and the focal distance $f_{r1}$ according to the first surface r1 is calculated by the relation of Expression (14) described below.

$$\frac{1}{f_{R1}} = \frac{1}{f_{dif}} + \frac{1}{f_{r1}} \qquad (14)$$

When assuming that a lens is thin, and the focal distance provided by the second surface r2 is $f_{r2}$, the focal distance $f_{all}$ according to the entire refraction and diffraction of the objective lens 34 which is formed by $f_{R1}$ and the second surface r2 is calculated by the relation of Expression (15) described below.

$$\frac{1}{f_{all}} = \frac{1}{f_{R1}} + \frac{1}{f_{r2}} \qquad (15)$$

Figure 13:
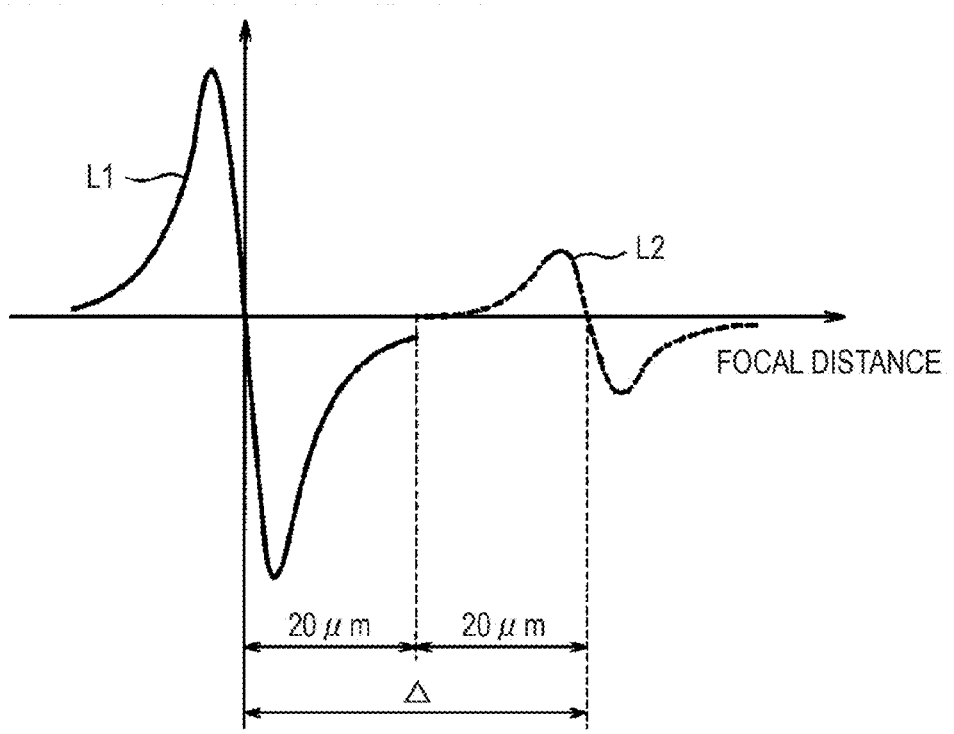
FIG. 13 is a diagram showing the magnitude of a focus error signal which is created by regular light.

The lens focal distances calculated by Expressions (13), (14), and (15) indicate condensed points at the time of parallel light incidence. As shown in FIG. 13, the focal point of unwanted light and the focal point of regular light need to have such a difference as not to interfere with each other. Note that, in FIG. 13, the horizontal axis represents a focal distance, the vertical axis represents the magnitude of a focus error signal (S shape), a solid line L1 represents regular light, and a dotted line L2 represents unwanted light. In FIG. 13, as the magnitude of the focus error signal (S shape) of the third wavelength which is created by regular light and used for CD or the like regular light, around 20 μm on one side is known. For this reason, in order to avoid interference of regular light and unwanted light, a distance Δ (hereinafter, Δ is also referred to as "deviation amount") between both regular light and unwanted light needs to be at least 40 μm. Note that the reason why deviation of regular light and unwanted light as to the third wavelength is studied is that with the first wavelength corresponding to BD or the like, according to the features, a diffraction order having high diffraction efficiency is selected, and almost 100% regular light is used. With the second wavelength corresponding to DVD or the like, the influence is small as compared with the third wavelength, so there is little need to take into consideration the problem regarding unwanted light.

The deviation amount Δ is calculated by the relation of Expression (16) described below.

$$\Delta = f_{all-main} - f_{all-stray} \qquad (16)$$

Note that $f_{all-main}$ represents regular light, and $f_{all-stray}$ represents unwanted light.

For Expressions (13) to (15) described above, when $f_{r1}$=2.4, $f_{r2}$=4.8, $k_{main}$=0, and $k_{stray}$=1, in order to separate unwanted light from the optical beam with the first wavelength used for CD or the like by 40 μm, the relation of Expression (17) described below needs to be satisfied.

$$\frac{C_1}{\lambda_0} > 4.9 \qquad (17)$$

That is, if the coefficient $C_1$ increases above a certain value according to Expression (17), unwanted light and regular light cannot be separated from each other, and focus servo is not performed.

With the diffraction surface, the pitch of diffraction is determined according to the coefficient C. Let the phase to be provided by a diffraction unit (diffraction surface) having a predetermined diffraction structure be φ, then, the phase φ is calculated by the relation of Expression (18) described below using the phase difference function coefficient $C_n$. Note that, for Expression (18) described below, k represents a diffraction order selected at each of the wavelengths $\lambda_1$, $\lambda_2$, and $\lambda_3$, and specifically is $k_1$, $k_2$, and $k_3$, r represents a position in the radial direction, and $\lambda_0$ represents a manufacturing wavelength. Now, let us say that in the case of $\lambda_0$ used for pitch design, calculation is performed assuming k=1.

$$\Phi = k \sum_{n=1} \frac{C_n r^{2n}}{\lambda_0} \qquad (18)$$

For Expression (18), the value of the phase φ can be obtained uniquely at the time of lens design. Meanwhile, the phase φ represents the phase at the manufacturing wavelength $\lambda_0$, so the phase φ is calculated by the relation of Expression (19) described below.

$$\phi' = \phi - n\lambda_0 \qquad (19)$$

Figure 11A:
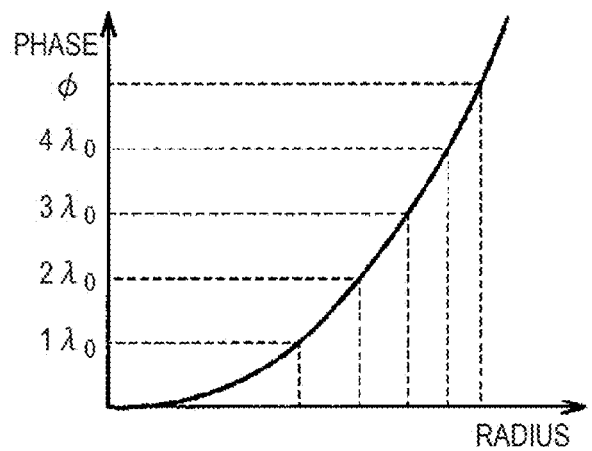
FIGS. 11A to 11C are diagrams illustrating a technique for determining of the pitch of a diffraction structure, specifically.
Figure 11B:
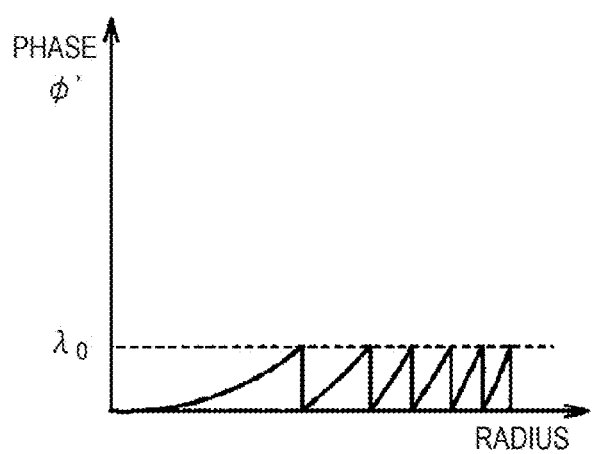
Figure 11C:
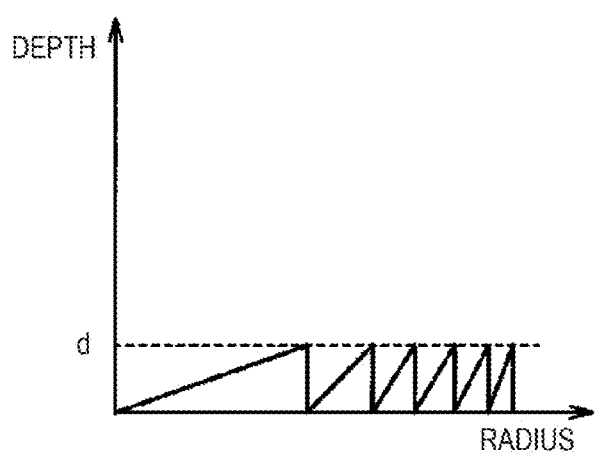

In this case, the influence of the phase φ' obtained by Expression (19) and the phase obtained by the phase φ is exactly the same. In other words, the phase φ' obtained by Expression (19) is, as shown in 11B, a remainder when φ such as shown in FIG. 11A is divided by $\lambda_0$, that is, a value obtained by so-called remainder calculation. This phase ϕ' can be referred to as a phase amount to be provided so as to determine the pitches of the actual diffraction structure. The pitches of the actual diffraction structure are determined from this phase ϕ', and specifically, as shown in FIG. 11C, are determined so as to follow the shape of the phase ϕ'. Note that, the horizontal axes in FIGS. 11A to 11C represent a position in the radial direction, the vertical axis in FIG. 11A represents a necessary phase amount ϕ for each position, the vertical axis in FIG. 11B represents a phase amount ϕ' to be provided obtained by remainder calculation for each position, and the vertical axis in FIG. 11C represents the groove depth d. Now, in FIG. 11C, after the pitches are determined, a blazed form is illustrated, but when a staircase form, such as the above-described first diffraction region 51 or the like, is used, a blazed slope portion shown in FIG. 11C is formed in a staircase form having a predetermined number of steps S.

Note that, a description has been made assuming that of the diffraction structure provided in the first diffraction region 51, the sectional shape including the radial direction and the optical axis direction thereof has, as shown in FIG. 5A, the diffraction structure having a plurality of staircase forms formed with a predetermined height and a predetermined width set with substantially the same interval within one staircase portion, but the invention is not limited to this. For example, a non-cyclical step form may be formed such that the height and/or width of a staircase form serving as a reference is finely adjusted on the basis of an acquisition target phase such as shown in FIG. 11B. Further, a form determined by phase design may be formed so as to provide a predetermined phase difference to an optical beam with a predetermined wavelength. That is, the section shape may not be formed of only a line parallel to a horizontal line indicating a plane serving as a reference, but may be formed so as to be a non-cyclical form including a line (slope surface) inclined with respect to the line, a curve (curved surface), or the like. This point is true for a below-described second diffraction region 52.

Actually, $C_1$ to $C_{10}$, or so are set on a diffraction surface. Of these, if with $C_1$, the cyclical number of the cyclical structure of the inner ring zone is $N_{1i}$, and the cyclical number of the cyclical structure of the middle ring zone is $N_{1m}$, as the minimal to be estimated is f=1.8, the cyclical numbers are calculated such as Expressions (20) and (21) described above, and become cyclical numbers generated by minimal $C_1$. Note that the radius r is obtained by r=f×NA, and NA is 0.45 in the case of CD or the like, and 0.6 in the case of DVD or the like.

$$N_{1i} \geq 4 \tag{20}$$

$$N_{1m} \geq 3 \tag{21}$$

The cyclical number of the cyclical structure decreases due to the influence of the coefficient $C_2$, but the minimal cyclical amount of the cyclical number $N_{1i}$ with the inner ring zone does not deviate from the range thereof. This is because with the inner ring zone, the influence of the coefficient $C_2$ is small. The range of Expression (17) varies somewhat depending on the value of R, but there is no influence on the resultant values of Expressions (20) and (21). With the middle ring zone, a large coefficient $C_2$ is applied, such that the cyclical number $N_{1m}$ itself can be decreased, but a cyclical structure having a loose form does not reduce aberration.

Accordingly, the diffraction unit 50 such as described above is configured such that the cyclical number $N_i$ of the cyclical structure with the inner ring zone and the cyclical number $N_m$ of the cyclical structure with the middle ring zone have the relations of Expressions (20) and (21). Therefore, interference of unwanted light and regular light can be avoided, the amount of diffracted light of unwanted light can be suppressed, and jitter and the like can be prevented from being deteriorated due to unwanted light being received by the photoreceptor portion. Further, even if a certain amount of diffracted light of unwanted light occurs to a certain degree, the diffraction order of unwanted light is made to be a deviated diffraction order having a great diffraction angle difference other than adjacent diffraction orders of focus light, such that jitter and the like can be prevented from being deteriorated due to unwanted light being condensed at the time of focus. Therefore, a sufficient optical spot at the time of playback/recording can be formed.

Figure 14:
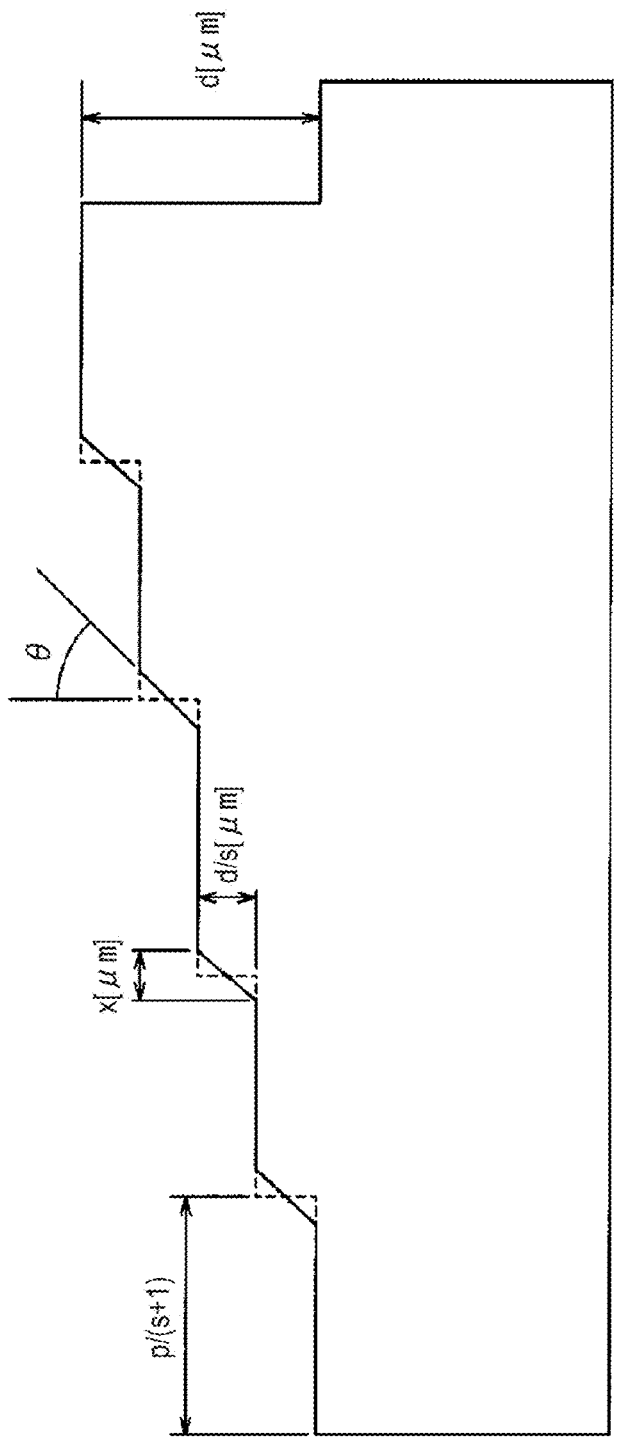
FIG. 14 is a diagram showing a portion as an uncut residue when a diffraction structure is formed.

With the first diffraction region 51 which is an inner ring zone, and the second diffraction region 52 which is a middle ring zone, a configuration in which pitch restriction described below is taken into consideration exhibits excellent functions. That is, at the time of forming a diffraction structure, if pitches and steps have no constant relation, diffraction efficiency may be reduced greatly. Hereinafter, the connection of pitches and steps will be described. That is, at the time of forming a diffraction structure, when taking into consideration formation according to cutting by a turning tool or the like, as shown in FIG. 14, a portion x (μm) as an uncut residue is inevitably formed. As a result, if the average pitch is P (μm), when assuming that light use efficiency with no loss according to an ideal step form is 1, light use efficiency $I_{step}$ according to a diffraction structure actually obtained by cutting is calculated by the relation of Expression (22) described below.

$$I_{step} = \left( \left(1 - \frac{s+1}{p} \cdot x\right) \cdot \frac{s}{s+1} + \frac{1}{s+1} \right)^2 = \left(1 - \frac{s \cdot x}{p}\right)^2 \tag{22}$$

The size of the portion x as an uncut residue is calculated by the relation of Expression (23) described below from the angle θ of the front end of the turning tool and the height d/s of each step.

$$x = \frac{d}{s} \tan\theta \tag{23}$$

If Expression (23) is substituted into Expression (22), Expression (24) described below is obtained.

$$I_{step} = \left(1 - \frac{d \cdot \tan\theta}{p}\right)^2 \tag{24}$$

Figure 15:
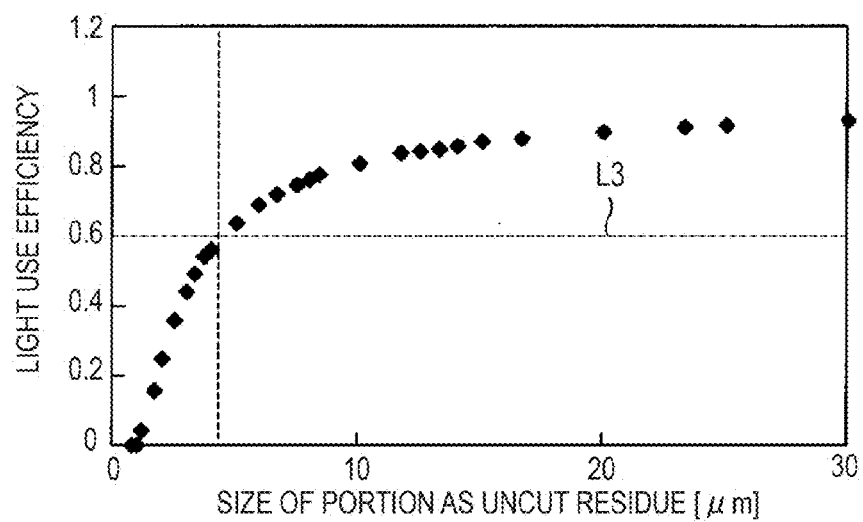
FIG. 15 is a diagram showing the relation between the light use efficiency and an uncut residue when a diffraction structure is formed.

From Expression (24), as shown in FIG. 15, it can be seen that light use efficiency varies depending on the value of x of Expression (23). In FIG. 15, the horizontal axis represents the x portion [μm] as an uncut residue that is calculated by the relation of Expression (23) from the angle θ of the front end of the turning tool and the height d/s of each step, and the vertical axis represents light use efficiency $I_{step}$ according to a diffraction structure having an x portion when light use efficiency according to a diffraction structure with no loss is 1.

Now, let return coupling efficiency from the objective lens 34 be $I_{all}$, and the diffraction efficiency of the optical beam with the first wavelength used for BD or the like be $I_{dif}$, then, return coupling efficiency $I_{all}$ from the objective lens 34 is calculated by the relation of Expression (25) described below.

$$I_{all} = I_{dif} \times I_{step} \tag{25}$$

It has been known that return coupling efficiency $I_{all}$ from the objective lens 34 needs to be around 60%, so when assuming that diffraction efficiency $I_{dif}$ of the optical beam with the first wavelength is 100%, light use efficiency $I_{step}$ needs to satisfy the relation of Expression (26).

$$I_{step} \geq 0.6 \tag{26}$$

Accordingly, as indicated by a dotted line L3 of FIG. 15, with regard to light use efficiency $I_{step}$, light use efficiency of at least 0.6 needs to be ensured. Thus, if Expression (24) is substituted into Expression (26), $d \cdot \tan\theta / p$ needs to satisfy the relation of Expression (27) described below.

$$d \cdot \tan\theta / p \leq 0.23 \tag{27}$$

Now, when assuming that the angle of the front end of the turning tool is 30° which is a reasonable acute angle according to the strength of the turning tool, and the maximum depth is 10 μm, the inner ring zone pitch $p_i$ needs to satisfy the relation of Expression (28) described below.

$$p_i \geq 25.1 [\mu m] \tag{28}$$

Accordingly, when assuming that the radius of the inner ring zone is 0.99 mm (BD: f=2.2), the cyclical number $N_i$ of the cyclical structure having the inner ring zones needs to satisfy the relation of Expression (29) described below.

$$N_i \leq 39 \tag{29}$$

Similarly, with the middle ring zone, when assuming that the angle of the front end of the turning tool is 30° which is a reasonable acute angle according to the strength of the turning tool, and the maximum depth is 7 μm, the middle ring zone pitch $p_m$ needs to satisfy the relation of Expression (30).

$$p_m > 17.6 [\mu m] \tag{30}$$

Accordingly, when assuming that the radius of the middle ring zone is 1.43 mm (BD: f=2.2), the cyclical number $N_m$ of the cyclical structure having the middle ring zones needs to satisfy the relation of Expression (31) described below.

$$N_m \leq 25 \tag{31}$$

Accordingly, the diffraction unit 50 having the first and second diffraction regions 51 and 52 serving as an inner ring zone and a middle ring zone configured as above is configured such that the cyclical number $N_i$ of the cyclical structure of the first diffraction region 51 has the relation of Expression (29), and the cyclical number $N_m$ of the cyclical structure of the second diffraction region 52 has the relation of Expression (31). Therefore, deterioration in efficiency at the time of forming a diffraction structure can be avoided, return coupling efficiency $I_{all}$ from the objective lens 34 can be ensured 60% or greater, and sufficient diffraction efficiency can be obtained.

Actually, the upper limit cyclical number varies depending on the change in the radius. For this reason, if $\theta \cong 30°$ is substituted to Expression (27), the relations of Expressions (32) and (33) are established.

$$d_i / p_i \leq 0.39 \tag{32}$$

$$d_m / p_m \leq 0.39 \tag{33}$$

Accordingly, even if the radius of the above-described inner ring zone differs from 0.99 mm described above, the diffraction unit 50 is configured such that at least the height $d_i$ of each step and the average pitch $p_i$ of the first diffraction region 51 have the relation of Expression (32). Therefore, deterioration in efficiency at the time of forming a diffraction grating can be avoided, return coupling efficiency $I_{all}$ from the objective lens 34 can be ensured 60% or greater, and sufficient diffraction efficiency can be obtained.

With the diffraction unit 50, even if the radius of the above-described middle ring zone differs from 1.43 mm described above, at least the height $d_m$ of each step and the average pitch $p_m$ of the second diffraction region 52 has the relation of Expression (33). Therefore, deterioration in efficiency at the time of forming a diffraction grating can be avoided, return coupling efficiency $I_{all}$ from the objective lens 34 can be ensured 60% or greater, and sufficient diffraction efficiency can be obtained.

Thus, the diffraction unit 50 is configured such that the first diffraction region 51 satisfies Expression (32), and/or that the second diffraction region 52 satisfies Expression (33). As a result, even if the uncut residue portion x is taken into consideration, sufficient diffraction efficiency can be obtained.

Next, a description will be made regarding the reason why the cyclical number of a cyclical structure of an inner ring zone and the cyclical number of a cyclical structure in a middle ring zone need to have constant connection.

Specifically, from Expression (18), let a diffraction power difference between the optical beam with the first wavelength and the optical beam with the second wavelength in an inner ring zone be $\phi_{i(B-D)}$, and a diffraction power difference between the optical beam with the first wavelength and the optical beam with the second wavelength in a middle ring zone be $\phi_{m(B-D)}$, then, diffraction power differences between the optical beam with the first wavelength used for BD or the like and the optical beam with the second wavelength used for DVD or the like in the inner ring zone and the middle ring zone are calculated by the relations of Expressions (34) and (35).

$$\phi_{i(B-D)} = \frac{k_{1i} C_{1i} \lambda_1 - k_{2i} C_{1i} \lambda_2}{0.5 \lambda_0} \tag{34}$$

$$\phi_{m(B-D)} = \frac{k_{1m} C_{1m} \lambda_1 - k_{2m} C_{1m} \lambda_2}{0.5 \lambda_0} \tag{35}$$

Now, in order to exhibit the functions of the objective lens 34, the values of $\phi_{i(B-D)}$ and $\phi_{m(B-D)}$ need to be identical. When the values are not identical, the aberration amount is not corrected. Therefore, in order to exhibit the lens functions of the objective lens 34, below-described Expression (36) which is derived from Expressions (34) and (35) needs to be established.

$$C_{1i}(k_{1i}\lambda_1 - k_{2i}\lambda_2) = C_{1m}(k_{1m}\lambda_1 - k_{2m}\lambda_2) \tag{36}$$

If only the coefficient $C_1$ is defined by Expressions (34), (35), and (36), and the above description as to the diffraction surface, the coefficient $C_1$ itself defines the cyclical number of the cyclical structure. That is, let the cyclical number of the cyclical structure in the inner ring zone be $N_{1i}$, and the cyclical number of the cyclical structure in the middle ring zone be $N_{1m}$, $N_{1i}$ and $N_{1m}$ are in proportion to the coefficient $C_1$ or the like, and specifically, Expression (37) is established.

$$N_{1i} \propto C_{1i} R_i^2 \tag{37}$$

$$N_{1m} \propto C_{1m}(R_m^2 - R_i^2) \tag{38}$$

Now, $R_i$ represents the radius of the outer diameter of an inner ring zone serving as a boundary between an inner ring zone and a middle ring zone, $R_m$ represents the radius of the outer diameter of a middle ring zone serving as a boundary between a middle ring zone and an outer ring zone, and ∝ represents proportional relation.

With Expressions (36), (37), and (38), if Expressions (37) and (38) are substituted into Expression (36), and arranged, Expression (39) described below is established.

$$\frac{k_{1i}\lambda_1 - k_{2i}\lambda_2}{k_{1m}\lambda_1 - k_{2m}\lambda_2} = \frac{N_{1m}}{N_{1i}} \cdot \frac{R_i^2}{R_m^2 - R_i^2} \quad (39)$$

Now, $\phi_{rate}$ is defined as shown in Expression (40) described below.

$$\phi_{rate} = \left| \frac{k_{1i}\lambda_1 - k_{2i}\lambda_2}{k_{1m}\lambda_1 - k_{2m}\lambda_2} \right| \quad (40)$$

Note that the reason why the absolute value is taken is that there is no influence on the value according to a definition method of a diffraction order. Expression (39) is a relational expression that can only be applied to a case where only the coefficient $C_1$ is defined in the diffraction grating. Actually, the coefficient $C_2$ is also included, so a case where the coefficient $C_2$ is applied to this expression is taken into consideration. The coefficient $C_2$ is a coefficient that is generally used for correction of temperature aberration properties. When the coefficient $C_2$ is a value above a certain level or below a certain level, the temperature aberration properties are deteriorated. While the temperature aberration properties are generally deteriorated in proportion to the focal distance of the objective lens, now, with an objective lens of a standard size and f=2.2 mm, study will be made as follows.

Figure 16:
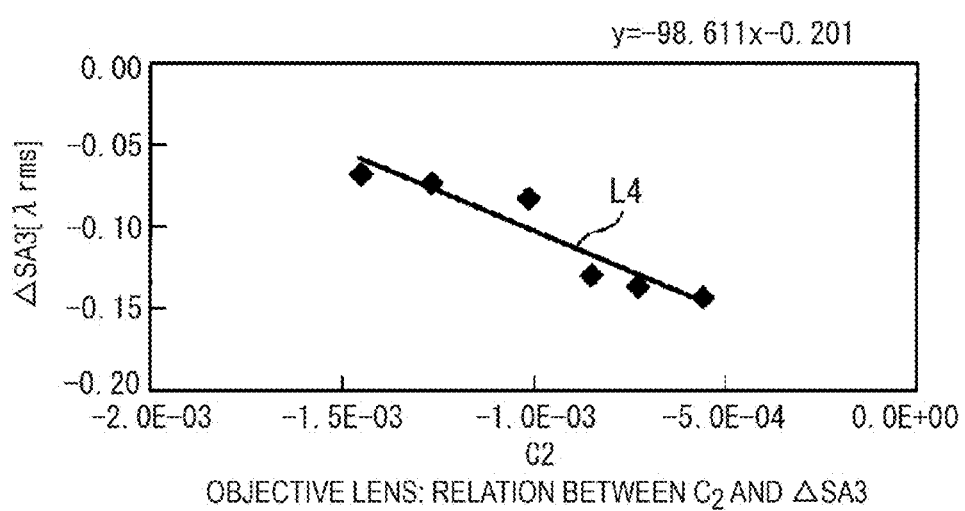
FIG. 16 is a diagram showing the relation between $C_2$ and $\Delta SA3$.

In the case of f=2.2 mm, a difference $\Delta SA3$ (that is, $\Delta SA3 = \Delta A3t0 - SA3t35$) between the 3rd order spherical aberration amount SA3t0 at 0° C. and the 3rd order spherical aberration amount SA3t35 at 35° C. has constant relation with the coefficient $C_2$. For illustration of this, the calculation result of the value of $\Delta SA3$ according to simulation when the coefficient $C_2$ changes is shown in FIG. 16. Note that, in FIG. 16, the value according to simulation with f=2.0 is shown as a value with f=2.2 mm. Note that, in FIG. 16, the horizontal axis (x axis) represents the coefficient $C_2$, and the vertical axis (y axis) represents $\Delta SA3$. Also, in the drawing, a line L4 represents an approximate line (y=−98.611x−0.201) of each plot by a least-square method.

In FIG. 16, the coefficient $C_2$ is taken to be large, such that $\Delta SA3$ can be made small. $\Delta SA3$ represents the spherical aberration amount that is generated due to a change in temperature, so at the time of actual lens design, it is desirable to make this value small. Note that FIG. 16 is a simulation result, and the value varies somewhat, but roughly, sensitivity above this level cannot be obtained.

Now, correction of spherical aberration due to a change in temperature by a certain amount of strokes of the collimator lens 42 or the like is taken into consideration. In this case, a temperature detection mechanism is mounted on the optical pickup 3, and a predetermined amount of collimator strokes determined by the relational expression is performed at a desired temperature, thereby correcting the spherical aberration amount generated at the objective lens 34.

A temperature detection mechanism that is used in an optical pickup which is generally used merely detects a difference of 2.5° C. If aberration of ±0.02 λrms or more is generated, reading is deteriorated, so 0.008 λrms/° C. becomes an index. In a range of ±35° C. which is the change in environmental temperature generally supposed, with the 3rd order spherical aberration amount SA3 generated at the objective lens, the relation of Expression (41) described below is established.

$$-0.28 \leq SA3 \leq 0.28 [\lambda rms] \quad (41)$$

In the case of the range expressed by Expression (41), aberration can be corrected. Even if collimator strokes for correction are taken into consideration, this range is a value close to the limit.

In FIG. 16, if such a range is permitted, with the range of $C_2$, the relation of Expression (42) described below is established. That is, when assuming that $-0.28 \leq SA3(=y) \leq 0.28$ with respect to y=−98.611x−0.201 which is an approximate line of each plot according to a least-square method indicated by the line L4 in FIG. 16, from x=(y+0.201)/(−98.611), $-4.88E-3 \leq x \leq 0.801E-3$ is obtained. Subsequently, x=$C_2$, and thus $-4.88E-3 \leq C_2 \leq 0.801E-3$ is obtained. FIG. 16 is a simulation result in the case of $\lambda_0$=710 (nm), so if standardized with $\lambda_0$, the relation of Expression (42) described below is established.

$$-6.9 \leq \frac{C_2}{\lambda_0} \leq 1.1 \quad (42)$$

Note that $C_2$ may be used for overcorrection, and in Expression (42), the range of overcorrection is also included. However, when the cyclical number of the cyclical structure becomes great, such an advantage is not obtained, and realistically, the relation of Expression (42') described below is established. That is, Expression (42') narrows the range from the relation of Expression (42) according to the following perspective, and defines a more effective range. First, when assuming that the coefficient $C_2$ satisfies the condition $C_2$>0, the coefficient $C_2$ has the same sign as the coefficient $C_1$. When this happens, the phase amount $\phi$ of Expression (18) increases. The increase in the phase amount $\phi$ has to do with the cyclical number of the cyclical structure, so the cyclical number of the cyclical structure increases. The increase in the cyclical number of the cyclical structure means that it is disadvantageous in terms of manufacturing, and indicates that $C_2 \leq 0$ is a desirable range. Also, the relation $\Delta SA3$>0 represents a range on an upper left extension shown in FIG. 16, which is a range beyond $\Delta SA3$=0 as an optimal point. This range excessively correct aberration beyond an optimal amount, and thus aberration is deteriorated adversely. Therefore, it is desirable that $\Delta SA3 \leq 0$, and in the case of y$\leq$0 with respect to y=−98.611x−0.201 which is an approximate line of each plot according to a least-square method indicated by the line L4 of FIG. 16, x$\geq$−0.201/98.611=−2.04E-3 is obtained. Subsequently, x=$C_2$, and then $C_2$>−2.04E-3 is obtained. Thus, FIG. 16 is a simulation result in the case of $\lambda_0$=710 (nm), so if standardized with $\lambda_0$, the relation $C_2 \geq -2.9\lambda_0$ is established.

$$-2.9 \leq \frac{C_2}{\lambda_0} \leq 0 \quad (42')$$

In this case, the coefficient $C_2$ leans to a negative direction, and can cancel the change in temperature aberration with respect to a diffraction order set to make the focal distance as to the optical beam with the first wavelength used for BD or the like short, and to make the focal distance as to the optical beam with the third wavelength used for CD or the like long. That is, if the positive/negative direction of the selected dominant diffraction order and the positive/negative direction of the coefficient $C_1$ are taken into consideration, it means that in the case of the range such as Expression (42'), the change in temperature aberration can be cancelled.

Further description will be made regarding this point as follows. For example, the description will be made assuming that the coefficient $C_1$ always satisfies the relation $C_1 \geqq 0$. When only the coefficient $C_1$ is defined on a diffraction surface, a description will be made assuming that the diffraction order of diffracted light serving as convergent light is positive. In this case, if $C_2 \times k_1 < 0$, a change in temperate aberration of the optical beam with the first wavelength used for BD or the like can be cancelled. That is, if $C_2 \times k_1 < 0$, temperature aberration properties can be improved, regardless of the relation of the focal distance as to the optical beams with the first and third wavelengths.

Further description will be made regarding a diffraction order $k_1$ in such a case. With an inner ring zone (first diffraction region 51), as described from the first to fourth perspectives, $(k_{1i}, k_{2i}, k_{3i}) = (1, -1, -2), (0, -1, -2), (1, -2, -3),$ or $(0, -2, -3)$ is taken into consideration as an optimal configuration example. Now, with a diffraction order $k_{1i}$ selected in the inner ring zone, the relation $k_{1i} \geqq 0$ is established, and from the relation $C_2 < 0$, it can be said that the temperature aberration properties can be corrected.

In studying a middle ring zone (second diffraction region 52), of the combinations as an optimal configuration from the first to third perspective regarding the middle ring zone, with the combination satisfying the relation $k_{1m} \geqq 0$, the relation $C_2 < 0$ is established, and temperature property correction can be realized.

Specifically, in the case of $(k_{1m}, k_{2m}) = (+1, +1), (+1, 0), (+3, +2),$ or $(+2, +1)$, the above-described relation is satisfied, and temperature property correction is realized. Thus, the combination $(k_{1m}, k_{2m})$ of the selected diffraction order is advantageous in terms of unwanted light deviation, as compared with, for example, $(-3, -2)$. Further, in terms of the diffraction power differences in the inner ring zone and the middle ring zone, the diffraction power difference increases, as compared with $(1, -1)$, so the combination $(k_{1m}, k_{2m})$ of the selected diffraction order is advantageous taking into consideration a problem in that many diffraction cycles are required in the middle ring zone. The combinations $(k_{1m}, k_{2m}) = (0, +2), (0, -2), (0, +1),$ and $(0, -1)$ do not have a temperature property correction function, but the use of zero order is advantageous in terms of manufacturing and efficiency, so these combinations are used frequently.

Further description will be made regarding the relation between FIG. 16 and Expressions (42) and (42'). Expression (42) can be said to be calculation of the range of Expression (41). Meanwhile, Expression (42') defines the range from the following first and second perspectives. First, if the coefficient $C_2$ satisfies the relation $C_2 > 0$, the cyclical number of the diffraction structure increases. While the increase in the cyclical number does not ensure effects so much, a plot is positioned on a lower right extension in FIG. 16, and accordingly $\Delta SA3$ also increases. From this perspective, it is understood that $C_2 \leqq 0$ is a sufficient range. Second, in the case of $\Delta SA3 < 0$, the range is a range beyond $\Delta SA3 = 0$ as an optimal point. Thus, a plot is positioned on the upper left extension in FIG. 16, and it cannot be said that the range is an optimal range in terms of such correction, so the lower limit of $C_2$ is set from the range of $\Delta SA3 \leqq 0$.

As described above, while Expression (42') defines an operationally desirable range for operation from the perspectives such as described above, as will be apparent from the above description, the range of Expression (42) defines a theoretically desirable range. As a main perspective, from a perspective that temperature properties are put within a specific range, such range may be desirable.

Next, a study will be made regarding the cyclical numbers of an inner ring zone and a middle ring zone from the ranges obtained by Expressions (42) and (42'). That is, in order to cancel the change in temperature aberration from the results of Expressions (42) and (42'), let the cyclical number of the cyclical structure of the inner ring zone which increases or decreases depending on the coefficient $C_2$ be $N_{2i}$, and the cyclical number of the cyclical structure of the middle ring zone be $N_{2m}$, then, the relations of Expressions (43) and (44) described below need to be established.

$$N_{2i} = \frac{C_{2i} R_i^4}{\lambda_0} \tag{43}$$

$$N_{2m} = \frac{C_{2m}(R_m^4 - R_i^4)}{\lambda_0} \tag{44}$$

Accordingly, with the cyclical numbers $N_i$ and $N_m$ of the total cyclical structure, the relations of Expressions (45) and (46) described below need to be established.

$$N_i = N_{1i} + N_{2i} \tag{45}$$

$$N_m = N_{1m} + N_{2m} \tag{46}$$

Expressions (45) and (46) take a positive value or a negative value intrinsically, and a minus cyclical number indicates that a diffraction structure is reversed. However, the cyclical structure in which the diffraction structure is reversed has restriction in terms of manufacturing, particularly, when being formed on a spherical surface. Accordingly, with $N_i$ and $N_m$, a positive range can be generally said to be an appropriate range.

From Expressions (39), (40), (43), (44), (45), and (46), the relation of Expression (47) described below is established.

Specifically, from Expressions (39) and (40), the relation of Expression (47) is established.

$$\phi_{rate} = \frac{N_{1m}}{N_{1i}} \cdot \frac{R_i^2}{R_m^2 - R_i^2} \tag{47}$$

With $N_{1i}$ and $N_{1m}$, Expressions (45) and (46) are established, and if Expressions (45) and (46) are substituted into Expression (47), the relation of Expression (48) described below is established.

$$\phi_{rate} = \frac{N_m - N_{2m}}{N_i - N_{2i}} \cdot \frac{R_i^2}{R_m^2 - R_i^2} \tag{48}$$

If Expression (48) is modified, the relation of Expression (49) described below is established.

$$\frac{R_m^2 - R_i^2}{R_i^2} \cdot \phi_{rate} = \frac{N_m - N_{2m}}{N_i - N_{2i}} \tag{49}$$

If Expressions (43) and (44) are substituted into Expression (49), the relation of Expression (50) described below is established.

$$\frac{R_m^2 - R_i^2}{R_i^2} \cdot \phi_{rate} = \frac{N_m - \frac{C_{2m}(R_m^4 - R_i^4)}{\lambda_0}}{N_i - \frac{C_{2i}R_i^4}{\lambda_0}} \quad (50)$$

Now, the relation $C_{2\_min} \leq C_2 \leq C_{2\_max}$ is established, and let the minimum value of $C_2$ of the inner ring zone be $C_{2i\text{-}min}$, the minimum value of $C_2$ of the middle ring zone be $C_{2m\text{-}min}$, the maximum value of $C_2$ of the inner ring zone be $C_{2i\text{-}max}$, and the maximum value of $C_2$ of the middle ring zone be $C_{2m\text{-}max}$, according to the maximum-minimum of the numerator and denominator, the relation such as Expression (51a) is established.

$$\frac{N_m - \frac{C_{2m\_max}(R_m^4 - R_i^4)}{\lambda_0}}{N_i - \frac{C_{2i\_min}R_i^4}{\lambda_0}} \leq \quad (51a)$$

$$\frac{R_m^2 - R_i^2}{R_i^2} \cdot \phi_{rate} \leq \frac{N_m - \frac{C_{2m\_min}(R_m^4 - R_i^4)}{\lambda_0}}{N_i - \frac{C_{2i\_max}R_i^4}{\lambda_0}}$$

Also, the relations of Expression (52a) and (52b) are established.

$$C_{2\_min} = C_{2i\_min} = C_{2m\_min} \quad (52a)$$

$$C_{2\_max} = C_{2i\_max} = C_{2m\_max} \quad (52b)$$

Accordingly, from Expressions (52a) and (52b), the relations of Expressions (51a) through (51b) are derived.

$$\frac{N_m - \frac{C_{2\_max}(R_m^4 - R_i^4)}{\lambda_0}}{N_i - \frac{C_{2\_min}R_i^4}{\lambda_0}} \leq \frac{R_m^2 - R_i^2}{R_i^2} \cdot \phi_{rate} \leq \frac{N_m - \frac{C_{2\_min}(R_m^4 - R_i^4)}{\lambda_0}}{N_i - \frac{C_{2\_max}R_i^4}{\lambda_0}} \quad (51b)$$

Now, if Expression (42') is applied to Expression (51b), the cyclical number $N_i$ of the inner ring zone and the cyclical number $N_m$ of the middle ring zone have constant connection such as Expression (53) described below.

$$\frac{N_m}{N_i + 2.9 R_i^4} \leq \frac{R_m^2 - R_i^2}{R_i^2} \cdot \phi_{rate} \leq \frac{N_m + 2.9 \cdot (R_m^4 - R_i^4)}{N_i} \quad (53)$$

Actually, while the range of Expression (42') differs according to lens design, if the range is within Expression (53), this range can be said to be a range capable of reducing aberration.

If a diffraction structure is formed beyond this range, on-axial aberration may not be reduced or temperature aberration properties may be deteriorated. Note that while the coefficient $C_3$ may increase the diffraction cyclical number, $C_3$ does not have a lot of flexibility, and if an inappropriate value is applied, when wavelength fluctuation occurs in an optical beam emitted from a light source, high-order aberration is generated as to the wavelength fluctuation variation. As a result, it may be impossible to establish an optical pickup.

Actually, while there is no great advantage to perform overcorrection with the range of $C_2$, even in the case of Expression (42), correction by the collimator lens is possible. In this case, if Expression (42) is applied to Expression (52b), the relation of Expression (54a) is established.

$$\begin{cases} \frac{N_m - 1.1 \cdot (R_m^4 - R_i^4)}{N_i + 6.9 \cdot R_i^4} \leq \frac{R_m^2 - R_i^2}{R_i^2} \cdot \left| \frac{k_{1m}\lambda_1 - k_{2m}\lambda_2}{k_{1i}\lambda_1 - k_{2i}\lambda_2} \right| \leq \\ \frac{N_m + 6.9 \cdot (R_m^4 - R_i^4)}{N_i - 1.1 \cdot R_i^4} \end{cases} \quad (54a)$$

(When $N_i - 1.1 \cdot R_i^4 > 0$)

When the denominator on the right side is equal to or smaller than 0, the relation of Expression (54b) is established.

$$\begin{cases} \frac{N_m - 1.1 \cdot (R_m^4 - R_i^4)}{N_i + 6.9 \cdot R_i^4} \leq \frac{R_m^2 - R_i^2}{R_i^2} \cdot \left| \frac{k_{1m}\lambda_1 - k_{2m}\lambda_2}{k_{1i}\lambda_1 - k_{2i}\lambda_2} \right| \end{cases} \quad (54b)$$

(When $N_i - 1.1 \cdot R_i^4 \leq 0$)

With $\phi_{rate}$ of Expression (40), $\Delta_{typ}$ indicating $\phi_{rate}$ when only the coefficient $C_1$ is defined in the diffraction structure without taking into consideration the coefficient $C_2$, and $A_{min}$ and $A_{max}$ indicating the upper limit and lower limit of $\phi_{rate}$ when the coefficient $C_2$ is taken into consideration can be set such as Expressions (55a) and (55c) described below.

$$A_{typ} = \frac{N_{1m}}{N_{1i}} \cdot \frac{R_i^2}{R_m^2 - R_i^2} \quad (55a)$$

$$A_{min} = \frac{N_m}{N_i + 2.9 R_i^4} \cdot \frac{R_i^2}{R_m^2 - R_i^2} \quad (55b)$$

$$A_{max} = \frac{N_m + 2.9 \cdot (R_m^4 - R_i^4)}{N_i} \cdot \frac{R_i^2}{R_m^2 - R_i^2} \quad (55c)$$

That is, $A_{typ}$, $A_{min}$, and $A_{max}$ are set such as Expressions (55a) through (55c), from Expressions (40) and (53), the relation of Expression (56) described below is established.

$$A_{min} \leq \phi_{rate} \leq A_{max} \quad (56)$$

Figure 17:
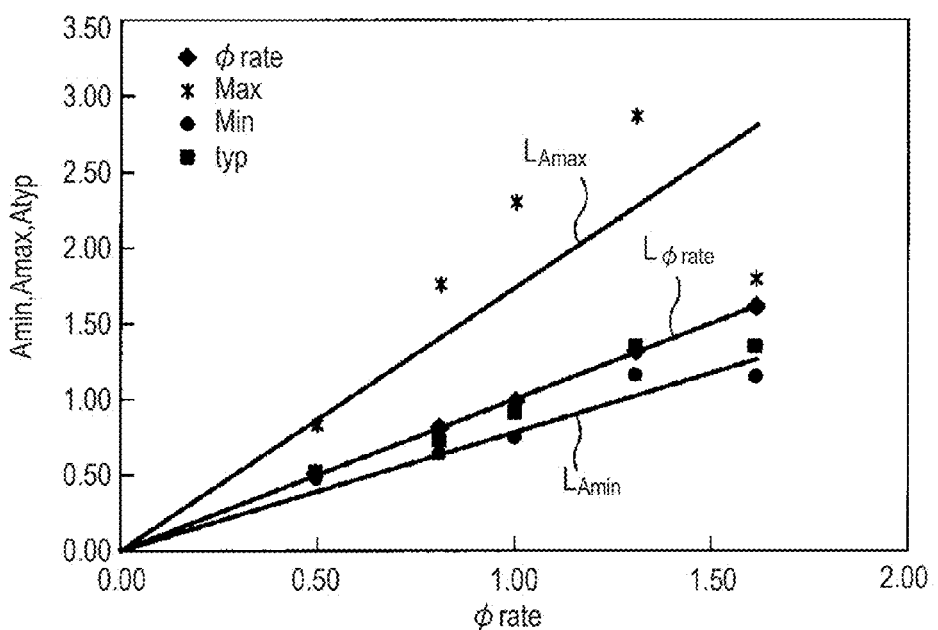
FIG. 17 is a diagram showing the relation between the cyclical number and a diffraction order (no overcorrection)

In actual lens design for specifying a cyclical structure of an objective lens, the relation between $A_{min}$ and $A_{max}$, and $\phi_{rate}$ is shown in FIG. 17 with $A_{min}$ and $A_{max}$ so obtained as the vertical axis and the value of $\phi_{rate}$ at that time as the horizontal axis. $A_{typ}$ is also shown. In FIG. 17, plots are the calculation results of $A_{typ}$, $A_{min}$, $A_{max}$, and $\phi_{rate}$ of Expressions (55a), (55b), and (55c). Also, $L_{Amin}$ represents an approximate line obtained based on each plot of $A_{min}$ by a least-square method, $L_{Amax}$ represents an approximate line obtained based on each plot of $A_{max}$ by a least-square method, and $L_{\phi rate}$ represents $\phi_{rate}$-$\phi_{rate}$, and represents a line having an inclination of 1.

In FIG. 17, it can be confirmed that $L_{\phi rate}$ having an inclination of 1 and representing the line $\phi_{rate}$-$\phi_{rate}$ is positioned within a range defined by $L_{Amin}$ representing a line $\phi_{rate}$-$A_{min}$ and $L_{Amax}$ representing a line $\phi_{rate}$-$A_{max}$. From this, it can be confirmed that with all kinds of data, Expression (56) is established, and consequently Expression (53) is established. It can also be confirmed that $A_{typ}$ roughly exists near $\phi_{rate}$. This indicates that there is no aberration correction according to the coefficient $C_2$. According to design, correction according to the coefficient $C_2$ may be needed, and in this case, the mutual relation of $\phi_{rate}$-$A_{typ}$ and $\phi_{rate}$-$\phi_{rate}$ may vary.

Similarly to setting of Expressions (55a), (55b), and (55c), from Expression (54a), Expressions (55b') and (55c') described below can be set.

$$A'_{min} = \frac{N_m - 1.1 \cdot (R_m^4 - R_i^4)}{N_i + 6.9 \cdot R_i^4} \cdot \frac{R_i^2}{R_m^2 - R_i^2} \quad (55b')$$

$$A'_{max} = \frac{N_m + 6.9 \cdot (R_m^4 - R_i^4)}{N_i - 1.1 \cdot R_i^4} \cdot \frac{R_i^2}{R_m^2 - R_i^2} \quad (55c')$$

Expressions (55b') and (55c') are set, such that from Expressions (40) and (54a), the relation of Expression (56') is established.

$$A_{min}' \leq \phi_{rate} \leq A_{max}' \quad (56')$$

Figure 18:
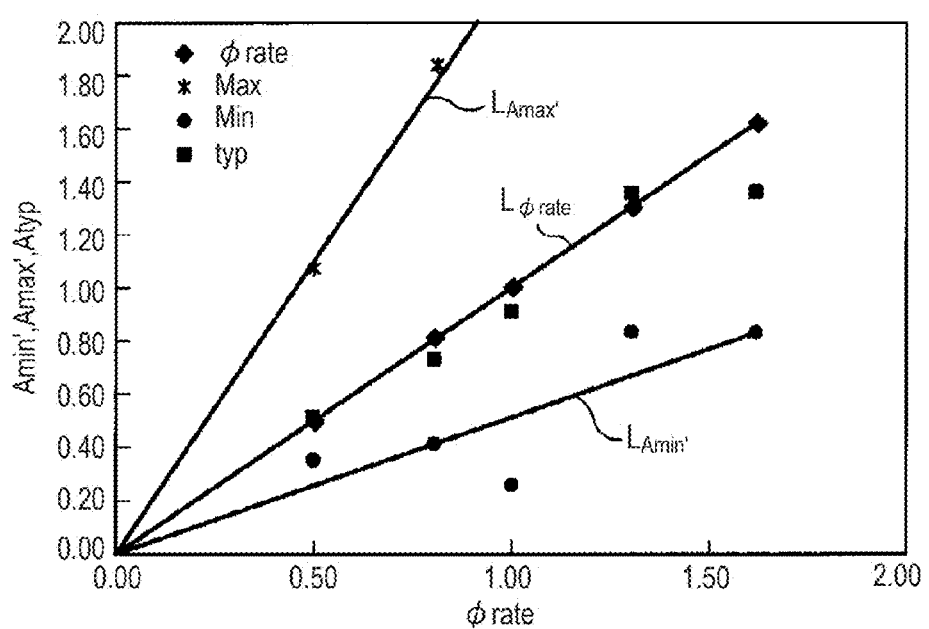
FIG. 18 is a diagram showing the relation between the cyclical number and a diffraction order (overcorrection)

The relation between $A_{min}'$ and $A_{max}'$, and $\phi_{rate}$ is shown in FIG. 18 with $A_{min}'$ and $A_{max}'$ so obtained as the vertical axis, and $\phi_{rate}$ at that time as the horizontal axis. $A_{typ}$ is also shown. In FIG. 18, plots are the calculation results of $A_{typ}$, $A_{min}'$, $A_{max}'$, and $\phi_{rate}$ of Expressions (55a), (55b'), and (55c'). Also, $L_{Amin'}$ represents an approximate line obtained based on each plot of $A_{min}'$ by a least-square method, $L_{Amax}'$ represents an approximate line obtained based on each plot of $A_{max}'$ by a least-square method, and $L_{\phi rate}$ represents $\phi_{rate}$-$\phi_{rate}$, and represents a line having an inclination of 1. In FIG. 18, similarly to FIG. 17, it can be confirmed that $L_{\phi rate}$ is positioned within a range defined by $L_{max}'$ and $L_{min}'$. From this, it can be confirmed that with all kinds of data, Expression (56') is established.

In actual lens system, the ranges of Expressions (56) and (56') vary depending on various parameters, such as lens focal distance, magnification, and the like, but derivation of Expressions (56) and (56') is performed by a best optical system for practical use. Therefore, this does not deviate from the ranges of Expressions (56) and (56').

Thus, the diffraction unit 50 is configured such that the first and second diffraction regions 51 and 52 satisfy Expression (56) or (56'), that is, satisfy Expression (54a) or (53). Therefore, the aberration amount when temperature changes can be reduced.

The combination ($k_{1i}$, $k_{2i}$) of the diffraction order $k_{1i}$ of the first wavelength and the diffraction order $k_{2i}$ of the second wavelength which are dominant, that is, become the maximum diffraction efficiency with the first diffraction region 51, and the combination ($k_{1m}$, $k_{2m}$) of the diffraction order $k_{1m}$ of the first wavelength and the diffraction order $k_{2m}$ of the second wavelength which are dominant, that is, become the maximum diffraction efficiency with the second diffraction region 52, the relation of Expression (57) described below is established, and the following advantages are obtained. In other words, the diffraction order combination ($k_{1i}$, $k_{2i}$) and the diffraction order combination ($k_{1m}$, $k_{2m}$) need to not be identical completely.

$$(k_{1i}, k_{2i}) \neq (k_{1m}, k_{2m}) \quad (57)$$

This is because if the combinations are identical, $k_{3i}$ and $k_{3m}$ are likely to be identical, and even if the combinations are not identical, $k_{3m}'$ having efficiency after $k_{3m}$ in the middle ring zone becomes identical to $k_{3i}$. This can be avoided if a diffraction grating having a deep structure of 7 μm or larger is engraved, but such a diffraction structure causes efficiency to be deteriorated greatly. If the relation $k_{3i}=k_{3m}$ or $k_{3i}=k_{3m}'$ is established, aperture restriction as to the third wavelength in the middle ring zone is not appropriately performed. In contrast, it is configured such that the first and second diffraction regions 51 and 52 satisfy Expression (57), so diffraction efficiency can be prevented from being deteriorated. Further, with the middle ring zone, appropriate aperture restriction can be performed as to the optical beam with the third wavelength.

While the above description has been made regarding an example where the diffraction surfaces of the first and second diffraction regions 51 and 52 are configured as a single cyclical structure, the invention is not limited to the configuration as the single cyclical structure. That is, the first and second diffraction structures formed in the first and second diffraction regions constituting the diffraction unit 50 may be formed as a structure in which a plurality of, for example, two or more basic cyclical structures are superimposed on each other.

Now, a description will be made regarding a structure (hereinafter, also referred to as "overlap") in which a plurality of, for example, two or more basic structures are superimposed on each other. The diffraction structures, such as the above-described first to third diffraction structures, can provide a predetermined optical path difference to the optical beam of each wavelength, thereby emitting diffracted light such that diffracted light of a diffraction order as to each of the above-described wavelengths is dominant. When being regarded as an optical path difference providing structure which provides an optical path difference, a diffraction structure may be formed by overlapping a basic structure having a function for emitting predetermined diffracted light and a basic structure having a function for emitting another predetermined diffracted light with each other.

Figure 21:
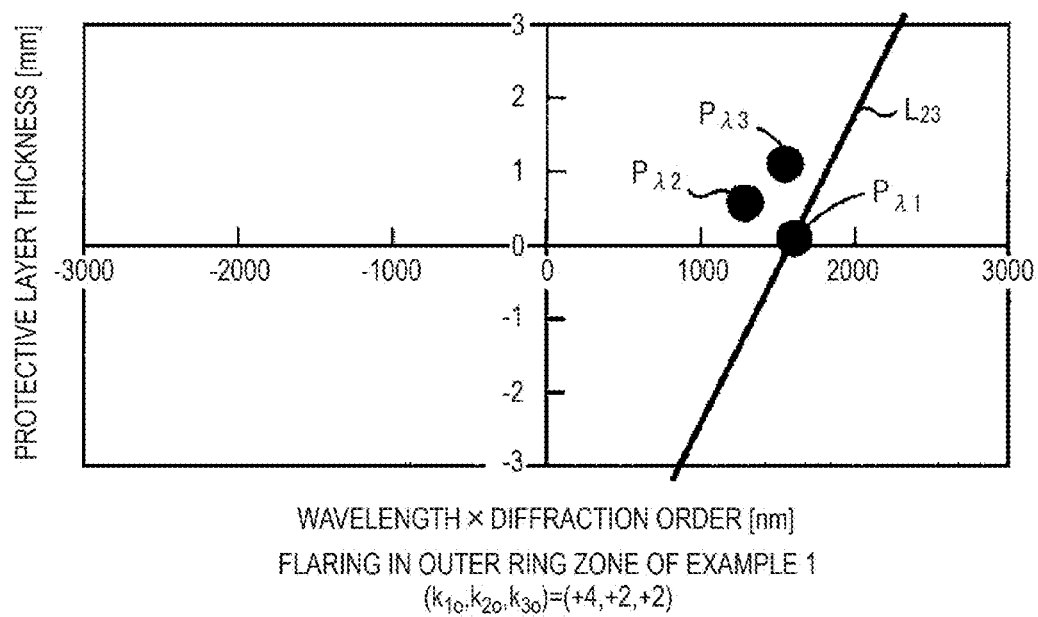
FIG. 21 is a diagram illustrating flaring in the outer ring zone of Example 1, and showing the relation of points that are plotted according to the relation between wavelength×diffraction order and the thickness of a protective layer, and the design line of the objective lens in a case of $(k_{1o}, k_{2o}, k_{3o})= (+4, +2, +2)$.

For example, as shown in FIG. 21, let us say that a composite diffraction structure 72 in which a first basic structure 70 and a second basic structure 71 overlap each other. The first basic structure 70 is configured such that a predetermined diffraction order is dominant with respect to each wavelength, and the second basic structure 71 is configured such that a predetermined diffraction order is dominant with respect to each wavelength. Such a composite diffraction structure 72 provides a predetermined optical path difference to the optical beam of each wavelength, such that the same function as in the case of passing through the diffraction structure having the first basic structure 70 and the diffraction structure having the second basic structure 71 can be performed.

When taking into consideration the application of the overlap structure to the above-described first diffraction structure, if the overlap structure is formed as follows, the same effects as those in the above description are obtained. That is, a composite diffraction structure 72 in which a combination of diffraction order selected from the first basic structure 70 is ($k_{1iB1}$, $k_{2iB1}$)=($k_{1i}$, $k_{2i}$), and a combination of diffraction orders selected from the second basic structure 71 is ($k_{1iB2}$, $k_{2iB2}$)=(0, 0) can be applied to the inner ring zone. With such a composite diffraction structure 72, a cyclical structure formed in the above-described first diffraction region 51 is the first basic structure 70, and the second basic structure 71 satisfying the above-described conditions overlap the first basic structure 70. In other words, the second basic structure 71 is configured such that light of zero order is dominant with respect to the first and second wavelengths, so it can be said that such a composite diffraction structure 72 only exhibits the function according to first basic structure 70 with respect to the first and second wavelengths. The optical beam with the third wavelength is subjected to the function according to the overlapped first basic structure 70 and the function according to the second basic structure 71. Specifically, the optical beam with the third wavelength is subjected to the same operation as in the case that the first basic structure 70 emits diffracted light such that diffracted light of a diffraction order $k_{3iB1}$ is dominant, and then the second basic structure 71 emits diffracted light such that diffracted light of a diffraction order $k_{3iB2}$ is dominant. In other words, the optical beam with the third wavelength is subjected to the influence of a diffraction angle according to the first basic structure 70 and the influence of a diffraction angle according to the second basic structure 71. Now, let us say that diffracted light is generated such that diffracted light of the diffraction orders $k_{1iB1}$, $k_{2iB1}$, and $k_{3iB1}$ of the optical beams with the first, second, and third wavelengths which pass through a region where the first basic structure 70 is provided is dominant, that is, becomes the maximum diffraction efficiency. Also, let us say that diffracted light is generated such that diffracted light of the diffraction orders $k_{1iB2}$, $k_{2iB2}$, and $k_{3iB2}$ of the optical beams with the first, second, and third wavelengths which pass through a region where the second basic structure 71 is provided is dominant. The reason why $(k_{1iB1}, k_{2iB1})$ is set to be "$=(k_{1i}, k_{2i})$" is that the combination $(k_{1iB1}, k_{2iB1})$ is selected from the same perspective as the above-described combination $(k_{1i}, k_{2i})$. $k_{3iB1}$ and $k_{3iB2}$ are arbitrary, and appropriate and optimal diffraction orders are selected. Let us say that $k_{3iB2}$ is a diffraction order other than zero order. This is because if $k_{3iB2}$ is zero order, this means a planar shape taking into consideration the above-described conditions of the second basic structure 71, so it is determined that the structures do not overlap each other substantially.

Thus, the first diffraction structure that is formed in the inner ring zone of the diffraction unit 50 constituting the optical pickup 3 to which the invention is applied may be configured as the composite diffraction structure 72 as an optical path difference providing structure in which at least the first basic structure 70 and the second basic structure 71 are formed so as to overlap each other. In this case, the first basic structure 70 is a cyclical structure in which unit cyclical structures having a concavo-convex shape are successively formed in a radial direction of each ring zone, and is configured as an optical path difference providing structure that provides an optical path difference so as to emit diffracted light of the same diffraction orders $(k_{1iB1}, k_{2iB1})$ as the diffraction orders $(k_{1i}, k_{2i})$ being condensed, which has been described with reference to the first diffraction region 51, with respect to the first and second wavelengths. The second basic structure 71 is configured as an optical path difference providing structure to emit diffracted light such that diffracted light of zero order of the optical beam with the first wavelength which passes through the second basic structure 71 is dominant, and to emit diffracted light such that diffracted light of zero order of the optical beam with the second wavelength which passes through the second basic structure 71 is dominant. The second basic structure 71 is configured so as to provide an optical path difference to emit diffracted light such that diffracted light of an order other than zero order of the optical beam with the third wavelength which passes through the second basic structure 71 is dominant. The first basic structure 70 is configured such that Expression (20), (29), (56), or (56') is established. In this case, let us say that for each expression, $N_i$ represents the cyclical number of the cyclical structure in the first basic structure 70.

The inner ring zone having such an overlap structure is configured such that Expression (20), (29), (56), or (56') is established, such that the same effects as those in the above-described first diffraction region 51 can be manifested. That is, the inner ring zone having such an overlap structure satisfies Expression (20), so interference of unwanted light and regular light can be avoided, the light quantity of unwanted light can be suppressed or unwanted light can be received by the photoreceptor portion by setting the diffraction order of diffracted light serving as unwanted light to be a diffraction order deviated from the diffraction order of regular light, and jitter and the like can be prevented from being deteriorated. Further, Expression (29) is satisfied, so deterioration in efficiency at the time of diffraction structure formation can be avoided, and sufficient diffraction efficiency can be obtained. In addition, the inner ring zone having such an overlap structure satisfies Expression (56) or (56'), the aberration amount when temperature changes can be reduced.

Similarly, the second diffraction structure that is formed in the middle ring zone of the diffraction unit 50 constituting the optical pickup 3 to which the invention is applied may be configured as the composite diffraction structure 72 as an optical path difference providing structure in which at least the first basic structure 70 and the second basic structure 71 are formed so as to overlap each other. In this case, the first basic structure 70 is a cyclical structure in which unit cyclical structures having a concavo-convex shape are successively formed in a radial direction of each ring zone, and is configured as an optical path difference providing structure that provides an optical path difference so as to emit diffracted light of the same diffraction orders $(k_{1mB1}, k_{2mB1})$ as the diffraction orders $(k_{1m}, k_{2m})$ being condensed, which has been described with reference to the second diffraction region 52, with respect to the first and second wavelengths. Now, let us say that diffracted light is generated such that diffracted light of the diffraction orders $k_{1mB1}$ and $k_{2mB1}$ of the optical beams with the first and second wavelengths which pass through a region where the first basic structure 70 is provided is dominant, that is, becomes the maximum diffraction efficiency. The second basic structure 71 is configured as an optical path difference providing structure to emit diffracted light such that diffracted light of zero order of the optical beam with the first wavelength which passes through the second basic structure 71 is dominant, and to emit diffracted light such that diffracted light of zero order of the optical beam with the second wavelength which passes through the second basic structure 71 is dominant. The second basic structure 71 is configured so as to provide an optical path difference to emit diffracted light such that diffracted light of an order other than zero order of the optical beam with the third wavelength which passes through the second basic structure 71 is dominant. The first basic structure 70 is configured such that Expression (21), (31), (56), or (56') is established. In this case, let us say that for each expression, $N_m$ represents the cyclical number of the cyclical structure in the first basic structure 70.

The middle ring zone having such an overlap structure is configured such that Expression (21), (31), (56), or (56') is established, such that the same effects as those in the above-described second diffraction region 52 can be manifested. That is, the middle ring zone having such an overlap structure satisfies Expression (21), so interference of unwanted light and regular light can be avoided, the light quantity of unwanted light can be suppressed or unwanted light can be received by the photoreceptor portion by setting the diffraction order of diffracted light serving as unwanted light to be a diffraction order deviated from the diffraction order of regular light, and jitter and the like can be prevented from being deteriorated. Further, Expression (31) is satisfied, so deterioration in efficiency at the time of diffraction structure formation can be avoided, and sufficient diffraction efficiency can be obtained. In addition, the middle ring zone having such an overlap structure satisfies Expression (56) or (56'), the aberration amount when temperature changes can be reduced.

The third diffraction region 53 which is an outer ring zone has a third diffraction structure different from the first and second diffraction structures formed in a ring zone shape to have a predetermined depth, and is configured to emit diffracted light of the optical beam with the first wavelength which passes therethrough such that diffracted light of a diffraction order being condensed so as to form an appropriate spot on the signal recording surface of the first optical disc through the objective lens 34 is dominant, that is, the maximum diffraction efficiency is manifested with respect to diffracted light of other diffraction orders.

With the third diffraction structure, the third diffraction region 53 also emits diffracted light of the optical beam with the second wavelength which passes therethrough such that diffracted light of a diffraction order other than the diffraction order being condensed so as to form an appropriate spot on the signal recording surface of the second optical disc through the objective lens 34 is dominant, that is, the maximum diffraction efficiency is manifested with respect to diffracted light of other diffraction orders. To put this point in another way, in the light of a below-described flaring operation and the like, with the third diffraction structure, the third diffraction region 53 emits diffracted light of the optical beam with the second wavelength which passes therethrough such that diffracted light of a diffraction order which forms no appropriate spot on the signal recording surface of the second optical disc through the objective lens 34 is dominant. Note that with the third diffraction structure, the third diffraction region 53 can sufficiently reduce the diffraction efficiency of diffracted light of a diffraction order being condensed so as to form an appropriate spot on the signal recording surface of the second optical disc through the objective lens 34.

With the third diffraction structure, the third diffraction region 53 also emits diffracted light of the optical beam with the third wavelength which passes therethrough such that diffracted light of a diffraction order other than the diffraction order being condensed so as to form an appropriate spot on the signal recording surface of the third optical disc through the objective lens 34 is dominant, that is, the maximum diffraction efficiency is manifested with respect to diffracted light of other diffraction orders. To put this point in another way, in the light of a below-described flaring operation and the like, with the third diffraction structure, the third diffraction region 53 emits diffracted light of the optical beam with the third wavelength which passes therethrough such that diffracted light of a diffraction order which forms no appropriate spot on the signal recording surface of the third optical disc through the objective lens 34 is dominant. Note that with the third diffraction structure, the third diffraction region 53 can sufficiently reduce the diffraction efficiency of diffracted light of a diffraction order of the optical beam with the third wavelength which passes therethrough being condensed so as to form an appropriate spot on the signal recording surface of the third optical disc through the objective lens 34.

Thus, the third diffraction region 53 has such a diffraction structure that diffracted light of a predetermined diffraction order is dominant with respect to the optical beam of each wavelength. For this reason, when the optical beam of the first wavelength having passed through the third diffraction region 53 and become diffracted light of a predetermined diffraction order is condensed on the signal recording surface of the corresponding optical disc by the objective lens 34, spherical aberration can be corrected and reduced.

The third diffraction region 53 is configured so as to function as described above with respect to the optical beams with the first wavelength, and is configured such that with respect to the optical beams with the second and third wavelengths, diffracted light of a diffraction order which passes therethrough and is not condensed on the signal recording surfaces of the second and third optical discs through the objective lens 34 is dominant by taking into consideration the influence of flaring and the like. Accordingly, even if the optical beams with the second and third wavelengths having passed the third diffraction region 53 are input to the objective lens 34, this seldom affects the signal recording surfaces of the second and third optical discs. In other words, the third diffraction region 53 can serve so as to significantly reduce the light quantity of the optical beams with the second and third wavelengths having passed therethrough and been condensed on the signal recording surface by the objective lens 34 to around zero, and subject the optical beam with the second wavelength to aperture restriction. Note that the third diffraction region 53 can function to perform aperture restriction with respect to the optical beam with the third wavelength, along with the above-described second diffraction region 52.

Incidentally, the above-described second diffraction region 52 is formed with such a size that the optical beam with the second wavelength having passed therethrough is input to the objective lens 34 in the same state as that of the optical beam subjected to aperture restriction at around NA=0.6. The third diffraction region 53 formed outside the second diffraction region 52 does not condense the optical beam with the second wavelength having passed therethrough on the optical disc through the objective lens 34. Consequently, the diffraction unit 50 including the second and third diffraction regions 52 and 53 configured as above serves so as to perform aperture restriction at around NA=0.6 with respect to the optical beam with the second wavelength. A configuration has been made in which the diffraction unit 50 performs aperture restriction of numerical aperture NA of around 0.6 with respect to the optical beam with the second wavelength, but the numerical aperture restricted by the above-described configuration is not limited to this.

The above-described third diffraction region 53 is formed with such a size that the optical beam with the first wavelength having passed therethrough is input to the objective lens 34 in the same state as that of the optical beam subjected to aperture restriction at around NA=0.85. No diffraction structure is formed outside the third diffraction region 53, so the optical beam with the first wavelength having passed through the third diffraction region 53 is not condensed on the first optical disc through the objective lens 34. The diffraction unit 50 having the third diffraction region 53 configured as above functions so as to perform aperture restriction with respect to the optical beam with the first wavelength at around NA=0.85. Note that with the optical beam with the first wavelength passed through the third diffraction region 53, light of 1st and 4th diffraction orders is dominant, so light of zero order having transmitted a region outside the third diffraction region 53 almost never passes through the objective lens 34 to be condensed on the first optical disc, but in the case where light of zero order passes through the objective lens 34 and is condensed on the first optical disc, a configuration may be provided to perform aperture restriction by providing, in a region outside the third diffraction region 53, either a shield portion for shielding an optical beam passing through or a diffraction region having a diffraction structure in which optical beam of diffraction orders other than the diffraction order which passes therethrough and is condensed on the first optical disc through the objective lens 34 are dominant. A configuration has been made in which the diffraction unit 50 performs aperture restriction of numerical aperture NA of around 0.85 with respect to the optical beam with the first wavelength, but the numerical aperture restricted by the above-described configuration is not limited to this.

Specifically, as shown in FIGS. 4A, 4B, and 5C, the third diffraction region 53 is formed in a ring zone shape centered on the optical axis with the sectional shape of the ring zone being formed in a blazed form having a predetermined depth d with respect to the reference surface.

With the third diffraction region 53 which is an outer ring zone, a blazed structured is used, as described above. This is because with the outer ring zone provided on the outermost side, the lens curved surface has the steepest curvature, and a structure other than a blazed structure is disadvantageous in terms of manufacturing. Also, there is no need to take into consideration problems such as unwanted light, efficiency, and the like as described above, so sufficient performance can be obtained with a blazed structure. A description will be made below regarding the respective diffraction orders to be selected.

In the case where the third diffraction region 53 emits diffracted light such that diffracted light of the diffraction order $k_{1o}$ of the optical beam with the first wavelength which passes therethrough is dominant, that is, such that diffraction efficiency is maximum, emits diffracted light such that diffracted light of the diffraction order $k_{2o}$ of the optical beam with the second wavelength which passes therethrough is dominant, that is, such that diffraction efficiency is maximum, and emits diffracted light such that diffracted light of the diffraction order $k_{3o}$ of the optical beam with the third wavelength which passes therethrough is dominant, that is, such that diffraction efficiency is maximum, when selecting the diffraction orders $k_{1o}$, $k_{2o}$, and $k_{3o}$, it should suffice that the diffraction order of the first wavelength and diffraction efficiency are taken into consideration.

This is because the condensed points of the second and third wavelengths having predetermined diffraction efficiency are subjected to flaring so as to be shifted from the state where an image is formed, such that the light quantity of the optical beams to be condensed on the signal recording surface of the second and third optical discs can be reduced substantially, and as a result, flexibility is high, and conditions are alleviated.

From the perspectives described above, with the third diffraction region 53, it should suffice that predetermined diffraction orders $k_{1o}$, $k_{2o}$, and $k_{3o}$ are selected. For example, like Example 1 described below, in the case of ($k_{1o}$, $k_{2o}$, $k_{3o}$)=(+4, +2, +2), the above-described perspectives are satisfied, and the corresponding efficiency can be obtained.

Now, a description will be made regarding flaring with the third diffraction region 53, and the configuration thereof. With the above description of the first diffraction region 51, a description has been made regarding a case where it is required to satisfy the above-described conditional expression ($\lambda_1 \times k_{1x} - \lambda_2 \times k_{2x})/(t_1-t_2) \cong (\lambda_1 \times k_{1x} - \lambda_3 \times k_{3x})/(t_1-t_3)$, but this conditional expression (let us say that x of $k_{1x}$, $k_{2x}$, and $k_{3x}$ in the conditional expression with the outer ring zone is x=o) is also taken into consideration with the third diffraction region 53. With the third diffraction region 53 serving as an outer ring zone, when taking into consideration a function for generating diffracted light of the diffraction order $k_o$ of the optical beam with the first wavelength being condensed through the objective lens 34 in a state of high diffraction efficiency so as to form an appropriate spot on the signal recording surface of the first optical disc, $P_{\lambda 1}$ to be plotted needs to be positioned on a design line. Further, in order to perform flaring regarding the second wavelength, the third wavelength, or the second and third wavelength, there is a need to select a design line so as to deviate $P_{\lambda 2}$ and $P_{\lambda 3}$ from the design line intentionally.

That is, the objective lens 34 is configured based on the design line whereby $P_{\lambda 2}$ is deviated, such that diffracted light of the relevant diffraction order of the optical beam with the second wavelength can be shifted from a state where a focal point is imaged on the signal recording surface of the second optical disc, and the light quantity of the optical beam with the second wavelength to be condensed on the signal recording surface of the second optical disc can be reduced substantially. Therefore, aperture restriction as to the optical beam with the second wavelength can be performed reliably and favorably. That is, the objective lens 34 is configured based on the design line whereby $P_{\lambda 3}$ is deviated, such that diffracted light of the relevant diffraction order of the optical beam with the third wavelength can be shifted from a state where a focal point is imaged on the signal recording surface of the third optical disc, and the light quantity of the optical beam with the third wavelength to be condensed on the signal recording surface of the third optical disc can be reduced substantially. Therefore, aperture restriction as to the above-described optical beam with the third wavelength can be performed reliably and favorably. The objective lens 34 is configured based on a design line whereby both $P_{\lambda 2}$ and $P_{\lambda 3}$ are deviated, so both effects described above can be obtained, that is, with such a configuration, the light quantity of the optical beams with the second and third wavelengths being condensed on the signal recording surface of the corresponding optical disc can be reduced.

Specifically, both of $P_{\lambda 2}$ and $P_{\lambda 3}$ are deviated from the design line $L_{23}$ in the case of ($k_{1o}$, $k_{2o}$, $k_{3o}$)=(+4, +2, +2) such as shown in FIG. 21, so in addition to the effects initially expected that the diffraction efficiency of diffracted light of the relevant diffraction orders of the second and third wavelengths can be reduced according to the diffraction structure formed in the third diffraction region 53, flaring effects are further obtained. According to such a configuration, the light quantity of the optical beams with the second and third wavelengths which are input to the second and third optical discs, respectively, can be further suppressed.

As a specific example of the diffraction unit 50 having the first diffraction region 51 which is an inner ring zone, the second diffraction region 52 which is a middle ring zone, and the third diffraction region 53 which is an outer ring zone, the diffraction order of diffracted light which is a dominant diffraction order with respect to the optical beam of each wavelength, and the diffraction efficiency of diffracted light of the diffraction order will be shown in Table 4 and below-described Table 5, in which specific numerical values regarding the depth d and the number of steps S of the blazed form or the staircase form are listed. Note that Table 4 shows Example 1 of the diffraction unit 50, and Table 5 shows Example 2 of the diffraction unit 50. In Tables 4 and 5, $k_1$ represents the diffraction orders ($k_{1i}$, $k_{1m}$, $k_{1o}$) in which the diffraction efficiency of the optical beam with the first wavelength at each ring zone reaches the maximum, that is, the diffraction orders in which condensation is made so as to appropriately form a spot on the signal recording surface of the first optical disc through the objective lens 34, $eff_1$ represents the diffraction efficiency of the relevant diffraction orders ($k_{1i}$, $k_{1m}$, $k_{1o}$) of the optical beam with the first wavelength, $k_2$ represents the diffraction orders ($k_{2i}$, $k_{2m}$, $k_{2o}$) in which the diffraction efficiency of the optical beam with the second wavelength reaches the maximum, particularly, the diffraction orders in which condensation is made so as to appropriately form a spot on the signal recording surface of the second optical disc through the objective lens 34 at the inner ring zone and the middle ring zone, $eff_2$ represents the diffraction efficiency of the relevant diffraction orders ($k_{2i}$, $k_{2m}$, $k_{2o}$) of the optical beam with the second wavelength, $k_3$ represents the diffraction orders ($k_{3i}$, $k_{3m}$, $k_{3o}$) in which the diffraction efficiency of the optical beam with the third wavelength reaches the maximum, particularly, the diffraction orders in which condensation is made so as to appropriately form a spot on the signal recording surface of the third optical disc through the objective lens 34 at the inner ring zone, $eff_3$ represents the diffraction efficiency of the relevant diffraction orders ($k_{3i}$, $k_{3m}$, $k_{3o}$) of the optical beam with the third wavelength, d represents the groove depth of each diffraction region, and S represents the number of steps in the case of the staircase form or "∞" in the case of the blazed form. In Tables 4 and 5, "*" represents a state where according to the above-described flaring, efficiency does not cause a problem.

TABLE 4

Example 1: diffraction efficiency, diffraction order, depth, and the number of steps of each ring zone

| | K1 | $eff_1$ | K2 | $eff_2$ | K3 | $eff_3$ | d[μm] | s |
|---|---|---|---|---|---|---|---|---|
| Inner Ring Zone | 1 | 0.81 | −1 | 0.62 | −2 | 0.57 | 3.8 | 4 |
| Middle Ring Zone | 3 | 0.96 | 2 | 0.93 | 2 | * | 2.4 | ∞ |
| Outer Ring zone | 4 | 1.0 | 2 | * | 2 | * | 3.1 | ∞ |

* indicates a state where according to flaring, efficiency does not cause a problem.

Now, Example 1 shown in Table 4 will be described. With the inner ring zone of Example 1, as shown in Table 4, when a staircase form with the groove depth d=3.8 (μm) and the number of steps S=4, the diffraction efficiency of the diffraction order $k_{1i}$=+1 of the optical beam with the first wavelength is $eff_1$=0.81, the diffraction efficiency of the diffraction order $k_{2i}$=−1 of the optical beam with the second wavelength is $eff_2$=0.62, and the diffraction efficiency of the diffraction order $k_{3i}$=−2 of the optical beam with the third wavelength is $eff_3$=0.57. Further specific description of the inner ring zone of Example 1 has been made with reference to FIGS. 9A to 9C, so a detailed description will be omitted.

With the middle ring zone of Example 1, as shown in Table 4, when a blazed form (S=∞) with the groove depth d=2.4 (μm) is used, the diffraction efficiency of the diffraction order $k_{1m}$=+3 of the optical beam with the first wavelength is $eff_1$=0.96, and the diffraction efficiency of the diffraction order $k_{2m}$=+2 of the optical beam with the second wavelength is $eff_2$=0.93. The diffraction efficiency $eff_3$ of the diffraction order $k_{3m}$=+2 being dominant, that is, the maximum diffraction efficiency of the optical beam with the third wavelength having passed through this region is around 0.4, but this does not contribute to image formation since the spot is subjected to flaring as described with reference to FIG. 19.

Figures 22A, 22B, 22C:
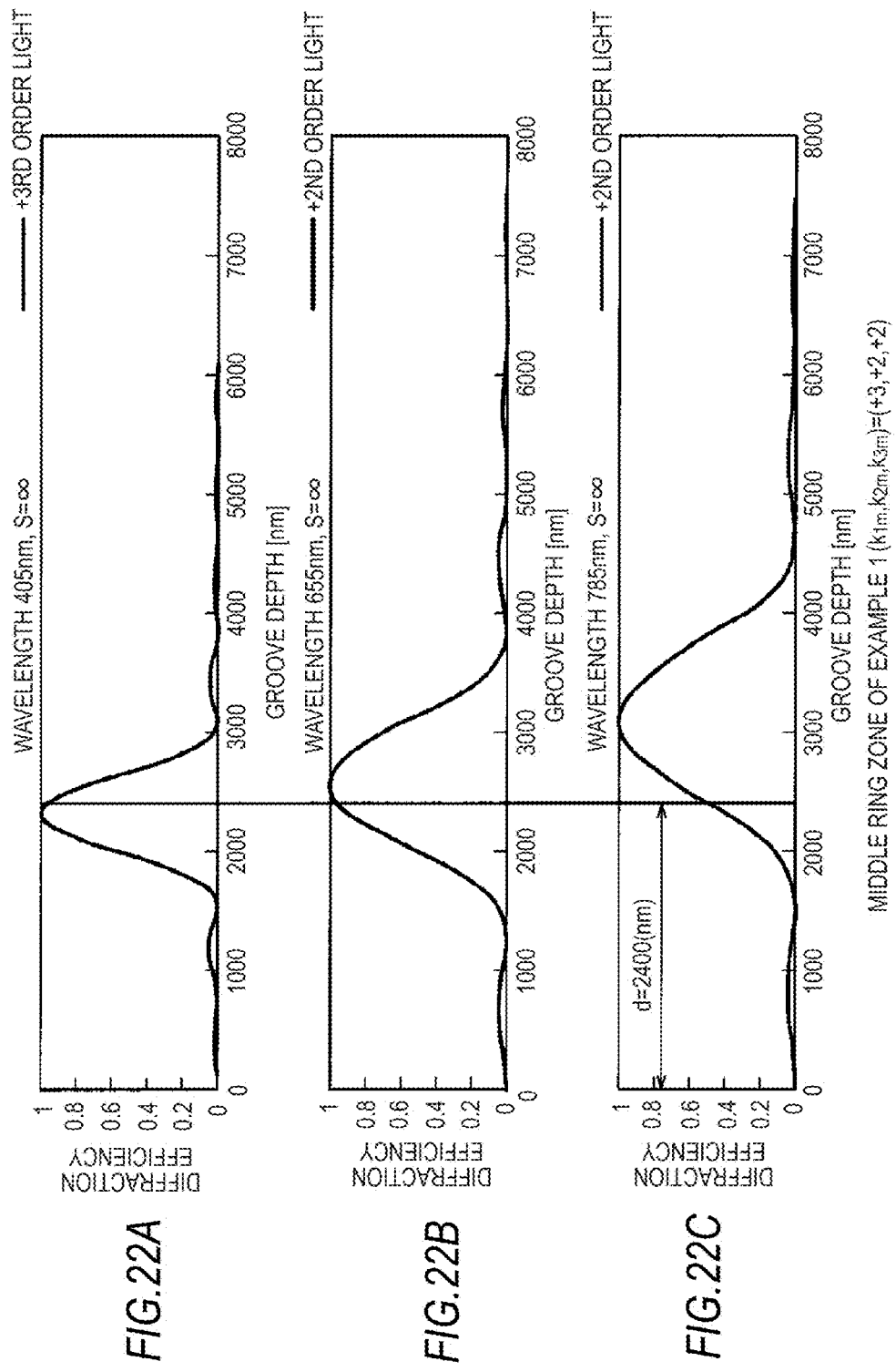
FIGS. 22A to 22C are diagram for calculation of the diffraction efficiency of the middle ring zone of Example 1, and is a diagram showing a change in the diffraction efficiency of an optical beam of each wavelength with respect to a change in the groove depth d in a case of S=∞ and $(k_{1m}, k_{2m}, k_{3m})= (+3, +2, +2)$.

Next, further description will be made specifically regarding the middle ring zone of Example 1 with reference to FIGS. 22A to 22C. FIG. 22A is a diagram showing a change in the diffraction efficiency of +3rd order diffracted light of the optical beam with the first wavelength when the groove depth d of the blazed form with the number of steps S=∞ changes. FIG. 22B is a diagram showing a change in the diffraction efficiency of +2nd order diffracted light of the optical beam with the second wavelength when the groove depth d of the blazed form with the number of steps S=∞ changes. FIG. 22C is a diagram showing a change in the diffraction efficiency of +2nd order diffracted light of the optical beam with the third wavelength when the groove depth d of the blazed form with the number of steps S=∞ changes. In FIGS. 22A to 22C, the horizontal axis represents the groove depth (nm), and the vertical axis represents diffraction efficiency (light intensity). At a position where the horizontal axis is 2400 nm, as shown in FIG. 22A, $eff_1$ is 0.96, and as shown in FIG. 22B, $eff_2$ is 0.93, and as shown in FIG. 22C, $eff_3$ is around 0.4, but the spot is not subjected to flaring.

Also, with the middle ring zone of Example 1 described above, of the design line in the relation between the (wavelength×diffraction order) and the thickness of the protective layer, the Y-intercept position and the inclination with the vertical axis representing the thickness of the protective layer as the Y axis are deviated due to design of the objective lens and exhibits flaring regarding the third wavelength. Accordingly, appropriate objective lens design based on such a design line enables the light quantity of the optical beam with the third wavelength to be further suppressed and good aperture restriction to be performed regarding the optical beam with the third wavelength. Specifically, as shown in FIG. 19, the middle ring zone of Example 1 has the design line indicated by $L_{22}$ set by plotting the points $P_{\lambda 1}$, $P_{\lambda 2}$, and $P_{\lambda 3}$ at the diffraction orders ($k_{1m}$, $k_{2m}$, $k_{3m}$)=(+3, +2, +2). In FIG. 19, the design point $P_{\lambda 1}$ of the first wavelength and the design point $P_{\lambda 2}$ of the second wavelength are positioned on the design line $L_{22}$, so the aberration of diffracted light of the diffraction orders $k_{1m}$ and $k_{2m}$ is approximately zero. Meanwhile, the plotted point $P_{\lambda 3}$ of the third wavelength is significantly deviated from the aberration zero design point, indicating the above-described flaring. Note that in FIG. 19, only the plot $k_{3m}$=+2 is shown, but there is deviation from the design line $L_{22}$ in the same way for other orders of the third wavelength as well. Consequently, there is uncorrected aberration in the third wavelength, and then the light quantity of the optical beam with the third wavelength that has passed through the middle ring zone, and is not imaged on the signal recording surface but input to the third optical disc can be suppressed. As a result, regardless of the diffraction efficiency of the optical beam with the third wavelength as shown in FIGS. 22A to 22C, the optical beams do not contribute to image formation, and thus appropriate aperture restriction (NA=0.45) can be realized.

Also, with the outer ring zone of Example 1, as shown in Table 4, when a blazed form (S=∞) with the groove depth d=3.1 (μm), the diffraction efficiency of the diffraction order $k_{1o}$=+4 of the optical beam with the first wavelength is $eff_1$=1.0. Also, the diffraction efficiency $eff_2$ of the diffraction order $k_{2o}$=+2 being dominant, that is, having maximum diffraction efficiency of the optical beam with the second wavelength having passed through this region is around 0.6, but this does not contribute to image formation since the spot is subjected to flaring as described above with reference to FIG. 21. Further, the diffraction efficiency $eff_3$ of the diffraction order $k_{3o}$=+2 being dominant, that is, the maximum diffraction efficiency of the optical beam of the third wavelength having passed through this region is around 1.0, but this does not contribute to image formation since the spot is subjected to flaring as described above with reference to FIG. 21.

Next, further description will be made specifically regarding the outer ring zone of Example 1 with reference to FIGS. 23A to 23C. FIG. 23A is a diagram showing a change in the diffraction efficiency of +4th order diffracted light of the optical beam with the first wavelength when the groove depth d of the blazed form with the number of steps S=∞ changes. FIG. 23B is a diagram showing a change in the diffraction efficiency of +2nd order diffracted light of the optical beam with the second wavelength when the groove depth d of the blazed form with the number of steps S=∞ changes. FIG. 23C is a diagram showing a change in the diffraction efficiency of +2nd order diffracted light of the optical beam with the third wavelength when the groove depth d of the blazed form with the number of steps S=∞ changes. In FIGS. 23A to 23C, the horizontal axis represents the groove depth (nm), and the vertical axis represents diffraction efficiency (light intensity). At a position where the horizontal axis is 3100 nm, as shown in FIG. 23A, $eff_1$ is 1.0, and as shown in FIG. 23B, $eff_2$ is around 0.6, but the spot is subjected to flaring. Also, as shown in FIG. 23C, $eff_3$ is around 1.0, but the spot is subjected to flaring.

Also, with the outer ring zone of Example 1 described above, in the same manner as the case of the middle ring zone of Example 1 described above, a configuration is made in which the design line of the objective lens is deviated and flaring is carried out regarding the second and third wavelengths to perform good aperture restriction. Specifically, as shown in FIG. 21, the outer ring zone of Example 1 has the design line indicated by $L_{23}$ set by plotting the points $P_{\lambda 1}$, $P_{\lambda 2}$, and $P_{\lambda 3}$ at the diffraction orders $(k_{1o}, k_{2o}, k_{3o})=(+4, +2, +2)$. In FIG. 21, the design point $P_{\lambda 1}$ of the first wavelength is positioned on the design line $L_{23}$, so the aberration of diffracted light of the diffraction order $k_{1o}$ is approximately zero. Meanwhile, the plotted points $P_{\lambda 2}$ and $P_{\lambda 3}$ of the second and third wavelengths are significantly deviated from the aberration zero design point, indicating the above-described flaring. Note that in FIG. 21, only the plots $(k_{2o}, k_{3o})=(+2, +2)$ are shown, but there is deviation from the design line $L_{23}$ in the same way for other orders of the second and third wavelengths as well. Consequently, there is uncorrected aberration in the second wavelength, and then the light quantity of the optical beams with the second and third wavelengths that have passed through the outer ring zone, and are not imaged on the signal recording surfaces but input to the second and third optical discs can be suppressed. As a result, regardless of the diffraction efficiency of the optical beam with the second wavelength as shown in FIGS. 23A to 23C, the optical beam does not contribute to image formation, and thus appropriate aperture restriction (NA=0.6) can be realized. Also, regardless of the diffraction efficiency of the optical beam with the third wavelength as shown in FIGS. 23A to 23C, the optical beam does not contribute to image formation, and thus appropriate aperture restriction (NA=0.45) can be realized.

As described above, with the outer ring zones of Example 1 and Example 2 described below, the diffraction surface is blazed, so according to this configuration, even if the diffraction unit is provided on one surface of the objective lens as described below, diffraction grooves can be formed comparatively easily at the curved surface having a steep slope of the lens surface at the periphery of the lens due to being at the outer ring zone.

Next, Example 2 shown in Table 5 will be described.

TABLE 5

Example 2: diffraction efficiency, diffraction order, depth, and the number of steps of each ring zone

|  | K1 | $eff_1$ | K2 | $eff_2$ | K3 | $eff_3$ | d[μm] | s |
|---|---|---|---|---|---|---|---|---|
| Inner Ring Zone | 0 | 0.98 | −1 | 0.78 | −2 | 0.39 | 6.9 | 3 |
| Middle Ring Zone | 0 | 0.96 | −1 | 0.81 | −3 | * | 11.65 | 5 |
| Outer Ring zone | 1 | 1.0 | 1 | * | 1 | * | 0.8 | ∞ |

* indicates a state where according to flaring, efficiency does not cause a problem.

With the inner ring zone of Example 2, as shown in Table 5, when the staircase form with the groove depth d=6.9 (μm) and the number of steps S=3 is used, the diffraction efficiency of the diffraction order $k_{1i}=0$ of the optical beam with the first wavelength is $eff_1=0.98$, the diffraction efficiency of the diffraction order $k_{2i}=-1$ of the optical beam with the second wavelength is $eff_2=0.78$, and the diffraction efficiency of the diffraction order $k_{3i}=-2$ of the optical beam with the third wavelength is $eff_3=0.39$.

Figures 24A, 24B, 24C:
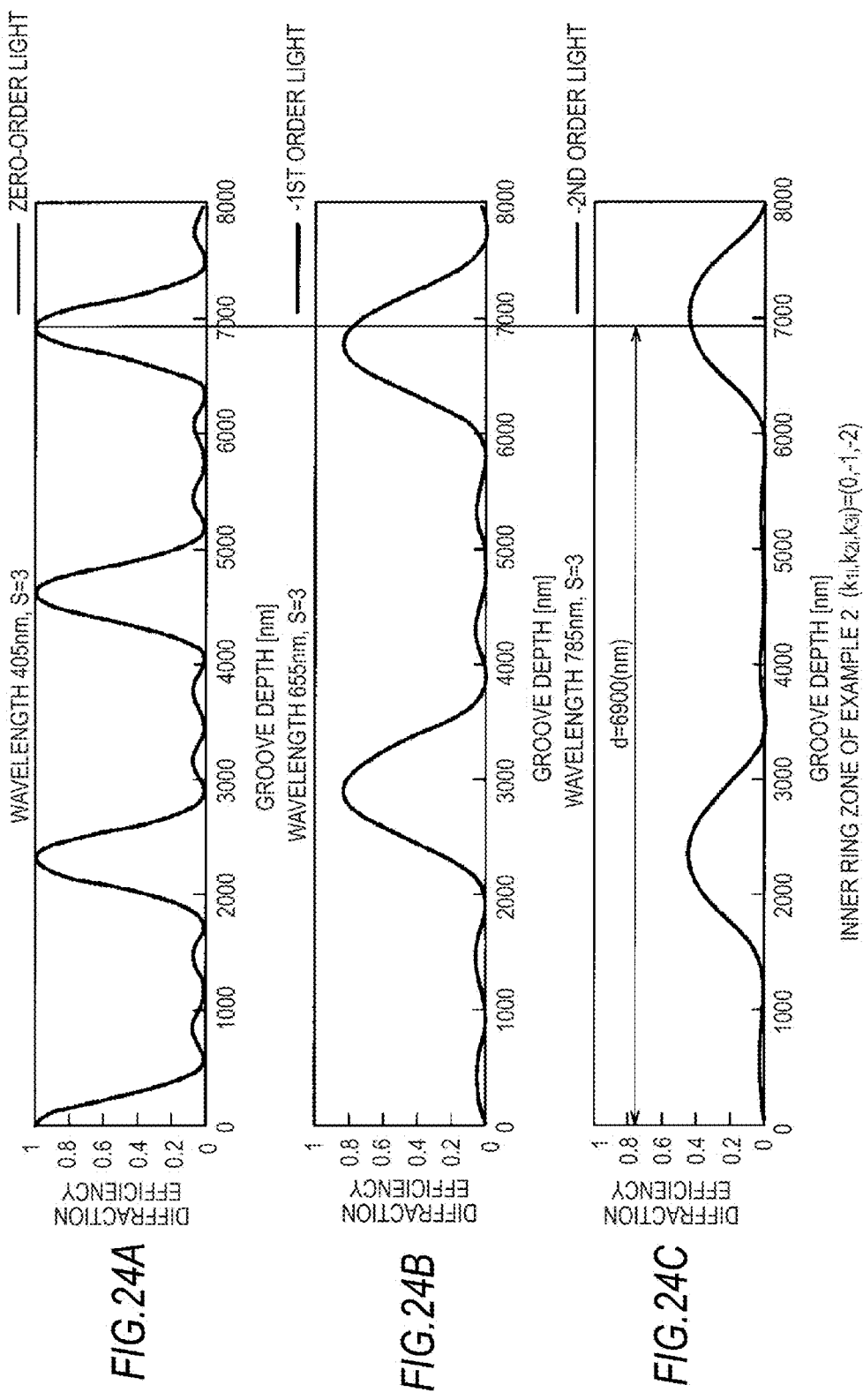
FIGS. 24A to 24C are diagrams for calculation of the diffraction efficiency of an inner ring zone of Example 2, and is a diagram showing a change in the diffraction efficiency of an optical beam of each wavelength with respect to a change in the groove depth d in a case of S=3 and $(k_{1i}, k_{2i}, k_{3i})=(0, -1, -2)$.

Next, further description will be made specifically regarding the inner ring zone of Example 2 with reference to FIGS. 24A to 24C. FIG. 24A is a diagram showing a change in the diffraction efficiency of zero-order diffracted light of the optical beam with the first wavelength when the groove depth d of the staircase form with the number of steps S=3 changes. FIG. 24B is a diagram showing a change in the diffraction efficiency of −1st order diffracted light of the optical beam with the second wavelength when the groove depth d of the staircase form with the number of steps S=3 changes. FIG. 24C is a diagram showing a change in the diffraction efficiency of −2nd order diffracted light of the optical beam with the third wavelength when the groove depth d of the staircase form with the number of steps S=3 changes. In FIGS. 24A to 24C, the horizontal axis represents the groove depth (nm), and the vertical axis represents diffraction efficiency (light intensity). At a position where the horizontal axis is 6900 nm, as shown in FIG. 24A, $eff_1$ is 0.98, and as shown in FIG. 24B, $eff_2$ is 0.78, and as shown in FIG. 24C, $eff_3$ is 0.39.

Figure 27:
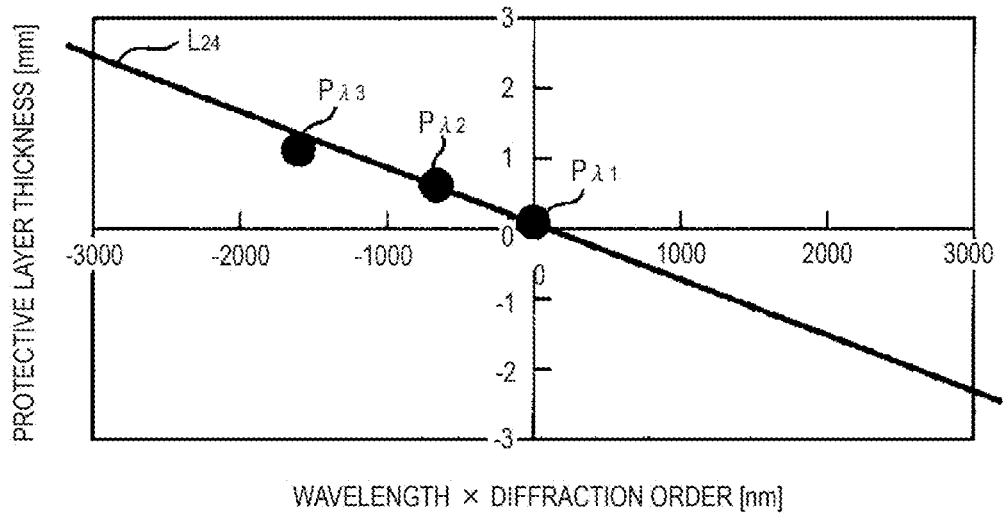
FIG. 27 is a diagram illustrating spherical aberration correction possibility at the inner ring zone of Example 2, and showing the relation of points that are plotted according to the relation between wavelength×diffraction order and the thickness of a protective layer, and the design line of the objective lens in a case of $(k_{1i}, k_{2i}, k_{3i})=(+0, -1, -2)$.

Note that with the inner ring zone of Example 2, the selected diffraction orders $(k_{1i}, k_{2i}, k_{3i})=(0, -1, -2)$ satisfy the above-described conditional expression (9) (let us say that x of $k_{1x}$, $k_{2x}$, and $k_{3x}$ of the conditional expression is x=i), and are diffraction orders that can correct and reduce spherical aberration on the signal recording surface of each optical disc. Specifically, as shown in FIG. 27, the plots $P_{\lambda 1}$, $P_{\lambda 2}$, and $P_{\lambda 3}$ are positioned in line on the line $L_{24}$ which is a substantially design line. Strictly, in the same manner as described above with reference to FIG. 7, the second and third wavelengths $\lambda_2$ and $\lambda_3$ are input as divergent light, so the plots are positioned on one line completely.

With the middle ring zone of Example 2, as shown in Table 5, when a staircase form with the groove depth d=11.65 (μm) and the number of steps S=5 is used, the diffraction efficiency of the diffraction order $k_{1m}=0$ of the optical beam with the first wavelength is $eff_1=0.96$, and the diffraction efficiency of the diffraction order $k_{2m}=-1$ of the optical beam with the second wavelength is $eff_2=0.81$. Further, the diffraction efficiency $eff_3$ of the diffraction order $k_{3m}=-3$ being dominant, that is, the maximum diffraction efficiency of the optical beam of the third wavelength having passed through this region is around 0.4, but this does not contribute to image formation since the spot is subjected to flaring as described above (see FIG. 28).

Next, further description will be made specifically regarding the middle ring zone of Example 2 with reference to FIGS. 25A to 25C. FIG. 25A is a diagram showing a change in the diffraction efficiency of zero-order diffracted light of the optical beam with the first wavelength when the groove depth d of the staircase form with the number of steps S=5 changes. FIG. 25B is a diagram showing a change in the diffraction efficiency of −1st order diffracted light of the optical beam with the second wavelength when the groove depth d of the staircase form with the number of steps S=5 changes, and FIG. 25C is a diagram showing a change in the diffraction efficiency of −3rd order diffracted light of the optical beam with the third wavelength when the groove depth d of the staircase form with the number of steps S=5 changes. In FIGS. 25A to 25C, the horizontal axis represents the groove depth (nm), and the vertical axis represents diffraction efficiency (light intensity). At a position where the horizontal axis is 11650 nm, as shown in FIG. 25A, $eff_1$ is 0.96, as shown in FIG. 25B, $eff_2$ is 0.81, and as shown in FIG. 25C, $eff_3$ is around 0.4, but the spot is subjected to flaring.

Figure 28:
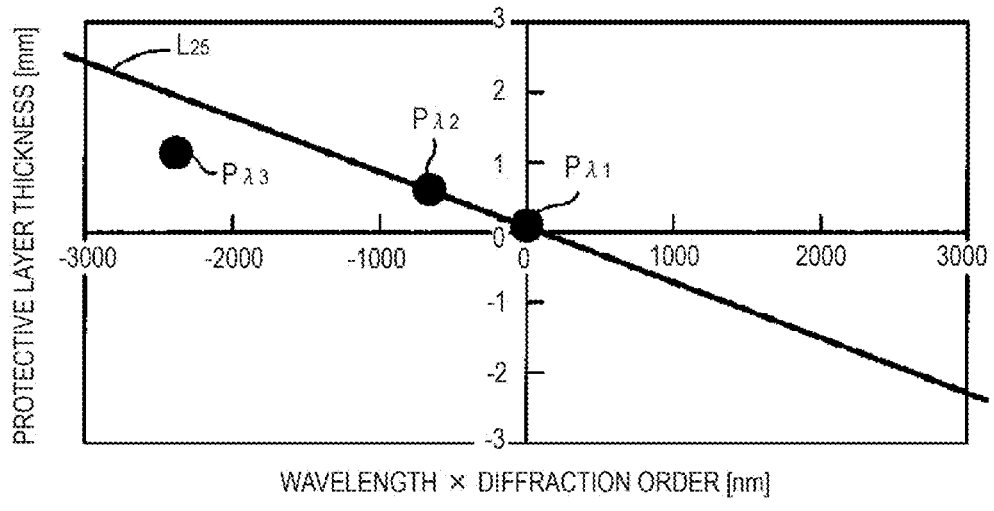
FIG. 28 is a diagram illustrating flaring at the middle ring zone of Example 2, and showing the relation of points that are plotted according to the relation between wavelength×diffraction order and the thickness of a protective layer, and the design line of the objective lens in a case of $(k_{1m}, k_{2m}, k_{3m})= (0, -1, -3)$.

Also, with the middle ring zone of Example 2 described above, in the same manner as the case of the middle ring zone of Example 1 described above, a configuration is made in which the design line of the objective lens is deviated and flaring is carried out regarding the third wavelength to perform good aperture restriction. Specifically, as shown in FIG. 28, the middle ring zone of Example 2 has the design line indicated by $L_{25}$ set by plotting the points $P_{\lambda 1}$, $P_{\lambda 2}$, and $P_{\lambda 3}$ at the diffraction orders $(k_{1m}, k_{2m}, k_{3m})=(0, -1, -3)$. In FIG. 28, the design point $P_{\lambda 1}$ of the first wavelength and the design point $P_{\lambda 2}$ of the second wavelength are positioned on the design line $L_{25}$, so the aberration of diffracted light of the diffraction orders $k_{1m}$ and $k_{2m}$ is approximately zero. Meanwhile, the plotted point $P_{\lambda 3}$ of the third wavelength is significantly deviated from the aberration zero design point, indicating the above-described flaring. Note that in FIG. 28, only the plot $k_{3m}=-3$ is shown, but there is deviation from the design line $L_{25}$ in the same way for other orders of the third wavelength as well. Consequently, there is uncorrected aberration in the third wavelength, and then the light quantity of the optical beam with the third wavelength that has passed through the middle ring zone, and is not imaged on the signal recording surface but input to the third optical disc can be suppressed. As a result, regardless of the small diffraction efficiency of the optical beam with the third wavelength as shown in FIGS. 25A to 25C, the optical beam does not contribute to image formation, and thus appropriate aperture restriction (NA=0.45) can be realized.

Also, with the outer ring zone of Example 2, as shown in Table 5, when the blazed form (S=∞) with the groove depth d=0.8 (μm) is used, the diffraction efficiency of the diffraction order $k_{1o}=+1$ of the optical beam with the first wavelength is $eff_1=1.0$. The diffraction efficiency $eff_2$ of the diffraction order $k_{2o}=+1$ being dominant, that is, having maximum diffraction efficiency of the optical beam with the second wavelength having passed through this region is around 0.6, but this does not contribute to image formation since the spot is subjected to flaring as described above (see FIGS. 41A and 41B). Further, the diffraction efficiency $eff_3$ of the diffraction order $k_{3o}=+1$ being dominant, that is, having maximum diffraction efficiency of the optical beam with the third wavelength having passed through this region is around 0.4, but this does not contribute to image formation since the spot is subjected to flaring as described above.

Figures 26A, 26B, 26C:
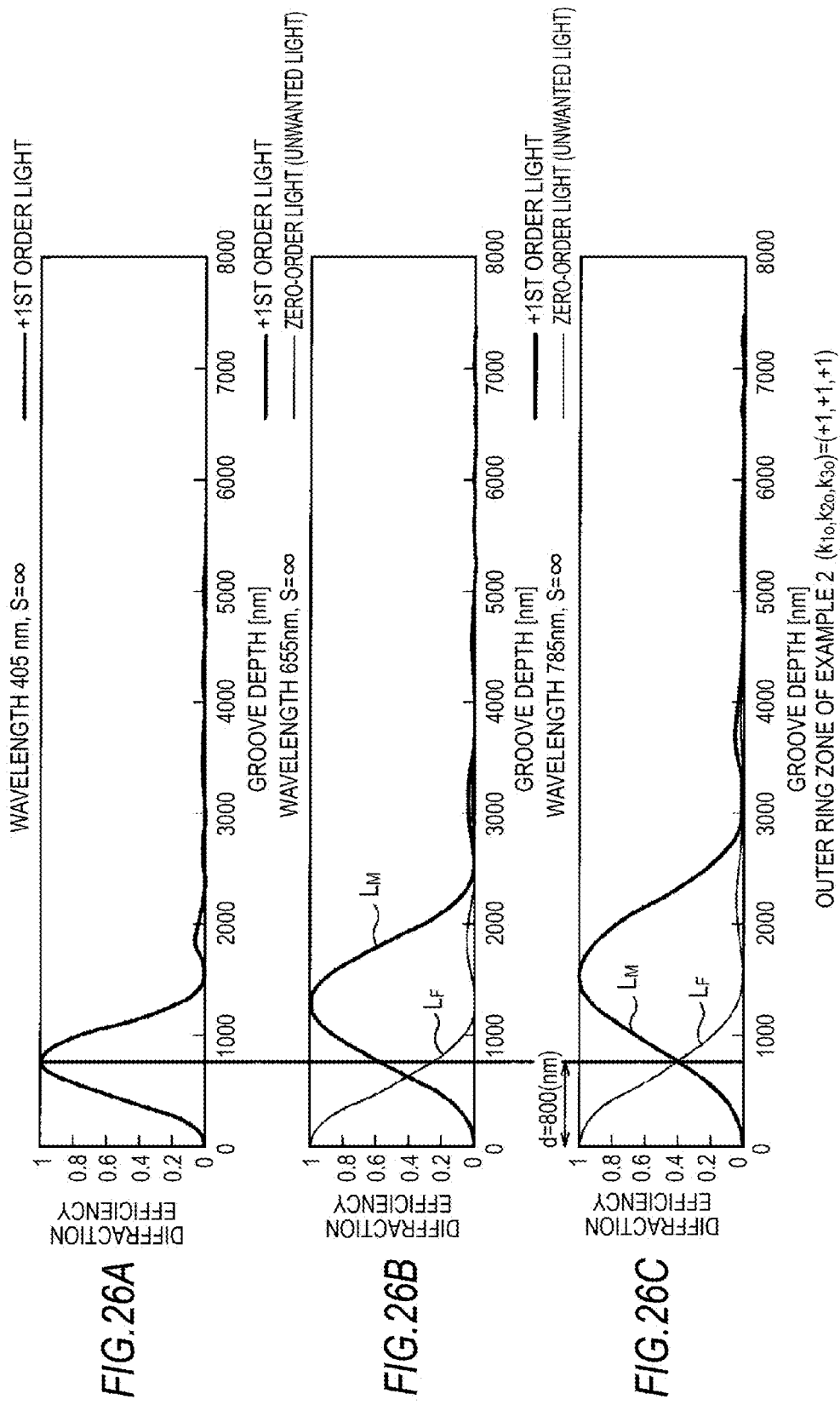
FIGS. 26A to 26C are diagrams for calculation of the diffraction efficiency of an outer ring zone of Example 2, and is a diagram showing a change in the diffraction efficiency of an optical beam of each wavelength with respect to a change in the groove depth d in a case of S=∞ and $(k_{1o}, k_{2o}, k_{3o})=(+1, +1, +1)$.

Next, further description will be made specifically regarding the outer ring zone of Example 2 with reference to FIGS. 26A to 26C. FIG. 26A is a diagram showing a change in the diffraction efficiency of +1st order diffracted light of the optical beam with the first wavelength when the groove depth d of the blazed form with the number of steps S=∞ changes. FIG. 26B is a diagram showing a change in the diffraction efficiency of +1st order diffracted light of the optical beam with the second wavelength and a change in the diffraction efficiency of zero-order light serving as unwanted light when the groove depth d of the blazed form with the number of steps S=∞ changes. FIG. 26C is a diagram showing a change in the diffraction efficiency of +1st order diffracted light of the optical beam with the third wavelength and a change in the diffraction efficiency of zero-order light serving as unwanted light when the groove depth d of the blazed form with the number of steps S=∞ changes. In FIGS. 26A to 26C, the horizontal axis represents the groove depth (nm), and the vertical axis represents diffraction efficiency (light intensity). At a position where the horizontal axis is 800 nm, as shown in FIG. 26A, $eff_1$ is 1.0, and as shown in FIG. 26B, $eff_2$ is around 0.6, but the spot is subjected to flaring. Further, as shown in FIG. 26C, $eff_3$ is around 0.4, but the spot is subjected to flaring.

Figure 29:
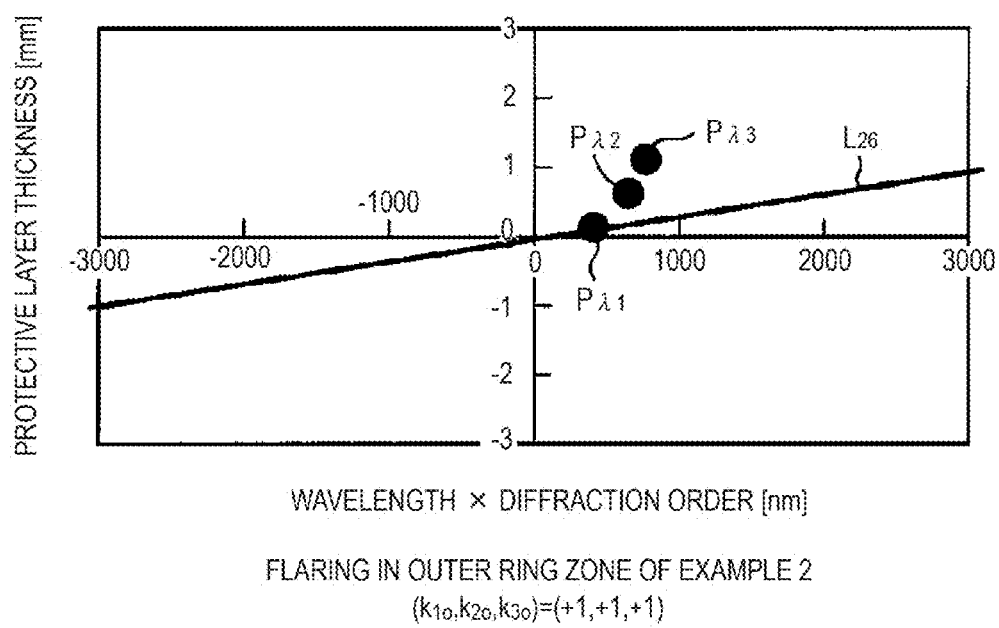
FIG. 29 is a diagram illustrating flaring at the outer ring zone of Example 2, and showing the relation of points that are plotted according to the relation between wavelength×diffraction order and the thickness of a protective layer, and the design line of the objective lens in a case of $(k_{1o}, k_{2o}, k_{3o})= (+1, +1, +1)$.

Also, with the outer ring zone of Example 2, in the same manner as the case of the outer ring zone of Example 1 described above, a configuration is made in which the design line of the objective lens is deviated and flaring is carried out regarding the second and third wavelengths to perform good aperture restriction. Specifically, as shown in FIG. 29, the outer ring zone of Example 2 has the design line indicated by $L_{26}$ set by plotting the points $P_{\lambda 1}$, $P_{\lambda 2}$, and $P_{\lambda 3}$ at the diffraction orders $(k_{1o}, k_{2o}, k_{3o})=(+1, +1, +1)$. In FIG. 29, the design point $P_{\lambda 1}$ of the first wavelength is positioned on the design line $L_{26}$, so the aberration of diffracted light of the diffraction order $k_{1o}$ is approximately zero. Meanwhile, the plotted point $P_{\lambda 2}$ and $P_{\lambda 3}$ of the second and third wavelengths are significantly deviated from the aberration zero design point, indicating the above-described flaring. Note that in FIG. 29, only the plots $(k_{2o}, k_{3o})=(+1, +1)$ are shown, but there is deviation from the design line $L_{26}$ in the same way for other orders, such as zero-order, of the second and third wavelengths as well. Consequently, there is uncorrected aberration in the second and third wavelengths, and then the light quantity of the optical beams with the second and third wavelength that have passed through the outer ring zone, and are not imaged on the signal recording surfaces but input to the second and third optical discs can be suppressed. As a result, regardless of the diffraction efficiency of the optical beams with the second wavelength as shown in FIGS. 26A to 26C, the optical beam does not contribute to image formation, and thus appropriate aperture restriction (NA=0.6) can be realized. Also, regardless of the diffraction efficiency of the optical beams with the third wavelength as shown in FIGS. 26A to 26C, the optical beam does not contribute to image formation, and thus appropriate aperture restriction (NA=0.45) can be realized.

In the diffraction units of Example 1 and Example 2 having such an inner ring zone, a middle ring zone, and an outer ring zone, the relation of Expression (14) is satisfied, diffraction efficiency as to the respective wavelengths is excellent for all ring zones. Therefore, sufficient efficiency can be obtained, and it can be confirmed that the problem of unwanted light is eliminated. Also, as described above, the inner ring zone is formed in a step form (staircase form), and the outer ring zone is formed in a blazed form, which is an advantageous configuration for manufacturing as well.

Next, with regard to the first diffraction region 51 which is an inner ring zone, and the second diffraction region 52 which is a middle ring zone, a description will be made regarding Examples 3 to 7 by listing specific numerical values of the parameters defined by Expressions (20), (21), (29), (31), and (56'). An unwanted light deviation amount and the like in the respective examples are shown in Table 6 by listing specific numerical values regarding the cyclical number $N_i$ of the cyclical structure in the first diffraction structure of the first diffraction region, the cyclical number $N_m$ of the cyclical structure in the second diffraction structure of the second diffraction region, $\phi_{rate}$, and $A_{typ}$. Note that the specific numerical values regarding the third diffraction region 53 serving as an outer ring zone will be omitted, and the effects of Expressions (20), (21), (29), (31), and (56') are confirmed.

In Table 6, $k_1$ represents the diffraction orders ($k_{1i}$, $k_{1m}$) of the optical beam with the first wavelength at the inner ring zone, that is, the diffraction orders in which condensation is made so as to appropriately form a spot on the signal recording surface of the first optical disc through the objective lens 34, $N_i$ represents the cyclical number of the cyclical structure in the first diffraction structure of the first diffraction region, $k_2$ represents the diffraction orders ($k_{2i}$, $k_{2m}$) of the optical beam with the second wavelength at the middle ring zone, that is, the diffraction orders in which condensation is made so as to appropriately form a spot on the signal recording surface of the second optical disc through the objective lens 34, $N_m$ represents the cyclical number of the cyclical structure in the second diffraction structure of the second diffraction region, $\phi_{rate}$ represents a value calculated from Expression (40), $R_i$ represents the radius [mm] of the outer diameter of the first inner ring zone, $R_m$ represents the radius [mm] of the outer diameter of the middle ring zone, $A_{min}'$ represents a value calculated from Expression (55b'), $A_{typ}$ represents a value calculated from Expression (55a), $A_{max}'$ represents a value calculated from Expression (55c'), $\Delta$ represents an unwanted light deviation amount, and RMS represents three-wavelength residual aberration. In Table 6, the respective values of Comparative Examples 1 to 3 are also shown for comparison with Examples 3 to 7.

$A_{typ}$=1.35, $A_{max}'$=2.60, the unwanted light deviation amount $\Delta$ is 362 (μm), and three-wavelength residual aberration RMS is 16.6 (mλrms).

In Example 4, at the inner ring zone, the diffraction order $k_{1i}$ of the optical beam with the first wavelength is +1, the diffraction order $k_{2i}$ of the optical beam with the second wavelength is −1, the cyclical number $N_i$ of the cyclical structure is 13, and the radius $R_i$ of the outer diameter is 0.91 (mm). Also, at the middle ring zone, the diffraction order $k_{1m}$ of the optical beam with the first wavelength is 0, the diffraction order $k_{2m}$ of the optical beam with the second wavelength is −2, the cyclical number $N_m$ of the cyclical structure is 7, and the radius $R_m$ of the outer diameter is 1.20 (mm). In this case, $\phi_{rate}$=0.81, $A_{min}'$=0.42, $A_{typ}$=0.73, $A_{max}'$=1.83, the unwanted light deviation amount $\Delta$ is 412 (μm), and three-wavelength residual aberration RMS is 20.7 (mλrms).

In Example 5, at the inner ring zone, the diffraction order $k_{1i}$ of the optical beam with the first wavelength is 0, the diffraction order $k_{2i}$ of the optical beam with the second wavelength is −1, the cyclical number $N_i$ of the cyclical structure is 33, and the radius $R_i$ of the outer diameter is 1.00 (mm). Also, at the middle ring zone, the diffraction order $k_{1m}$ of the optical beam with the first wavelength is 0, the diffraction order $k_{2m}$ of the optical beam with the second wavelength is −2, the cyclical number $N_m$ of the cyclical structure is 9, and the radius $R_m$ of the outer diameter is 1.24 (mm). In this case, $\phi_{rate}$=0.50, $A_{min}'$=0.35, $A_{typ}$=0.51, $A_{max}'$=1.07, the unwanted light deviation amount $\Delta$ is 846 (μm), and three-wavelength residual aberration RMS is 34.3 (mλrms).

In Example 6, at the inner ring zone, the diffraction order $k_{1i}$ of the optical beam with the first wavelength is +1, the diffraction order $k_{2i}$ of the optical beam with the second

TABLE 6

With actual design, diffraction order, the cyclical number of diffraction grating, $\phi_{rate}$, $A_{max}'$, $A_{min}'$, deviation amount of unwanted light, and total three-wavelength residual aberration amount

| | Inner Ring Zone | | Middle Ring Zone | | | | | | | | | deviation amount of | three-wavelength residual |
|---|---|---|---|---|---|---|---|---|---|---|---|---|---|
| | $k_1$ | | $k_2$ | | | | | | | | | unwanted | aberration RMS |
| No. | $K_{1i}$ | $k_{1m}$ | $N_i$ | $k_{2i}$ | $k_{2m}$ | $N_m$ | $\phi_{rate}$ | $R_i$ | $R_m$ | $A_{min}'$ | $A_{typ}$ | $A_{max}'$ | light | [λmrms] |
| Example 3 | 1 | −1 | 12 | 0 | −1 | 12 | 1.62 | 0.91 | 1.20 | 0.85 | 1.35 | 2.60 | 362 | 16.6 |
| Example 4 | 1 | −1 | 13 | 0 | −2 | 7 | 0.81 | 0.91 | 1.20 | 0.42 | 0.73 | 1.83 | 412 | 20.7 |
| Example 5 | 0 | −1 | 33 | 0 | −2 | 9 | 0.50 | 1.00 | 1.24 | 0.35 | 0.51 | 1.07 | 846 | 34.3 |
| Example 6 | 1 | −2 | 12 | 0 | −2 | 12 | 1.31 | 0.91 | 1.20 | 0.85 | 1.35 | 2.60 | 533 | 16.8 |
| Example 7 | 0 | −2 | 9 | 0 | −2 | 6 | 1.00 | 1.04 | 1.37 | 0.27 | 0.91 | 3.92 | 334 | 18.1 |
| Comparative Example 1 | 1 | −1 | 2 | 3 | 2 | 16 | 11.16 | 0.91 | 1.20 | 2.91 | 10.83 | 27.79 | 31 | 14.8 |
| Comparative Example 2 | 1 | −2 | 13 | 0 | −2 | 17 | 1.31 | 1.00 | 1.25 | 1.38 | 2.32 | 4.03 | — | 6718 |
| Comparative Example 3 | 1 | −2 | 6 | 2 | 1 | 19 | 11.06 | 1.00 | 1.25 | 2.40 | 5.63 | 10.50 | — | 540.9 |

Now, a description will be made regarding Examples 3 to 7 and Comparative Examples 1 to 3 shown in Table 6.

As shown in Table 6, in Example 3, at the inner ring zone, the diffraction order $k_{1i}$ of the optical beam with the first wavelength is +1, the diffraction order $k_{2i}$ of the optical beam with the second wavelength is −1, the cyclical number $N_i$ of the cyclical structure is 12, and the radius $R_i$ of the outer diameter is 0.91 (mm). Also, at the middle ring zone, the diffraction order $k_{1m}$ of the optical beam with the first wavelength is 0, the diffraction order $k_{2m}$ of the optical beam with the second wavelength is −1, the cyclical number $N_m$ of the cyclical structure is 12, and the radius $R_m$ of the outer diameter is 1.20 (mm). In this case, $\phi_{rate}$=1.62, $A_{min}'$=0.85, wavelength is −2, the cyclical number $N_i$ of the cyclical structure is 12, and the radius $R_i$ of the outer diameter is 0.91 (mm). Also, at the middle ring zone, the diffraction order $k_{1m}$ of the optical beam with the first wavelength is 0, the diffraction order $k_{2m}$ of the optical beam with the second wavelength is −2, the cyclical number $N_m$ of the cyclical structure is 12, and the radius $R_m$ of the outer diameter is 1.20 (mm). In this case, $\phi_{rate}$=1.31, $A_{min}'$=0.85, $A_{typ}$=1.35, $A_{max}'$=2.60, the unwanted light deviation amount $\Delta$ is 533 (μm), and three-wavelength residual aberration RMS is 16.8 (mλrms).

In Example 7, at the inner ring zone, the diffraction order $k_{1i}$ of the optical beam with the first wavelength is 0, the diffraction order $k_{2i}$ of the optical beam with the second wavelength is −2, the cyclical number $N_i$ of the cyclical structure is 9, and the radius $R_i$ of the outer diameter is 1.04 (mm). Also, at the middle ring zone, the diffraction order $k_{1m}$ of the optical beam with the first wavelength is 0, the diffraction order $k_{2m}$ of the optical beam with the second wavelength is −2, the cyclical number $N_m$ of the cyclical structure is 6, and the radius $R_m$ of the outer diameter is 1.37 (mm). In this case, $\phi_{rate}=1.00$, $A_{min}'=0.27$, $A_{typ}=0.91$, $A_{max}'=3.92$, the unwanted light deviation amount $\Delta$ is 334 (μm), and three-wavelength residual aberration RMS is 18.1 (mλrms).

In Comparative Example 1, at the inner ring zone, the diffraction order $k_{1i}$ of the optical beam with the first wavelength is +1, the diffraction order $k_{2i}$ of the optical beam with the second wavelength is −1, the cyclical number $N_i$ of the cyclical structure is 2, and the radius $R_i$ of the outer diameter is 0.91 (mm). Also, at the middle ring zone, the diffraction order $k_{1m}$ of the optical beam with the first wavelength is 3, the diffraction order $k_{2m}$ of the optical beam with the second wavelength is +2, the cyclical number $N_m$ of the cyclical structure is 16, and the radius $R_m$ of the outer diameter is 1.20 (mm). In this case, $\phi_{rate}=11.16$, $A_{min}'=2.91$, $A_{typ}=10.83$, $A_{max}'=27.79$, the unwanted light deviation amount $\Delta$ is 31 (μm), and three-wavelength residual aberration RMS is 14.8 (mλrms).

In Comparative Example 2, at the inner ring zone, the diffraction order $k_{1i}$ of the optical beam with the first wavelength is +1, the diffraction order $k_{2i}$ of the optical beam with the second wavelength is −2, the cyclical number $N_i$ of the cyclical structure is 13, and the radius $R_i$ of the outer diameter is 1.00 (mm). Also, at the middle ring zone, the diffraction order $k_{1m}$ of the optical beam with the first wavelength is 0, the diffraction order $k_{2m}$ of the optical beam with the second wavelength is −2, the cyclical number $N_m$ of the cyclical structure is 17, and the radius $R_m$ of the outer diameter is 1.25 (mm). In this case, $\phi_{rate}=1.31$, $A_{min}'=1.38$, $A_{typ}=2.32$, $A_{max}'=4.03$, and three-wavelength residual aberration RMS is 6718 (mλrms). Three-wavelength residual aberration RMS is large, which causes a problem, so the value of the unwanted light deviation amount $\Delta$ will be omitted and described as "-".

In Comparative Example 3, at the inner ring zone, the diffraction order $k_{1i}$ of the optical beam with the first wavelength is +1, the diffraction order $k_{2i}$ of the optical beam with the second wavelength is −2, the cyclical number $N_i$ of the cyclical structure is 6, and the radius $R_i$ of the outer diameter is 1.00 (mm). Also, at the middle ring zone, the diffraction order $k_{1m}$ of the optical beam with the first wavelength is +2, the diffraction order $k_{2m}$ of the optical beam with the second wavelength is +1, the cyclical number $N_m$ of the cyclical structure is 19, and the radius $R_m$ of the outer diameter is 1.25 (mm). In this case, $\phi_{rate}=11.06$, $A_{min}'=2.40$, $A_{typ}=5.63$, $A_{max}'=10.50$, and three-wavelength residual aberration RMS is 540.9 (λrms). Three-wavelength residual aberration RMS is large, which causes a problem, so the value of the unwanted light deviation amount $\Delta$ will be omitted and described as "-".

Accordingly, in all of Examples 3 to 7, the unwanted light deviation amount is 40 μm or greater, such that the focal point of unwanted light and the focal point of regular light can be prevented from interfering with each other. This is because the cyclical number $N_i$ of the cyclical structure of the inner ring zone satisfies the relation of Expression (20), the cyclical number $N_m$ of the cyclical structure of the middle ring zone satisfies the relation of Expression (21), and Expression (55b') is satisfied.

Also, the relations of Expressions (29) and (31) are also satisfied, so deterioration in efficiency at the time of diffraction grating formation can be avoided, return coupling efficiency $I_{all}$ from the objective lens can be ensured 60% or greater, and sufficient diffraction efficiency can be obtained.

In contrast, in Comparative Example 1, the unwanted light deviation amount of the inner ring zone is smaller than 40 μm, and thus a configuration is made in which interference between the focal point of unwanted light and the focal point of regular light cannot be avoided. This is because the cyclical number $N_i$ of the cyclical structure of the inner ring zone does not satisfy the relation of Expression (20).

As described above, in the diffraction units of Examples 3 to 7 including such an inner ring zone and a middle ring zone, the relations of Expressions (20), (21), (29), (31), and (56') are satisfied, so it can be confirmed that the unwanted light deviation amount can be suppressed within an appropriate range, and three-wavelength residual aberration can be sufficiently reduced. In contrast, in Comparative Example 2, $\phi_{rate}$ is below $A_{min}'$, so three-wavelength residual aberration has a significantly large value. Also, in Comparative Example 3, $\phi_{rate}$ is above $A_{max}'$, so three-wavelength residual aberration has a significantly large value. For this reason, any comparative example is unpractical.

Next, with regard to the first diffraction region 51 which is an inner ring zone, and the second diffraction region 52 which is a middle ring zone, a description will be made regarding Examples 8 to 12 by listing specific numerical values regarding the parameters defined by Expressions (20), (21), (29), (31), and (56). An unwanted light deviation amount and the like in the respective examples are shown in Table 7 by listing specific numerical values regarding the cyclical number $N_i$ of the cyclical structure in the first diffraction structure of the first diffraction region, the cyclical number $N_m$ of the cyclical structure in the second diffraction structure of the second diffraction region, $\phi_{rate}$, and $A_{typ}$. Note that, similarly to Table 6, the specific numerical values regarding the third diffraction region 53 serving as an outer ring zone will be omitted, and the effects of Expressions (20), (21), (29), (31), and (56) are confirmed.

Note that in Table 7, $k_1$ represents the diffraction orders ($k_{1i}$, $k_{1m}$) of the optical beam with the first wavelength at the inner ring zone, that is, the diffraction orders in which condensation is made so as to appropriately form a spot on the signal recording surface of the first optical disc through the objective lens 34, $N_i$ represents the cyclical number of the cyclical structure in the first diffraction structure of the first diffraction region, $k_2$ represents the diffraction orders ($k_{2i}$, $k_{2m}$) of the optical beam with the second wavelength at the middle ring zone, that is, the diffraction orders in which condensation is made so as to appropriately form a spot on the signal recording surface of the second optical disc through the objective lens 34, $N_m$ represents the cyclical number of the cyclical structure in the second diffraction structure of the second diffraction region, $\phi_{rate}$ represents a value calculated from Expression (40), $R_i$ represents the radius [mm] of the outer diameter of the first inner ring zone, $R_m$ represents the radius [mm] of the outer diameter of the middle ring zone, $A_{min}$ represents a value calculated from Expression (55b), $A_{typ}$ represents a value calculated from Expression (55a), $A_{max}$ represents a value calculated from Expression (55c), $\Delta$ represents an unwanted light deviation amount, and RMS represents three-wavelength residual aberration. Also, in Table 7, the respective values of Comparative Examples 4 to 6 for comparison with Examples 8 to 12 are shown.

TABLE 7

With actual design, diffraction order, the cyclical number of diffraction grating, $\phi_{rate}$, $A_{max}$, $A_{min}$, deviation amount of unwanted light, and total three-wavelength residual aberration amount

| No. | Inner Ring Zone $k_1$ | | | Middle Ring Zone $k_2$ | | | $\phi_{rate}$ | $R_i$ | $R_m$ | $A_{min}$ | $A_{typ}$ | $A_{max}$ | deviation amount of unwanted light | three-wavelength residual aberration RMS [λmrms] |
|---|---|---|---|---|---|---|---|---|---|---|---|---|---|---|
| | $K_{1i}$ | $k_{1m}$ | $N_i$ | $k_{2i}$ | $k_{2m}$ | $N_m$ | | | | | | | | |
| Example 8 | 1 | −1 | 12 | 0 | −1 | 12 | 1.62 | 0.91 | 1.20 | 1.16 | 1.35 | 1.81 | 362 | 16.6 |
| Example 9 | 1 | −1 | 13 | 0 | −2 | 7 | 0.81 | 0.91 | 1.20 | 0.63 | 0.73 | 1.77 | 412 | 20.7 |
| Example 10 | 0 | −1 | 33 | 0 | −2 | 9 | 0.50 | 1.00 | 1.24 | 0.47 | 0.51 | 0.83 | 846 | 34.3 |
| Example 11 | 1 | −2 | 12 | 0 | −2 | 12 | 1.31 | 0.91 | 1.20 | 1.16 | 1.35 | 2.86 | 533 | 16.8 |
| Example 12 | 0 | −2 | 9 | 0 | −2 | 6 | 1.00 | 0.91 | 1.20 | 0.74 | 0.90 | 2.30 | 334 | 18.1 |
| Comparative Example 4 | 1 | −1 | 2 | 3 | 2 | 16 | 11.16 | 1.04 | 1.37 | 4.04 | 10.88 | 24.28 | 31 | 14.8 |
| Comparative Example 5 | 1 | −2 | 13 | 0 | −2 | 12 | 1.31 | 1.00 | 1.25 | 1.34 | 1.64 | 2.64 | — | 2350 |
| Comparative Example 6 | 1 | −2 | 5 | 2 | 1 | 20 | 11.06 | 1.00 | 1.25 | 4.50 | 7.11 | 10.51 | — | 104.3 |

"—" indicates that the value is not described since it does not have to do with the contents in the description for comparison.

Now, a description will be made regarding Examples 8 to 12 and Comparative Examples 4 to 6 shown in Table 7.

As shown in Table 7, in Example 8, at the inner ring zone, the diffraction order $k_{1i}$ of the optical beam with the first wavelength is +1, the diffraction order $k_{2i}$ of the optical beam with the second wavelength is −1, the cyclical number $N_i$ of the cyclical structure is 12, and the radius $R_i$ of the outer diameter is 0.91 (mm). Also, at the middle ring zone, the diffraction order $k_{1m}$ of the optical beam with the first wavelength is 0, the diffraction order $k_{2m}$ of the optical beam with the second wavelength is −1, the cyclical number $N_m$ of the cyclical structure is 12, and the radius $R_m$ of the outer diameter is 1.20 (mm). In this case, $\phi_{rate}$=1.62, $A_{min}$=1.16, $A_{typ}$=1.35, $A_{max}$=1.81, the unwanted light deviation amount Δ is 362 (μm), and three-wavelength residual aberration RMS is 16.6 (mλrms).

In Example 9, at the inner ring zone, the diffraction order $k_{1i}$ of the optical beam with the first wavelength is +1, the diffraction order $k_{2i}$ of the optical beam with the second wavelength is −1, the cyclical number $N_i$ of the cyclical structure is 13, and the radius $R_i$ of the outer diameter is 0.91 (mm). Also, at the middle ring zone, the diffraction order $k_{1m}$ of the optical beam with the first wavelength is 0, the diffraction order $k_{2m}$ of the optical beam with the second wavelength is −2, the cyclical number $N_m$ of the cyclical structure is 7, and the radius $R_m$ of the outer diameter is 1.20 (mm). In this case, $\phi_{rate}$=0.81, $A_{min}$=0.63, $A_{typ}$=0.73, $A_{max}$=1.77, the unwanted light deviation amount Δ is 412 (μm), and three-wavelength residual aberration RMS is 20.7 (mλrms).

In Example 10, at the inner ring zone, the diffraction order $k_{1i}$ of the optical beam with the first wavelength is 0, the diffraction order $k_{2i}$ of the optical beam with the second wavelength is −1, the cyclical number $N_i$ of the cyclical structure is 33, and the radius $R_i$ of the outer diameter is 1.00 (mm). Also, at the middle ring zone, the diffraction order $k_{1m}$ of the optical beam with the first wavelength is 0, the diffraction order $k_{2m}$ of the optical beam with the second wavelength is −2, the cyclical number $N_m$ of the cyclical structure is 9, and the radius $R_m$ of the outer diameter is 1.24 (mm). In this case, $\phi_{rate}$=0.50, $A_{min}$=0.47, $A_{typ}$=0.51, $A_{max}$=0.83, the unwanted light deviation amount Δ is 846 (μm), and three-wavelength residual aberration RMS is 34.3 (mλrms).

In Example 11, at the inner ring zone, the diffraction order $k_{1i}$ of the optical beam with the first wavelength is +1, the diffraction order $k_{2i}$ of the optical beam with the second wavelength is −2, the cyclical number $N_i$ of the cyclical structure is 12, and the radius $R_i$ of the outer diameter is 0.91 (mm). Also, at the middle ring zone, the diffraction order $k_{1m}$ of the optical beam with the first wavelength is 0, the diffraction order $k_{2m}$ of the optical beam with the second wavelength is −2, the cyclical number $N_m$ of the cyclical structure is 12, and the radius $R_m$ of the outer diameter is 1.20 (mm). In this case, $\phi_{rate}$=1.31, $A_{min}$=1.16, $A_{typ}$=1.35, $A_{max}$=2.86, the unwanted light deviation amount Δ is 533 (μm), and three-wavelength residual aberration RMS is 16.8 (mλrms).

In Example 12, at the inner ring zone, the diffraction order $k_{1i}$ of the optical beam with the first wavelength is 0, the diffraction order $k_{2i}$ of the optical beam with the second wavelength is −2, the cyclical number $N_i$ of the cyclical structure is 9, and the radius $R_i$ of the outer diameter is 0.91 (mm). Also, at the middle ring zone, the diffraction order $k_{1m}$ of the optical beam with the first wavelength is 0, the diffraction order $k_{2m}$ of the optical beam with the second wavelength is −2, the cyclical number $N_m$ of the cyclical structure is 6, and the radius $R_m$ of the outer diameter is 1.20 (mm). In this case, $\phi_{rate}$=1.00, $A_{min}$=0.74, $A_{typ}$=0.90, $A_{max}$=2.30, the unwanted light deviation amount Δ is 334 (μm), and three-wavelength residual aberration RMS is 18.1 (mλrms).

In Comparative Example 4, at the inner ring zone, the diffraction order $k_{1i}$ of the optical beam with the first wavelength is +1, the diffraction order $k_{2i}$ of the optical beam with the second wavelength is −1, the cyclical number $N_i$ of the cyclical structure is 2, and the radius $R_i$ of the outer diameter is 1.04 (mm). Also, at the middle ring zone, the diffraction order $k_{1m}$ of the optical beam with the first wavelength is 3, the diffraction order $k_{2m}$ of the optical beam with the second wavelength is +2, the cyclical number $N_m$ of the cyclical structure is 16, and the radius $R_m$ of the outer diameter is 1.37 (mm). In this case, $\phi_{rate}$=11.16, $A_{min}$=4.04, $A_{typ}$=10.88, $A_{max}$=24.28, the unwanted light deviation amount Δ is 31 (μm), and three-wavelength residual aberration RMS is 14.8 (mλrms).

In Comparative Example 5, at the inner ring zone, the diffraction order $k_{1i}$ of the optical beam with the first wavelength is +1, the diffraction order $k_{2i}$ of the optical beam with the second wavelength is −2, the cyclical number $N_i$ of the cyclical structure is 13, and the radius $R_i$ of the outer diameter is 1.00 (mm). Also, at the middle ring zone, the diffraction order $k_{1m}$ of the optical beam with the first wavelength is 0, the diffraction order $k_{2m}$ of the optical beam with the second wavelength is −2, the cyclical number $N_m$ of the cyclical structure is 12, and the radius $R_m$ of the outer diameter is 1.25 (mm). In this case, $\phi_{rate}=1.31$, $A_{min}=1.64$, $A_{typ}=1.64$, $A_{max}=2.64$, and three-wavelength residual aberration RMS is 2350 (mλrms). Three-wavelength residual aberration RMS is large, which causes a problem, so the value of the unwanted light deviation amount Δ will be omitted and described as "-".

In Comparative Example 6, at the inner ring zone, the diffraction order $k_{1i}$ of the optical beam with the first wavelength is +1, the diffraction order $k_{2i}$ of the optical beam with the second wavelength is −2, the cyclical number $N_i$ of the cyclical structure is 5, and the radius $R_i$ of the outer diameter is 1.00 (mm). Also, at the middle ring zone, the diffraction order $k_{1m}$ of the optical beam with the first wavelength is +2, the diffraction order $k_{2m}$ of the optical beam with the second wavelength is +1, the cyclical number $N_m$ of the cyclical structure is 20, and the radius $R_m$ of the outer diameter is 1.25 (mm). In this case, $\phi_{rate}=11.06$, $A_{min}=4.50$, $A_{typ}=7.11$, $A_{max}=10.51$, and three-wavelength residual aberration RMS is 104.3 (mλrms). Three-wavelength residual aberration RMS is large, which causes a problem, so the value of the unwanted light deviation amount Δ will be omitted and described as "-".

Accordingly, in all of Examples 8 to 12, the unwanted light deviation amount is 40 μm or greater, such that the focal point of unwanted light and the focal point of regular light can be prevented from interfering with each other. This is because the cyclical number $N_i$ of the cyclical structure of the inner ring zone satisfies the relation of Expression (20), the cyclical number $N_m$ of the cyclical structure of the middle ring zone satisfies the relation of Expression (21), and Expression (56) is satisfied.

Also, the relations of Expressions (29) and (31) are satisfied, so deterioration in efficiency at the time of diffraction grating formation can be avoided, return coupling efficiency $I_{all}$ from the objective lens can be ensured 60% or greater, and sufficient diffraction efficiency can be obtained.

Meanwhile, in Comparative Example 4, the unwanted light deviation amount of the inner ring zone is smaller than 40 μm, and thus a configuration is made in which interference between the focal point of unwanted light and the focal point of regular light cannot be avoided. This is because the cyclical number $N_i$ of the cyclical structure of the inner ring zone does not satisfy the relation of Expression (20). In Comparative Example, $\phi_{rate}$ is below $A_{min}$, so three-wavelength residual aberration has a significantly large value. Also, in Comparative Example 6, $\phi_{rate}$ is above $A_{max}$, so three-wavelength residual aberration has a significantly large value. For this reason, any comparative example is unpractical.

As described above, in the diffraction units of Examples 8 to 12 including such an inner ring zone and a middle ring zone, the relations of Expressions (20), (21), (29), (31), and (56) are satisfied, so it can be confirmed that the unwanted light deviation amount can be suppressed within an appropriate range, and three-wavelength residual aberration can be sufficiently reduced.

Note that the description has been made above assuming that there are provided the first diffraction region 51 where the diffraction structure of the staircase form is formed in which staircase structures having a plurality of steps as inner ring zones are successively formed in the radial direction of the ring zones, the second diffraction region 52 or 52B where the diffraction structure of the staircase form or the blazed form is formed in which staircase structures having a plurality of steps as middle ring zones are successively formed in the radial direction of the ring zones, and the third diffraction region 53 where the diffraction structure of the blazed form is formed as an outer ring zone, but the invention is not limited to this. With the inner ring zone and the middle ring zone, a diffraction structure which is non-cyclical structure may be formed insofar as the above-described relation of diffraction orders to be selected is satisfied.

For example, the first diffraction region may be configured such that a non-cyclical diffraction structure is formed in which a non-cyclical structure for providing a desired phase difference is formed in the radial direction of the ring zones as described above. The second diffraction region may be configured such that a non-cyclical diffraction structure is formed in which a non-cyclical structure for providing a desired phase difference is formed in the radial direction of the ring zones as described above. If a non-cyclical diffraction structure is provided for the first and second diffraction regions, design flexibility can be extended, and more desirable diffraction efficiency can be obtained, which is an advantageous configuration in terms of the temperature properties of diffraction efficiency.

As a modification of the above-described first to third diffraction regions 51, 52, and 53, the third diffraction region may be formed as a so-called aspheric continuous surface. Specifically, a configuration may be made in which predetermined refractive power is applied to the optical beam with the first wavelength by the refractive power of a lens curved surface instead of the third diffraction region 53 such as described above to condense the optical beam on the corresponding optical disc in a state where there is no spherical aberration, and the optical beams with the second and third wavelengths are appropriately subjected to aperture restriction. In other words, the diffraction unit may be configured as a diffraction unit including the first diffraction region 51 where the diffraction structure of the staircase form is formed in which staircase structures, which are formed on a region corresponding to the numerical aperture of the third optical disc and have a plurality of steps as inner ring zones, are successively formed in the radial direction of the ring zones, the second diffraction region 52 or 52B where the diffraction structure of the staircase or blazed form is formed in which staircase structures, which are formed on a region corresponding to the numerical aperture of the second optical disc and have a plurality of steps as middle ring zones, are successively formed in the radial direction of the ring zones, and a region formed on a region corresponding to the numeric aperture of the first optical disc such that the optical beam with the first wavelength which passes therethrough is condensed on the signal recording surface of the corresponding first optical disc, and the optical beams with the second and third wavelengths which pass therethrough are not condensed on the signal recording surfaces of the corresponding second and third optical discs. An example where an outer ring zone is formed as an aspheric continuous surface will be described below with reference to FIGS. 30A and 30B.

With the diffraction unit 50 having the first to third diffraction regions 51, 52, and 53 thus configured, the optical beams with the first to third wavelengths which pass through the first diffraction region 51 can be diffracted by diffraction power so as to be in a divergent angle state where no spherical aberration occurs on the signal recording surface of the corresponding type of optical disc by refractive power of the objective lens 34 which is common to the three wavelengths, and an appropriate spot can be condensed on the signal recording surface of the corresponding optical disc by refractive power of the objective lens 34. Also, the optical beams with the first and second wavelength which pass through the second diffraction region 52 can be diffracted by diffraction power so as to be in a divergent angle state where no spherical aberration occurs on the signal recording surface of the corresponding type of optical disc by refractive power of the common objective lens 34, and an appropriate spot can be condensed on the signal recording surface of the corresponding optical disc by refractive power of the objective lens 34. Also, the optical beam with the first wavelength which passes through the third diffraction region 53 can be diffracted by diffraction power so as to be in a divergent angle state where no spherical aberration occurs on the signal recording surface of the corresponding type of optical disc by refractive power of the objective lens 34, and an appropriate spot can be condensed on the signal recording surface of the corresponding optical disc by refractive power of the objective lens 34. Let us say that "a divergent angle state where no spherical aberration occurs" includes a diverged state, a converged state, and a parallel light state, and means a state where spherical aberration is corrected by refractive power of a lens curved surface.

That is, with the diffraction unit 50 provided on one surface of the objective lens 34 disposed on the optical path between the first to third emission units in the optical system of the optical pickup 3 and the signal recording surface, diffraction power can be applied to the optical beams of the respective wavelengths which pass through respective regions (the first to third diffraction regions 51, 52, and 53) so as to be in a state where spherical aberration occurring at the signal recording surface is reduced. Therefore, spherical aberration occurring at the signal recording surface when the optical beams with the first to third wavelengths are condensed on the signal recording surfaces of the corresponding optical discs using the common objective lens 34 in the optical pickup 3 can be minimized. That is, three-wavelength compatibility of the optical pickup using three types of wavelengths with respect to three types of optical discs and the common objective lens 34 can be realized, and thus recording and/or playback of information signals with respect to the respective optical discs can be performed appropriately.

With the objective lens 34 that has the diffraction unit 50 including the first to third diffraction regions 51, 52, and 53 such as described above, the diffraction orders ($k_{1i}$, $k_{2i}$, $k_{3i}$) selected by the first diffraction region 51 serving as an inner ring zone so as to be dominant and condensed on the signal recording surface of the corresponding optical disc through the objective lens 34 have the relation $k_{1i} \geq k_{2i} > k_{3i}$. Then, diffracted light of a diffraction order which can appropriately reduce spherical aberration is made dominant, so the optical beam of each wavelength can be condensed on the signal recording surface of the corresponding optical disc so as to form an appropriate spot, and an appropriate state can be realized as to the working distance when the optical beam of each wavelength is used, and the focal distance for each wavelength. That is, when the third wavelength $\lambda_3$ is used, the focal distance can be prevented from becoming too long as to the first wavelength $\lambda_1$ in order to ensure the working distance, thereby suppressing an increase in the lens diameter of the objective lens or the overall size of the optical pickup. Therefore, the objective lens 34 having the diffraction unit 50 realizes condensation of the optical beam of each wavelength on the signal recording surface of the corresponding optical disc so as to form an appropriate spot with high light use efficiency while ensuring appropriate working distance and focal distance, without increasing the size of the optical part or the optical pickup. That is, three-wavelength compatibility of the optical pickup using three types of wavelengths with respect to three types of optical discs and the common objective lens 34 can be realized, and thus recording and/or playback of information signals with respect to the respective optical discs can be performed appropriately.

The objective lens 34 having the diffraction unit 50 such as described above is configured such that of the diffraction orders selected by the first diffraction region 51 serving as an inner ring zone and condensed on the signal recording surface of the corresponding optical disc through the objective lens 34, $k_{1i}$ and $k_{3i}$ are (−2, −3), (−1, −2), (−1, −3), (0, −2), (0, −3) (1, −2), (1, −3), (2, −1), (2, −2), (2, −3), (3, 0), (3, −1), (3, −2), or (3, −3). Then, diffracted light of a diffraction order which can appropriately reduce spherical aberration is made dominant, so the optical beam of each wavelength can be condensed on the signal recording surface of the corresponding optical disc so as to form an appropriate spot, and an appropriate state can be realized as to the working distance when the optical beam of each wavelength is used, and the focal distance for each wavelength. That is, when third wavelength $\lambda_3$ is used, the focal distance can be prevented from becoming too long as to the first wavelength $\lambda_1$ in order to ensure the working distance, thereby preventing an increase in the lens diameter of the objective lens or the overall size of the optical pickup. In addition, as described above with regard to the third perspective for the inner ring zone, the configuration is advantageous in terms of manufacturing in that the necessary depth of the groove is prevented from becoming too deep, thereby simplifying the manufacturing process and preventing formation precision from being deteriorated. Therefore, the objective lens 34 having the diffraction unit 50 can simplify the manufacturing process and can suppress deterioration in formation precision while ensuring appropriate working distance and focal distance, without increasing the size of the optical part or the optical pickup, thereby realizing condensation of an appropriate spot on the signal recording surface of the corresponding optical disc with high light use efficiency.

The objective lens 34 having the diffraction unit 50 such as described above is configured such that the first diffraction region 51 has formed a diffraction structure of a staircase form in which staircase structures having a plurality of steps are successively formed in the radial direction of the ring zones, and the third diffraction region 53 has formed a diffraction structure of a blazed form. The objective lens 34 having the diffraction unit 50 has the inner ring zone of a step form which needs to provide diffraction power to the first to third wavelengths so as to be in a predetermined state and to have high diffraction efficiency, thereby suppressing the amount of diffracted light of unwanted light, and preventing jitter and the like from being deteriorated due to unwanted light being received by the photoreceptor portion. Even though a certain amount of diffracted light of unwanted light occurs, the diffraction order of unwanted light is set to be a diffraction order with a great diffraction angle difference other than adjacent diffraction orders of focus light, thereby preventing jitter and the like from being deteriorated due to condensation of unwanted light at the time of focus.

The objective lens 34 having the diffraction unit 50 has the outer ring zone of a blazed form which is formed integrally on one surface of the objective lens and provided on the outermost side. This configuration is advantageous when a diffraction structure is formed at a portion having an extremely steep lens curved surface, such as a three-wavelength compatible lens. Therefore, manufacturing can be facilitated, and formation precision can be prevented from being deteriorated.

The objective lens 34 having the diffraction unit 50 such as described above is configured such that when being input to the incident side of the objective lens 34, the optical beam with the first wavelength is an infinite optical system, that is, substantially parallel light, and the optical beams with the second and third wavelengths are a finite optical system, that is, as divergent light. Therefore, as described with reference to FIGS. 6, 7, and 26, optical beams which pass through the first diffraction region 51 serving as an inner ring zone where there is a need to take into consideration the possibility of spherical aberration correction can be appropriately condensed on the signal recording surface of the corresponding optical disc in a state of high diffraction efficiency and no spherical aberration as predetermined diffraction efficiency with respect to the selected diffraction orders $k_{1i}$, $k_{2i}$, and $k_{3i}$ for three wavelengths.

The objective lens 34 having the diffraction unit 50 is configured such that when being input to the incident side of the objective lens, the optical beam with the first wavelength is substantially parallel light, and the optical beams with the second and third wavelengths are divergent light. Thus, at the middle ring zone or outer ring zone, a degree of freedom when flaring such as described with reference to FIGS. 19, 21, 27, and 28 is performed can be improved. With the improvement of the degree of freedom and the benefit from the advantages of flaring, the degree of freedom of diffraction structure selection of the middle ring zone or outer ring zone can be improved, that is, higher efficiency can be obtained. In addition, the configuration itself can be simplified, and formation precision can be prevented from being deteriorated. Thus, with the configuration in which when being input to the incident side of the objective lens 34, the optical beam with the first wavelength is substantially parallel light, and the optical beams with the second and third wavelengths are divergent light, the objective lens 34 having the diffraction unit 50 can realize appropriate condensation of light of each wavelength on the signal recording surface of the corresponding optical disc in a state of high diffraction efficiency and no spherical aberration with a simpler configuration.

Note that, when the diffraction unit 50 is provided on a diffraction optical element 35B (see FIGS. 41A and 41B) separate from the objective lens as described below, the same advantages are obtained with a configuration in which, of the objective lens and the diffraction optical element provided with the diffraction unit, an element disposed on a side closer to the first to third emission units is configured such that, when being input to the incident side thereof, the optical beam with the first wavelength is substantially parallel light, and the optical beams with the second and third wavelengths are divergent light.

The objective lens 34 having the diffraction unit 50 such as described above is configured such that the diffraction orders ($k_{1i}$, $k_{2i}$, $k_{3i}$) selected by the first diffraction region 51 serving as an inner ring zone so as to be dominant and condensed on the signal recording surface of the corresponding optical disc through the objective lens 34 are (1, −1, −2), (0, −1, −2), (1, −2, −3), or (0, −2, −3). Accordingly, spherical aberration at each wavelength described from the first perspective for the inner ring zone can be reduced, the working distance and the focal distance at each wavelength described from the second perspective can be optimized, and an advantageous configuration in terms of manufacturing described from the third and fourth perspective can be realized. In addition, the diffraction efficiency of the diffraction orders selected for each wavelength can be set sufficiently high, the configuration with the staircase form can be realized, thereby suppressing the diffraction efficiency of unwanted light, and the diffraction efficiency of adjacent diffraction orders can be reduced, thereby minimizing adverse effects of unwanted light. Therefore, the objective lens 34 having the diffraction unit 50 can realize condensation of an appropriate spot on the signal recording surface of the corresponding optical disc with high light use efficiency using a more advantageous configuration taking into consideration a more specific configuration and the advantages of reduction in size and of the configuration.

The objective lens 34 having the diffraction unit 50 such as described above is configured such that when the diffraction orders ($k_{1i}$, $k_{2i}$, $k_{3i}$) selected by the first diffraction region 51 serving as an inner ring zone are as described above, the diffraction orders ($k_{1m}$, $k_{2m}$) selected by the second diffraction region 52 serving as a middle ring zone so as to be dominant and condensed on the signal recording surface of the corresponding optical disc through the objective lens 34 are (+1, +1), (−1, −1), (0, +2), (0, −2), (0, +1), (0, −1), (+1, 0), or (−1, 0). Accordingly, a configuration can be realized in a staircase form or non-cyclical form which is advantageous regarding diffraction efficiency, and thus the functions of the inner ring zone and the middle ring zone can be sufficiently manifested. That is, the objective lens 34 having the second diffraction region 52 thus configured is of a configuration in which matching the image point position according to the diffraction functions of the inner ring zone and the middle ring zone such as described from the second perspective for the middle ring zone is easier. Therefore, the optical beams with the first and second wavelengths input to the middle ring zone can be put in a state where the relation with the optical beam whose aberration is reduced with the inner ring zone as described above is optimal, and spherical aberration can be sufficiently reduced. Further, with the objective lens 34 having the second diffraction region 52, high diffraction efficiency can be obtained with respect to the first and second wavelengths in a state of spherical aberration having been corrected, aperture restriction can be appropriately performed with respect to the third wavelength, and an advantageous configuration in terms of manufacturing can be realized. As a result, the objective lens 34 having the diffraction unit 50 can realize condensation of an appropriate spot on the signal recording surface of the corresponding optical disc with high light use efficiency using a more advantageous configuration taking into consideration the advantages of the configuration.

The objective lens 34 having the diffraction unit 50 such as described above is configured such that when the diffraction orders ($k_{1i}$, $k_{2i}$, $k_{3i}$) selected by the first diffraction region 51 serving as an inner ring zone are as described above, the diffraction orders ($k_{1m}$, $k_{2m}$) selected by the second diffraction region 52 serving as a middle ring zone so as to be dominant and condensed on the signal recording surface of the corresponding optical disc through the objective lens 34 are (+3, +2), (−3, −2), (+2, +1), or (−2, −1). Accordingly, a configuration can be realized in a blazed form or non-cyclical form which is advantageous regarding diffraction efficiency, and thus the functions of the inner ring zone and the middle ring zone can be sufficiently manifested. That is, the objective lens 34 having the second diffraction region 52 thus configured is of a configuration in which matching the image point position according to the diffraction functions of the inner ring zone and the middle ring zone such as described from the second perspective for the middle ring zone is easier. Therefore, the optical beams with the first and second wavelengths input to the middle ring zone can be put in a state where the relation with the optical beam whose aberration is reduced with the inner ring zone as described above is optimal, and spherical aberration can be sufficiently reduced. Further, with the objective lens 34 having the second diffraction region 52, high diffraction efficiency can be obtained with respect to the first and second wavelengths in a state of spherical aberration having been corrected, aperture restriction can be appropriately performed with respect to the third wavelength, and an advantageous configuration in terms of manufacturing can be realized. As a result, the objective lens 34 having the diffraction unit 50 can realize condensation of an appropriate spot on the signal recording surface of the corresponding optical disc with high light use efficiency using a more advantageous configuration taking into consideration the advantages of the configuration.

The objective lens 34 having the diffraction unit 50 such as described above is configured such that when the diffraction orders ($k_{1i}$, $k_{2i}$, $k_{3i}$) selected by the first diffraction region 51 serving as an inner ring zone are as described above, the diffraction orders ($k_{1m}$, $k_{2m}$) selected by the second diffraction region 52 serving as a middle ring zone so as to be dominant and condensed on the signal recording surface of the corresponding optical disc through the objective lens 34 are (+1, −1) or (−1, +1). Accordingly, a configuration can be realized in a staircase form or non-cyclical form which is advantageous regarding diffraction efficiency. Further, the diffraction orders ($k_{1m}$, $k_{2m}$) are (+1, +1) or (−1, −1), so a configuration can be realized in a blazed form or non-cyclical form which is advantageous regarding diffraction efficiency. Thus, the functions of the inner ring zone and the middle ring zone can be sufficiently manifested. That is, the objective lens 34 having the second diffraction region 52 thus configured is used to along with a configuration in which the effects of unwanted light are reduced by a technique such as setting of the return magnification of the optical system of the optical pickup higher. Accordingly, the objective lens 34 having the second diffraction region 52 thus configured is of a configuration in which matching the image point position according to the diffraction functions of the inner ring zone and the middle ring zone such as described from the second perspective for the middle ring zone is easier. Therefore, the optical beams with the first and second wavelengths input to the middle ring zone can be put in a state where the relation with the optical beam whose aberration is reduced with the inner ring zone as described above is optimal, and spherical aberration can be sufficiently reduced. Further, with the objective lens 34 having the second diffraction region 52, high diffraction efficiency can be obtained with respect to the first and second wavelengths in a state of spherical aberration having been corrected, aperture restriction can be appropriately performed with respect to the third wavelength, and an advantageous configuration in terms of manufacturing can be realized. As a result, the objective lens 34 having the diffraction unit 50 can realize condensation of an appropriate spot on the signal recording surface of the corresponding optical disc with high light use efficiency using a more advantageous configuration taking into consideration the advantages of the configuration.

The diffraction unit 50 having the first to third diffraction regions 51, 52, and 53 is configured such that the optical beam with the third wavelength which passes through the second and third diffraction regions 52 and 53 results in diffracted light of a diffraction order with maximum diffraction efficiency and predetermined diffraction efficiency being flared and the imaging position is shifted from the signal recording surface, thereby reducing the diffraction efficiency of diffracted light of the diffraction order. Accordingly, with respect to the optical beam with the third wavelength, only the portion of the optical beam which has passed through the first diffraction region 51 is condensed on the signal recording surface of the optical disc by the objective lens 34. The first diffraction region 51 is formed to a size such that the optical beam with the third wavelength which passes therethrough is shaped to a size of a predetermined NA. Therefore, aperture restriction can be performed with respect to the optical beam with the third wavelength so as to have NA of around 0.45, for example.

The diffraction unit 50 is configured such that the optical beam with the second wavelength which passes through the third diffraction regions 53 results in diffracted light of a diffraction order output with maximum diffraction efficiency and predetermined diffraction efficiency being flared, thereby reducing the diffraction efficiency of diffracted light of the diffraction order. Accordingly, with respect to the optical beam with the second wavelength, only the portion of the optical beam which has passed through the first and second diffraction regions 51 and 52 is condensed on the signal recording surface of the optical disc by the objective lens 34. The first and second diffraction regions 51 and 52 are formed to a size such that the optical beam with the second wavelength which passes therethrough is shaped to a size of a predetermined NA. Therefore, aperture restriction can be performed with respect to the optical beam with the second wavelength so as to have NA of around 0.60, for example.

The diffraction unit 50 places the optical beam with the first wavelength passing through a region outside the third diffraction region 53 in a state of being not appropriately condensed on the signal recording surface of the corresponding type of optical disc by the objective lens 34 or shields the optical beam with the first wavelength passing through a region outside the third diffraction region 53. Accordingly, with regard to the optical beam with the first wavelength, only the portion of the optical beam which has passed through the first to third diffraction regions 51, 52, and 53 is condensed on the signal recording surface of the optical disc by the objective lens 34. The first to third diffraction regions 51, 52, and 53 are formed to a size such that the optical beam with the first wavelength which passes therethrough is shaped to a size of a predetermined NA. Therefore, aperture restriction can be performed with respect to the optical beam of the first wavelength so as to have NA of around 0.85.

Thus, the diffraction unit 50 provided on one surface of the objective lens 34 disposed on the optical path as described above not only realizes three-wavelength compatibility, but also enables the optical beam of each wavelength to be input to the common objective lens 34 in a state where aperture restriction is performed with a numerical aperture appropriate for each of the three types of optical discs and the optical beams with the first through third wavelengths. That is, the diffraction unit 50 has functions of aberration correction corresponding to the three wavelengths, but also serves as an aperture restriction unit.

It should be noted that a diffraction unit may be configured by suitably combining the diffraction regions in the above-described examples. That is, the diffraction order of each wavelength passing through each diffraction region can be selected as appropriate. In the event of changing the diffraction order of each wavelength passing through each diffraction region, the objective lens 34 may be configured to have a lens curved surface corresponding to each diffraction order of each wavelength passing through each diffraction region.

The objective lens 34 having the diffraction unit 50 is configured such that the cyclical number $N_i$ of the diffraction cyclical structure in the inner ring zone has the relation of Expression (20) described below, and the cyclical number $N_m$ of the diffraction cyclical structure in the middle ring zone has the relation of Expression (21) described below. Therefore, interference of unwanted light and regular light can be avoided, the amount of diffracted light of unwanted light can be suppressed, and jitter and the like can be prevented from being deteriorated due to unwanted light being received by the photoreceptor portion. Further, even if the amount of diffracted light of unwanted light occurs to a certain degree, the diffraction order of unwanted light is made to be a deviated diffraction order having a great diffraction angle difference other than adjacent diffraction orders of focus light, such that jitter and the like can be prevented from being deteriorated due to unwanted light being condensed at the time of focus. Therefore, a sufficient optical spot at the time of playback/recording can be formed.

$$N_{1i} \geq 4 \qquad (20)$$

$$N_{1m} \geq 3 \qquad (21)$$

The objective lens 34 having the diffraction unit 50 is configured such that when the radius of the first diffraction region 51 is 0.99 mm, the cyclical number $N_i$ of the diffraction cyclical structure of the first diffraction region 51 has the relation of Expression (29) described below, and when the radius of the second diffraction region 52 is 1.43 mm, the cyclical number $N_m$ of the diffraction cyclical structure of the second diffraction region 52 has the relation of Expression (31) described below. Therefore, deterioration in efficiency at the time of forming a diffraction cyclical structure can be avoided, return coupling efficiency $I_{all}$ from the objective lens 34 can be ensured 60% or greater, and sufficient diffraction efficiency can be obtained.

$$N_i \leq 39 \qquad (29)$$

$$N_m \leq 25 \qquad (31)$$

Accordingly, the objective lens 34 having the diffraction unit 50 is configured such that the cyclical number $N_i$ of the diffraction cyclical structure in the inner ring zone has the relation of Expression (58) described below, and the cyclical number $N_m$ of the diffraction cyclical structure in the middle ring zone has the relation of Expression (59) described below. Therefore, interference of unwanted light and regular light can be avoided, the amount of diffracted light of unwanted light can be suppressed, and jitter and the like can be prevented from being deteriorated due to unwanted light being received by the photoreceptor portion. Further, even if the amount of diffracted light of unwanted light occurs to a certain degree, the diffraction order of unwanted light is made to be a deviated diffraction order having a great diffraction angle difference other than adjacent diffraction orders of focus light, such that jitter and the like can be prevented from being deteriorated due to unwanted light being condensed at the time of focus. Therefore, a sufficient optical spot at the time of playback/recording can be formed. Deterioration in efficiency at the time of diffraction grating formation can be avoided, return coupling efficiency $I_{all}$ from the objective lens can be ensured 60% or greater, and sufficient diffraction efficiency can be obtained.

$$4 \leq N_i \leq 39 \qquad (58)$$

$$3 \leq N_m \leq 25 \qquad (59)$$

The objective lens 34 having the diffraction unit 50 is configured such that even though the radius of the first diffraction region 51 differs from 0.99 mm described above, at least the height $d_i$ of each step and the average pitch $p_i$ of the first diffraction region 51 has the relation of Expression (32). Therefore, deterioration in efficiency at the time of forming a diffraction cyclical structure can be avoided, return coupling efficiency $I_{all}$ from the objective lens 34 can be ensured 60% or greater, and sufficient diffraction efficiency can be obtained.

The objective lens 34 having the diffraction unit 50 is configured such that even though the radius of the second diffraction region 52 differs from 1.43 mm described above, at least the height $d_m$ of each step and the average pitch $p_m$ of the second diffraction region 52 has the relation of Expression (33). Therefore, deterioration in efficiency at the time of forming a diffraction cyclical structure can be avoided, return coupling efficiency $I_{all}$ from the objective lens 34 can be ensured 60% or greater, and sufficient diffraction efficiency can be obtained.

The objective lens 34 having the diffraction unit 50 is configured such that the first diffraction region 51 and the second diffraction region 52 have the relations of Expressions (54a) and (54b), thereby adjusting the on-axial aberration amount appropriately and reducing the aberration amount at the time of temperature change.

The objective lens 34 having the diffraction unit 50 is configured such that the first diffraction region 51 and the second diffraction region 52 have the relation of Expression (53), thereby adjusting the on-axial aberration amount appropriately and reducing the aberration amount at the time of temperature change.

The objective lens 34 having the diffraction unit 50 is configured such that the combinations of the diffraction orders $k_{1i}$ and $k_{2i}$ of each wavelength in the first diffraction region 51 and the diffraction orders $k_{1m}$ and $k_{2m}$ of each wavelength in the second diffraction region 52 satisfy Expression (54a) and have the relation of Expression (57). Accordingly, with the third diffraction region 53, the diffraction orders $k_{3i}$ and $k_{3m}$ of each wavelength are identical, or with the middle ring zone, efficiency is obtained after $k_{3m}$ and $k_{3m}'$ becomes identical to $k_{3i}$. Therefore, aperture restriction can be prevented from being not appropriately performed in the outer ring zone, thereby adjusting the on-axial aberration amount appropriately and reducing the aberration amount at the time of temperature change.

Now, an example where an outer ring zone is formed as an aspheric continuous surface instead of the third diffraction region 53 of the diffraction unit 50 will be described with reference to FIGS. 30A and 30B. That is, an example where a diffraction unit 90 includes the first and second diffraction regions 51 and 52, and a third region 80 formed as an aspheric continuous surface outside the second diffraction region 52 will be described with reference to FIGS. 30A and 30B. Note that the diffraction unit 90 is the same as the diffraction unit 50 except that the third region 80 is formed in the portion corresponding to the third diffraction region 53 of the diffraction unit 50. Accordingly, the same parts are represented by the same reference numerals, and details thereof will be omitted. In the diffraction unit 90, as described, the second diffraction region 52B may be used instead of the second diffraction region 52.

Similarly to the objective lens 34 having the diffraction unit 50, an objective lens 34C having the diffraction unit 90 is configured such that, with the diffraction unit 90, each of the optical beams with the first to third wavelengths passing through each of a plurality of diffraction regions 51 and 52 is diffracted so as to become a predetermined order, thereby entering the objective lens 34C as an optical beam in a diffused state or a converged state having a predetermined divergent angle and being subjected to a predetermined operation by the third region 80 described below. Accordingly, the single objective lens 34C can be used to appropriately condense the optical beams with the first to third wavelengths on the signal recording surfaces of the three types of optical discs corresponding to the optical beams such that no spherical aberration occurs. The objective lens 34C having the diffraction unit 90 has a diffraction structure which generates diffraction power with a lens surface shape as reference, and thus the objective lens 34C functions as a condensing optical device to appropriately condense the optical beams with the three different wavelengths onto the signal recording surfaces of the optical discs corresponding to the optical beams such that no spherical aberration occurs. Therefore, the objective lens 34C having the diffraction unit 90 has a refraction element function and a diffraction element function, that is, has a refraction function according to a lens curved surface and a diffraction function according to the diffraction unit 90 provided on one surface.

Figures 30A, 30B:
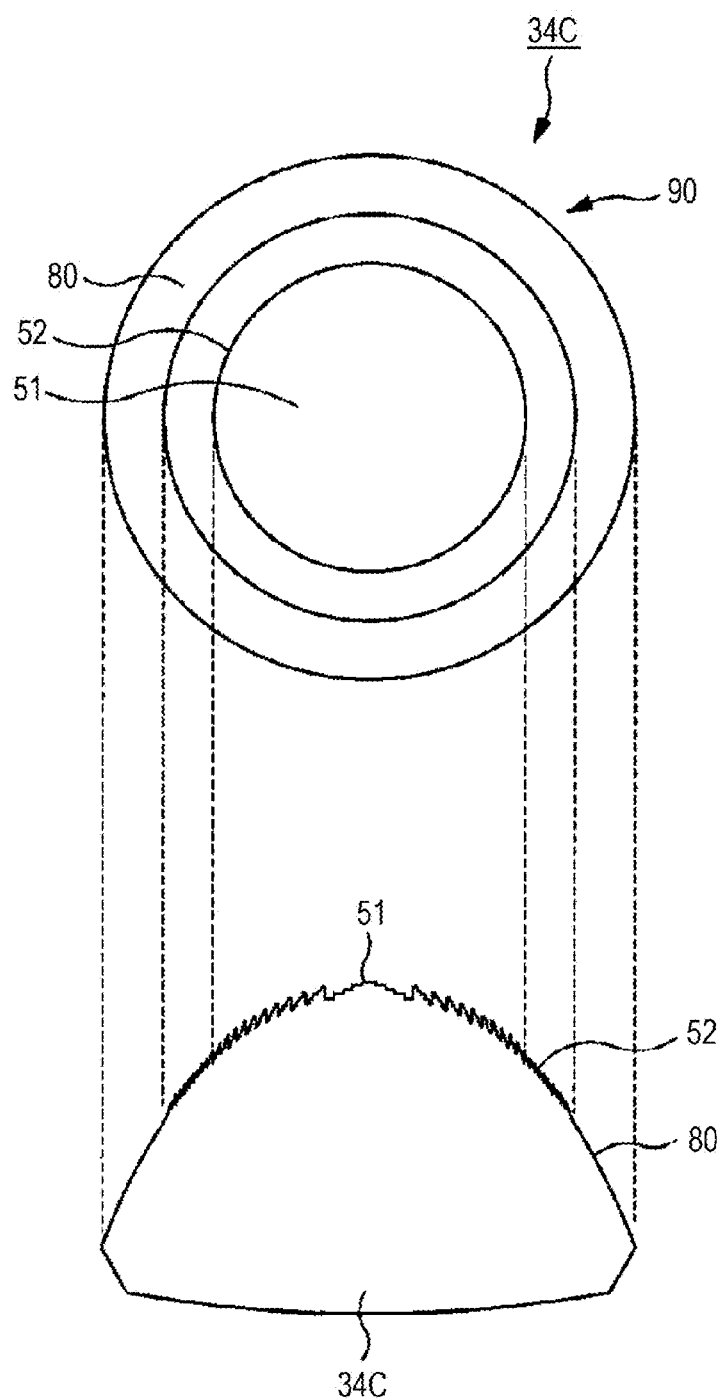
FIGS. 30A and 30B are diagrams illustrating an example where an outer ring zone is formed as an aspheric continuous surface, as another example of the objective lens constituting the optical pickup shown in FIG. 37, specifically.

Specifically, as shown in FIGS. 30A and 30B, the diffraction unit 90 provided on the incident side surface of the objective lens 34C has a substantially circular first diffraction region (inner ring zone) 51, serving as a first region, provided on the innermost portion to diffract an optical beam, a ring zone-shaped second diffraction region (middle ring zone) 52, serving as a second region, provided outside the first diffraction region 51 to diffract an optical beam, and a ring zone-shaped third region (hereinafter, also referred to as "outer ring zone") 80 provided outside the second diffraction region 52.

The third region 80 which is an outer ring zone is formed as a ring zone-shaped aspheric continuous surface having a predetermined refraction operation, and is configured to refract the optical beam with the first wavelength which passes therethrough so as to concentrate and form an appropriate spot on the signal recording surface of the first optical disc.

With the aspheric continuous surface, the third region 80 refracts the optical beam with the second wavelength which passes therethrough so as not to form an appropriate spot on the signal recording surface of the second optical disc. That is, the third region 80 places the optical beam with the second wavelength in a state so as not to be condensed on the signal recording surface of the second optical disc. In other words, the third region 80 refracts the optical beam with the second wavelength so as to be in a state defocused or condensed at a position deviated from the signal recording surface of the second optical disc, or in a state diverged and not condensed.

With the aspheric continuous surface, the third region 80 refracts the optical beam with the third wavelength which passes therethrough so as not to form an appropriate spot on the signal recording surface of the third optical disc. That is, the third region 80 places the optical beam with the third wavelength in a state so as not to be condensed on the signal recording surface of the third optical disc. In other words, the third region 80 refracts the optical beam with the third wavelength so as to be in a state defocused or condensed at a position deviated from the signal recording surface of the third optical disc.

Thus, the third region 80 is formed as an aspheric continuous surface which provides the above-described operation, so spherical aberration when the optical beam with the first wavelength having passed through the third region 80 is condensed on the signal recording surface of the first optical disc can be corrected and reduced. With regard to the optical beam with the second wavelength, the third region 80 does not perform condensation on the signal recording surface of the corresponding optical disc, and can exhibit an aperture restriction function. With regard to the optical beam with the third wavelength, the third region 80 does not perform condensation on the signal recording surface of the corresponding optical disc, and can exhibit an aperture restriction function along with the above-described diffraction region 52. The third region 80 is formed outside the second diffraction region 52 configured to perform aperture restriction such that the optical beam with the second wavelength is shaped to have a numerical aperture NA of around 0.6. The third region 80 is formed to a size such that the optical beam with the first wavelength having passed therethrough is subjected to aperture restriction at around NA=0.85. Note that, in a region outside the third region 80, a shield portion for shielding an optical beam passing through is provided, a diffraction region is provided such that an optical beam of an order other than an order of an optical beam which passes therethrough and is condensed on the first optical disc through the objective lens 34C is dominant, or a refraction surface is provided such that the optical beam with the first wavelength which passes therethrough is not condensed on the signal recording surface on the first optical disc, thereby performing aperture restriction. The numerical aperture restricted by the above-described configuration is not limited to this.

Specifically, the third region 80 is formed in an aspheric shape as expressed by Expression (60) described below. Note that with regard to the first and second diffraction regions 51 and 52, the reference surface at which the diffraction structure is formed is in an aspheric shape which is expressed by Expression (60), and the diffraction structure is formed on the aspheric reference surface. With regard to the third diffraction region 53 of the diffraction unit 50, the reference surface at which the diffraction structure is formed is in an aspheric shape which is expressed by Expression (60), and the diffraction structure is formed on the aspheric reference surface. For Expression (60), h represents the height from the optical axis, that is, the position in the radial direction, and z represents the sag amount parallel to the optical axis at the position h, that is, a distance from the tangential plane of the surface apex at the position h. The sag amount represented by z indicates the lens surface shape in the third region 80 where there is no diffraction structure. Also, c represents the curvature, that is, the reciprocal of the radius of curvature, κ represents a cone coefficient (aspheric coefficient), and A4, A6, A8, A10 . . . represent aspheric coefficients.

$$z = \Delta z + \frac{ch^2}{1 + \sqrt{1-(1+\kappa)c^2h^2}} + A_4 h^4 + A_6 h^6 + A_8 h^8 + A_{10} h^{10} + \ldots + \quad (60)$$

Figure 31:
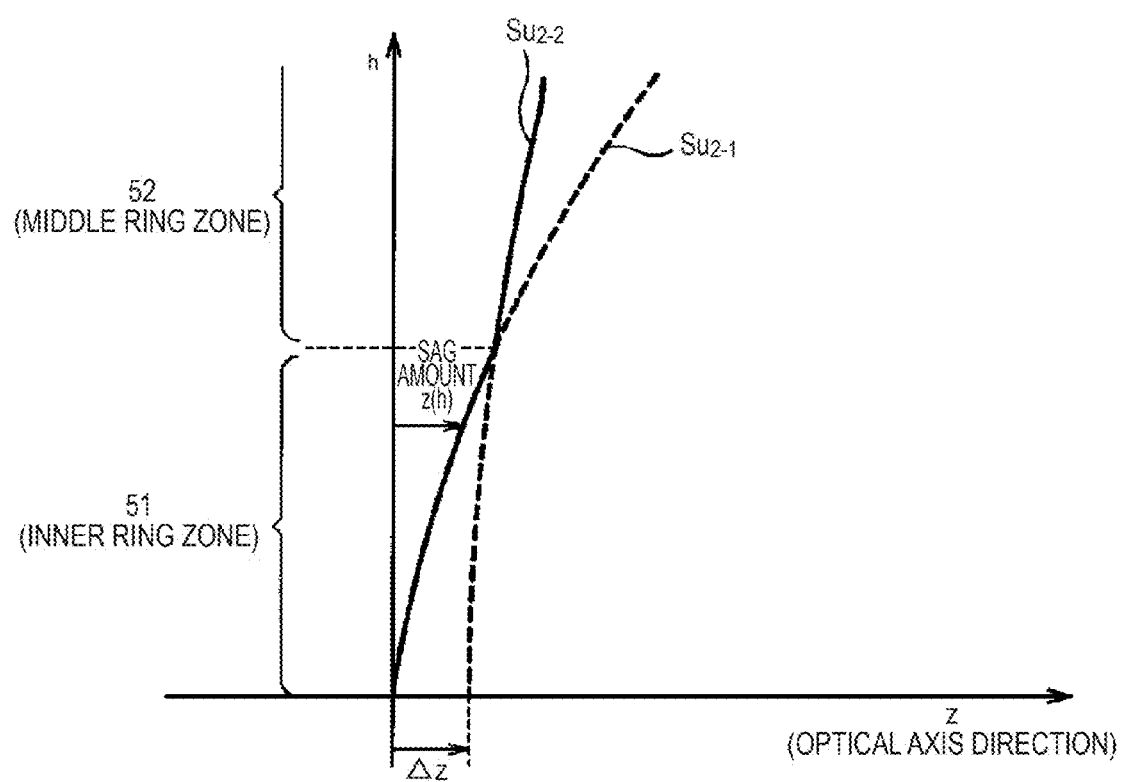
FIG. 31 is a diagram illustrating an on-axial surface distance of an aspheric surface as the reference of the inner ring zone, the middle ring zone, and the outer ring zone in the diffraction unit of the objective lens.

For Expression (60), Δz represents the on-axial distance from a surface 2-1 with the surface 2-1 representing the reference surface of the inner ring zone as reference. That is, when the inner ring zone reference surface is the surface 2-1, and the middle ring zone reference surface is a surface 2-2, and the outer ring zone reference surface is a surface 2-3, it should be understood that, with the apex position of the surface 2-1 serving as the inner ring zone reference surface as origin, the surface 2-2 serving as the middle ring zone reference surface and the surface 2-3 serving as the outer ring zone reference surface are formed to be offset by Δz from the origin. With respect to "the outer ring zone reference surface", while in the case of the outer ring zone 53, a diffraction structure is formed on the reference surface, in the case of the outer ring zone 80 described here, "the outer ring zone reference surface" itself becomes the surface shape of the outer ring zone. For example, the on-axial surface distance Δz with respect to the surface 2-2 is as shown in FIG. 31. Note that in FIG. 31, Su2-1 represents the surface 2-1 which is the reference surface of the inner ring zone 51, and Su2-2 represents the surface 2-2 which is the reference surface of the middle ring zone 52. The horizontal axis represents the sag amount z in the optical axis direction, h represents the position in the radial direction, and z(h) represents the sag amount at each position in the radial direction, which is described as z for Expression (60). In FIG. 31, a solid-line portion represents the reference surface which is formed by Su2-1 and Su2-2, and a broken-line portion represents an extended portion of Su2-1 and Su2-2. In FIG. 31, Δz represents the on-axis distance between the apex of the surface 2-1 and the apex of the surface 2-2. Note that an intersection of the surface 2-1 and the surface 2-2 becomes a boundary between the inner ring zone and the middle ring zone, but the invention is not limited this. For example, the boundary is formed such that an optical beam can be appropriately condensed on the signal recording surface of each optical disc taking into consideration aberration or diffraction efficiency. In other words, the threshold value of the boundary between the inner ring zone and the middle ring zone is determined by h which represents the position in the radial direction. As described above, when the surface 2-1 and the surface 2-2 do not intersect at the boundary which is determined by h, the reference surfaces of the inner ring zone and the middle ring zone are formed with minute steps. In the above description, the relation between the inner ring zone and the middle ring zone has been described, the relations between the outer and inner ring zones and the middle ring zone are as described above. With the outer ring zone, Δz is also determined according to the relation with the apex of the inner ring zone in the same manner as described above.

Figure 39:
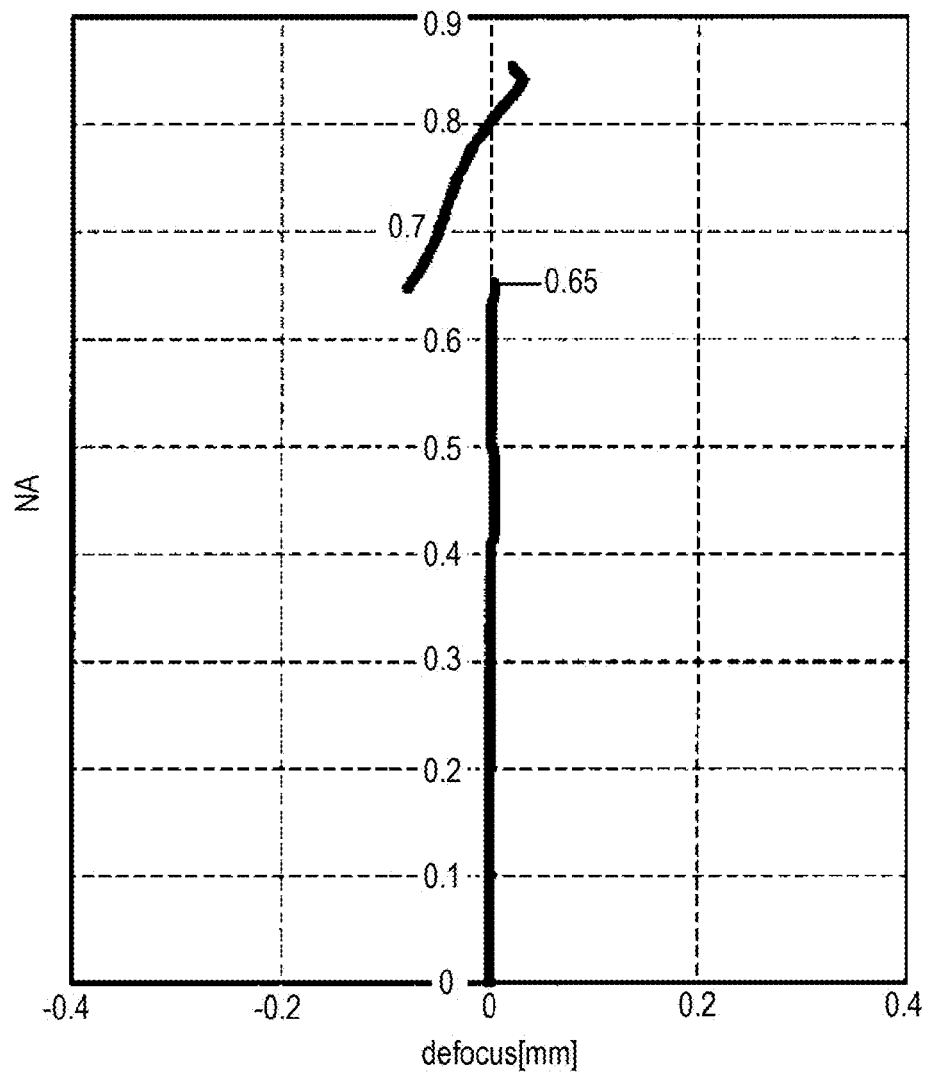
FIG. 39 is a diagram illustrating Example 15 and a longitudinal aberration diagram of the second optical disc.

In the first diffraction region 51 serving as an inner ring zone or the second diffraction region 52 serving as a middle ring zone described with reference to FIGS. 39 and 30, or in the third diffraction region 53 serving as an outer ring zone described with reference to FIG. 39, a phase difference Φ according to the diffraction structure provided on the aspheric reference surface is represented by Expression (61) described below. Expression (61) uses a phase difference function coefficient $C_i$, and for Expression (61), k represents a diffraction order at each of the wavelengths $\lambda_1$, $\lambda_2$, and $\lambda_3$, and specifically represents $k_1$, $k_2$, and $k_3$, h represents a position in the radial direction, and $\lambda_0$ represents a manufacturing wavelength. Note that Φ described here defines a phase difference when assuming that an extremely thin film having a high refractive index is provided on the aspheric lens shape. In the actual formation of the lens diffraction surface, the lens diffraction surface is formed according to the sequence of FIG. 46, but if a concavo-convex shape as a diffraction structure is formed on the lens surface as it is, in the case of an optical path which travels obliquely with respect to the optical axis, an optical path difference fluctuates, and thus the diffraction surface is formed after fine correction is performed.

$$\Phi = k \sum_{n=1} \frac{C_n r^{2n}}{\lambda_0} \quad (61)$$

Next, a description will be made regarding Example 15 by listing specific numerical values regarding the objective lens that includes the diffraction unit 90 having the first and second diffraction regions 51 and 52 and the third region 80. For comparison with Example 15, Examples 13 and 14 in which the diffraction unit 50 has the first to third diffraction regions 51, 52, and 53 will also be described. Hereinafter, as such examples, Example 13 shown in Table 8, Example 14 shown in Table 9, and Example 15 shown in Table 10 will be described.

In Tables 8 to 10 described below, as media type, a first optical disc, such as BD or the like, a second optical disc, such as DVD or the like, and a third optical disc, such as CD or the like, are shown. Wavelength, protective layer thickness, focal distance f, NA, and incidence magnification are also shown in Tables. A surface number represents the number of each surface, that is, zero surface represents the position of the light source, and infinite (∞) represents parallel light incidence. If not infinite, this means that light is input from a slight oblique direction. A surface 1 represent a stop surface, and the stop diameter is the diameter of the first optical disc (BD or the like) having maximum aperture, and is around φ3.26 mm. With regard to the second and third optical discs, the aperture restriction function according to the middle ring zone or the outer ring zone functions as a so-called self aperture, and the aperture is restricted to around the numerical values in Tables by the aperture restriction function. The surface 2-1, the surface 2-2, and the surface 2-3 represent the inner ring zone, the middle ring zone, and the outer ring zone, respectively. An actual lens has one surface, but it is configured as described with reference to FIG. 31. A surface 3 represents an output surface of the objective lens. A surface 4 represents a distance from the objective lens to the surface of the optical disc, and represents a so-called working distance (WD). A surface 5 represents an optical disc, and has a refractive index according to the wavelength and a protective layer thickness which differs according to the media type. Each of the refractive indexes nλ1, nλ2, and nλ3 at the respective surfaces represents a refractive index backward from the corresponding surface, and each of the surface spacings dλ1, dλ2, and dλ3 at the respective surfaces represents a distance from the corresponding surface to the next surface. Also, ri (where i=2-1, 2-2, 2-3, 3) represents the radius of curvature of each surface. The surface spacing dλ1 of the first optical disc, such as BD or the like, the refractive index nλ1 as to the first wavelength, the surface spacing dλ2 of the second optical disc, such as DVD or the like, the refractive index nλ2 as to the second wavelength, the surface spacing dλ3 of the third optical disc, such as CD or the like, and the refractive index nλ3 as to the third wavelength are shown. In Tables 8 to 10, h is shown as region (mm), and aspheric coefficients k, A4, A6, A8, diffraction order, manufacturing wavelength (nm), phase difference function coefficient $C_n$, and "on-axial surface distance from surface 2-1" are also shown. With regard to the diffraction order, for example, "1/−1/−2" at the surface 2-1 represents that with the inner ring zone, 1st order as to the first wavelength, −1st order as to the second wavelength, and −2nd order as to the third wavelength are selected so as to be dominant as described above. Also, "0/−1" at the surface 2-2 represents that with the middle ring zone, zero order as to the first wavelength, and −1st order as to the second wavelength are selected so as to be dominant as described. Also, "4" at the surface 2-3 represents that with the outer ring zone, 4th order as to the first wavelength is selected so as to be dominant. In Table 10, the surface 2-3 of the outer ring zone is formed as a diffraction surface, and thus it is blank. The on-axial surface distance from the surface 2-1 represents Δz in Expression (60), and at the surface 2-1, it is 0, and at the surface 3, it represents the thickness of the lens on the optical axis.

Figure 32:
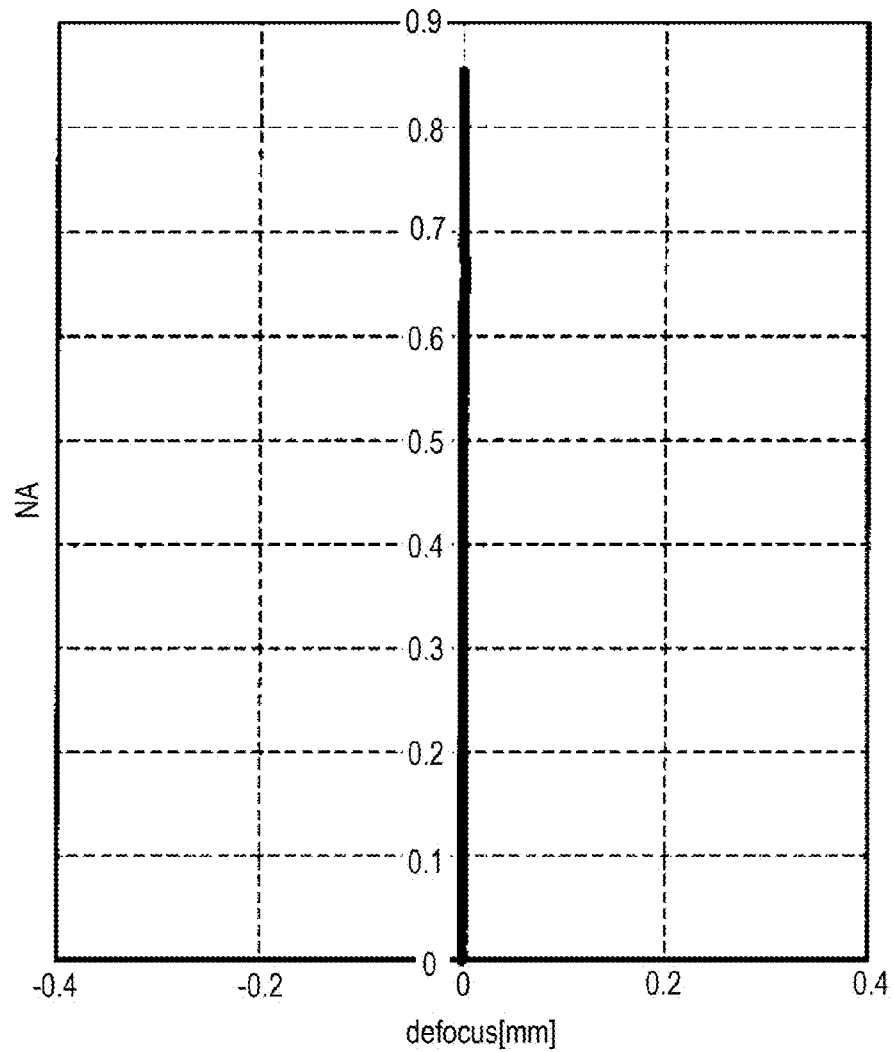
FIG. 32 is a diagram illustrating Example 13 and a longitudinal aberration diagram of the first optical disc.
Figure 33:
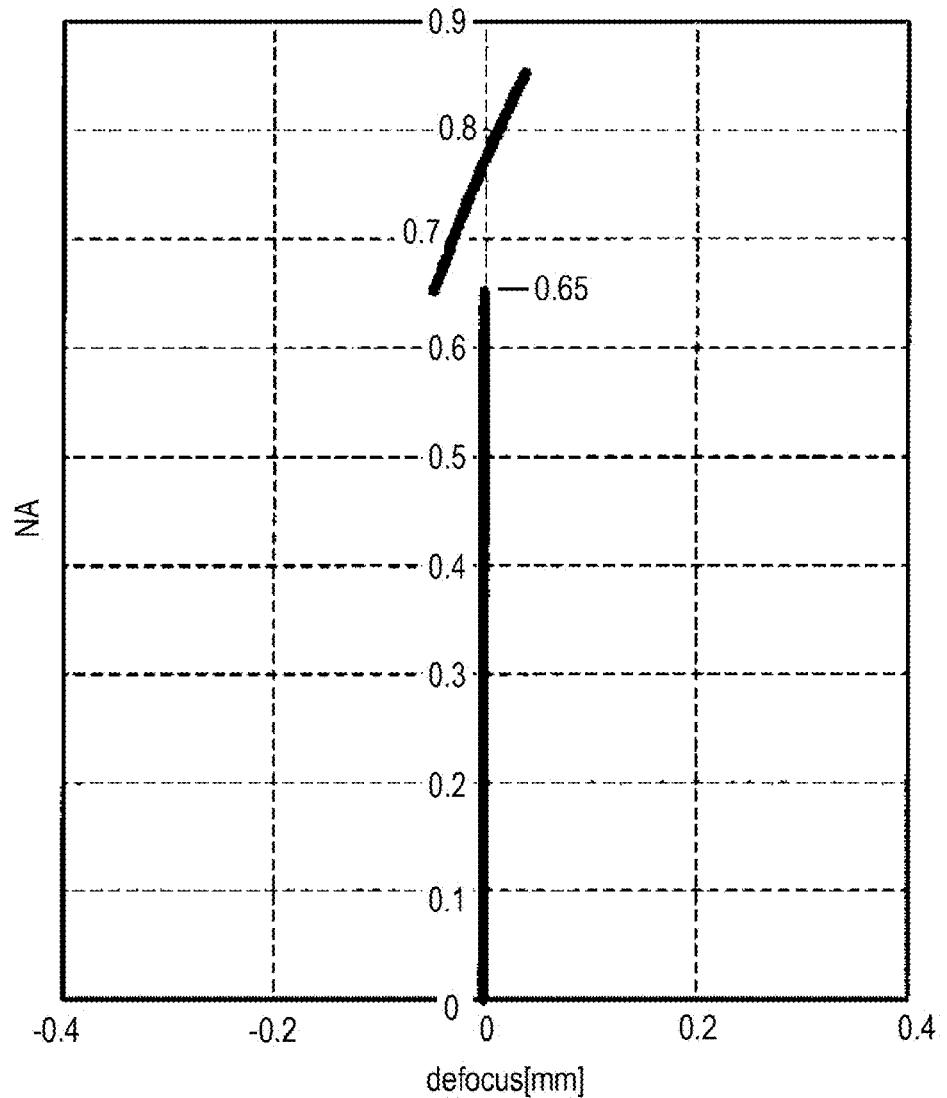
FIG. 33 is a diagram illustrating Example 13 and a longitudinal aberration diagram of the second optical disc.
Figure 34:
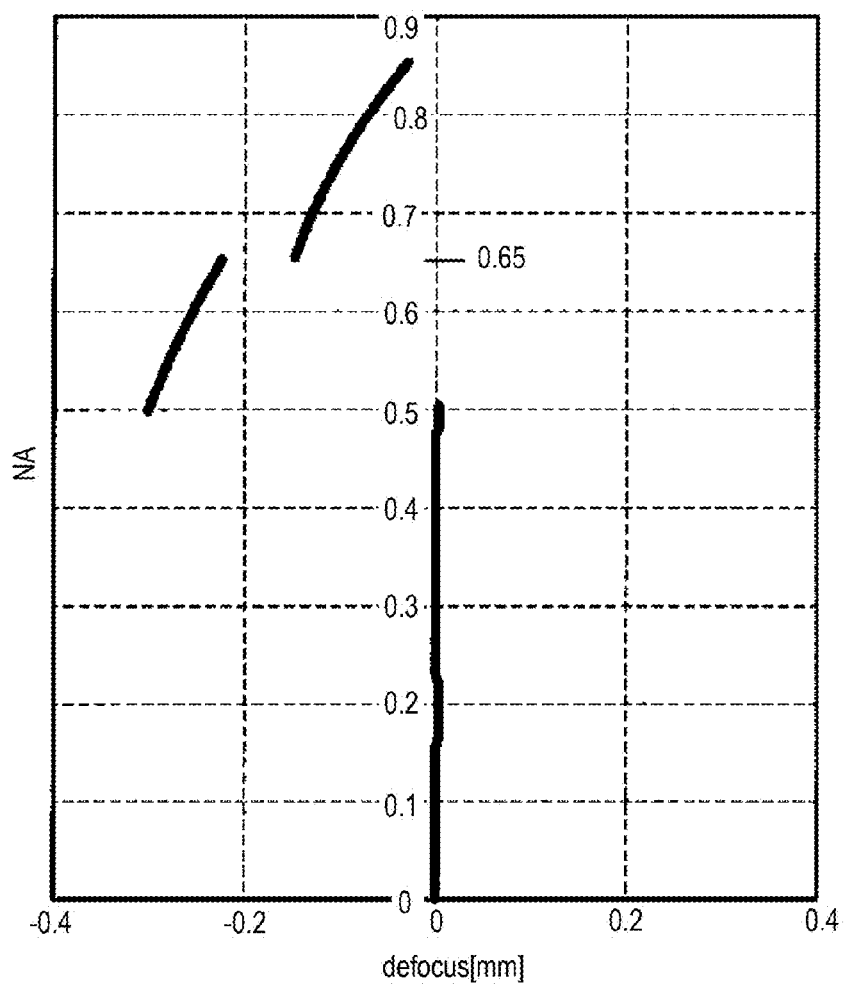
FIG. 34 is a diagram illustrating Example 13 and a longitudinal aberration diagram of the third optical disc.

First, a description will be made regarding Example 13 shown in Table 8. Example 13 corresponds to the diffraction unit 50 having the third diffraction region 53. FIGS. 32 to 34 show a longitudinal aberration diagram corresponding to Example 13. In FIGS. 32 to 34, and FIGS. 35 to 40 described below, the vertical axis represents NA, and the horizontal axis represents defocus (mm). Here, NA is obtained by conversion according to the wavelength of the first optical disc, such as BD or the like, that is, the first wavelength. That is, conversion is made using the relation $NA_1 \times f_1 = NA_2 \times f_2 = NA_3 \times f_3$. $NA_1$, $NA_2$, and $NA_3$ represent the numerical apertures NA of the first to third optical discs, respectively, $f_1$, $f_2$, and $f_3$ represent the focal distances at the first to third wavelengths corresponding to the first to third optical discs, respectively. If this relation is used, the numerical aperture at the second wavelength as to the second optical disc, such as DVD or the like, is around 0.65 at the time of conversion according to the first wavelength. Similarly, the numerical aperture at the third wavelength as to the third optical disc, such as CD or the like, is around 0.5 at the time of conversion according to the first wavelength.

Figure 35:
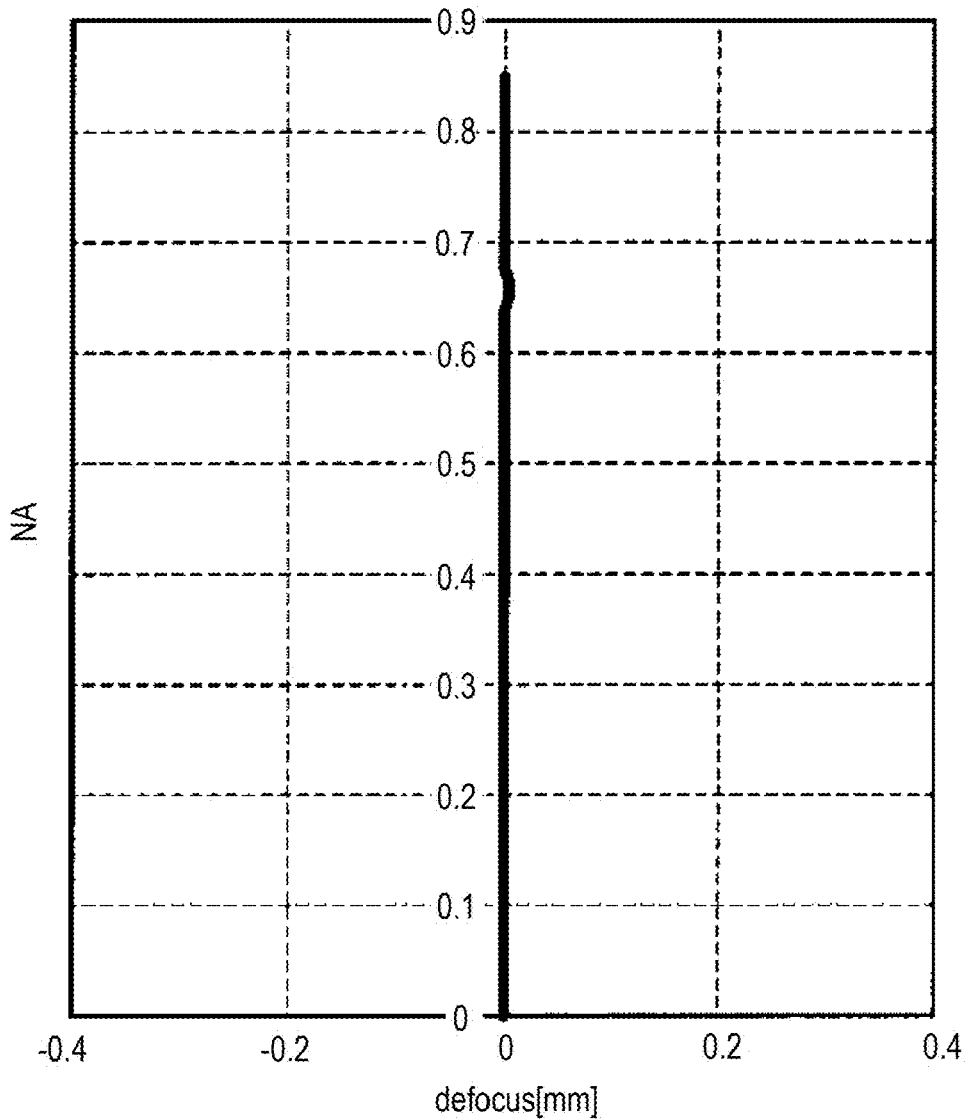
FIG. 35 is a diagram illustrating Example 14 and a longitudinal aberration diagram of the first optical disc.

In Example 13, FIG. 32 shows that, at the first wavelength as to the first optical disc, such as BD or the like, an image is formed with substantially no aberration. FIG. 33 shows that, at the second wavelength as to the second optical disc, such as DVD or the like, NA is around 0.65, there is no aberration, and an image is blurred on the outer side. This is because, in the longitudinal aberration diagram of FIG. 34, the imaging position is shifted by ±0.05 mm. While an image remains somewhat, the diffraction efficiency of the second wavelength is around 60% (see FIG. 9B), so it can be said that an image is formed with a problem. That is, in a portion outside the aperture of the second wavelength as to the second optical disc, an aperture restriction function is appropriately manifested. FIG. 35 shows that, at the third wavelength as to the third optical disc, such as CD or the like, an image is completely off outside around NA0.5, that is, indicates that the aperture restriction function is appropriately manifested.

Figure 36:
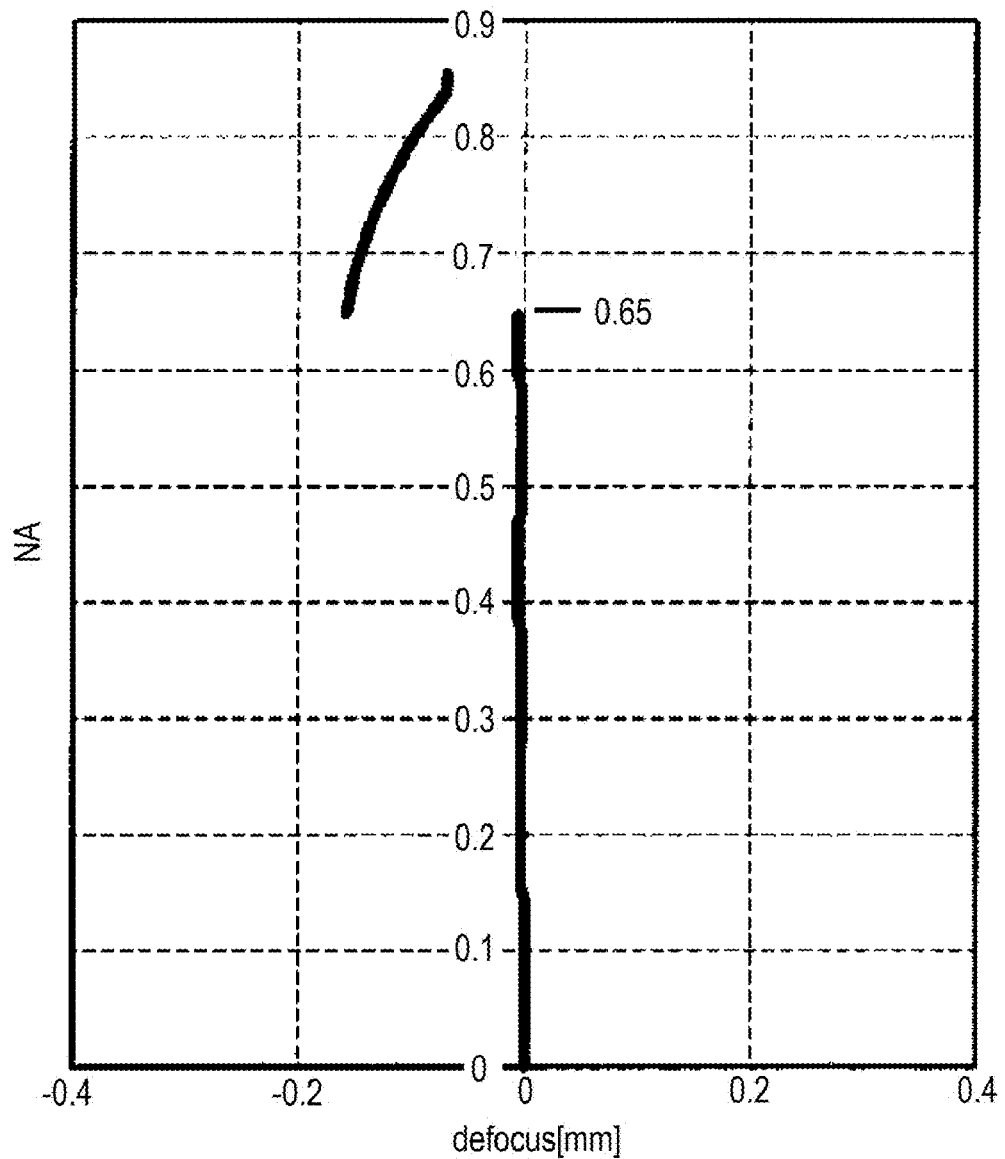
FIG. 36 is a diagram illustrating Example 14 and a longitudinal aberration diagram of the second optical disc.
Figure 37:
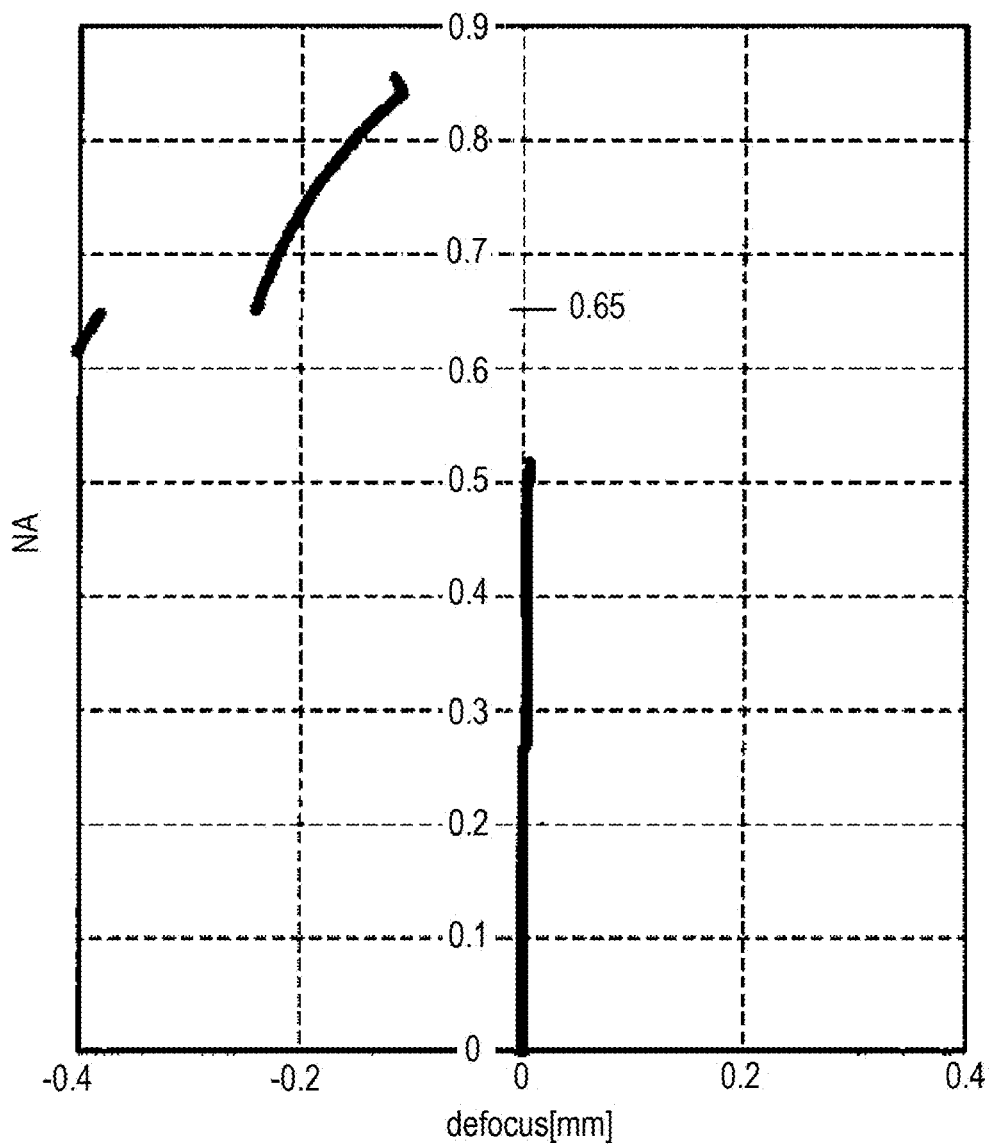
FIG. 37 is a diagram illustrating Example 14 and a longitudinal aberration diagram of the third optical disc.

Next, a description will be made regarding Example 14 shown in Table 9. FIGS. 35 to 37 show a longitudinal aber-

TABLE 8

Example 13

| Media Type | First Optical Disc | Second Optical Disc | Third Optical Disc |
|---|---|---|---|
| Wavelength λ[nm] | 405.7 | 659.9 | 785 |
| Media Protective Layer Thickness [mm] | 0.0875 | 0.6 | 1.1 |
| Focal Distance f [mm] | 1.92 | 2.06 | 2.16 |
| NA | 0.85 | 0.60 | 0.44 |
| Incident Magnification | 0 | −1/60 | −1/60 |

| Surface Number | ri | Surface Spacing dλ1 | Refractive Index nλ1 | Surface Spacing dλ2 | Refractive Index nλ2 | Surface Spacing dλ3 | Refractive Index nλ3 |
|---|---|---|---|---|---|---|---|
| 0 | | ∞ | | 125.2 | | 131.3 | |
| 1 (Stop Diameter) | | 0 (φ3.26) | | 0 (φ2.5) | | 0 (φ1.92) | |
| 2-1 | 1.241 | 2.104 | 1.525 | 2.104 | 1.508 | 2.104 | 1.5033 |
| 2-2 | 1.258 | | | | | | |
| 2-3 | 1.309 | | | | | | |
| 3 | −2.451 | | | | | | |
| 4 | | 0.714 | | 0.595 | | 0.410 | |
| 5 | | 0.0875 | 1.5716 | 0.6 | 1.5781 | 1.1 | 1.6172 |

| | | Surface Number | | | |
|---|---|---|---|---|---|
| | | 2-1 | 2-2 | 2-3 | 3 |
| Region | | h ≦ 0.96 | 0.96 < h ≦ 1.25 | 1.25 < h | |
| Aspheric Surface Coefficient | κ | −1.8239E−01 | −5.2693E−01 | −6.4686E−01 | −4.6024E+01 |
| | A4 | −1.5797E−02 | 2.8690E−02 | 3.5393E−02 | 5.6389E−02 |
| | A6 | −1.0585E−02 | −8.3849E−03 | −5.5266E−03 | −2.3816E−02 |
| | A8 | −3.2480E−03 | −1.8048E−03 | −2.0610E−03 | 5.4012E−03 |
| | A10 | −1.0776E−03 | 2.9783E−03 | 8.0154E−04 | −5.6487E−04 |
| | A12 | −1.5190E−03 | −5.1641E−04 | 9.6210E−05 | −1.5030E−05 |
| | A14 | | −2.5260E−05 | −1.8542E−05 | |
| | A16 | | | | |
| | A18 | | | | |
| | A20 | | | | |
| | A22 | | | | |
| Optical Path Difference Function Coefficient | Diffraction Order | 1/−1/−2 | 0/−1 | 4 | |
| | Manufacturing Wavelength [nm] | 710 | 710 | 710 | |
| | C1 | −1.0312E−02 | −1.5976E−02 | 0.00060568 | |
| | C2 | 1.1642E−03 | 4.6087E−04 | −0.0015183 | |
| | C3 | −5.1215E−04 | 0.0000E+00 | −0.00095588 | |
| | C4 | | 0.0000E+00 | | |
| | C5 | | 3.0049E−05 | | |
| On-Axial Surface Distance from 2-1 Surface | | 0.0000 | 0.0050 | 0.0170 | 2.1037 | ration diagram corresponding to Example 14. Example 14 corresponds to the diffraction unit 50 having the third diffraction region 53.

TABLE 9

Example 14

| Media Type | First Optical Disc | Second Optical Disc | Third Optical Disc |
|---|---|---|---|
| Wavelength λ[nm] | 405.7 | 659.9 | 785 |
| Media Protective Layer Thickness [mm] | 0.0875 | 0.6 | 1.1 |
| Focal Distance f [mm] | 1.92 | 2.10 | 2.20 |
| NA | 0.85 | 0.60 | 0.44 |
| Incident Magnification | 0 | −1/59.9 | −1/59.5 |

| Surface Number | ri | Surface Spacing dλ1 | Refractive Index nλ1 | Surface Spacing dλ2 | Refractive Index nλ2 | Surface Spacing dλ3 | Refractive Index nλ3 |
|---|---|---|---|---|---|---|---|
| 0 | ∞ | | | 124.1 | | 128.9 | |
| 1 (Stop Diameter) | | 0 (φ3.26) | | 0 (φ2.5) | | 0 (φ2.0) | |
| 2-1 | 1.254 | 2.301 | 1.525 | 2.301 | 1.508 | 2.301 | 1.5033 |
| 2-2 | 1.228 | | | | | | |
| 2-3 | 1.232 | | | | | | |
| 3 | −2.035 | | | | | | |
| 4 | | 0.619 | | 0.575 | | 0.408 | |
| 5 | | 0.0875 | 1.5716 | 0.6 | 1.5781 | 1.1 | 1.6172 |

| | | Surface Number | | | |
|---|---|---|---|---|---|
| | | 2-1 | 2-2 | 2-3 | 3 |
| Region | | h ≦ 1 | 1 < h ≦ 1.25 | 1.25 < h | |
| Aspheric Surface Coefficient | κ | −6.8639E−01 | −6.7794E−01 | −6.7356E−01 | −2.2832E+01 |
| | A4 | 1.2544E−02 | 1.3953E−02 | 1.3918E−02 | 1.4097E−01 |
| | A6 | 3.6166E−03 | 2.5664E−03 | 3.3551E−03 | −1.2723E−01 |
| | A8 | 3.6769E−05 | 1.3282E−05 | 5.2136E−04 | 5.5675E−02 |
| | A10 | 6.0873E−04 | 5.6145E−04 | 7.4504E−04 | −9.8395E−03 |
| | A12 | −6.6296E−05 | 9.6116E−05 | 1.9597E−05 | |
| | A14 | | 4.0008E−05 | −2.2850E−05 | |
| | A16 | | −2.9078E−05 | −1.8260E−05 | |
| | A18 | | | | |
| | A20 | | | | |
| | A22 | | | | |
| Optical Path Difference Function Coefficient | Diffraction Order | 1/−2/−3 | 0/−1 | 4 | |
| | Manufacturing Wavelength [nm] | 710 | 710 | 710 | |
| | C1 | −1.0043E−02 | −2.5684E−02 | −0.0043371 | |
| | C2 | 1.1685E−03 | 1.4561E−03 | 0.0028343 | |
| | C3 | −1.4388E−03 | −1.1077E−03 | −0.00035683 | |
| | C4 | 1.2482E−03 | 5.9204E−04 | 0.00021657 | |
| | C5 | −4.6298E−04 | −1.5748E−04 | −0.000111 | |
| On-Axial Surface Distance from 2-1 Surface | | 0.0000 | 0.0008 | −0.0083 | 2.3013 |

In Example 14, FIG. 35 shows that, at the first wavelength as to the first optical disc, an image is formed with substantially no aberration. FIG. 36 shows that, at the second wavelength as to the second optical disc, an image is off in a portion outside NA0.65. In particular, in Example 14, at the second wavelength as to the second optical disc, unwanted light is deviated largely in a portion of the outer ring zone of NA0.65 or larger, so it can be said that the aperture restriction function is very favorably exhibits. FIG. 37 shows that, at the third wavelength as to the third optical disc, an image is completely off outside NA0.5, that is, indicates that the aperture restriction function is appropriately manifested.

Figure 38:
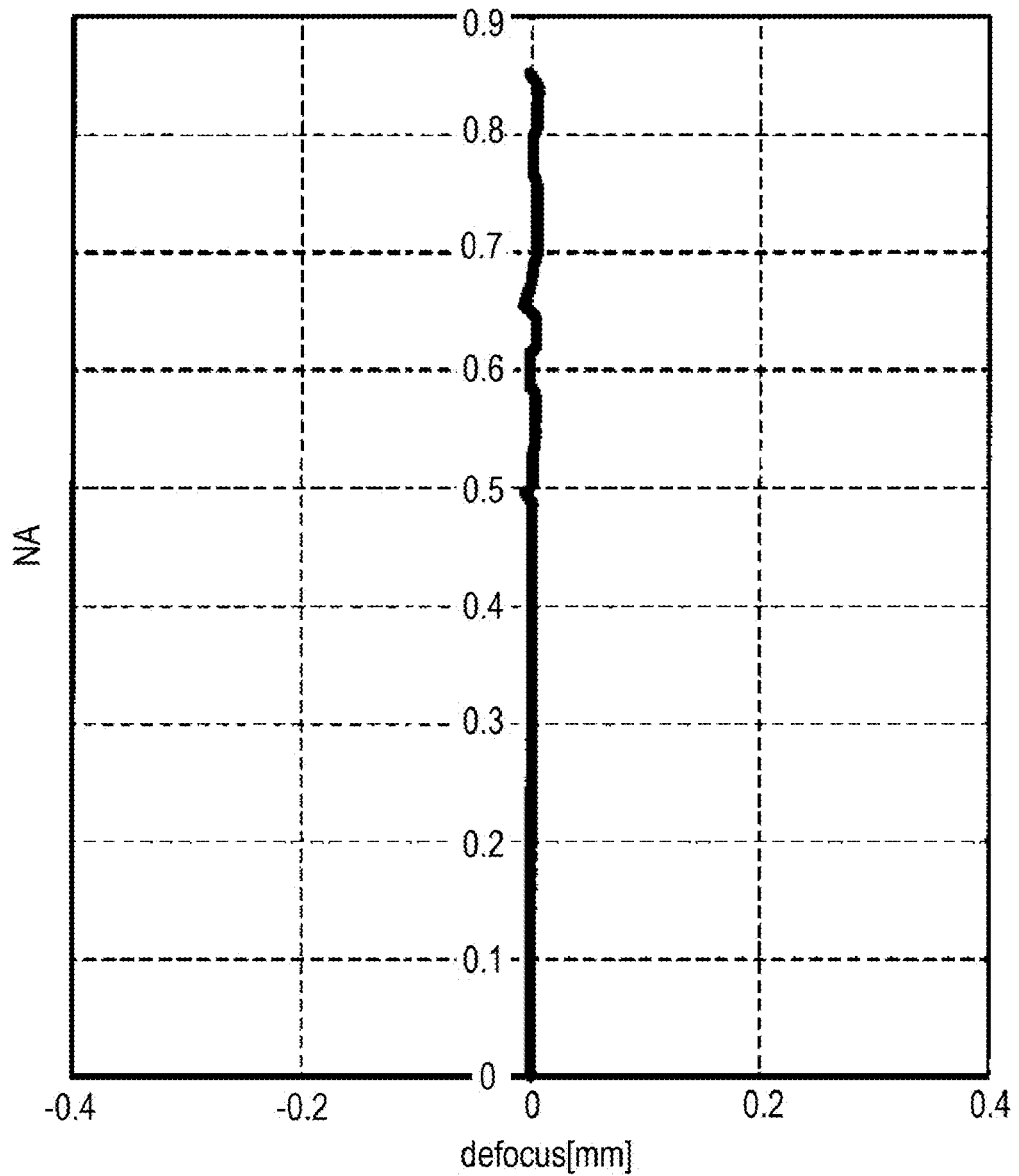
FIG. 38 is a diagram illustrating Example 15 and a longitudinal aberration diagram of the first optical disc.
Figure 40:
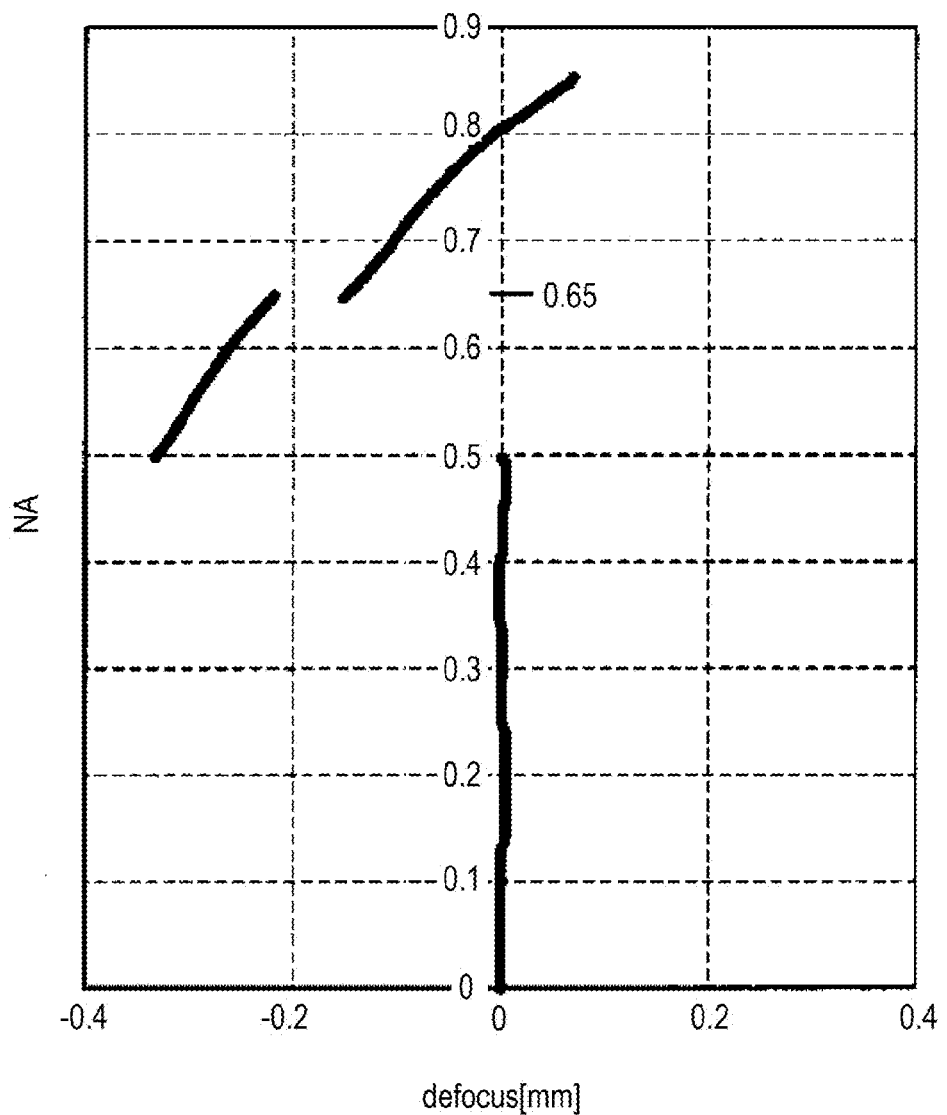
FIG. 40 is a diagram illustrating Example 15 and a longitudinal aberration diagram of the third optical disc.

Next, a description will be made regarding Example 15 shown in Table 10. FIGS. 38 to 40 show a longitudinal aberration diagram corresponding to Example 15. Example 15 corresponds to the diffraction unit 90 having the third region 80.

TABLE 10

Example 15

| Media Type | First Optical Disc | Second Optical Disc | Third Optical Disc |
|---|---|---|---|
| Wavelength λ[nm] | 405.7 | 659.9 | 785 |
| Media Protective Layer Thickness [mm] | 0.0875 | 0.6 | 1.1 |

TABLE 10-continued

Example 15

| | | | | | | |
|---|---|---|---|---|---|---|
| Focal Distance f [mm] | | | 1.92 | 2.04 | | 2.13 |
| NA | | | 0.85 | 0.60 | | 0.44 |
| Incident Magnification | | | 0 | −1/60 | | −1/60 |

| Surface Number | ri | Surface Spacing dλ1 | Refractive Index nλ1 | Surface Spacing dλ2 | Refractive Index nλ2 | Surface Spacing dλ3 | Refractive Index nλ3 |
|---|---|---|---|---|---|---|---|
| 0 | | ∞ | | 124.1 | | 128.9 | |
| 1 (Stop Diameter) | | 0 (φ3.26) | | 0 (φ2.5) | | 0 (φ1.92) | |
| 2-1 | 1.252 | 2.027 | 1.525 | 2.027 | 1.508 | 2.027 | 1.5033 |
| 2-2 | 1.260 | | | | | | |
| 2-3 | 1.145 | | | | | | |
| 3 | −2.451 | | | | | | |
| 4 | | 0.772 | | 0.625 | | 0.410 | |
| 5 | | 0.0875 | 1.5716 | 0.6 | 1.5781 | 1.1 | 1.6172 |

| | | Surface Number | | | |
|---|---|---|---|---|---|
| | | 2-1 | 2-2 | 2-3 | 3 |
| Region | | h ≦ 0.96 | 0.96 < h ≦ 1.25 | 1.25 < h | |
| Aspheric Surface Coefficient | κ | −1.7246E−01 | −5.4400E−01 | −6.4802E−01 | −4.6024E+01 |
| | A4 | −1.3503E−02 | 2.6186E−02 | 1.4208E−02 | 5.6389E−02 |
| | A6 | −1.6354E−02 | −9.2049E−03 | −7.4202E−03 | −2.8316E−02 |
| | A8 | 1.2134E−02 | −9.4182E−04 | −8.7646E−04 | 5.4012E−03 |
| | A10 | −1.8734E−02 | 3.3981E−03 | 1.3607E−03 | −5.6487E−04 |
| | A12 | 6.0194E−03 | −7.1359E−04 | 1.3807E−04 | −1.5030E−05 |
| | A14 | | −2.5260E−05 | −1.8542E−05 | |
| | A16 | | | | |
| | A18 | | | | |
| | A20 | | | | |
| | A22 | | | | |
| Optical Path Difference Function Coefficient | Diffraction Order | 1/−2/−3 | 0/−1 | | |
| | Manufacturing Wavelength [nm] | 710 | 710 | | |
| | C1 | −7.9805E−03 | −1.2362E−02 | | |
| | C2 | 1.4409E−03 | 1.1809E−03 | | |
| | C3 | −4.9977E−04 | 0.0000E+00 | | |
| | C4 | | 0.0000E+00 | | |
| | C5 | | 1.8113E−05 | | |
| On-Axial Surface Distance from 2-1 Surface | | 0.0000 | 0.0026 | −0.0319 | 2.0271 |

In Example 15, FIG. 38 shows that, at the first wavelength as to the first optical disc, an image is formed with substantially no aberration. FIG. 39 shows that, at the second wavelength as to the second optical disc, an image is off in a portion of NA0.65 or larger. FIG. 40 shows that, at the third wavelength as to the third optical disc, an image is completely off outside NA0.5, that is, indicates that the aperture restriction function is appropriately manifested. In particular, in Example 15, the portion of the outer ring zone of the third wavelength does not have a diffraction function, and unwanted light is emitted with efficiency of 100%, but light is distributed over about 0.2 mm in the axial direction, so it can be said that flaring is sufficiently made. Therefore, it can be confirmed that the aperture restriction function is sufficiently manifested.

With the diffraction unit 90 having the first and second diffraction regions 51 and 52 serving as first and second regions and the third region 80, the optical beams with the first to third wavelengths which pass through the first diffraction region 51 can be diffracted by diffraction power so as to be in a divergent angle state where no spherical aberration occurs on the signal recording surface of the corresponding type of optical disc by refractive power of the objective lens 34C which is common to the three wavelengths, and an appropriate spot can be condensed on the signal recording surface of the corresponding optical disc by refractive power of the objective lens 34C. Also, the optical beams with the first and second wavelength which pass through the second diffraction region 52 can be diffracted by diffraction power so as to be in a divergent angle state where no spherical aberration occurs on the signal recording surface of the corresponding type of optical disc by refractive power of the common objective lens 34C, and an appropriate spot can be condensed on the signal recording surface of the corresponding optical disc by refractive power of the objective lens 34C. Also, the optical beam with the first wavelength which passes through the third region 80 can be diffracted so as to be in a divergent angle state where no spherical aberration occurs on the signal recording surface of the corresponding type of optical disc by the refractive power, and an appropriate spot can be condensed on the signal recording surface of the corresponding optical disc.

That is, with the diffraction unit 90 provided on one surface of the objective lens 34C disposed on the optical path between the first to third emission units in the optical system of the optical pickup 3 and the signal recording surface, diffraction power can be applied to the optical beams of the respective wavelengths which pass through respective regions (the first and second diffraction regions 51 and 52, and the third region 80) so as to be in a state where spherical aberration occurring at the signal recording surface is reduced. Therefore, spherical aberration occurring at the signal recording surface when the optical beams with the first to third wavelengths are condensed on the signal recording surfaces of the corresponding optical discs using the common objective lens 34C in the optical pickup 3 can be minimized. That is, three-wavelength compatibility of the optical pickup using three types of wavelengths with respect to three types of optical discs and the common objective lens 34C can be realized, and thus recording and/or playback of information signals with respect to the respective optical discs can be performed appropriately.

With the functions of the first and second diffraction regions 51 and 52 and the functions of the third region 80, the diffraction unit 90 provided on one surface of the objective lens 34C and the objective lens 34C having the diffraction unit 90 have the same functions and effects as the diffraction unit 50 and the objective lens 34 having the diffraction unit 50. That is, with the first and second diffraction regions 51 and 52, the diffraction unit 90 and the objective lens 34C are configured such that diffracted light of a predetermined order is dominant. As a result, high light use efficiency can be obtained, a favorable spot can be condensed, and predetermined aperture restriction can be manifested such as described above.

The objective lens 34C having the diffraction unit 90 has, as an outer ring zone, the ring zone-shaped third region 80 provided outside the second diffraction region 52, and the third region 80 is formed as an aspheric continuous surface having a predetermined diffraction function. Therefore, as described above, high light use efficiency can be obtained, a favorable spot can be condensed, and predetermined aperture restriction can be manifested. In addition, with regard to the outer ring zone, a manufacturing process can be simplified, and high light use efficiency can be realized since there is no diffraction structure in the outer ring zone.

In this case, the first and second diffraction structures formed in the first and second diffraction regions constituting the diffraction unit 90 may be formed by a structure shown in FIG. 21 in which a plurality of, that is, two or more basic cyclical structures are superimposed on each other such as described above. In this case, with the functions of the third diffraction region 53 which is formed as an aspheric continuous surface, and the functions of the first and second diffraction regions 51 and 52 in which a plurality of, that is, two or more basic cyclical structures are superimposed on each other, the diffraction unit 90 has the same functions and effects as the diffraction unit 50 or the objective lens 34 having the diffraction unit 50.

Figure 41A:
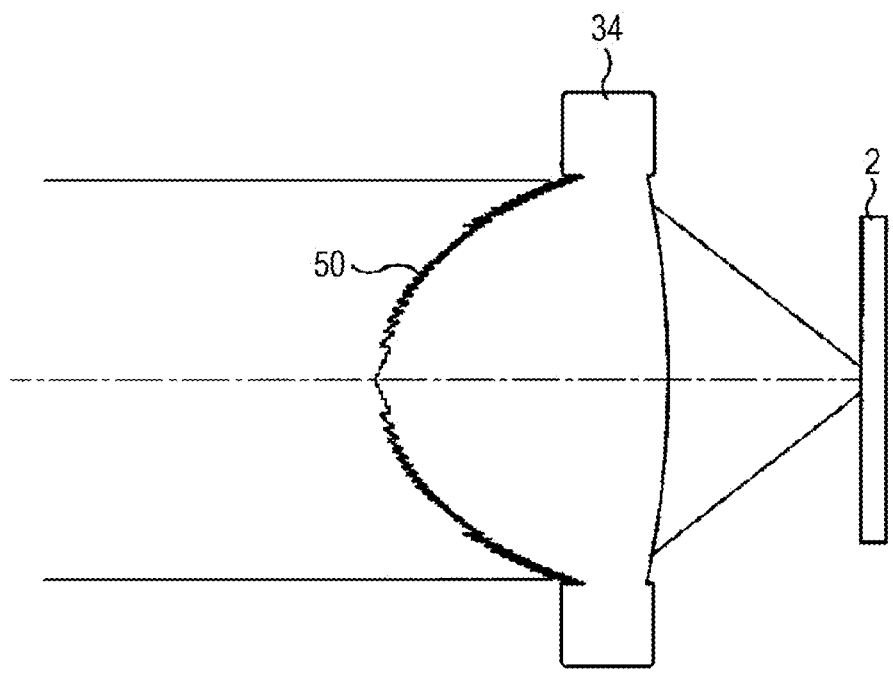
FIGS. 41A and 41B are diagrams illustrating an example of a condensing optical device constituting the optical pickup to which the invention is applied, specifically.

In the above description, as shown in FIG. 41A, the diffraction unit 50 having the three diffraction regions 51, 52, and 53 is provided on the incident side surface of the objective lens 34, but the invention is not limited to this. The diffraction unit 50 may be provided on the output side surface of the objective lens 34. The diffraction unit 50 having the first to third diffraction regions 51, 52, and 53 may be provided integrally on the incident side surface or the output side surface of an optical element separated from the objective lens. For example, as shown in FIG. 41B, a condensing optical device may include an objective lens 34B having a lens curved surface such as obtained by removing the diffraction unit 50 from the objective lens 34, and a diffraction optical element 35B provided on one surface of the diffraction unit 50 and disposed on the optical path common to the three wavelengths. In the objective lens 34 shown in FIG. 41A, the surface shape is formed such as obtained by adding the surface shape of a diffraction structure required as a diffraction power function with the surface shape of the incident side surface required as a refractive power function of the objective lens as reference. Meanwhile, when the separate diffraction optical element 35B such as shown in FIG. 41B is provided, the objective lens 34B itself has a surface shape required as a refractive power function, and the surface shape of a diffraction structure required as a diffraction power function is formed on one surface of the diffraction optical element 35B. The objective lens 34B and the diffraction optical element 35B such as shown in FIG. 41B functions as a condensing optical device in the same manner as the objective lens 34, and is used in the optical pickup. Therefore, aberration and the like can be reduced, three-wavelength compatibility of the optical pickup can be realized, the number of parts can be reduced, which enables simplification of the configuration and reduction in size, and thus high productivity and low cost can be realized. The diffraction structure may be complicated as compared with the case where the objective lens 34 is provided integrally. Meanwhile, as shown in FIG. 41A described above, a single element (objective lens 34) functions as a condensing optical device to appropriately condense the optical beams with three different wavelengths on the signal recording surfaces of the optical discs corresponding to the optical beams such that no spherical aberration occurs, and the diffraction unit 50 is provided integrally with the objective lens 34. In this case, the number of optical parts can be reduced, and the apparatus can be reduced in size. Note that it should suffice that the diffraction unit 50 has formed an aberration correction diffraction structure for three-wavelength compatibility, which was difficult in the related art, on one surface thereof. Therefore, the diffraction unit 50 can be formed integrally with the objective lens 34 serving as a refraction element such as described above, so a diffraction surface can be formed directly on a plastic lens. The objective lens 34 having formed integrally therewith the diffraction unit 50 is formed of a plastic material, so high productivity and low cost can be realized. Note that the modification shown in FIGS. 41A and 41B is also applied to the objective lens 34C having the diffraction unit 90. That is, the diffraction unit 90 may be provided on the output side surface of the objective lens 34C or may be provided on the incident side surface or the output side surface of an optical element separated from the objective lens. In this case, the objective lens takes the refraction operation of the third region 80, and the separate optical element takes the diffraction operation corresponding to the first and second diffraction regions 51 and 52. That is, the separate optical element has a first region where a diffraction structure corresponding to that of the first diffraction region 51 is provided, a second region where a diffraction structure corresponding to that of the second diffraction region 52 is provided, and a third region provided outside the second region to transmit an optical beam as it is with no diffraction operation. In the objective lens, an aspheric shape corresponding to the third region 80 is formed in the outer ring zone portion.

The collimator lens 42 provided between the objective lens 34 and the third beam splitter 38 converts the divergent angle of each of the optical beams with the first to third wavelengths, the optical paths of which have been synthesized by the second beam splitter 37 and which have passed through the third beam splitter 38, and outputs to the quarter-wave plate 43 and objective lens 34 side, in a substantially parallel light state, for example. The configuration in which the collimator lens 42 inputs the optical beam with the first wavelength to the objective lens 34 with the divergent angle thereof in the state of substantially parallel light, and also inputs the optical beams with the second and third wavelengths to the objective lens 34 in a state of a slightly diffused divergent angle as to parallel light (hereinafter, the diffused state and the converged state are also referred to as "finite system state") enables reduction of spherical aberration when the optical beams with the second and third wavelengths are condensed on the signal recording surfaces of the second and third optical discs through the objective lens 34, thereby realizing three-wavelength compatibility with even less aberration. This point has been described above with reference to FIGS. 6 and 7. While a configuration has been described here in which the optical beam of the third wavelength is input to the objective lens 34 in a state of a predetermined divergent angle, due to the positional relation between the second light source unit 32 having the second emission unit for emitting the optical beam with the second wavelength and the collimator lens 42, and/or the positional relation between the third light source unit 33 having the third emission unit for emitting the optical beam with the third wavelength and the collimator lens 42, when a plurality of emission units are provided in a common light source unit, for example, an element which converts only the divergent angle of the optical beam of the second and/or third wavelength, or a mechanism for driving the collimator lens 42, or the like may be provided, thereby realizing incidence on the objective lens 34 in a predetermined divergent angle state. Also, one of the optical beams with the second and third wavelengths may be input to the objective lens 34 in the finite system state in accordance with the situation, thereby further reducing aberration. In addition, the optical beams with the second and third wavelengths may be input in the finite system state and in a diffused state, thereby realizing adjustment of return magnification. With the adjustment of the return magnification, the focus capture range and the like can be set to a desired state conforming to the format, and as a result, more excellent optical system compatibility can be achieved.

The multi lens 46 is, for example, a wavelength selective multi lens that appropriately condenses, on the photoreception surface of a photodetector or the like of the photosensor 45, the return optical beams with the first to third wavelengths which have been reflected from the signal recording surfaces of the respective optical discs, passed through the objective lens 34, the redirecting mirror 44, the quarter-wave plate 43, and the collimator lens 42, been reflected from the third beam splitter 38, and then been separated from the optical beams on the outgoing path. In this case, the multi lens 46 provides the return optical beam with astigmatism for detection of focus error signals or the like.

The photosensor 45 receives the return optical beam condensed by the multi lens 46, and detects, along with information signals, various detection signals, such as focus error signals, tracking error signals, and the like.

With the optical pickup 3 configured as above, the objective lens 34 is driven so as to be displaced based on the focus error signals and tracking error signals obtained by the photosensor 45. Then, the objective lens 34 is moved to a focal position as to the signal recording surface of the optical disc 2, the optical beam is focused onto the signal recording surface of the optical disc 2, and information is recorded to or played from the optical disc 2.

The optical pickup 3 is provided on one surface of the objective lens 34, can provide the optical beam of each wavelength with optimal diffraction efficiency and diffraction angle for each region using the diffraction unit 50 having the first to third diffraction regions 51, 52, and 53, can sufficiently reduce spherical aberration on the signal recording surfaces of the three types of first to third optical discs 11, 12, and 13 having different formats, such as the protective layer thickness or the like, and enable reading and writing of signals to and from a plurality of optical discs 11, 12, and 13, using the optical beams with three different wavelengths.

The objective lens 34 having the diffraction unit 50 shown in FIG. 41A, the diffraction optical element 35B having the diffraction unit 50 and the objective lens 34B described with reference to FIG. 41B, and the objective lens 34C having the diffraction unit 90 described with reference to FIGS. 30A and 30B constituting the optical pickup 3 each can function as a condensing optical device for condensing the input optical beams at predetermined positions. When this condensing optical device is used for an optical pickup that performs recording and/or playback of information signals by irradiating optical beams onto three different types of optical discs, with the diffraction unit 50 or 90 provided on one surface of the objective lens 34 or 34C or the diffraction optical element 35B, corresponding optical beams can be appropriately condensed on the signal recording surfaces of the three types of optical discs in a state where spherical aberration is sufficiently reduced. That is, three-wavelength compatibility of the optical pickup using the objective lens 34, the objective lens 34B, or the objective lens 34C common to the three wavelengths can be realized.

The diffraction optical element 35B having the diffraction unit 50 and the objective lens 34B described with reference to FIG. 41B may be provided, for example, to an actuator, such as an objective lens driving mechanism or the like, for driving the objective lens 34B such that the diffraction optical element 35B having the diffraction unit 50 and the objective lens 34B are integral. Meanwhile, in order to improve precision of assembling to the lens holder of the actuator, and facilitate assembling work, a condensing optical unit may be configured in which the diffraction optical element 35B and objective lens 34B are formed as an integrated unit. For example, a condensing optical unit may be configured by using spacers or the like to fix the diffraction optical element 35B and the objective lens 34B to the holder as a single body while setting the position, spacing, and optical axis. The diffraction optical element 35B and the objective lens 34B are integrally assembled to the objective lens driving mechanism as described above, so the optical beams with the first to third wavelengths can be appropriately condensed on the signal recording surfaces of the respective optical discs with spherical aberration reduced, even at the time of field shift, such as displacement in the tracking direction and the like, for example.

Next, the optical paths of the optical beams emitted from the first to third light source units 31, 32, and 33 of the optical pickup 3 configured as described above will be described with reference to FIG. 2. First, the optical path when the optical beam with the first wavelength is emitted onto the first optical disc 11 to perform reading or writing of information will be described.

The disc type determination unit 22 that has determined that the type of the optical disc 2 is the first optical disc 11 causes the optical beam with the first wavelength to be emitted from the first emission unit of the first light source unit 31.

The optical beam with the first wavelength emitted from the first emission unit is split into three beams by the first grating 39 for detection of tracking error signals and the like, and is input to the second beam splitter 37. The optical beam with the first wavelength that has been input to the second beam splitter 37 is reflected from a mirror surface 37a of the second beam splitter 37, and is output to the third beam splitter 38 side.

The optical beam with the first wavelength that has been input to the third beam splitter 38 transmits a mirror surface 38a of the third beam splitter 38, is output to the collimator lens 42 side. The collimator lens 42 converts the divergent angle of the input optical beam so as to be substantially parallel light. Subsequently, the optical beam is given a predetermined phase difference by the quarter-wave plate 43, reflected from the redirecting mirror 44, and output to the objective lens 34 side.

The optical beam with the first wavelength that has been input to the objective lens 34 is diffracted with the first to third diffraction regions 51, 52, and 53 of the diffraction unit 50 provided on the incident side surface of the objective lens 34 such that, of the optical beam which has passed through each region, a predetermined diffraction order is dominant as described above, and also appropriately condensed on the signal recording surface of the first optical disc 11 by refractive power of the lens curved surface of the objective lens 34. In this case, the optical beam with the first wavelength is given diffractive power such that the optical beam passing through the regions 51, 52, and 53 is in a state where spherical aberration can be reduced, and accordingly can be appropriately condensed. Note that the optical beam with the first wavelength output from the objective lens 34 is not only in a state that a predetermined diffraction power is applied, but also in a state of aperture restriction.

The optical beam condensed on the first optical disc 11 is reflected from the signal recording surface, passes through the objective lens 34, the redirecting mirror 44, the quarter-wave plate 43, and the collimator lens 42, is reflected from the mirror face 38a of the third beam splitter 38, and is output to the photosensor 45 side.

The optical beam split from the optical beam on the outgoing path reflected from the third beam splitter 38 is condensed on the photoreception surface of the photodetector 45 by the multi lens 46 and detected.

Next, a description will be made regarding the optical path when the optical beam with the second wavelength is emitted onto the second optical disc 12 to perform reading or writing of information.

The disc type determination unit 22 that has determined that the type of the optical disc 2 is the second optical disc 12 causes the optical beam with the second wavelength to be emitted from the second emission unit of the second light source unit 32.

The optical beam with the second wavelength emitted from the second emission unit is split into three beams by the second grating 40 for detection of tracking error signals and the like, and is input to the first beam splitter 36. The optical beam with the second wavelength that has been input to the first beam splitter 36 transmits a mirror surface 36a of the first beam splitter 36, transmits the mirror surface 37a of the second beam splitter 37, and is output to the third beam splitter 38 side.

The optical beam with the second wavelength that has been input to the third beam splitter 38 transmits the mirror surface 38a of the third beam splitter 38, and is output to the collimator lens 42 side. The collimator lens 42 converts the divergent angle of the input optical beam so as to be diffused light. Subsequently, the optical beam is given a predetermined phase difference by the quarter-wave plate 43, reflected from the redirecting mirror 44, and output to the objective lens 34 side.

The optical beam with the second wavelength that has been input to the objective lens 34 is diffracted with the first and second diffraction regions 51 and 52 of the diffraction unit 50 provided on the incident side surface of the objective lens 34 such that, of the optical beam which has passed through each region, a predetermined diffraction order is dominant as described above, and also appropriately condensed on the signal recording surface of the second optical disc 12 by refractive power of the lens curved surface of the objective lens 34. In this case, the optical beam with the second wavelength is given diffractive power such that the optical beam passing through the first and second diffraction regions 51 and 52 is in a state where spherical aberration can be reduced, and accordingly can be appropriately condensed. Note that diffracted light generated when the optical beam with the second wavelength has passed through the third diffraction region 53 is in a state of being not appropriately condensed on the signal recording surface of the second optical disc 12 due to the effects of flaring, that is, in a state where the effects of aperture restriction are appropriately obtained.

The return optical path of the optical beam reflected from the signal recording surface of the second optical disc 12 is the same as the optical beam with the first wavelength, and a description thereof will be omitted.

Next, a description will be made regarding the optical path when the optical beam with the third wavelength is emitted onto the third optical disc 13 to perform reading or writing of information.

The disc type determination unit 22 that has determined that the type of the optical disc 2 is the third optical disc 13 causes the optical beam with the third wavelength to be emitted from the third emission unit of the third light source unit 33.

The optical beam with the third wavelength emitted from the third emission unit is split into three beams by the third grating 41 for detection of tracking error signals and the like, and is input to the first beam splitter 36. The optical beam with the third wavelength that has been input to the first beam splitter 36 is reflected from the mirror surface 36a of the first beam splitter 36, transmits the mirror surface 37a of the second beam splitter 37, and is output to the third beam splitter 38 side.

The optical beam with the third wavelength that has been input to the third beam splitter 38 transmits the mirror surface 38a of the third beam splitter 38, is output to the collimator lens 42 side. The collimator lens 42 converts the divergent angle of the input optical beam so as to be diffused light. Subsequently, the optical beam is given a predetermined phase difference by the quarter-wave plate 43, reflected from the redirecting mirror 44, and output to the objective lens 34 side.

The optical beam with the third wavelength that has been input to the objective lens 34 is diffracted with the first diffraction region 51 of the diffraction unit 50 provided on the incident side surface of the objective lens 34 such that, of the optical beam which has passed through this region, a predetermined diffraction order is dominant as described above, and also appropriately condensed on the signal recording surface of the third optical disc 13 by refractive power of the lens curved surface of the objective lens 34. In this case, the optical beam with the third wavelength is given diffractive power such that the optical beam passing through the first diffraction region 51 is in a state where spherical aberration can be reduced, and accordingly can be appropriately condensed. Note that diffracted light generated when the optical beam with the third wavelength has passed through the second and third diffraction regions 52 and 53 is in a state of being not appropriately condensed on the signal recording surface of the third optical disc 13 due to the effects of flaring, that is, in a state where the effects of aperture restriction are appropriately obtained.

The return optical path of the optical beam reflected from the signal recording surface of the third optical disc 13 is the same as the optical beam with the first wavelength, and a description thereof will be omitted.

Note that while a configuration has been described here in which the optical beams with the second and third wavelengths have the position of the second and/or third emission units adjusted such that the optical beam, the divergent angle of which is converted by the collimator lens 42 and which is input to the objective lens 34 is in a diffused state as to substantially parallel light, a configuration may be made in which the optical beam is input to the objective lens 34 by providing an element which has wavelength selectivity and converts the divergent angle, or by providing a mechanism for driving the collimator lens 42 in the optical axis direction in a diffused or converged state.

While a description has been made regarding a configuration in which the optical beam with the first wavelength is input to the objective lens 34 in a state of substantially parallel light, and the optical beams with the second and third wavelengths are input to the objective lens 34 in a state of diffused light, the invention is not limited to this configuration. For example, a configuration may be made in which the optical beams with the first to third wavelengths are all input to the objective lens 34 in a state of parallel light, or some or all of the optical beams with the first to third wavelengths are input to the objective lens 34 in a state of diffused light or converged light.

The optical pickup 3 to which the invention is applied includes the first to third emission units emitting the optical beams with the first to third wavelengths, the objective lens 34 condensing the optical beams with the first to third wavelengths emitted from the first to third emission units on the signal recording surface of the optical disc, and the diffraction unit 50 provided on one surface of the objective lens 34 serving as an optical element disposed on the outgoing optical path of the optical beams with the first to third wavelengths. The diffraction unit 50 has the first to third diffraction regions 51, 52, and 53. The first to third diffraction regions 51, 52, and 53 have the first to third different diffraction structures that are formed in a ring zone shape, each have a predetermined depth, and are configured to emit diffracted light such that as to the optical beam of each wavelength, diffracted light of a predetermined diffraction order such as described above is dominant. Therefore, the single common objective lens 34 can be used to appropriately condense the corresponding optical beams on the signal recording surfaces of three types of optical discs of different use wavelengths. As a result, three-wavelength compatibility is realized with the common objective lens 34, without complicating the configuration, and thus good recording and/or playback of signals with respect to the respective optical discs is realized.

That is, the optical pickup 3 to which the invention is applied obtains optimal diffraction efficiency and diffraction angle with the diffraction unit 50 provided on one surface within the optical path of the optical beams with the first to third wavelengths. Therefore, reading and writing of signals to and from a plurality of optical discs 11, 12, and 13 can be performed using the optical beams with different wavelengths emitted from a plurality of emission units provided in the respective light source units 31, 32, and 33, and the optical parts, such as the objective lens 34 and the like, can be shared. As a result, the number of parts can be reduced, which enables simplification of the configuration and reduction in size, so high productivity and low cost can be realized.

The optical pickup 3 to which the invention is applied is configured such that predetermined diffraction orders ($k_{1i}$, $k_{2i}$, $k_{3i}$) selected by the first diffraction region 51 serving as an inner ring zone with maximum diffraction efficiency and condensed on the signal recording surface of the corresponding optical disc with spherical aberration reduced have the relation $k_{1i} \geq k_{2i} > k_{3i}$. Accordingly, an appropriate state can be realized as to the working distance when the optical beam of each wavelength is used, and the focal distance for each wavelength. That is, the working distance when the third wavelength $\lambda_3$ is used can be ensured while shortening the focal distance as to the first wavelength $\lambda_1$, and an increase in the lens diameter of the objective lens or the overall size of the optical pickup can be suppressed. Reduction in the lens diameter of the objective lens ensures ease of design of the actuator and enables reduction in the focal distance, thereby obtaining good aberration properties. Therefore, excellent compatibility can be realized, which enables good recording and/or playback with respect to the respective optical discs. Further, simplification of the configuration and reduction in size can be achieved, so high productivity and low cost can be realized.

The optical pickup 3 to which the invention is applied is configured such that, of the diffraction orders ($k_{1i}$, $k_{2i}$, $k_{3i}$) selected by the first diffraction region 51 serving as an inner ring zone, $k_{1i}$ and $k_{3i}$ are (−2, −3), (−1, −2), (−1, −3), (0, −2), (0, −3), (1, −2), (1, −3), (2, −1), (2, −2), (2, −3), (3, −1), (3, −2), or (3, −3). Accordingly, an appropriate state can be realized as to the working distance at each wavelength, and the focal distance for each wavelength, and an increase in the lens diameter of the objective lens or the size of the apparatus can be suppressed. In addition, the groove depth can be prevented from being excessively deepened, which ensures ease of manufacturing and prevents formation precision from being deteriorated. Therefore, excellent compatibility can be realized to perform good recording and/or playback with respect to the respective optical discs, simplification of the configuration and reduction in size can be attained, manufacturing can be facilitated, and high productivity and low cost can be realized.

The optical pickup 3 to which the invention is applied has a diffraction structure of a step form which provides predetermined diffraction power to three wavelengths and is formed in the first diffraction region 51 serving as an inner ring zone, which requires high diffraction efficiency. Accordingly, the amount of diffracted light of unwanted light can be suppressed, and jitter and the like can be prevented from being deteriorated due to unwanted light being received by the photoreceptor portion. Further, even though a certain amount of diffracted of unwanted light occurs, the diffraction order of unwanted light is set to be a diffraction order deviated with a great diffraction angle difference other than adjacent diffraction orders of focus light, so jitter and the like can be prevented from being deteriorated due to condensation of unwanted light at the time of focus.

The optical pickup 3 to which the invention is applied has a diffraction structure of a blazed form which is formed integrally on one surface of the objective lens 34 and is formed in the third diffraction region 53 serving as an outer ring zone, which is provided on the outermost side. This configuration is advantageous when a diffraction structure is formed at a portion having an extremely steep lens curved surface, such as a three-wavelength compatible lens. Therefore, manufacturing can be facilitated, and formation precision can be prevented from being deteriorated.

The optical pickup 3 to which the invention is applied is configured such that the diffraction orders ($k_{1i}$, $k_{2i}$, $k_{3i}$) selected by the first diffraction region 51 serving as an inner ring zone are (1, −1, −2), (0, −1, −2), (1, −2, −3), or (0, −2, −3), and the diffraction structure is formed in a staircase form. Accordingly, adverse effects of unwanted light can be minimized. Further, an appropriate state can be realized as to the working distance at each wavelength, and the focal distance for each wavelength, and an increase in the lens diameter of the objective lens or the size of the apparatus can be suppressed. In addition, the groove depth can be suppressed small, manufacturing can be facilitated, and formation precision can be prevented from being deteriorated. Therefore, excellent compatibility can be realized to perform good recording and/or playback with respect to the respective optical discs, simplification of the configuration and reduction in size can be attained, manufacturing can be facilitated, and high productivity and low cost can be realized.

The optical pickup 3 to which the invention is applied is configured such that, in addition to the diffraction orders selected by the inner ring zone, the diffraction orders ($k_{1m}$, $k_{2m}$) selected by the second diffraction region 52 serving as a middle ring zone are (+1, +1), (−1, −1), (0, +2), (0, −2), (0, +1), (0, −1), (+1, 0), (−1, 0), (+1, −1), or (−1, +1), and the diffraction structure is formed in a staircase form or a non-cyclical form. Accordingly, the functions of the inner ring zone and the middle ring zone can be sufficiently manifested. Therefore, excellent compatibility can be realized, which enables good recording and/or playback with respect to the respective optical discs. Further, simplification of the configuration and reduction in size can be achieved, so high productivity and low cost can be realized.

The optical pickup 3 to which the invention is applied is configured such that, in addition to the diffraction orders selected by the inner ring zone, the diffraction orders ($k_{1m}$, $k_{2m}$) selected by the second diffraction region 52 serving as a middle ring zone are (+3, +2), (−3, −2), (+2, +1), (−2, −1), (+1, +1), or (−1, −1), and the diffraction structure is formed in a blazed form or a non-cyclical form. Accordingly, the functions of the inner ring zone and the middle ring zone can be sufficiently manifested. Therefore, excellent compatibility can be realized, which enables good recording and/or playback with respect to the respective optical discs. Further, simplification of the configuration and reduction in size can be achieved, so high productivity and low cost can be realized.

The optical pickup 3 to which the invention is applied is configured such that when being input to the incident side surface of the condensing optical device, such as the objective lens 34 or the like, the optical beam of the first wavelength is substantially parallel light, and the optical beams with the second and third wavelengths are diffused light. Accordingly, the optical beam passing through the first diffraction region 51 serving as an inner ring zone can be appropriately condensed on the signal recording surface of the corresponding optical disc in a state of high diffraction efficiency and where spherical aberration is further reduced. In the case of the second and third diffraction regions serving as a middle ring zone and an outer ring zone, with th benefit from the effects of flaring, high efficiency can be obtained and spherical aberration can be reduced as to an optical beam of a desired wavelength. With regard to an optical beam with a wavelength that should not be condensed, the light quantity incident on the corresponding signal recording surface can be reduced. In addition, the degree of freedom of diffraction order selection can be improved, so simplification of the configuration and the like can be realized.

The optical pickup 3 to which the invention is applied can use the common objective lens 34 with respect to the three wavelengths. Accordingly, deterioration of sensitivity and an unsuitable attachment angle to the lens holder of the actuator due to an increase in the weight of a movable portion in the actuator can be suppressed. Further, with the diffraction unit 50 provided on one surface of the optical element (the objective lens 34 or the diffraction optical element 35B), the optical pickup 3 to which the invention is applied can sufficiently reduce spherical aberration which causes a problem when the common objective lens 34 is used at the time of three-wavelength compatibility. Thus, as in the related art, when a diffraction unit for spherical aberration reduction is provided on multiple surfaces, deterioration in diffraction efficiency or the like due to positioning of the diffraction units or providing of multiple diffraction units can be suppressed. That is, simplification of assembling work and improvement of light use efficiency can be realized. Also, the optical pickup 3 to which the invention is applied enables a configuration in which the diffraction unit 50 is provided on one surface of the optical element as described above, so the diffraction unit 50 can be formed integrally with the objective lens 34. Therefore, further simplification of the configuration, reduction in the weight of the movable portion of the actuator, simplification of assembling work, and improvement of light use efficiency can be realized.

Figure 41B:
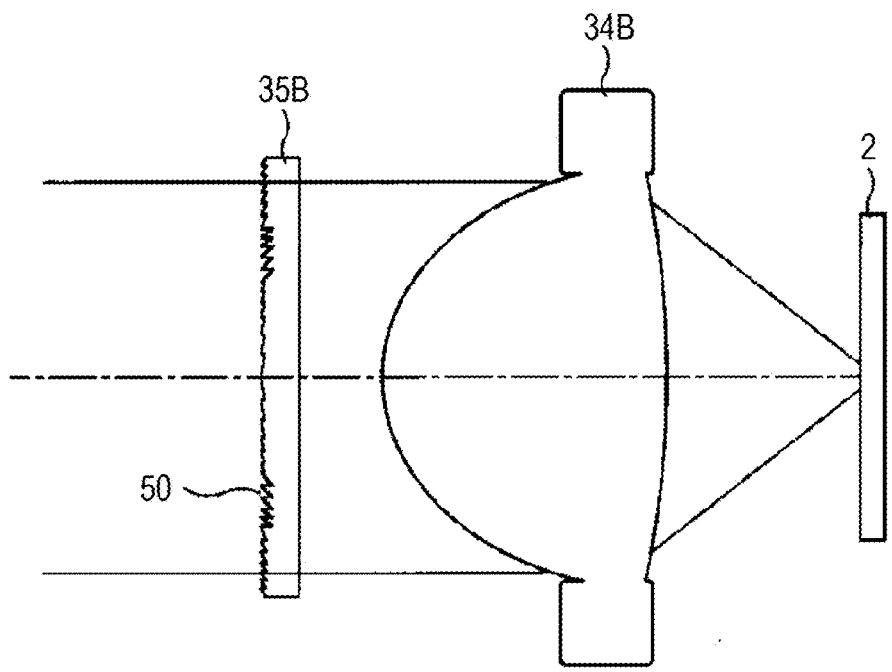

With the optical pickup 3 to which the invention is applied, as shown in FIGS. 41A and 41B, the diffraction unit 50 is provided on one surface of the objective lens 34 or the diffraction optical element 35B. Accordingly, three-wavelength compatibility can be realized, and also aperture restriction can be performed with three types of optical discs and a numerical aperture corresponding to optical beams of three types of wavelengths. Therefore, it is not necessary to provide an aperture restriction filter or the like which was needed in the related art, or to perform adjustment at the time of arrangement. Further, simplification of the configuration, reduction in size, and low cost can be realized.

The optical pickup 3 to which the invention is applied is configured such that with the diffraction unit 50, the cyclical number $N_i$ of the diffraction cyclical structure of the inner ring zone has the relation of Expression (20), and the cyclical number $N_m$ of the diffraction cyclical structure in the middle ring zone has the relation of Expression (21). Therefore, interference of unwanted light and regular light can be avoided, the amount of diffracted light of unwanted light can be suppressed, and jitter and the like can be prevented from being deteriorated due to unwanted light being received by the photoreceptor portion. Further, even if the amount of diffracted light of unwanted light occurs to a certain degree, the diffraction order of unwanted light is made to be a deviated diffraction order having a great diffraction angle difference other than adjacent diffraction orders of focus light, such that jitter and the like can be prevented from being deteriorated due to unwanted light being condensed at the time of focus. Therefore, a sufficient optical spot at the time of playback/recording can be formed.

The optical pickup 3 to which the invention is applied is configured such that with the diffraction unit 50, when the radius of the first diffraction region 51 is 0.99 mm, the cyclical number $N_i$ of the diffraction cyclical structure of the first diffraction region 51 has the relation of Expression (29), and when the radius of the second diffraction region 52 is 1.43 mm, the cyclical number $N_m$ of the diffraction cyclical structure of the second diffraction region 52 has the relation of Expression (31). Therefore, deterioration in efficiency at the time of forming a diffraction cyclical structure can be avoided, return coupling efficiency $I_{all}$ from the objective lens 34 can be ensured 60% or greater, and sufficient diffraction efficiency can be obtained.

Accordingly, the optical pickup 3 to which the invention is applied is configured such that with the diffraction unit 50, the cyclical number $N_i$ of the diffraction cyclical structure of the inner ring zone has the relation of Expression (59), and the cyclical number $N_m$ of the diffraction cyclical structure of the middle ring zone has the relation of Expression (60). Therefore, interference of unwanted light and regular light can be avoided, the amount of diffracted light of unwanted light can be suppressed, and jitter and the like can be prevented from being deteriorated due to unwanted light being received by the photoreceptor portion. Further, even if the amount of diffracted light of unwanted light occurs to a certain degree, the diffraction order of unwanted light is made to be a deviated diffraction order having a great diffraction angle difference other than adjacent diffraction orders of focus light, such that jitter and the like can be prevented from being deteriorated due to unwanted light being condensed at the time of focus. Therefore, a sufficient optical spot at the time of playback/recording can be formed. As a result, at the time of forming the cyclical structure, deterioration inefficiency can be avoided, the return coupling efficiency $I_{all}$ from the objective lens can be ensured 60% or greater, and sufficient diffraction efficiency can be obtained.

The optical pickup 3 to which the invention is applied is configured such that with the diffraction unit 50, even though the radius of the first diffraction region 51 differs from 0.99 mm, at least the height $d_i$ of each step of the first diffraction region 51 and the average pitch $p_i$ have the relation of Expression (32) described below. Therefore, deterioration in efficiency at the time of forming a diffraction cyclical structure can be avoided, return coupling efficiency $I_{all}$ from the objective lens 34 can be ensured 60% or greater, and sufficient diffraction efficiency can be obtained.

The optical pickup 3 to which the invention is applied is configured such that with the diffraction unit 50, even though the radius of the second diffraction region 52 differs from 1.43 mm, at least the height $d_m$ of each step of the second diffraction region 52 and the average pitch $p_m$ have the relation of Expression (33) described below. Therefore, deterioration in efficiency at the time of forming a diffraction cyclical structure can be avoided, return coupling efficiency $I_{all}$ from the objective lens 34 can be ensured 60% or greater, and sufficient diffraction efficiency can be obtained.

The optical pickup 3 to which the invention is applied is configured such that with the diffraction unit 50, the first diffraction region 51 and the second diffraction region 52 have the relations of Expressions (54a) and (54b), thereby adjusting the on-axial aberration amount appropriately and reducing the aberration amount at the time of temperature change.

The optical pickup 3 to which the invention is applied is configured such that with the diffraction unit 50, the first diffraction region 51 and the second diffraction region 52 have the relation of Expression (53), thereby adjusting the on-axial aberration amount appropriately and reducing the aberration amount at the time of temperature change.

The optical pickup 3 to which the invention is applied is configured such that with the diffraction unit 50, the combinations of the diffraction orders $k_{1i}$ and $k_{2i}$ at each wavelength in the first diffraction region 51 and the diffraction orders $k_{1m}$ and $k_{2m}$ at each wavelength in the second diffraction region 52 satisfy Expression (54a) and have the relation of Expression (57). Accordingly, with the third diffraction region, the diffraction orders $k_{3i}$ and $k_{3m}$ at each wavelength are identical, or with the middle ring zone, efficiency is obtained after $k_{3m}$ and $k_{3m}'$ becomes identical to $k_{3i}$. Therefore, aperture restriction can be prevented from being not appropriately performed in the outer ring zone, thereby adjusting the on-axial aberration amount appropriately and reducing the aberration amount at the time of temperature change.

The optical pickup 3 to which the invention is applied includes the first to third emission units emitting the optical beams with first to third wavelengths, the objective lens 34C condensing the optical beam with the first to third wavelengths emitted from the first to third emission units on the signal recording surface of the optical disc, and the diffraction unit 90 provided on one surface of the objective lens 34C serving as an optical element disposed on the outgoing optical path of the optical beams with the first to third wavelengths. The diffraction unit 90 has the first and second diffraction regions 51 and 52 serving as first and second regions, and the third region 80. The diffraction regions 51 and 52 have the first and second different diffraction structures that are formed in a ring zone shape, each have a predetermined depth, and are configured to emit diffracted light such that as to the optical beam of each wavelength, diffracted light of a predetermined diffraction order such as described above is dominant. The third region 80 is formed as an aspheric continuous surface that has a predetermined diffraction operation with respect to the optical beam of each wavelength such as described above. Therefore, the single common objective lens 34C can be used to appropriately condense the corresponding optical beams on the signal recording surfaces of three types of optical discs of different use wavelengths. As a result, three-wavelength compatibility is realized with the common objective lens 34C, without complicating the configuration, and thus good recording and/or playback of signals with respect to the respective optical discs is realized.

That is, the optical pickup 3 to which the invention is applied obtains optimal diffraction efficiency and diffraction angle with the diffraction unit 90 provided on one surface within the optical path of the optical beams with the first to third wavelength. Therefore, reading and writing of signals to and from a plurality of optical discs 11, 12, and 13 can be performed using the optical beams with different wavelengths emitted from a plurality of emission units provided in the respective light source units 31, 32, and 33, and the optical parts, such as the objective lens 34C and the like, can be shared. As a result, the number of parts can be reduced, which enables simplification of the configuration and reduction in size, so high productivity and low cost can be realized.

With the optical pickup 3 having the diffraction unit 90 and the objective lens 34C to which the invention is applied, the diffraction unit 90 provided on one surface of the objective lens 34C, and the objective lens 34C having the diffraction unit 90 have the functions of the first and second diffraction regions 51 and 52, and functions of the third region 80. Therefore, the optical pickup 3 has the same functions and effects as the optical pickup 3 having the diffraction unit 50 and the objective lens 34. That is, with the first and second diffraction regions 51 and 52, the optical pickup 3 having the diffraction unit 80 and the objective lens 34C is configured such that diffracted light of a predetermined order is dominant. As a result, high light use efficiency can be obtained, a favorable spot can be condensed, and predetermined aperture restriction can be manifested such as described above.

With the optical pickup 3 having the diffraction unit 90 and the objective lens 34C to which the invention is applied, as an outer ring zone, the ring zone-shaped third region 80 is provided outside the second diffraction region 52. The third region 80 is formed as an aspheric continuous surface having a predetermined diffraction operation, so high light use efficiency can be obtained, a favorable spot can be condensed, and predetermined aperture restriction can be manifested such as described above. Further, with regard to the outer ring zone, a manufacturing process can be simplified, and high light use efficiency can be realized since there is no diffraction structure in the outer ring zone.

In the above description, with th optical pickup 3, a configuration may be made in which the first emission unit is provided in the first light source unit 31, the second emission unit is provided in the second light source unit 32, and the third emission unit is provided in the third light source unit 33, but the invention is not limited to this configuration. For example, a light source unit having two emission units from among the first to third emission units, and a light source unit having the remaining emission unit may be provided so as to be disposed at different positions.

Next, a description will be made regarding an optical pickup 60, shown in FIG. 42, which includes a light source unit having a first emission unit and a light source unit having second and third emission units. Note that, in the following description, the same parts as those in the optical pickup 3 are represented by the same reference numerals, and descriptions thereof will be omitted.

Figure 42:
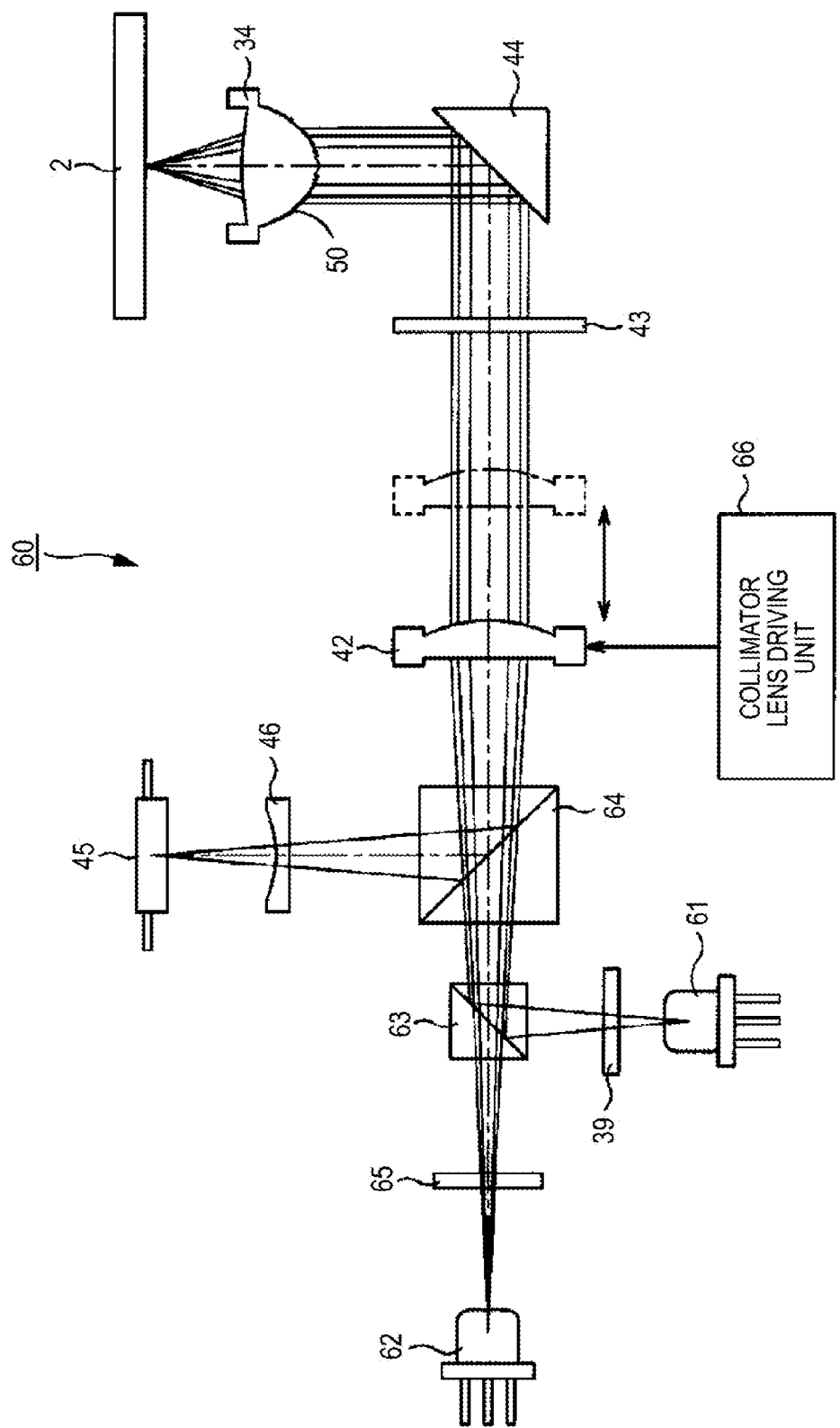
FIG. 42 is an optical path diagram showing another example of an optical system of the optical pickup to which the invention is applied.
Figure 43:
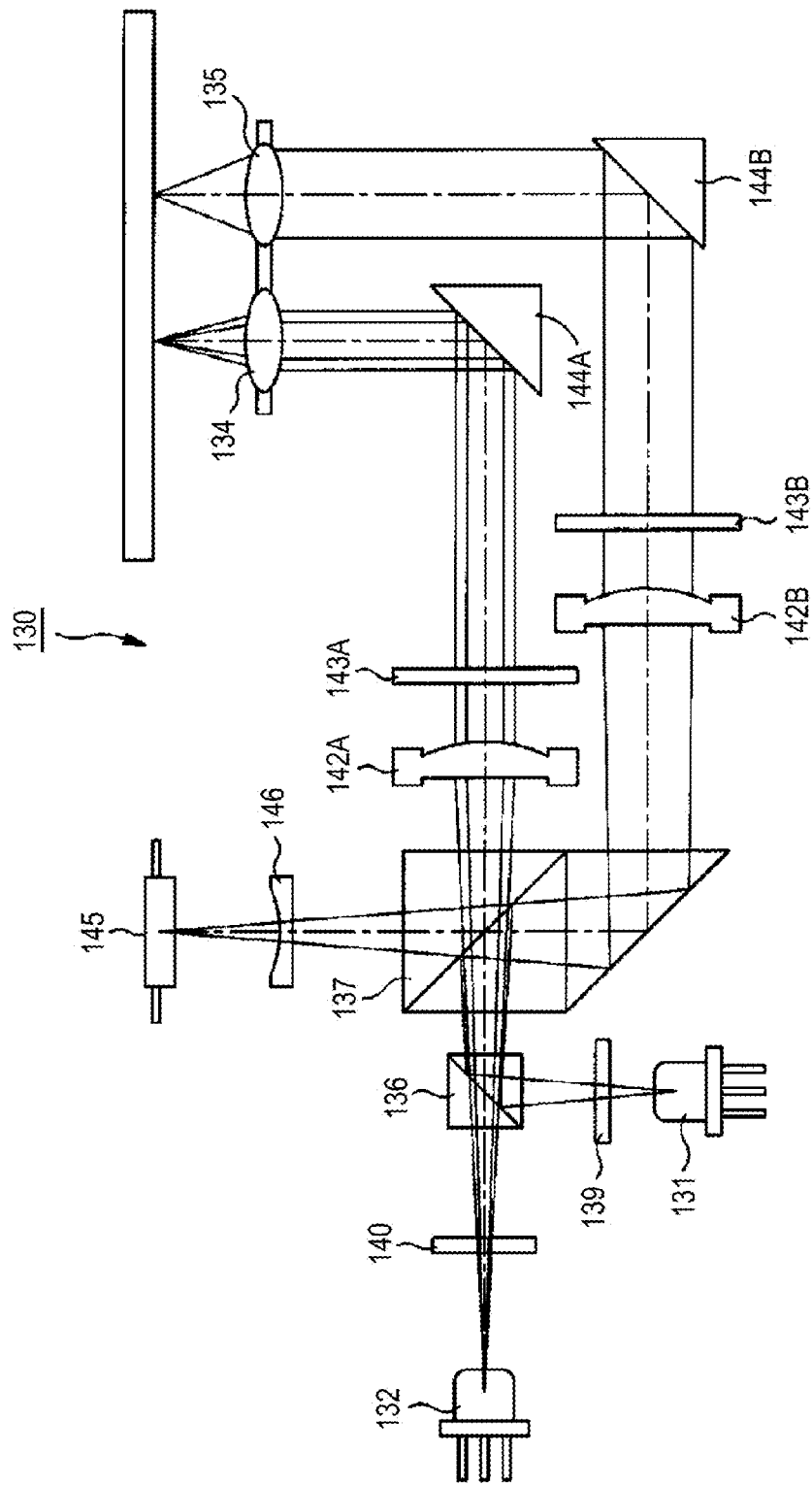
FIG. 43 is an optical path diagram showing an example of an optical system of a known optical pickup.

As shown in FIG. 42, the optical pickup 60 to which the invention is applied includes a first light source unit 61 having a first emission unit configured to emit an optical beam with a first wavelength, a second light source unit 62 having a second emission unit configured to emit an optical beam with a second wavelength and a third emission unit configured to emit an optical beam with a third wavelength, and an objective lens 34 serving as a condensing optical device to condense the optical beams emitted from the first to third emission units on the signal recording surface of the optical disc 2. Note that while a description has been made regarding the optical pickup 60 which uses the objective lens 34 having the diffraction unit 50 as a condensing optical device, a condensing optical device having the objective lens 34B and the diffraction optical element 35B having the diffraction unit 50 such as shown in FIG. 41B, or a condensing optical device having the objective lens 34C with the diffraction unit 90 such as shown in FIGS. 30A and 30B may be provided. When the condensing optical device having the objective lens 34C with the diffraction unit 90 such as shown in FIGS. 30A and 30B is applied to the below-described optical pickup 60 such as shown in FIG. 42, effects described below can be manifested, and the advantages of the above-described objective lens 34C are obtained.

The optical pickup 60 also includes a beam splitter 63 serving as an optical path synthesizing unit to synthesize the optical path of the optical beam with the first wavelength emitted from the first emission unit of the first light source unit 61 and the optical path of the optical beams with second and third wavelengths emitted from the second and third emission units of the second light source unit 62, and a beam splitter 64 having the same function as the third beam splitter 38.

The optical pickup 60 also includes a first grating 39, and a wavelength-dependent grating 65 provided between the second light source unit 62 and the beam splitter 63 to diffract the optical beams with the second and third wavelengths emitted from the second and third emission units into three beams for detection of tracking error signals and the like.

The optical pickup 60 also includes a collimator lens 42, a quarter-wave plate 43, a redirecting mirror 44, a photosensor 45, a multi lens 46, and a collimator lens driving unit 66 driving the collimator lens 42 in the optical axis direction. The collimator lens driving unit 66 drives the collimator lens 42 in the optical axis direction, thereby adjusting the divergent angle of the optical beam having passed through the collimator lens 42, as described above. Accordingly, each optical beam is input to the objective lens 34 in a desired state, so spherical aberration can be reduced, and flaring can be performed. When the loaded optical disc is a so-called multilayer optical disc having a plurality of signal recording surfaces, recording and/or playback can be performed with respect to any signal recording surface.

With the optical pickup 60 configured as described above, the functions of the respective optical parts are the same as with the optical pickup 3 except for those described above, and the optical path of the optical beams with the first to third wavelengths emitted from the first to third emission units is the same as with the optical pickup 3 except for those described above, that is, following synthesizing of the optical path of the optical beams of each wavelength by the beam splitter 64, so detailed description thereof will be omitted.

The optical pickup 60 to which the invention is applied includes the first to third emission units emitting the optical beams with the first to third wavelengths, the objective lens 34 condensing the optical beams with the first to third wavelengths emitted from the first to third emission units on the signal recording surface of the optical disc, and the diffraction unit 50, serving as an optical element, provided on one surface of the objective lens 34 disposed on the outgoing optical path of the optical beams with the first to third wavelengths. The diffraction unit 50 has the first to third diffraction regions 51, 52, and 53. The first to third diffraction regions 51, 52, and 53 are first to third different diffraction structures that are formed in a ring zone shape, each have a predetermined depth, and are configured to emit diffracted light such that as to the optical beam of each wavelength, diffracted light of a predetermined diffraction order such as described above is dominant. Therefore, the single common objective lens 34 can be used to appropriately condense the corresponding optical beams on the signal recording surfaces of three types of optical discs of different use wavelengths. As a result, three-wavelength compatibility is realized with the common objective lens 34, without complicating the configuration, and thus good recording and/or playback of signals with respect to the respective optical discs is realized. Further, the optical pickup 60 has similar advantages of the above-described other optical pickup 3.

The optical pickup 60 is configured such that the second and third emission units are disposed in the common light source unit 62, so further simplification of the configuration and reduction in size are realized. Note that, similarly, with the optical pickup to which the invention is applied, the first to third emission units may be disposed in a light source unit at substantially the same position. With such a configuration, further simplification of the configuration and reduction in size are realized.

The optical disc apparatus 1 to which the invention is applied includes a driving unit holding and rotationally driving an optical disc arbitrarily selected from the first to third optical discs, and an optical pickup performing recording and/or playback of information signals by selectively irradiating a plurality of optical beams of different wavelengths with respect to the optical disc being rotationally driven by the driving unit. The optical pickup 3 or 60 is used as the optical pickup, so with the diffraction unit provided on one surface of the optical element on the optical path of the optical beams with the first to third wavelengths, the optical beam can be appropriately condensed on the signal recording surface of a corresponding one of the three types of optical discs of different use wavelengths through the single common objective lens 34. Accordingly, three-wavelength compatibility can be realized using the common objective lens 34, without complicating the configuration. Therefore, simplification of the configuration and reduction in size are realized, and good recording/playback properties are realized. With the optical disc apparatus 1 to which the invention is applied, the first and second diffraction structures 51 and 52 constituting the diffraction unit 50 of the optical pickup 3 or 60 are cyclical structures which have the cyclical numbers $N_i$ and $N_m$ satisfying Expressions (58) and (59), and in which unit cyclical structures having a concavo-convex shape are successively formed in the radial direction of each ring zone, light use efficiency can be improved, incidence of unwanted light can be reduced, and as a result good recording/playback properties are realized.

The present application contains subject matter related to that disclosed in Japanese Priority Patent Application JP 2008-220488 filed in the Japan Patent Office on Aug. 28, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical pickup comprising:
a first emission unit emitting a first optical beam with a first wavelength corresponding to a first optical disc;
a second emission unit emitting a second optical beam with a second wavelength, which is longer than the first wavelength, corresponding to a second optical disc different from the first optical disc;
a third emission unit emitting a third optical beam with a third wavelength, which is longer than the second wavelength, corresponding to a third optical disc different from the first and second optical discs;
a condensing optical device condensing, on a signal recording surface of a corresponding optical disc, the first optical beam emitted from the first emission unit, the second optical beam emitted from the second emission unit, and the third optical beam emitted from the third emission unit; and
a diffraction unit provided in the condensing optical device, which is disposed on an optical path of the first optical beam with the first wavelength, the second optical beam with the second wavelength, and the third optical beam with the third wavelength,
wherein the diffraction unit has a substantially circular first diffraction region provided on an innermost portion, a ring zone-shaped second diffraction region provided outside the first diffraction region, and a ring zone-shaped third diffraction region provided outside the second diffraction region,
the first diffraction region has a first diffraction structure formed in a ring zone shape to have a predetermined depth, and is configured to emit first diffracted light of an order of the first optical beam with the first wavelength, which passes therethrough and is condensed on the signal recording surface of the first optical disc through the condensing optical device, to emit second diffracted light of an order of the second optical beam with the second wavelength, which passes therethrough and is condensed on the signal recording surface of the second optical disc through the condensing optical device, and to emit third diffracted light of an order of the third optical beam with the third wavelength, which passes therethrough and is condensed on the signal recording surface of the third optical disc through the condensing optical device, the second diffraction region has a second diffraction structure, different from the first diffraction structure, formed in the ring zone shape of the second diffraction region to have a predetermined depth, and is configured to emit fourth diffracted light of an order of the first optical beam with the first wavelength, which passes therethrough and is condensed on the signal recording surface of the first optical disc through the condensing optical device, to emit fifth diffracted light of an order of the second optical beam with the second wavelength, which passes therethrough and is condensed on the signal recording surface of the second optical disc through the condensing optical device, and to emit sixth diffracted light such that diffracted light of an order other than the order of the third optical beam with the third wavelength which passes therethrough and is condensed on the signal recording surface of the third optical disc through the condensing optical device is dominant, the third diffraction region has a third diffraction structure, different from the first and second diffraction structures, formed in the ring zone shape of the third diffraction region to have a predetermined depth, and is configured to emit seventh diffracted light of an order of the first optical beam with the first wavelength, which passes therethrough and is condensed on the signal recording surface of the first optical disc through the condensing optical device, to emit eighth diffracted light such that diffracted light of an order other than the order of the second optical beam with the second wavelength which passes therethrough and is condensed on the signal recording surface of the second optical disc through the condensing optical device is dominant, and to emit ninth diffracted light such that diffracted light of an order other than the order of the third optical beam with the third wavelength which passes therethrough and is condensed on the signal recording surface of the third optical disc through the condensing optical device is dominant, and the first and second diffraction structures are cyclical structures in which unit cyclical structures having a concavo-convex shape are successively formed in a radial direction of each ring zone, and satisfy Expressions (1) and (2), respectively:

$$4 \leq N_i \leq 39 \quad (1)$$

$$3 \leq N_m \leq 25 \quad (2)$$

wherein, $N_1$ represents a first cyclical number of the cyclical structure in the first diffraction structure of the first diffraction region, and $N_m$ represents a second cyclical number of the cyclical structure in the second diffraction structure of the second diffraction region.

2. The optical pickup according to claim 1, wherein the first diffraction region and the second diffraction region satisfy Expressions (3) and (4):

$$\begin{cases} \dfrac{N_m - 1.1 \cdot (R_m^4 - R_i^4)}{N_i + 6.9 \cdot R_i^4} \leq \dfrac{R_m^2 - R_i^2}{R_i^2} \cdot \left| \dfrac{k_{1m}\lambda_1 - k_{2m}\lambda_2}{k_{1i}\lambda_1 - k_{2i}\lambda_2} \right| \leq \\ \dfrac{N_m + 6.9 \cdot (R_m^4 - R_i^4)}{N_i - 1.1 \cdot R_i^4} \\ (\text{When } N_i - 1.1 \cdot R_i^4 > 0) \end{cases} \quad (3)$$

$$\begin{cases} \dfrac{N_m - 1.1 \cdot (R_m^4 - R_i^4)}{N_i + 6.9 \cdot R_i^4} \leq \dfrac{R_m^2 - R_i^2}{R_i^2} \cdot \left| \dfrac{k_{1m}\lambda_1 - k_{2m}\lambda_2}{k_{1i}\lambda_1 - k_{2i}\lambda_2} \right| \\ (\text{When } N_i - 1.1 \cdot R_i^4 \leq 0) \end{cases} \quad (4)$$

wherein, $R_i$ represents a first radius of an outer diameter of the first diffraction region, $R_m$ represents a second radius of an outer diameter of the second diffraction region, $k_{1i}$ represents a first diffraction order of the first wavelength which is dominant in the first diffraction region, $k_{2i}$ represents a second diffraction order of the second wavelength which is dominant in the first diffraction region, $k_{1m}$ represents a third diffraction order of the first wavelength which is dominant in the second diffraction region, $k_{2m}$ represents a fourth diffraction order of the second wavelength which is dominant in the second diffraction region, $N_i$ represents the first cyclical number of the cyclical structure in the first diffraction structure of the first diffraction region, $N_m$ represents the second cyclical number of the cyclical structure in the second diffraction structure of the second diffraction region, $\lambda_1$ represents the first wavelength of the first optical beam which is emitted from the first emission unit, and $\lambda_2$ represents the second wavelength of the second optical beam which is emitted from the second emission unit.

3. The optical pickup according to claim 2, wherein the first diffraction region and the second diffraction region satisfy Expression (5):

$$\dfrac{N_m}{N_i + 2.9 \cdot R_i^4} \leq \dfrac{R_m^2 - R_i^2}{R_i^2} \cdot \left| \dfrac{k_{1m}\lambda_1 - k_{2m}\lambda_2}{k_{1i}\lambda_1 - k_{2i}\lambda_2} \right| \leq \dfrac{N_m + 2.9 \cdot (R_m^4 - R_i^4)}{N_i} \quad (5)$$

wherein, $R_i$ represents the first radius of the outer diameter of the first diffraction region, $R_m$ represents the second radius of the outer diameter of the second diffraction region, $k_{1i}$ represents the first diffraction order of the first wavelength that is dominant in the first diffraction region, $k_{2i}$ represents the second diffraction order of the second wavelength which is dominant in the first diffraction region, $k_{1m}$ represents the third diffraction order of the first wavelength which is dominant in the second diffraction region, $k_{2m}$ represents the fourth diffraction order of the second wavelength which is dominant in the second diffraction region, $N_i$ represents the first cyclical number of the cyclical structure in the first diffraction structure of the first diffraction region, $N_m$ represents the second cyclical number of the cyclical structure in the second diffraction structure of the second diffraction region, $\lambda_1$ represents the first wavelength of the first optical beam that is emitted from the first emission unit, and $\lambda_2$ represents the second wavelength of the second optical beam which is emitted from the second emission unit.

4. The optical pickup according to any one of claims 1 to 3, wherein each cyclical structure has a diffraction structure in which staircase structures having a plurality of steps are successively formed in the radial direction of each ring zone.

5. The optical pickup according to claim 4, wherein the combination of the first diffraction order $k_{1i}$ of the first wavelength and the second diffraction order $k_{2i}$ of the second wavelength which become dominant in the first diffraction region is inconsistent with a combination of the third diffraction order $k_{1m}$ of the first wavelength and the fourth diffraction order $k_{2m}$ of the second wavelength which become dominant in the second diffraction region.

6. The optical pickup according to claim 4, wherein the first diffraction region is such that an average pitch $p_i$ and a height $d_i$ of each of the plurality of steps satisfy Expression (6):

$$d_i/p_i \leq 0.39 \quad (6).$$

7. The optical pickup according to claim 4, wherein the second diffraction region is such that an average pitch $p_m$ and a height $d_m$ of each of the plurality of steps satisfy Expression (7):

$$d_m/p_m \leq 0.39 \quad (7).$$

8. An optical pickup comprising:

a first emission unit emitting a first optical beam with a first wavelength corresponding to a first optical disc;

a second emission unit emitting a second optical beam with a second wavelength, which is longer than the first wavelength, corresponding to a second optical disc different from the first optical disc;

a third emission unit emitting a third optical beam with a third wavelength, which is longer than the second wavelength, corresponding to a third optical disc different from the first and second optical discs;

a condensing optical device condensing, on a signal recording surface of a corresponding optical disc, the first optical beam emitted from the first emission unit, the second optical beam emitted from the second emission unit, and the third optical beam emitted from the third emission unit; and a diffraction unit provided in the condensing optical device, which is disposed on an optical path of the first optical beam with the first wavelength, the second optical beam with the second wavelength, and the third optical beam with the third wavelength, wherein the diffraction unit has a substantially circular first region provided on an innermost portion to diffract, a ring-zone shaped second region provided outside the first region, and a ring-zone shaped third region provided outside the second region, the first region has a first diffraction structure formed in a ring zone shape to have a predetermined depth, and is configured to emit first diffracted light of an order of the first optical beam with the first wavelength, which passes therethrough and is condensed on the signal recording surface of the first optical disc through the condensing optical device, to emit second diffracted light of an order of the second optical beam with the second wavelength, which passes therethrough and is condensed on the signal recording surface of the second optical disc through the condensing optical device, and to emit third diffracted light of an order of the third optical beam with the third wavelength, which passes therethrough and is condensed on the signal recording surface of the third optical disc through the condensing optical device, the second region has a second diffraction structure, different from the first diffraction structure, formed in the ring zone shape of the second region to have a predetermined depth, and is configured to emit fourth diffracted light of an order of the first optical beam with the first wavelength, which passes therethrough and is condensed on the signal recording surface of the first optical disc through the condensing optical device, to emit fifth diffracted light of an order of the second optical beam with the second wavelength, which passes therethrough and is condensed on the signal recording surface of the second optical disc through the condensing optical device, and to emit sixth diffracted light such that diffracted light of an order other than the order of the third optical beam with the third wavelength which passes therethrough and is condensed on the signal recording surface of the third optical disc through the condensing optical device is dominant, the third region is configured to condense the first optical beam with the first wavelength, which passes therethrough, on the signal recording surface of the first optical disc through the condensing optical device, to cause the second optical beam with the second wavelength, which passes therethrough, not to be condensed on the signal recording surface of the second optical disc through the condensing optical device, and to cause the third optical beam with the third wavelength, which passes therethrough, not to be condensed on the signal recording surface of the third optical disc through the condensing optical device, and the first and second diffraction structures are cyclical structures in which unit cyclical structures having a concavo-convex shape are successively formed in a radial direction of each ring zone, and satisfy Expressions (1) and (2), respectively:

$$4 \leq N_i \leq 39 \quad (1)$$

$$3 \leq N_m \leq 25 \quad (2)$$

wherein, $N_i$ represents a first cyclical number of the cyclical structure in the first diffraction structure of the first region, and $N_m$ represents a second cyclical number of the cyclical structure in the second diffraction structure of the second region.

9. An optical disc apparatus comprising:

an optical pickup performing recording and/or playback of an information signal by selectively irradiating a plurality of optical beams with different wavelengths onto an optical disc, which is arbitrarily selected from at least a first optical disc, a second optical disc different from the first optical disc, and a third optical disc different from the first and second optical discs, and is driven to rotate, wherein the optical pickup includes a first emission unit emitting a first optical beam with a first wavelength corresponding to a first optical disc, a second emission unit emitting a second optical beam with a second wavelength, which is longer than the first wavelength, corresponding to the second optical disc, a third emission unit emitting a third optical beam with a third wavelength, which is longer than the second wavelength, corresponding to the third optical disc, a condensing optical device condensing, on a signal recording surface of a corresponding optical disc, the first optical beam emitted from the first emission unit, the second optical beam emitted from the second emission unit, and the third optical beam emitted from the third emission unit; and a diffraction unit provided in the condensing optical device, which is disposed on an optical path of the first optical beam with the first wavelength, the second optical beam with the second wavelength, and the third optical beam with the third wavelength, the diffraction unit having a substantially circular first diffraction region provided on an innermost portion, a ring zone-shaped second diffraction region provided outside the first diffraction region, and a ring zone-shaped third diffraction region provided outside the second diffraction region, the first diffraction region has a first diffraction structure formed in a ring zone shape to have a predetermined depth, and is configured to emit first diffracted light of an order of the first optical beam with the first wavelength, which passes therethrough and is condensed on the signal recording surface of the first optical disc through the condensing optical device, to emit second diffracted light of an order of the second optical beam with the second wavelength, which passes therethrough and is condensed on the signal recording surface of the second optical disc through the condensing optical device, and to emit third diffracted light of an order of the third optical beam with the third wavelength, which passes therethrough and is condensed on the signal recording surface of the third optical disc through the condensing optical device, the second diffraction region has a second diffraction structure, different from the first diffraction structure, formed in the ring zone shape of the second diffraction region to have a predetermined depth, and is configured to emit fourth diffracted light of an order of the first optical beam with the first wavelength, which passes therethrough and is condensed on the signal recording surface of the first optical disc through the condensing optical device, to emit fifth diffracted light of an order of the second optical beam with the second wavelength, which passes therethrough and is condensed on the signal recording surface of the second optical disc through the condensing optical device, and to emit sixth diffracted light such that diffracted light of an order other than the order of the third optical beam with the third wavelength which passes therethrough and is condensed on the signal recording surface of the third optical disc through the condensing optical device is dominant, the third diffraction region has a third diffraction structure, different from the first and second diffraction structures, formed in the ring zone shape of the third diffraction region to have a predetermined depth, and is configured to emit seventh diffracted light of an order of the first optical beam with the first wavelength, which passes therethrough and is condensed on the signal recording surface of the first optical disc through the condensing optical device, to emit eighth diffracted light such that diffracted light of an order other than the order of the second optical beam with the second wavelength which passes therethrough and is condensed on the signal recording surface of the second optical disc through the condensing optical device is dominant, and to emit ninth diffracted light such that diffracted light of an order other than the order of the third optical beam with the third wavelength which passes therethrough and is condensed on the signal recording surface of the third optical disc through the condensing optical device is dominant, and the first and second diffraction structures are cyclical structures in which unit cyclical structures having a concavo-convex shape are successively formed in a radial direction of each ring zone, and satisfy Expressions (1) and (2), respectively:

$$4 \leq N_i \leq 39 \tag{1}$$

$$3 \leq N_m \leq 25 \tag{2}$$

wherein, $N_i$ represents a first cyclical number of the cyclical structure in the first diffraction structure of the first diffraction region, and $N_m$ represents a second cyclical number of the cyclical structure in the second diffraction structure of the second diffraction region.

10. An optical disc apparatus comprising:

an optical pickup performing recording and/or playback of an information signal by selectively irradiating a plurality of optical beams with different wavelengths onto an optical disc, which is arbitrarily selected from at least a first optical disc, a second optical disc different from the first optical disc, and a third optical disc different from the first and second optical discs, and is driven to rotate, wherein the optical pickup includes a first emission unit emitting a first optical beam with a first wavelength corresponding to a first optical disc, a second emission unit emitting a second optical beam with a second wavelength, which is longer than the first wavelength, corresponding to the second optical disc, a third emission unit emitting a third optical beam with a third wavelength, which is longer than the second wavelength, corresponding to the third optical disc, a condensing optical device condensing, on a signal recording surface of a corresponding optical disc, the first optical beam emitted from the first emission unit, the second optical beam emitted from the second emission unit, and the third optical beam emitted from the third emission unit; and a diffraction unit provided in the condensing optical device, which is disposed on an optical path of the first optical beam with the first wavelength, the second optical beam with the second wavelength, and the third optical beam with the third wavelength, the diffraction unit having a substantially circular first region provided on an innermost portion, a ring-zone shaped second region provided outside the first region, and a ring-zone shaped third region provided outside the second region, the first region has a first diffraction structure formed in a ring zone shape to have a predetermined depth, and is configured to emit first diffracted light of an order of the first optical beam with the first wavelength, which passes therethrough and is condensed on the signal recording surface of the first optical disc through the condensing optical device, to emit second diffracted light of an order of the second optical beam with the second wavelength, which passes therethrough and is condensed on the signal recording surface of the second optical disc through the condensing optical device, and to emit third diffracted light of an order of the third optical beam with the third wavelength, which passes therethrough and is condensed on the signal recording surface of the third optical disc through the condensing optical device, the second region has a second diffraction structure, different from the first diffraction structure, formed in the ring zone shape of the second region to have a predetermined depth, and is configured to emit fourth diffracted light of an order of the first optical beam with the first wavelength, which passes therethrough and is condensed on the signal recording surface of the first optical disc through the condensing optical device, to emit fifth diffracted light of an order of the second optical beam with the second wavelength, which passes therethrough and is condensed on the signal recording surface of the second optical disc through the condensing optical device, and to emit sixth diffracted light such that diffracted light of an order other than the order of the third optical beam with the third wavelength which passes therethrough and is condensed on the signal recording surface of the third optical disc through the condensing optical device is dominant, the third region is configured to condense the first optical beam with the first wavelength, which passes therethrough, on the signal recording surface of the first optical disc through the condensing optical device, to cause the second optical beam with the second wavelength, which passes therethrough, not to be condensed on the signal recording surface of the second optical disc through the condensing optical device, and to cause the third optical beam with the third wavelength, which passes therethrough, not to be condensed on the signal recording surface of the third optical disc through the condensing optical device, and the first and second diffraction structures are cyclical structures in which unit cyclical structures having a concavo-convex shape are successively formed in a radial direction of each ring zone, and satisfy Expressions (1) and (2), respectively:

$$4 \leq N_i \leq 39 \tag{1}$$

$$3 \leq N_m \leq 25 \tag{2}$$

wherein, $N_i$ represents a first cyclical number of the cyclical structure in the first diffraction structure of the first region, and $N_m$ represents a second cyclical number of the cyclical structure in the second diffraction structure of the second region.

11. A condensing optical device for use in an optical pickup configured to irradiate optical beams on at least a first optical disc, a second optical disc of a different type from the first optical disc, and a third optical disc of a different type from the first and second optical discs, thereby performing recording and/or playback of information signals, the condensing optical device being configured to condense, on a signal recording surface of a corresponding optical disc, a first optical beam with a first wavelength corresponding to the first optical disc, a second optical beam with a second wavelength, which is longer than the first wavelength, corresponding to the second optical disc, and a third optical beam with a third wavelength, which is longer than the second wavelength, corresponding to the third optical disc, the condensing optical device comprising:

a diffraction unit provided on an input side surface or an output side surface, wherein the diffraction unit has a substantially circular first diffraction region provided on an innermost portion, a ring zone-shaped second diffraction region provided outside the first diffraction region, and a ring zone-shaped third diffraction region provided outside the second diffraction region, the first diffraction region has a first diffraction structure formed in a ring zone shape to have a predetermined depth, and is configured to emit first diffracted light of an order of the first optical beam with the first wavelength, which passes therethrough and is condensed on the signal recording surface of the first optical disc through the condensing optical device, to emit second diffracted light of an order of the second optical beam with the second wavelength, which passes therethrough and is condensed on the signal recording surface of the second optical disc through the condensing optical device, and to emit third diffracted light of an order of the third optical beam with the third wavelength, which passes therethrough and is condensed on the signal recording surface of the third optical disc through the condensing optical device, the second diffraction region has a second diffraction structure, different from the first diffraction structure, formed in the ring zone shape of the second diffraction region to have a predetermined depth, and is configured to emit fourth diffracted light of an order of the first optical beam with the first wavelength, which passes therethrough and is condensed on the signal recording surface of the first optical disc through the condensing optical device, to emit fifth diffracted light of an order of the second optical beam with the second wavelength, which passes therethrough and is condensed on the signal recording surface of the second optical disc through the condensing optical device, and to emit sixth diffracted light such that diffracted light of an order other than the order of the third optical beam with the third wavelength which passes therethrough and is condensed on the signal recording surface of the third optical disc through the condensing optical device is dominant, the third diffraction region has a third diffraction structure, different from the first and second diffraction structures, formed in a ring zone shape of the third diffraction region to have a predetermined depth, and is configured to emit seventh diffracted light of an order of the first optical beam with the first wavelength, which passes therethrough and is condensed on the signal recording surface of the first optical disc through the condensing optical device, to emit eighth diffracted light such that diffracted light of an order other than the order of the second optical beam with the second wavelength which passes therethrough and is condensed on the signal recording surface of the second optical disc through the condensing optical device is dominant, and to emit ninth diffracted light such that diffracted light of an order other than the order of the third optical beam with the third wavelength which passes therethrough and is condensed on the signal recording surface of the third optical disc through the condensing optical device is dominant, and the first and second diffraction structures are cyclical structures in which unit cyclical structures having a concavo-convex shape are successively formed in a radial direction of each ring zone, and satisfy Expressions (1) and (2), respectively:

$$4 \leq N_i \leq 39 \quad (1)$$

$$3 \leq N_m \leq 25 \quad (2)$$

wherein, $N_i$ represents a first cyclical number of the cyclical structure in the first diffraction structure of the first diffraction region, $N_m$ represents a second cyclical number of the cyclical structure in the second diffraction structure of the second diffraction region.

12. A condensing optical device for use in an optical pickup configured to irradiate optical beams on at least a first optical disc, a second optical disc of a different type from the first optical disc, and a third optical disc of a different type from the first and second optical discs, thereby performing recording and/or playback of information signals, the condensing optical device being configured to condense, on a signal recording surface of a corresponding optical disc, a first optical beam with a first wavelength corresponding to the first optical disc, a second optical beam with a second wavelength, which is longer than the first wavelength, corresponding to the second optical disc, and a third optical beam with a third wavelength, which is longer than the second wavelength, corresponding to the third optical disc, the condensing optical device comprising:

a diffraction unit provided on an input side surface or an output side surface, wherein the diffraction unit has a substantially circular first diffraction region provided on an innermost portion, a ring zone-shaped second diffraction region provided outside the first diffraction region, and a ring zone-shaped third diffraction region provided outside the second diffraction region, the first diffraction region has a first diffraction structure formed in a ring zone shape to have a predetermined depth, and is configured to emit first diffracted light of an order of the first optical beam with the first wavelength, which passes therethrough and is condensed on the signal recording surface of the first optical disc through the condensing optical device, to emit second diffracted light of an order of the second optical beam with the second wavelength, which passes therethrough and is condensed on the signal recording surface of the second optical disc through the condensing optical device, and to emit third diffracted light of an order of the third optical beam with the third wavelength, which passes therethrough and is condensed on the signal recording surface of the third optical disc through the condensing optical device, the second diffraction region has a second diffraction structure, different from the first diffraction structure, formed in the ring zone shape of the second diffraction region to have a predetermined depth, and is configured to emit fourth diffracted light of an order of the first optical beam with the first wavelength, which passes therethrough and is condensed on the signal recording surface of the first optical disc through the condensing optical device, to emit fifth diffracted light of an order of the second optical beam with the second wavelength, which passes therethrough and is condensed on the signal recording surface of the second optical disc through the condensing optical device, and to emit sixth diffracted light such that diffracted light of an order other than the order of the third optical beam with the third wavelength which passes therethrough and is condensed on the signal recording surface of the third optical disc through the condensing optical device is dominant, the third diffraction region has a third diffraction structure, different from the first and second diffraction structures, formed in the ring zone shape of the third diffraction region to have a predetermined depth, and is configured to emit seventh diffracted light of an order of the first optical beam with the first wavelength, which passes therethrough and is condensed on the signal recording surface of the first optical disc through the condensing optical device, to emit eighth diffracted light such that diffracted light of an order other than the order of the second optical beam with the second wavelength which passes therethrough and is condensed on the signal recording surface of the second optical disc through the condensing optical device is dominant, and to emit ninth diffracted light such that diffracted light of an order other than the order of the third optical beam with the third wavelength which passes therethrough and is condensed on the signal recording surface of the third optical disc through the condensing optical device is dominant, the first diffraction structure is a first optical path difference providing structure in which at least a first basic structure and a second basic structure are formed so as to overlap on each other, the first basic structure is a cyclical structure, in which unit cyclical structures having a concavo-convex shape are successively formed in a radial direction of each ring zone, as a second optical path difference providing structure, which provides the second optical path difference between the first and second wavelengths so as to emit the first diffracted light of the order to be condensed, the second basic structure is a third optical path difference providing structure that provides the third optical path difference so as to emit tenth diffracted light such that diffracted light of zero order of the first optical beam with the first wavelength which passes through the second basic structure is dominant, to emit eleventh diffracted light such that diffracted light of zero order of the second optical beam with the second wavelength which passes through the second basic structure is dominant, and to emit twelfth diffracted light such that diffracted light of an order other than zero order of the third optical beam with the third wavelength which passes through the second basic structure is dominant, the first basic structure of the first diffraction structure is a cyclical structure in which unit cyclical structures having a concavo-convex shape are successively formed in a radial direction of each ring zone, and satisfies Expression (1), and the second diffraction structure is a cyclical structure in which unit cyclical structures having a concavo-convex shape are successively formed in a radial direction of each ring zone, and satisfy Expression (2):

$$4 \leq N_i \leq 39 \quad (1)$$

$$3 \leq N_m \leq 25 \quad (2)$$

wherein, $N_i$ represents a first cyclical number of the cyclical structure in the first basic structure of the first diffraction structure of the first diffraction region, and $N_m$ represents a second cyclical number of the cyclical structure in the second diffraction structure of the second diffraction region.

13. A condensing optical device for use in an optical pickup configured to irradiate optical beams on at least a first optical disc, a second optical disc of a different type from the first optical disc, and a third optical disc of a different type from the first and second optical discs, thereby performing recording and/or playback of information signals, the condensing optical device being configured to condense, on a signal recording surface of a corresponding optical disc, a first optical beam with a first wavelength corresponding to the first optical disc, a second optical beam with a second wavelength, which is longer than the first wavelength, corresponding to the second optical disc, and a third optical beam with a third wavelength, which is longer than the second wavelength, corresponding to the third optical disc, the condensing optical device comprising:

a diffraction unit provided on an input side surface or an output side surface, wherein the diffraction unit has a substantially circular first region provided on an innermost portion, a ring-zone shaped second region provided outside the first region, and a ring-zone shaped third region provided outside the second region, the first region has a first diffraction structure formed in a ring zone shape to have a predetermined depth, and is configured to emit first diffracted light of an order of the first optical beam with the first wavelength, which passes therethrough and is condensed on the signal recording surface of the first optical disc through the condensing optical device, to emit second diffracted light of an order of the second optical beam with the second wavelength, which passes therethrough and is condensed on the signal recording surface of the second optical disc through the condensing optical device, and to emit third diffracted light of an order of the third optical beam with the third wavelength, which passes therethrough and is condensed on the signal recording surface of the third optical disc through the condensing optical device, the second region has a second diffraction structure, different from the first diffraction structure, formed in the ring zone shape of the second region to have a predetermined depth, and is configured to emit fourth diffracted light of an order of the first optical beam with the first wavelength, which passes therethrough and is condensed on the signal recording surface of the first optical disc through the condensing optical device, to emit fifth diffracted light of an order of the second optical beam with the second wavelength, which passes therethrough and is condensed on the signal recording surface of the second optical disc through the condensing optical device, and to emit sixth diffracted light such that diffracted light of an order other than the order of the third optical beam with the third wavelength which passes therethrough and is condensed on the signal recording surface of the third optical disc through the condensing optical device is dominant, the third region is configured to condense the first optical beam with the first wavelength, which passes therethrough, on the signal recording surface of the first optical disc through the condensing optical device, to cause the second optical beam with the second wavelength, which passes therethrough, not to be condensed on the signal recording surface of the second optical disc through the condensing optical device, and to cause the third optical beam with the third wavelength, which passes therethrough, not to be condensed on the signal recording surface of the third optical disc through the condensing optical device, and the first and second diffraction structures are cyclical structures in which unit cyclical structures having a concavo-convex shape are successively formed in a radial direction of each ring zone, and satisfy Expressions (1) and (2), respectively:

$$4 \leq N_i \leq 39 \quad (1)$$

$$3 \leq N_m \leq 25 \quad (2)$$

wherein, $N_i$ represents a first cyclical number of the cyclical structure in the first diffraction structure of the first region, and $N_m$ represents a second cyclical number of the cyclical structure in the second diffraction structure of the second region.

14. A condensing optical device for use in an optical pickup configured to irradiate optical beams on at least a first optical disc, a second optical disc of a different type from the first optical disc, and a third optical disc of a different type from the first and second optical discs, thereby performing recording and/or playback of information signals, the condensing optical device being configured to condense, on a signal recording surface of a corresponding optical disc, a first optical beam with a first wavelength corresponding to the first optical disc, a second optical beam with a second wavelength, which is longer than the first wavelength, corresponding to the second optical disc, and a third optical beam with a third wavelength, which is longer than the second wavelength, corresponding to the third optical disc, the condensing optical device comprising:

a diffraction unit provided on an input side surface or an output side surface, wherein the diffraction unit has a substantially circular first region provided on an innermost portion to diffract, a ring-zone shaped second region provided outside the first region, and a ring-zone shaped third region provided outside the second region, the first region has a first diffraction structure formed in a ring zone shape to have a predetermined depth, and is configured to emit first diffracted light of an order of the first optical beam with the first wavelength, which passes therethrough and is condensed on the signal recording surface of the first optical disc through the condensing optical device, to emit second diffracted light of an order of the second optical beam with the second wavelength, which passes therethrough and is condensed on the signal recording surface of the second optical disc through the condensing optical device, and to emit third diffracted light of an order of the third optical beam with the third wavelength, which passes therethrough and is condensed on the signal recording surface of the third optical disc through the condensing optical device, the second region has a second diffraction structure, different from the first diffraction structure, formed in the ring zone shape of the second region to have a predetermined depth, and is configured to emit fourth diffracted light of an order of the first optical beam with the first wavelength, which passes therethrough and is condensed on the signal recording surface of the first optical disc through the condensing optical device, to emit fifth diffracted light of an order of the second optical beam with the second wavelength, which passes therethrough and is condensed on the signal recording surface of the second optical disc through the condensing optical device, and to emit sixth diffracted light such that diffracted light of an order other than the order of the third optical beam with the third wavelength which passes therethrough and is condensed on the signal recording surface of the third optical disc through the condensing optical device is dominant, the third region is configured to condense the first optical beam with the first wavelength, which passes therethrough, on the signal recording surface of the first optical disc through the condensing optical device, to cause the second optical beam with the second wavelength, which passes therethrough, not to be condensed on the signal recording surface of the second optical disc through the condensing optical device, and to cause the third optical beam with the third wavelength, which passes therethrough, not to be condensed on the signal recording surface of the third optical disc through the condensing optical device, the first diffraction structure is an optical path difference providing structure in which at least a first basic structure and a second basic structure are formed so as to overlap each other, the first basic structure is a cyclical structure, in which unit cyclical structures having a concavo-convex shape are successively formed in a radial direction of each ring zone, as a first optical path difference providing structure, which provides the first optical path difference between the first and second wavelengths so as to emit first diffracted light of the order to be condensed, the second basic structure is a second optical path difference providing structure that provides the second optical path difference so as to emit tenth diffracted light such that diffracted light of zero order of the first optical beam with the first wavelength which passes through the second basic structure is dominant, to emit eleventh diffracted light such that diffracted light of zero order of the second optical beam with the second wavelength which passes through the second basic structure is dominant, and to emit twelfth diffracted light such that diffracted light of an order other than zero order of the third optical beam with the third wavelength which passes through the second basic structure is dominant, the first basic structure of the first diffraction structure is a cyclical structure in which unit cyclical structures having a concavo-convex shape are successively formed in a radial direction of each ring zone, and satisfies Expression (1), and the second diffraction structure is a cyclical structure in which unit cyclical structures having a concavo-convex shape are successively formed in a radial direction of each ring zone, and satisfies Expression (2)

$$4 \leq N_i \leq 39 \quad (1)$$

$$3 \leq N_m \leq 25 \quad (2)$$

wherein, $N_i$ represents a first cyclical number of the cyclical structure in the first basic structure of the first diffraction structure of the first region, and Nm represents a second cyclical number of the cyclical structure in the second diffraction structure of the second region.

* * * * *